US012801262B2

(12) United States Patent
De Jong et al.

(10) Patent No.: US 12,801,262 B2
(45) Date of Patent: Nov. 17, 2026

(54) USER INTERFACES FOR SHARING LOCATIONS OF FINDABLE ITEMS

(71) Applicant: Apple Inc., Cupertino, CA (US)

(72) Inventors: Frank De Jong, San Francisco, CA (US); Katherine K. Ernst, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/304,911

(22) Filed: Apr. 21, 2023

(65) Prior Publication Data

US 2023/0342009 A1 Oct. 26, 2023

Related U.S. Application Data

(60) Provisional application No. 63/497,426, filed on Apr. 20, 2023, provisional application No. 63/363,363, filed on Apr. 21, 2022.

(51) Int. Cl.
*G06F 3/0484* (2022.01)
*G06F 3/0482* (2013.01)

(52) U.S. Cl.
CPC .......... *G06F 3/0484* (2013.01); *G06F 3/0482* (2013.01)

(58) Field of Classification Search
CPC ..... G06F 3/0484; G06F 3/0482; H04W 4/029
USPC .......................................................... 715/767
See application file for complete search history.

(56) References Cited

U.S. PATENT DOCUMENTS 5,672,820 A 9/1997 Rossi et al.
5,956,038 A 9/1999 Rekimoto
6,144,318 A 11/2000 Hayashi et al.
6,144,956 A 11/2000 Yajima et al.
6,323,846 B1 11/2001 Westerman et al.
6,421,608 B1 7/2002 Motoyama et al.
6,553,236 B1 4/2003 Dunko et al.
6,570,557 B1 5/2003 Westerman et al.
6,636,249 B1 10/2003 Rekimoto
6,677,932 B1 1/2004 Westerman
7,274,292 B2 9/2007 Velhal et al.
7,372,276 B2 5/2008 Mulcahey
(Continued)

FOREIGN PATENT DOCUMENTS

CN 103269510 A 8/2013
CN 205769155 U 12/2016
(Continued)

OTHER PUBLICATIONS

Corrected Notice of Allowability received for U.S. Appl. No. 17/452,971, mailed on Mar. 11, 2024, 3 pages.
(Continued)

*Primary Examiner* — Stephen S Hong
*Assistant Examiner* — Broderick C Anderson
(74) *Attorney, Agent, or Firm* — Kubota & Basol LLP

(57) ABSTRACT

Some embodiments described in this disclosure are directed to one or more electronic devices that receive and/or transmit invitations for accessing locations of findable items. Some embodiments described in this disclosure are directed to one or more electronic devices that present notifications when an unknown remote locator object is tracking the user. Some embodiments described in this disclosure are directed to one or more electronic devices that request, and grant or reject authorization to obtain location information of findable items.

49 Claims, 84 Drawing Sheets

(56) References Cited

U.S. PATENT DOCUMENTS 7,523,871 B1 4/2009 Wilson et al.
7,575,065 B1 8/2009 Podhrasky
7,614,008 B2 11/2009 Ording
7,633,076 B2 12/2009 Huppi et al.
7,653,883 B2 1/2010 Hotelling et al.
7,657,849 B2 2/2010 Chaudhri et al.
7,663,607 B2 2/2010 Hotelling et al.
7,788,032 B2 8/2010 Moloney
7,844,914 B2 11/2010 Andre et al.
7,957,762 B2 6/2011 Herz et al.
8,006,002 B2 8/2011 Kalayjian et al.
8,094,011 B2 1/2012 Faris et al.
8,239,784 B2 8/2012 Hotelling et al.
8,279,180 B2 10/2012 Hotelling et al.
8,380,430 B2 2/2013 Malone et al.
8,381,135 B2 2/2013 Hotelling et al.
8,433,722 B2 4/2013 Shin et al.
8,462,591 B1 6/2013 Marhaben
8,479,122 B2 7/2013 Hotelling et al.
8,526,677 B1 9/2013 Crichton et al.
8,576,669 B2 11/2013 Onda
8,847,754 B2 9/2014 Buchheim et al.
8,878,671 B2 11/2014 Buchheim et al.
9,002,372 B2 4/2015 Shakespeare et al.
9,348,458 B2 5/2016 Hotelling et al.
9,357,348 B2 5/2016 Evans et al.
9,443,414 B2 9/2016 Scavezze et al.
9,514,630 B1 12/2016 Steven
9,547,939 B2 1/2017 Hittel et al.
9,549,282 B1 1/2017 Mcdonough et al.
9,609,515 B2 3/2017 Tredoux et al.
9,654,598 B1 5/2017 Crawford et al.
9,706,357 B2 7/2017 Heo et al.
9,836,187 B2 12/2017 Lee et al.
9,892,535 B1 2/2018 Guy
9,900,733 B2 2/2018 Beattie, Jr.
9,911,310 B2 3/2018 Neumeyer et al.
9,933,937 B2 4/2018 Lemay et al.
9,997,043 B2 6/2018 H. Kazerouni
10,102,749 B1 10/2018 Wagner
10,147,303 B1 12/2018 Carter
10,154,379 B2 12/2018 Mei et al.
10,212,541 B1 2/2019 Brody et al.
10,292,006 B2 5/2019 Yu et al.
10,318,811 B1 6/2019 Gold et al.
10,373,463 B1 8/2019 Herring
10,386,960 B1 8/2019 Smith
10,424,189 B2 9/2019 Daoura et al.
10,438,409 B2 10/2019 Todeschini et al.
10,448,211 B1 10/2019 Shen et al.
10,462,611 B1 10/2019 Klinkner et al.
10,568,035 B1 2/2020 Tong
10,757,057 B2 8/2020 Friend et al.
10,757,540 B1 8/2020 Klinkner et al.
10,757,676 B1 8/2020 De La Broise et al.
10,777,053 B2 9/2020 Jenkins et al.
10,852,918 B1 12/2020 Voss
11,047,702 B1 6/2021 Meyer et al.
11,138,251 B2 10/2021 Estruch Tena et al.
11,145,183 B2 10/2021 Daoura et al.
11,216,624 B2 1/2022 Zarshchikov et al.
11,221,752 B2 1/2022 Howard et al.
11,222,203 B2 1/2022 Dante et al.
11,792,605 B2 10/2023 Daoura et al.
11,823,558 B2 11/2023 Persson
12,287,220 B1 4/2025 Cummings
2002/0015024 A1 2/2002 Westerman et al.
2002/0055362 A1 5/2002 Aoyama
2002/0183077 A1 12/2002 Fomukong
2004/0021567 A1 2/2004 Dunn
2004/0212630 A1 10/2004 Hobgood et al.
2004/0217859 A1 11/2004 Pucci et al.
2005/0190059 A1 9/2005 Wehrenberg
2006/0017692 A1 1/2006 Wehrenberg et al.
2006/0033724 A1 2/2006 Chaudhri et al.
2006/0197753 A1 9/2006 Hotelling
2006/0255935 A1 11/2006 Scalisi et al.
2006/0277469 A1 12/2006 Chaudhri et al.
2007/0021108 A1 1/2007 Bocking et al.
2007/0037582 A1 2/2007 Mohi et al.
2007/0037587 A1 2/2007 Mohi et al.
2007/0037588 A1 2/2007 Mohi et al.
2007/0042790 A1 2/2007 Mohi et al.
2007/0101291 A1 5/2007 Forstall et al.
2007/0106457 A1 5/2007 Rosenberg
2007/0157089 A1 7/2007 Van et al.
2007/0197229 A1 8/2007 Kalliola et al.
2007/0229350 A1 10/2007 Scalisi et al.
2007/0252696 A1 11/2007 Belisle et al.
2007/0291104 A1 12/2007 Petersen et al.
2008/0102786 A1 5/2008 Griffin
2008/0125040 A1 5/2008 Kalayjian
2008/0129491 A1 6/2008 Ruperto
2008/0143516 A1* 6/2008 Mock ................. G08B 21/0269
455/67.11
2008/0170118 A1 7/2008 Albertson et al.
2008/0242278 A1 10/2008 Rekimoto
2008/0254808 A1 10/2008 Rekimoto
2008/0254811 A1 10/2008 Stewart
2009/0076723 A1 3/2009 Moloney
2009/0260022 A1 10/2009 Louch et al.
2009/0300511 A1 12/2009 Behar et al.
2010/0002938 A1 1/2010 Mulcahey
2010/0107179 A1 4/2010 Quintanilla et al.
2010/0151840 A1 6/2010 Bauchot et al.
2010/0198867 A1 8/2010 Rekimoto
2010/0255882 A1 10/2010 Kozitsyn et al.
2010/0325194 A1 12/2010 Williamson et al.
2011/0052083 A1 3/2011 Rekimoto
2011/0081920 A1 4/2011 Hung et al.
2011/0148625 A1 6/2011 Velusamy
2011/0181289 A1 7/2011 Rushing
2011/0187527 A1 8/2011 Goodwill et al.
2011/0210847 A1 9/2011 Howard et al.
2011/0222729 A1 9/2011 Gabara
2011/0234399 A1 9/2011 Yan
2011/0285506 A1 11/2011 Hillis
2011/0286310 A1 11/2011 Onda
2012/0008526 A1 1/2012 Borghei
2012/0052870 A1 3/2012 Habicher
2012/0075099 A1 3/2012 Brown
2012/0092373 A1 4/2012 Ryu et al.
2012/0166077 A1 6/2012 Herzog et al.
2012/0171998 A1 7/2012 Kang
2012/0229400 A1 9/2012 Birnbaum et al.
2012/0303270 A1 11/2012 Su et al.
2013/0030931 A1 1/2013 Moshfeghi
2013/0107057 A1 5/2013 Zhou et al.
2013/0113715 A1 5/2013 Grant et al.
2013/0172016 A1 7/2013 Ooka
2013/0288719 A1 10/2013 Alonzo
2013/0328665 A1 12/2013 Cranfill et al.
2013/0332721 A1 12/2013 Chaudhri et al.
2013/0345953 A1 12/2013 Udeshi et al.
2014/0044305 A1 2/2014 Scavezze et al.
2014/0047413 A1* 2/2014 Sheive ...................... G06F 8/33
717/110
2014/0089810 A1 3/2014 Chen et al.
2014/0101189 A1 4/2014 Schenkel
2014/0135042 A1 5/2014 Buchheim et al.
2014/0136633 A1 5/2014 Murillo et al.
2014/0162685 A1 6/2014 Edge
2014/0173439 A1* 6/2014 Gutierrez ................ H04L 43/10
715/738
2014/0213301 A1 7/2014 Evans et al.
2014/0222280 A1 8/2014 Salomonsson et al.
2014/0242972 A1 8/2014 Slotznick
2014/0266698 A1 9/2014 Hall et al.
2014/0267411 A1 9/2014 Fein et al.
2014/0300452 A1 10/2014 Rofe et al.
2014/0327518 A1 11/2014 Loutit
2014/0329460 A1 11/2014 Loutit
2014/0364099 A1 12/2014 Pai et al.
2014/0365923 A1 12/2014 Lee et al.

(56) References Cited

U.S. PATENT DOCUMENTS

| | | | |
|---|---|---|---|
| 2014/0365945 A1 | 12/2014 | Karunamuni et al. | |
| 2015/0012307 A1 | 1/2015 | Moss | |
| 2015/0058744 A1 | 2/2015 | Dhingra et al. | |
| 2015/0154851 A1 | 6/2015 | Vincent et al. | |
| 2015/0170496 A1 | 6/2015 | King et al. | |
| 2015/0172393 A1* | 6/2015 | Oplinger | H04L 67/52 709/204 |
| 2015/0289108 A1 | 10/2015 | Sandel et al. | |
| 2015/0296341 A1* | 10/2015 | Cecchini | H04L 67/75 455/566 |
| 2015/0356393 A1 | 12/2015 | Daoura et al. | |
| 2016/0026869 A1 | 1/2016 | Rekimoto | |
| 2016/0027307 A1 | 1/2016 | Abhyanker et al. | |
| 2016/0044451 A1 | 2/2016 | Marth | |
| 2016/0055676 A1 | 2/2016 | Kasahara et al. | |
| 2016/0092705 A1 | 3/2016 | Wadman et al. | |
| 2016/0171777 A1 | 6/2016 | Todeschini et al. | |
| 2016/0203641 A1 | 7/2016 | Bostick et al. | |
| 2016/0335876 A1 | 11/2016 | Verma | |
| 2016/0350639 A1 | 12/2016 | Tere | |
| 2016/0357354 A1 | 12/2016 | Chen et al. | |
| 2017/0006577 A1 | 1/2017 | Koum et al. | |
| 2017/0048686 A1 | 2/2017 | Chang et al. | |
| 2017/0053560 A1 | 2/2017 | Aldossary et al. | |
| 2017/0064504 A1 | 3/2017 | Jose | |
| 2017/0064511 A1 | 3/2017 | Mccormick | |
| 2017/0092085 A1 | 3/2017 | Agarwal | |
| 2017/0092090 A1 | 3/2017 | Lerner | |
| 2017/0168159 A1 | 6/2017 | Gatland | |
| 2017/0180934 A1 | 6/2017 | Brice et al. | |
| 2017/0276498 A1 | 9/2017 | Tsai | |
| 2017/0307388 A1 | 10/2017 | Mcconathy et al. | |
| 2017/0353833 A1 | 12/2017 | De Barros Chapiewski et al. | |
| 2017/0357320 A1 | 12/2017 | Chaudhri et al. | |
| 2017/0357520 A1 | 12/2017 | De Vries et al. | |
| 2017/0365100 A1 | 12/2017 | Walton | |
| 2018/0035257 A1 | 2/2018 | Mccormick | |
| 2018/0077097 A1 | 3/2018 | Alfaro et al. | |
| 2018/0084517 A1 | 3/2018 | Do et al. | |
| 2018/0091951 A1* | 3/2018 | Sandel | H04L 67/306 |
| 2018/0147472 A1 | 5/2018 | Deangelis et al. | |
| 2018/0158197 A1 | 6/2018 | Dasgupta et al. | |
| 2018/0165924 A9 | 6/2018 | Olsson et al. | |
| 2018/0184286 A1 | 6/2018 | Patterson | |
| 2018/0189567 A1 | 7/2018 | Maheriya et al. | |
| 2018/0198973 A1 | 7/2018 | Eronen et al. | |
| 2018/0227393 A1 | 8/2018 | Daub | |
| 2018/0240176 A1 | 8/2018 | Cronin et al. | |
| 2018/0241488 A1 | 8/2018 | Daoura et al. | |
| 2018/0276427 A1 | 9/2018 | Depew et al. | |
| 2018/0278888 A1 | 9/2018 | Kasahara et al. | |
| 2018/0343561 A1 | 11/2018 | Patterson | |
| 2018/0349516 A1 | 12/2018 | Dutta et al. | |
| 2018/0357876 A1 | 12/2018 | Smoak | |
| 2019/0050901 A1 | 2/2019 | Vincent et al. | |
| 2019/0073113 A1 | 3/2019 | Yang | |
| 2019/0086666 A1 | 3/2019 | Wu | |
| 2019/0102372 A1 | 4/2019 | Hailpern et al. | |
| 2019/0103012 A1* | 4/2019 | Daoura | G08B 21/0247 |
| 2019/0114887 A1 | 4/2019 | Brantley | |
| 2019/0114921 A1 | 4/2019 | Cazzoli | |
| 2019/0163748 A1 | 5/2019 | Cuthbert et al. | |
| 2019/0174265 A1 | 6/2019 | Chen | |
| 2019/0182626 A1 | 6/2019 | Miller et al. | |
| 2019/0285413 A1 | 9/2019 | Hallett | |
| 2019/0362556 A1 | 11/2019 | Ben-dor et al. | |
| 2019/0370544 A1 | 12/2019 | Wright et al. | |
| 2020/0015040 A1* | 1/2020 | Baird | G08B 21/24 |
| 2020/0107164 A1 | 4/2020 | Lopatin et al. | |
| 2020/0107165 A1 | 4/2020 | Pai et al. | |
| 2020/0110934 A1 | 4/2020 | Paul | |
| 2020/0117339 A1 | 4/2020 | Amitay et al. | |
| 2020/0139929 A1 | 5/2020 | Turley | |
| 2020/0169848 A1 | 5/2020 | Daoura et al. | |
| 2020/0193783 A1 | 6/2020 | Peoples | |
| 2020/0220914 A1 | 7/2020 | Carrigan et al. | |
| 2020/0242848 A1 | 7/2020 | Ambler et al. | |
| 2020/0257865 A1 | 8/2020 | Zarshchikov et al. | |
| 2020/0259908 A1 | 8/2020 | Klinkner et al. | |
| 2020/0260142 A1 | 8/2020 | Kasahara et al. | |
| 2020/0273235 A1 | 8/2020 | Emami et al. | |
| 2020/0284585 A1 | 9/2020 | Lee | |
| 2020/0379946 A1 | 12/2020 | Coffman et al. | |
| 2020/0382908 A1* | 12/2020 | Behzadi | G06F 3/0482 |
| 2020/0382912 A1 | 12/2020 | Dancie et al. | |
| 2020/0409537 A1* | 12/2020 | Story | H04L 67/52 |
| 2021/0065107 A1* | 3/2021 | Jajula | G06Q 10/087 |
| 2021/0190503 A1 | 6/2021 | Landers | |
| 2021/0264154 A1 | 8/2021 | Lamont | |
| 2021/0314735 A1 | 10/2021 | Klinkner et al. | |
| 2022/0023136 A1 | 1/2022 | Xia et al. | |
| 2022/0035510 A1 | 2/2022 | Behzadi et al. | |
| 2022/0050563 A1 | 2/2022 | Behzadi et al. | |
| 2022/0075503 A1 | 3/2022 | Behzadi et al. | |
| 2022/0100286 A1 | 3/2022 | De Jong et al. | |
| 2022/0103974 A1 | 3/2022 | De Jong et al. | |
| 2022/0107187 A1 | 4/2022 | Okabe et al. | |
| 2022/0223013 A1 | 7/2022 | Persson et al. | |
| 2022/0335807 A1 | 10/2022 | Jong et al. | |
| 2022/0365633 A1 | 11/2022 | Rochette et al. | |
| 2023/0164103 A1 | 5/2023 | Ham et al. | |
| 2023/0262420 A1 | 8/2023 | Behzadi et al. | |
| 2023/0375359 A1 | 11/2023 | Fleizach et al. | |
| 2024/0012531 A1 | 1/2024 | Behzadi et al. | |
| 2024/0062634 A1 | 2/2024 | Persson | |
| 2024/0272773 A1 | 8/2024 | De Jong et al. | |
| 2024/0334161 A1 | 10/2024 | De Jong et al. | |
| 2024/0406672 A1 | 12/2024 | Sart | |
| 2024/0406677 A1 | 12/2024 | Allen | |
| 2025/0088584 A1 | 3/2025 | De Jong et al. | |

FOREIGN PATENT DOCUMENTS

| | | | |
|---|---|---|---|
| CN | 109146954 | A | 1/2019 |
| CN | 110297594 | A | 10/2019 |
| EP | 2439920 | A1 | 4/2012 |
| EP | 2482164 | A1 | 8/2012 |
| IT | UA20163647 | A1 | 11/2017 |
| JP | 2006-284458 | A | 10/2006 |
| JP | 2007-88943 | A | 4/2007 |
| JP | 2017-15593 | A | 1/2017 |
| JP | 2017-530463 | A | 10/2017 |
| JP | 2018101831 | A | 6/2018 |
| JP | 2019-46502 | A | 3/2019 |
| JP | 2020531938 | A | 11/2020 |
| KR | 10-2021-0151192 | A | 12/2021 |
| WO | 0137004 | A1 | 5/2001 |
| WO | 2012/047920 | A1 | 4/2012 |
| WO | 2013/169849 | A2 | 11/2013 |
| WO | 2014/105276 | A1 | 7/2014 |
| WO | 2018/034053 | A1 | 2/2018 |
| WO | 2020/214864 | A1 | 10/2020 |
| WO | 2023105450 | A1 | 6/2023 |

OTHER PUBLICATIONS

Corrected Notice of Allowability received for U.S. Appl. No. 17/455,843, mailed on Mar. 14 2024, 3 pages.

Final Office Action received for U.S. Appl. No. 17/663,816, mailed on Mar. 27, 2024, 38 pages.

Final Office Action received for U.S. Appl. No. 18/474,133, mailed on Aug. 26, 2024, 13 pages.

"HowTechs, Motorola Moto G—How to reorganize app and widget", https://www.youtube.com/watch?v=0szKlr7xnqs, Dec. 22, 2013, 15 pages.

International Search Report received for PCT Application No. PCT/US2023/019402, mailed on Sep. 19, 2023, 6 pages.

International Search Report received for PCT Patent Application No. PCT/US2023/022602, mailed on Sep. 4, 2023, 4 pages.

International Search Report received for PCT Patent Application No. PCT/US2024/015620, mailed on Jul. 17, 2024, 7 pages.

(56) References Cited

OTHER PUBLICATIONS

Non-Final Office Action received for U.S. Appl. No. 17/659,830, mailed on Mar. 14, 2024, 14 pages.
Non-Final Office Action received for U.S. Appl. No. 17/663,816, mailed on Oct. 19, 2023, 35 pages.
Non-Final Office Action received for U.S. Appl. No. 18/474,133, mailed on Jul. 3, 2024, 13 pages.
Non-Final Office Action received for U.S. Appl. No. 18/499,157, mailed on Jun. 5, 2024, 7 pages.
Notice of Allowance received for U.S. Appl. No. 17/452,971, mailed on Dec. 12, 2023, 7 pages.
Notice of Allowance received for U.S. Appl. No. 17/455,821, mailed on Dec. 12, 2023, 9 pages.
Notice of Allowance received for U.S. Appl. No. 17/455,843, mailed on Nov. 1, 2023, 7 pages.
Notice of Allowance received for U.S. Appl. No. 18/309,492, mailed on Mar. 8, 2024, 10 pages.
Notice of Allowance received for U.S. Appl. No. 18/309,492, mailed on Nov. 24, 2023, 10 pages.
Search Report received for Chinese Patent Application No. 202210059059.2, mailed on Dec. 22, 2023, 5 pages (2 pages of English Translation and 3 pages of Official Copy).
Stolyar, Brenda , "Google Maps' Location Sharing Now Lets You Track Battery Status", https://www.digitaltrends.com/mobile/google-maps-lets-you-share-your-location-and-battery-level/, Aug. 3, 2018, pp. 1-4.
Wikipedia , "Virtual Network Computing", Wikipedia, Available online at <https://en.wikipedia.org/w/index.php?t%20itle=Virtual%20Network%20Computing&oldid=1120211990>, Nov. 5, 2024, 5 pages.
European Search Report received for European Patent Application No. 21799155.3, mailed on Sep. 27, 2024, 4 pages.
Final Office Action received for U.S. Appl. No. 17/659,830, mailed on Nov. 19, 2024, 16 pages.
International Search Report received for PCT Patent Application No. PCT/US2024/031500, mailed on Nov. 21, 2024, 6 pages.
International Search Report received for PCT Patent Application No. PCT/US2024/031781, mailed on Aug. 13, 2024, 5 pages.
Non-Final Office Action received for U.S. Appl. No. 17/663,816, mailed on Sep. 28, 2024, 39 pages.
Notice of Allowance received for U.S. Appl. No. 18/499,157, mailed on Dec. 12, 2024, 7 pages.
Extended European Search Report received for European Patent Application No. 20790659.5, mailed on Nov. 29, 2022, 11 pages.
Extended European Search Report received for European Patent Application No. 20798438.6, mailed on Jan. 3, 2023, 11 pages.
Final Office Action received for U.S. Appl. No. 17/452,971, mailed on Jun. 1, 2022, 22 pages.
Final Office Action received for U.S. Appl. No. 17/455,821, mailed on Jul. 29, 2022, 20 pages.
Final Office Action received for U.S. Appl. No. 17/455,843, mailed on Oct. 3, 2022, 27 pages.
Final Office Action received for U.S. Appl. No. 17/503,246, mailed on May 20, 2022, 17 Pages.
Google Maps' Location Sharing Feature Can Show Your Friends' Battery Status, Available online at: <https://www.firstpost.com/tech/news-analysis/google-maps-location-sharing-feature-can-show-your-friends-battery-status-4885521.html>, [Retrieved Jan. 27, 2023], Aug. 3, 2018, 2 pages.
Roberts et al., "The Use of Augmented Reality, GPS and INS for Subsurface Data Visualisation", FIG XXII International Congress, Washington, D.C. USA, Apr. 19-26, 2002, 12 pages.
Mokatren et al., "Exploring the Potential of a Mobile Eye Tracker as an Intuitive Indoor Pointing Device: A Case Study in Cultural Heritage", In: Future Generation Computer Systems, Available online at: <https://is-web.hevra.haifa.ac.il/images/lecturers_files/ishimshoni_files/MokatrenFGCS.pdf>, [retrieved on Jul. 26, 2020], Jul. 1, 2017, 14 pages.
International Search Report received for PCT Patent Application No. PCT/US2021/071555, mailed on Feb. 14, 2022, 6 pages.
International Search Report received for PCT Patent Application No. PCT/US2022/071806, mailed on Oct. 21, 2022, 6 pages.
International Search Report received for PCT Patent Application No. PCT/US2022/072389, mailed on Nov. 30, 2022, 7 pages.
Non-Final Office Action received for U.S. Appl. No. 17/448,491, mailed on Jul. 27, 2022, 16 pages.
Non-Final Office Action received for U.S. Appl. No. 17/452,971, mailed on Feb. 15, 2023, 17 pages.
Non-Final Office Action received for U.S. Appl. No. 17/452,971, mailed on Jan. 21, 2022, 12 pages.
Non-Final Office Action received for U.S. Appl. No. 17/455,821, mailed on Apr. 7, 2022, 18 Pages.
Non-Final Office Action received for U.S. Appl. No. 17/455,821, mailed on Dec. 8, 2022, 24 pages.
Non-Final Office Action received for U.S. Appl. No. 17/455,843, mailed on Feb. 15, 2023, 28 pages.
Non-Final Office Action received for U.S. Appl. No. 17/455,843, mailed on May 26, 2022, 20 Pages.
Non-Final Office Action received for U.S. Appl. No. 17/503,246, mailed on Feb. 3, 2022, 15 pages.
Notice of Allowance received for U.S. Appl. No. 17/448,491, mailed on Jan. 18, 2023, 8 pages.
Notice of Allowance received for U.S. Appl. No. 17/448,491, mailed on May 4, 2023, 7 pages.
Notice of Allowance received for U.S. Appl. No. 17/452,971, mailed on Aug. 17, 2023, 11 pages.
Notice of Allowance received for U.S. Appl. No. 17/455,821, mailed on Sep. 20, 2023, 8 pages.
Notice of Allowance received for U.S. Appl. No. 17/455,843, mailed on Jul. 19, 2023, 9 pages.
Notice of Allowance received for U.S. Appl. No. 17/503,246, mailed on Dec. 7, 2022, 10 pages.
Notice of Allowance received for U.S. Appl. No. 17/503,246, mailed on Jan. 25, 2023, 9 pages.
Notice of Allowance received for U.S. Appl. No. 17/503,246, mailed on May 18, 2023, 9 pages.
Notice of Allowance received for U.S. Appl. No. 17/594,742, mailed on Jul. 24, 2023, 8 pages.
Notice of Allowance received for U.S. Appl. No. 17/594,742, mailed on Mar. 29, 2023, 9 pages.
Hill, Spencer, "Does Airplane Mode Stop GPS Tracking?", Retrieved from the Internet: <https://web.archive.org/web/20200921071851/https://www.imyfone.com/change-location/does-airplane-mode-stop-tracking/>, [retrieved on Aug. 18, 2022], Part 1. Does Airplane Mode Stop GPS Tracking?, Sep. 21, 2020, pp. 1-2.
Non-Final Office Action received for U.S. Appl. No. 18/474,133, mailed on Mar. 24, 2025, 12 pages.
Advisory Action received for U.S. Appl. No. 17/659,830, mailed on Mar. 26, 2025, 3 pages.
Final Office Action received for U.S. Appl. No. 17/663,816, mailed on Mar. 21, 2025, 36 pages.
International Search Report received for PCT Patent Application No. PCT/US2024/046045, mailed on Nov. 28, 2024, 4 pages.
Non-Final Office Action received for U.S. Appl. No. 18/319,394, mailed on Jun. 17, 2025, 18 pages.
Notice of Allowance received for U.S. Appl. No. 18/499,157, mailed on Apr. 11, 2025, 7 pages.
Non-Final Office Action received for U.S. Appl. No. 17/659,830, mailed on Jun. 4, 2025, 8 pages.
Non-Final Office Action received for U.S. Appl. No. 18/464,086, mailed on Apr. 22, 2025, 8 pages.
[Google Photos] How to Automatically Share Only Photos of Children! Specify a Person and Share [library], Dekiru Net [online], 2017, Dekiru Net, Jan. 22, 2008. Available online at https://dekiru.net/article/15726/, [Retrieved from Internet Jan. 18, 2026], 23 pages (13 pages of English Machine Translation and 10 pages of Official Copy).

* cited by examiner

700

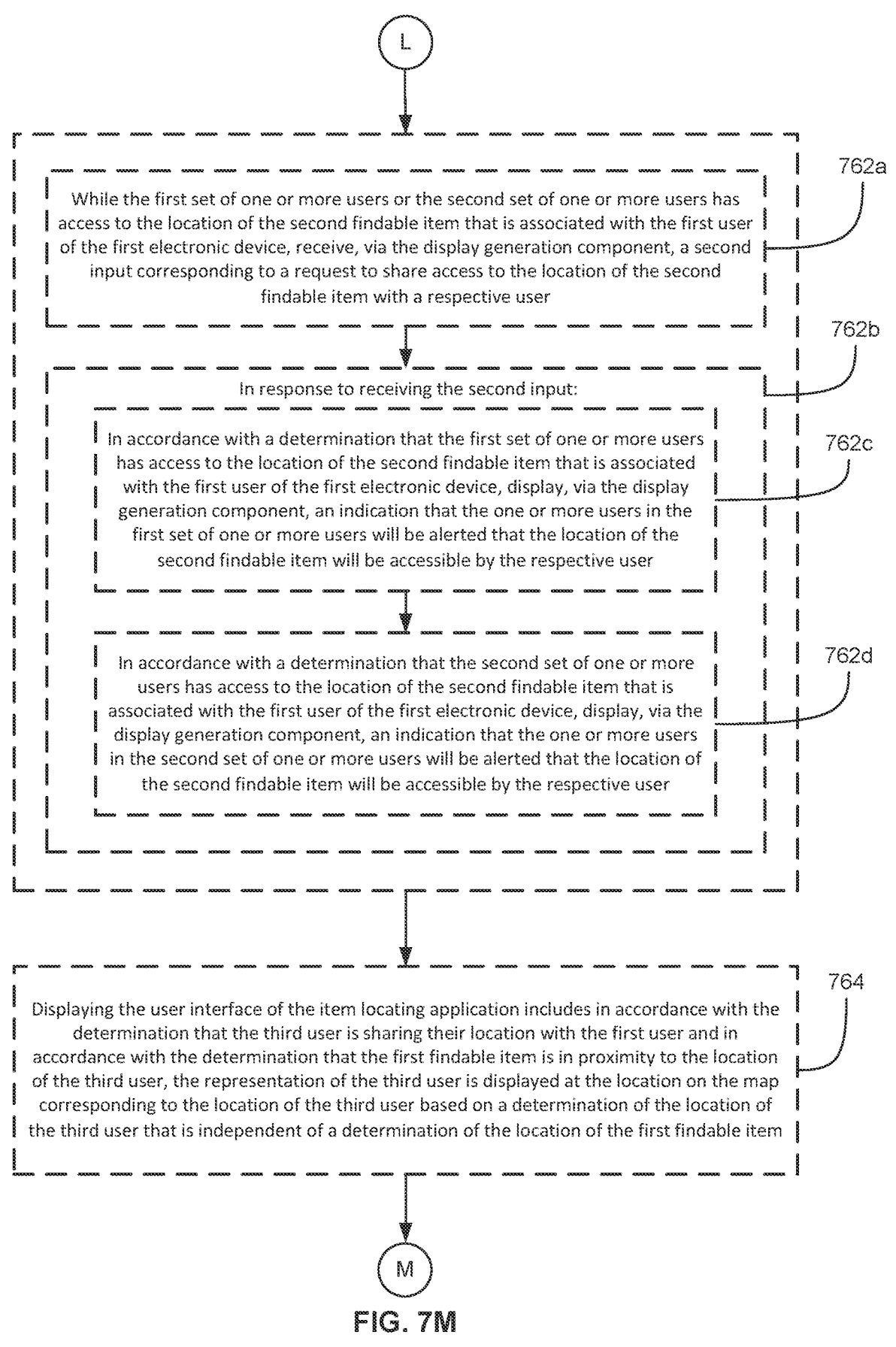

L

762a: While the first set of one or more users or the second set of one or more users has access to the location of the second findable item that is associated with the first user of the first electronic device, receive, via the display generation component, a second input corresponding to a request to share access to the location of the second findable item with a respective user 762b: In response to receiving the second input:

762c: In accordance with a determination that the first set of one or more users has access to the location of the second findable item that is associated with the first user of the first electronic device, display, via the display generation component, an indication that the one or more users in the first set of one or more users will be alerted that the location of the second findable item will be accessible by the respective user 762d: In accordance with a determination that the second set of one or more users has access to the location of the second findable item that is associated with the first user of the first electronic device, display, via the display generation component, an indication that the one or more users in the second set of one or more users will be alerted that the location of the second findable item will be accessible by the respective user 764: Displaying the user interface of the item locating application includes in accordance with the determination that the third user is sharing their location with the first user and in accordance with the determination that the first findable item is in proximity to the location of the third user, the representation of the third user is displayed at the location on the map corresponding to the location of the third user based on a determination of the location of the third user that is independent of a determination of the location of the first findable item

M

FIG. 7M

USER INTERFACES FOR SHARING LOCATIONS OF FINDABLE ITEMS

CROSS-REFERENCE TO RELATED APPLICATIONS

This application claims the benefit of U.S. Provisional Application No. 63/363,363, filed Apr. 21, 2022, and U.S. Provisional Application No. 63/497,426, filed Apr. 20, 2023, the contents of which are incorporated herein by reference in their entireties for all purposes.

FIELD OF THE DISCLOSURE

This relates generally to user interfaces that enable a user to share and/or request sharing of locations of findable items on an electronic device.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, users may wish to use such devices to track items. Enhancing the user's interactions with the device improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY OF THE DISCLOSURE

Some embodiments described in this disclosure are directed to one or more electronic devices that receive and/or transmit invitations for accessing locations of findable items. Some embodiments described in this disclosure are directed to one or more electronic devices that present notifications when an unknown remote locator object is tracking the user. Some embodiments described in this disclosure are directed to one or more electronic devices that request, and grant or reject authorization to obtain location information of findable items. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 5I-5N provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein.

DETAILED DESCRIPTION

Figure 1A:
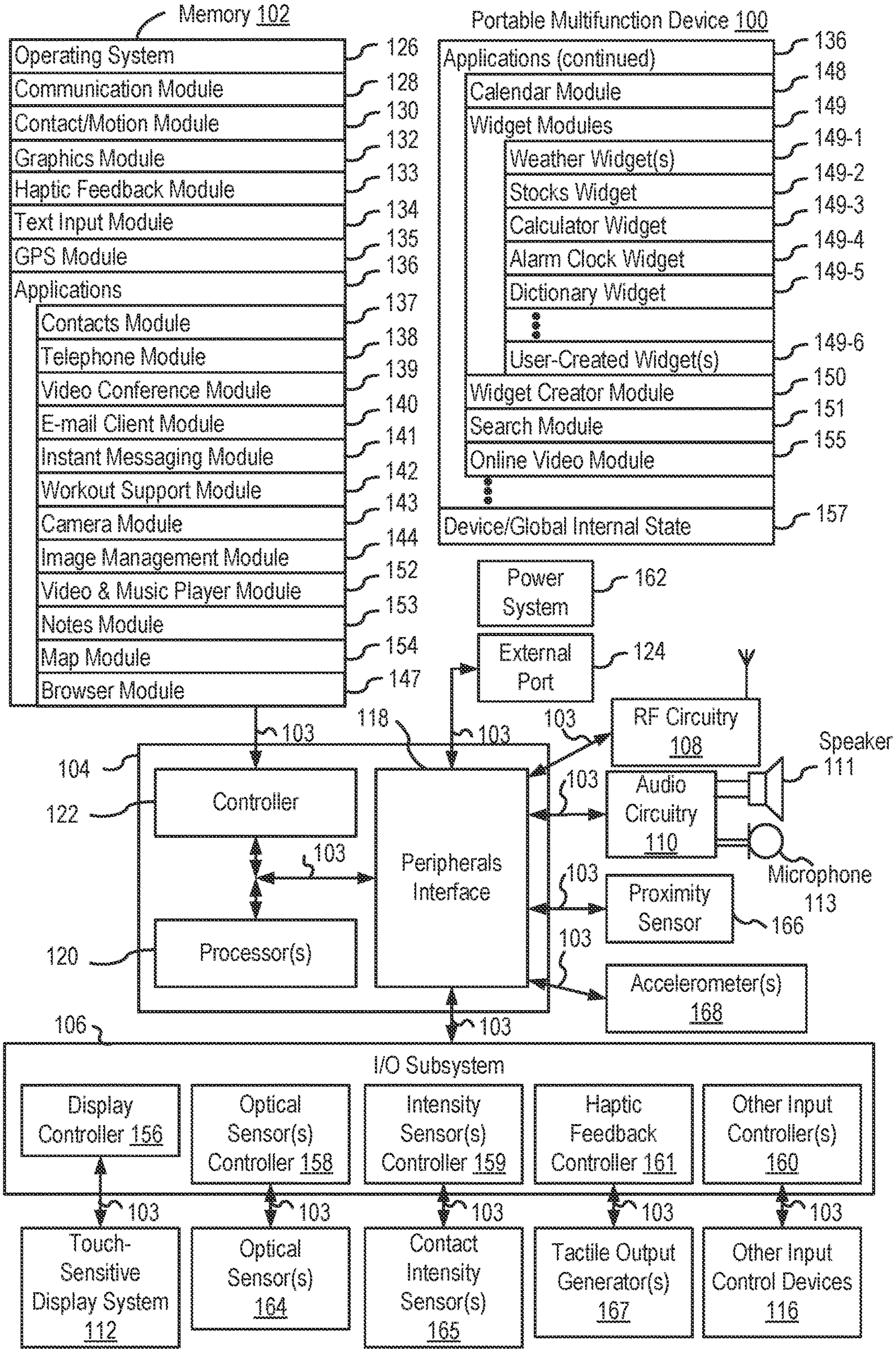
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices to track the location of remote locator objects and generate notifications associated with remote locator objects. Such techniques can reduce the cognitive burden on a user who uses such devices and/or wishes to control their use of such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and/or iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/48,264, "Gestures For Touch Sensitive Input Devices," filed Jan. 31, 2005; (5) U.S. patent application Ser. No. 11/38,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
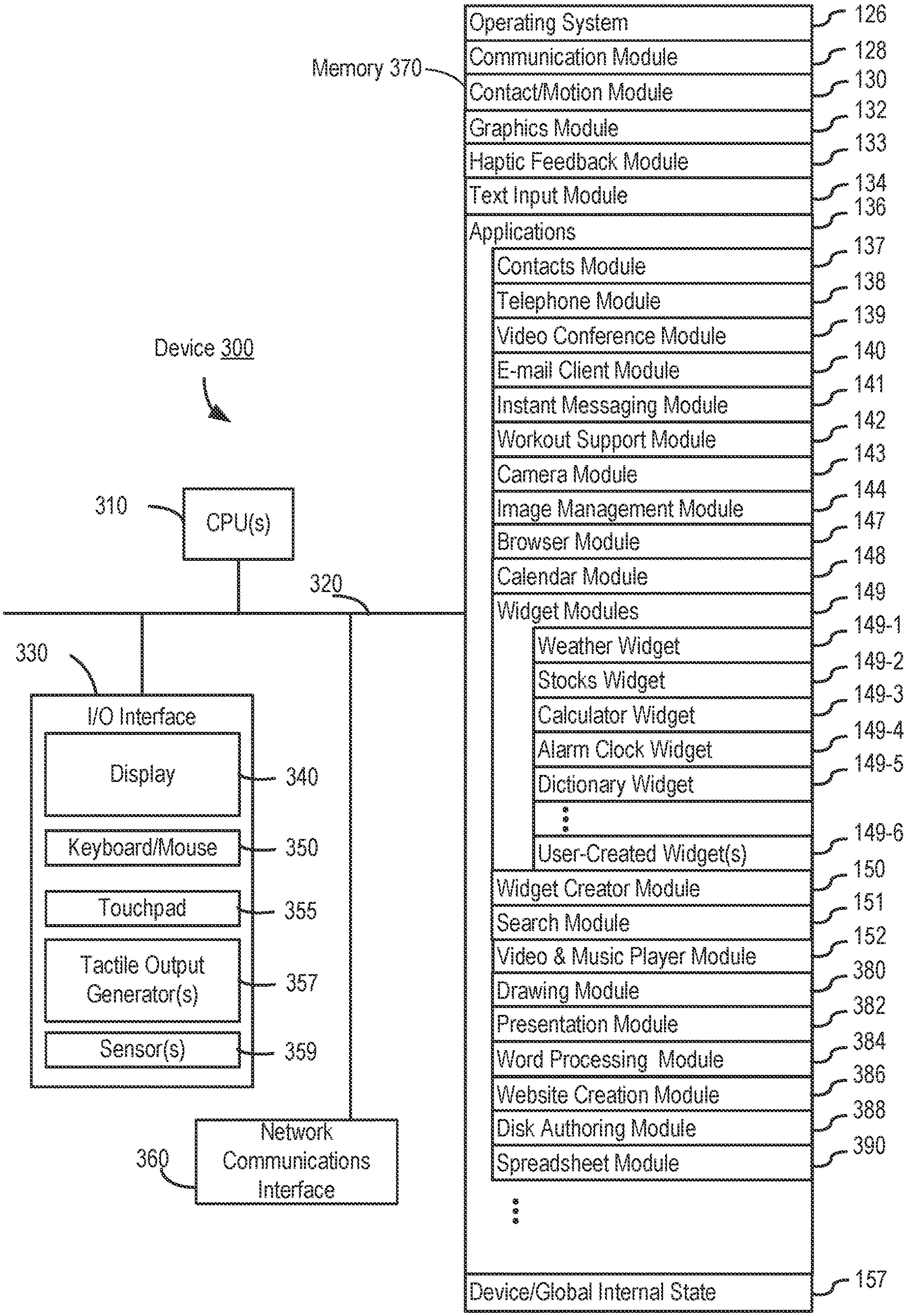
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and/or terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
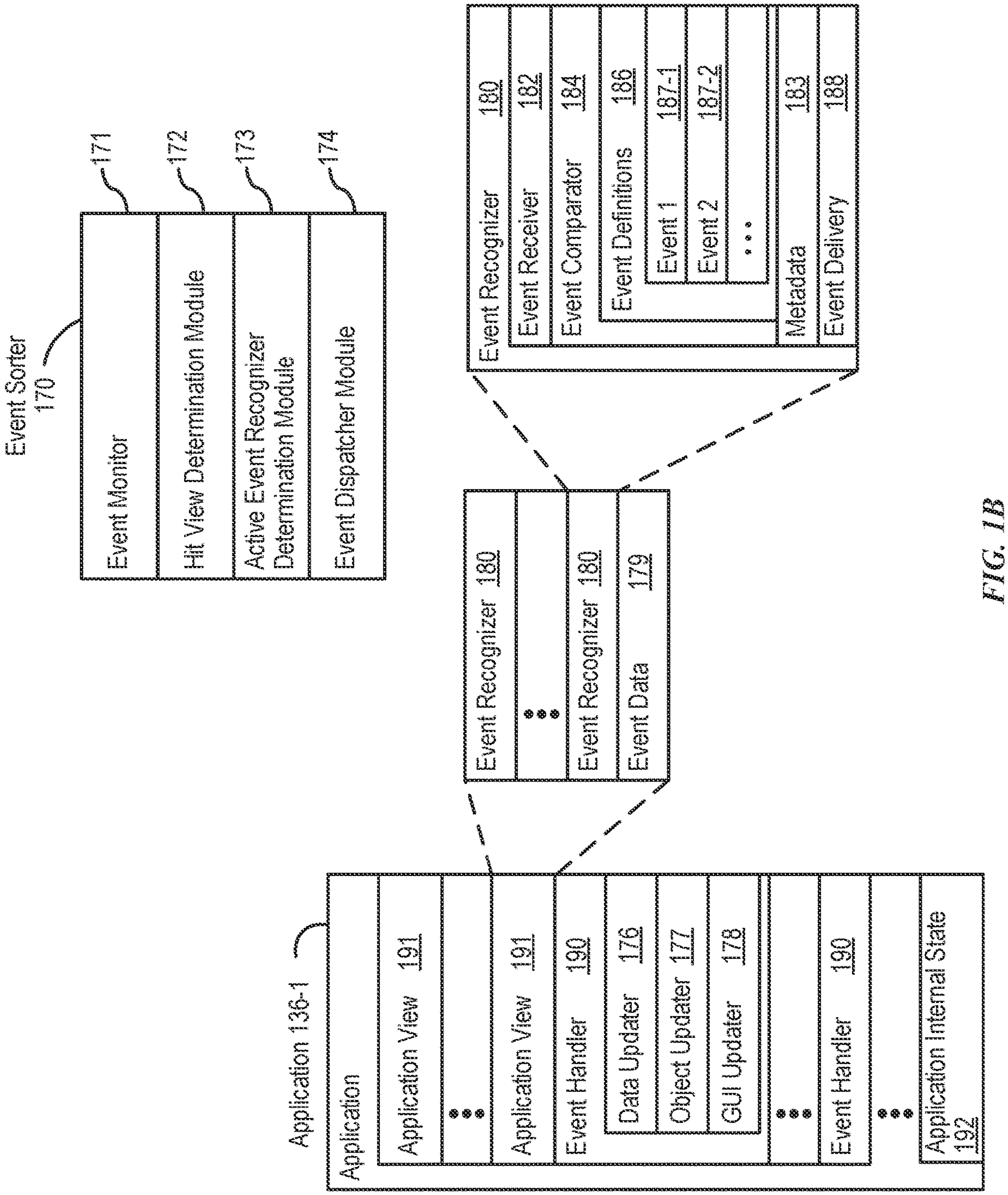
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
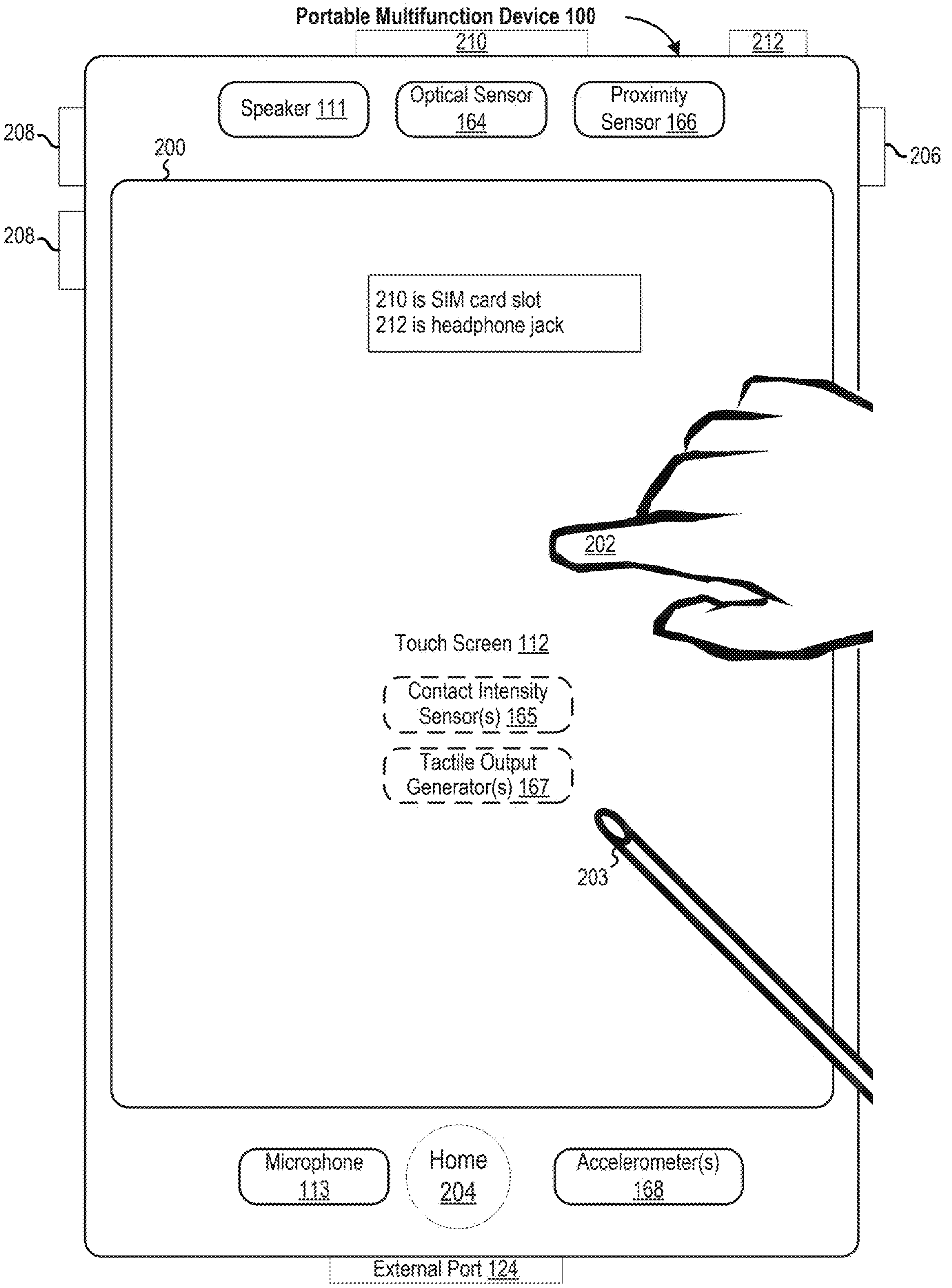
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
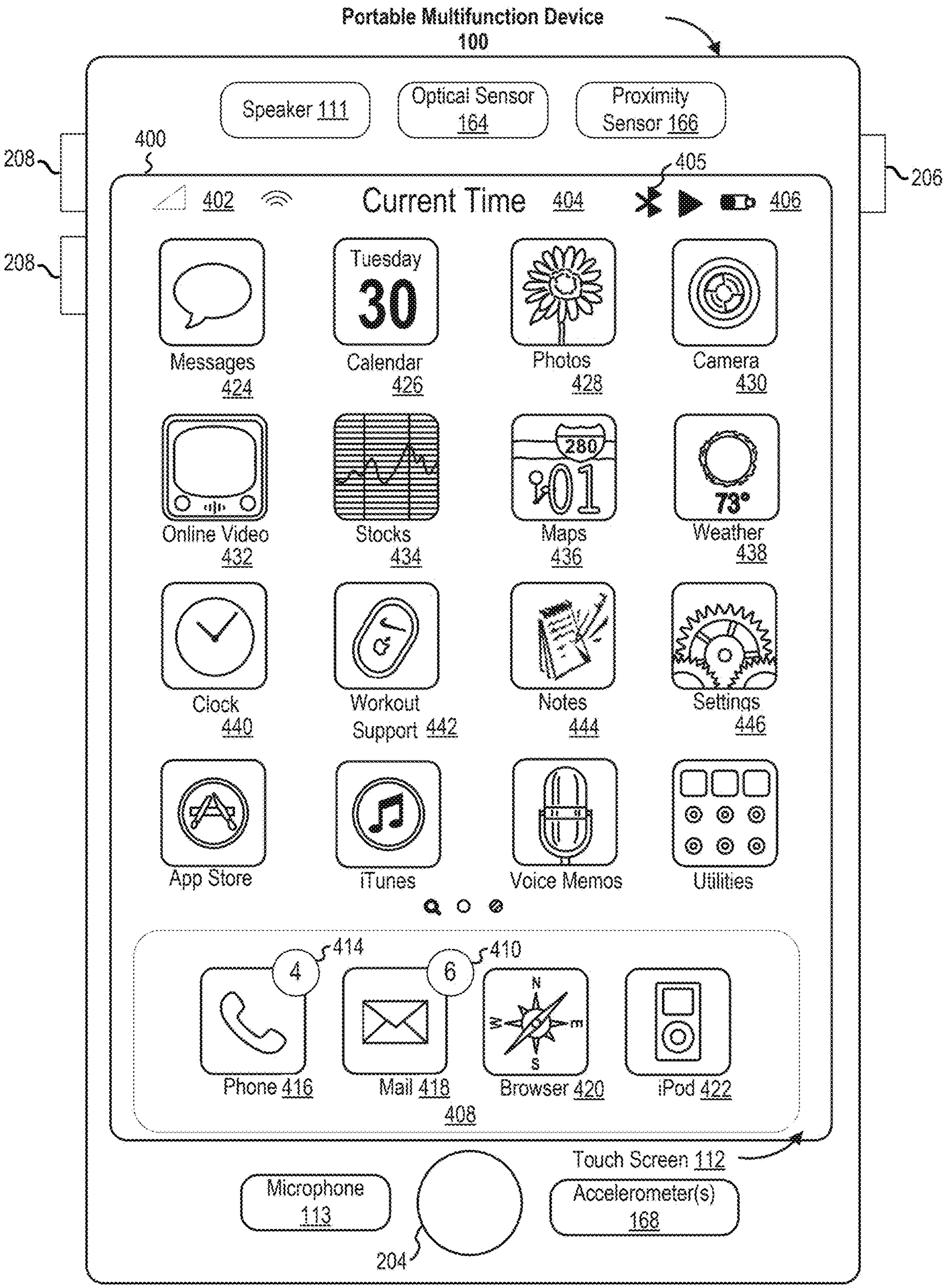
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
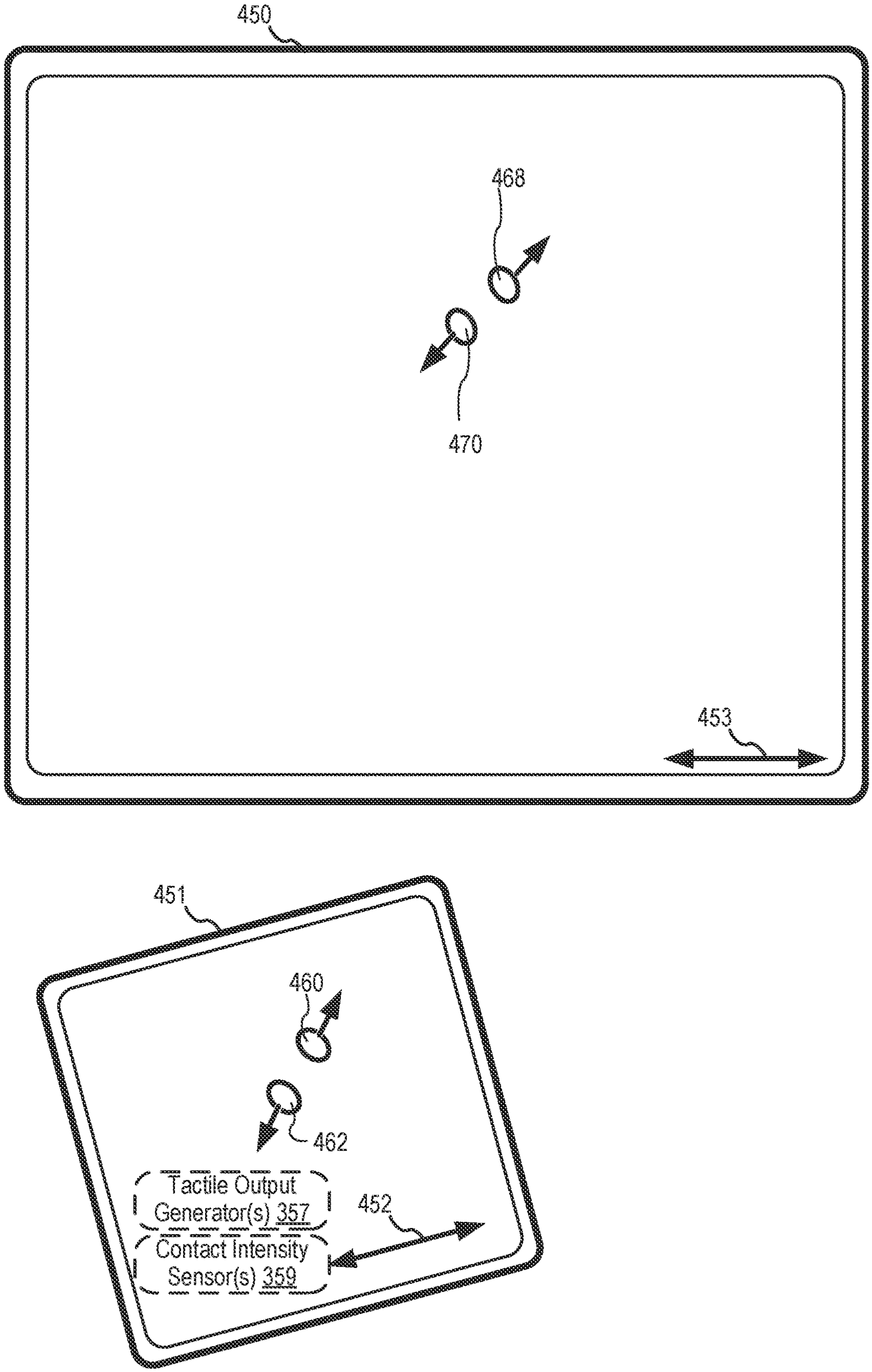
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
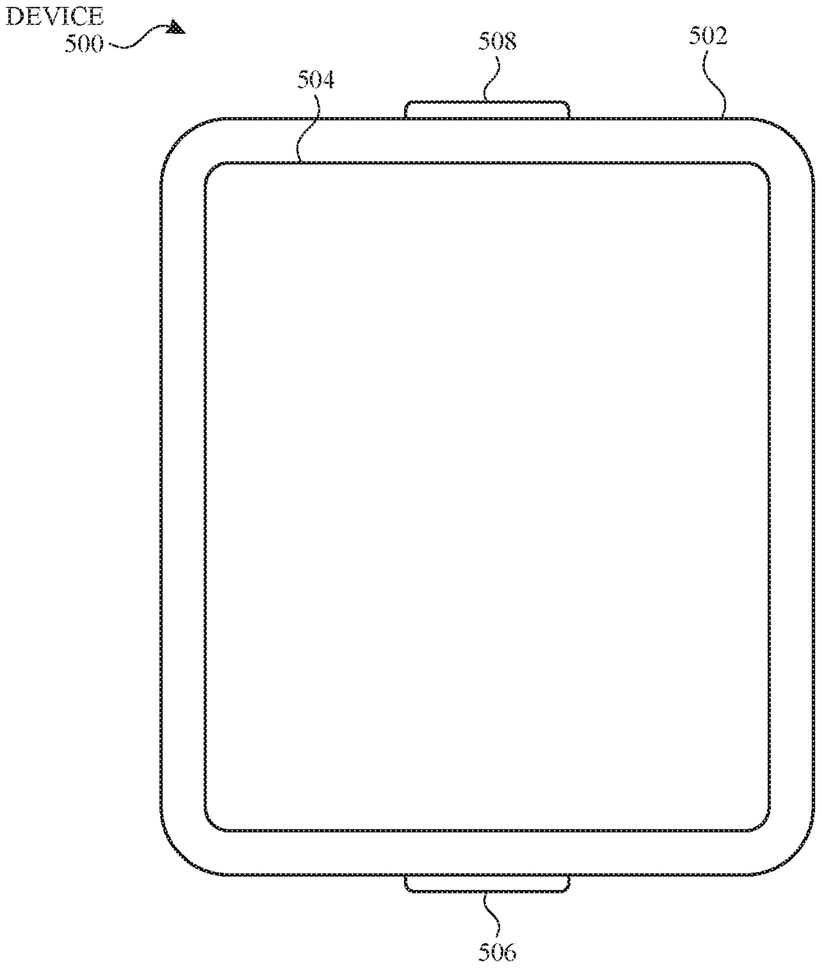
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
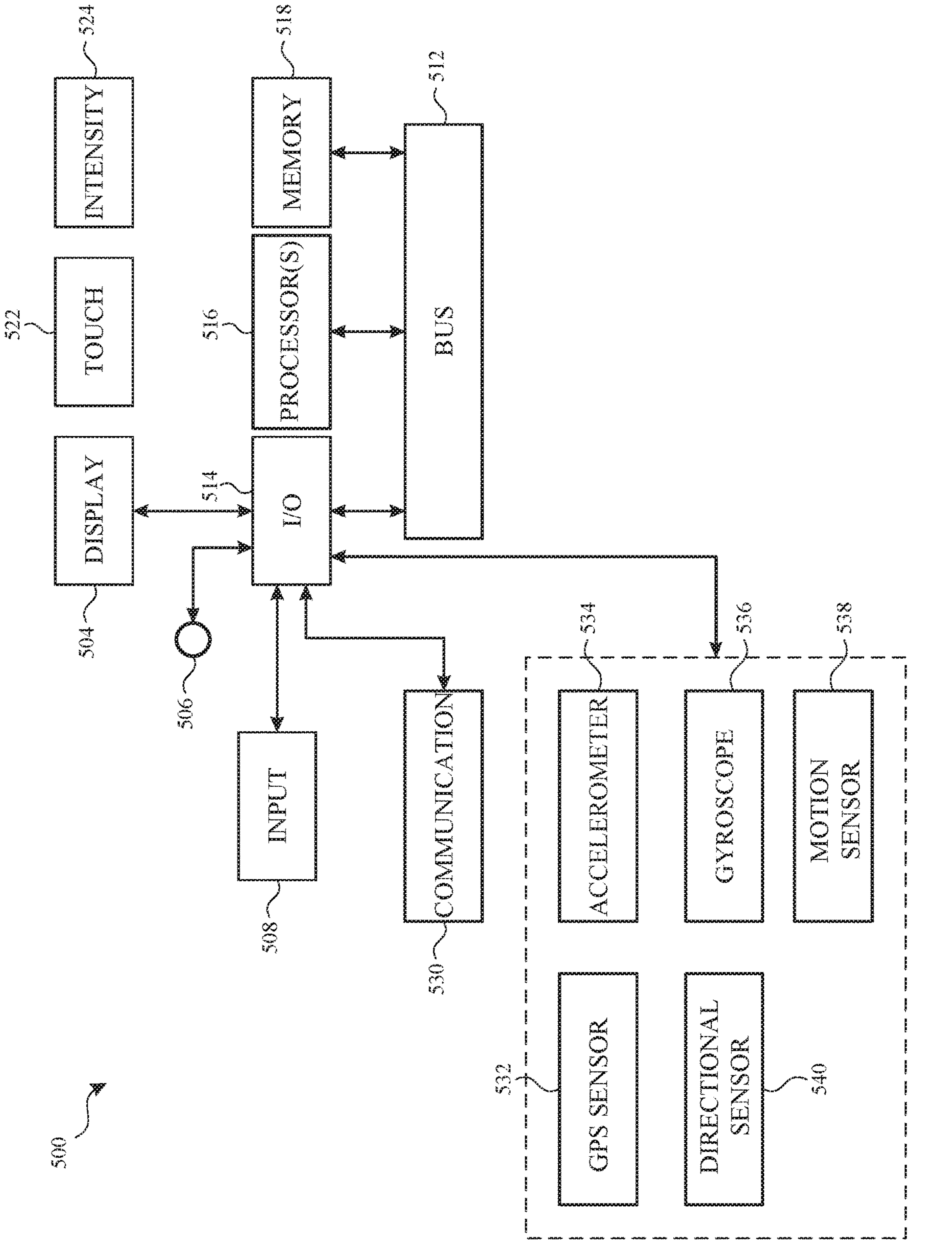
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, and 1100 (FIGS. 7, 9, and 11). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
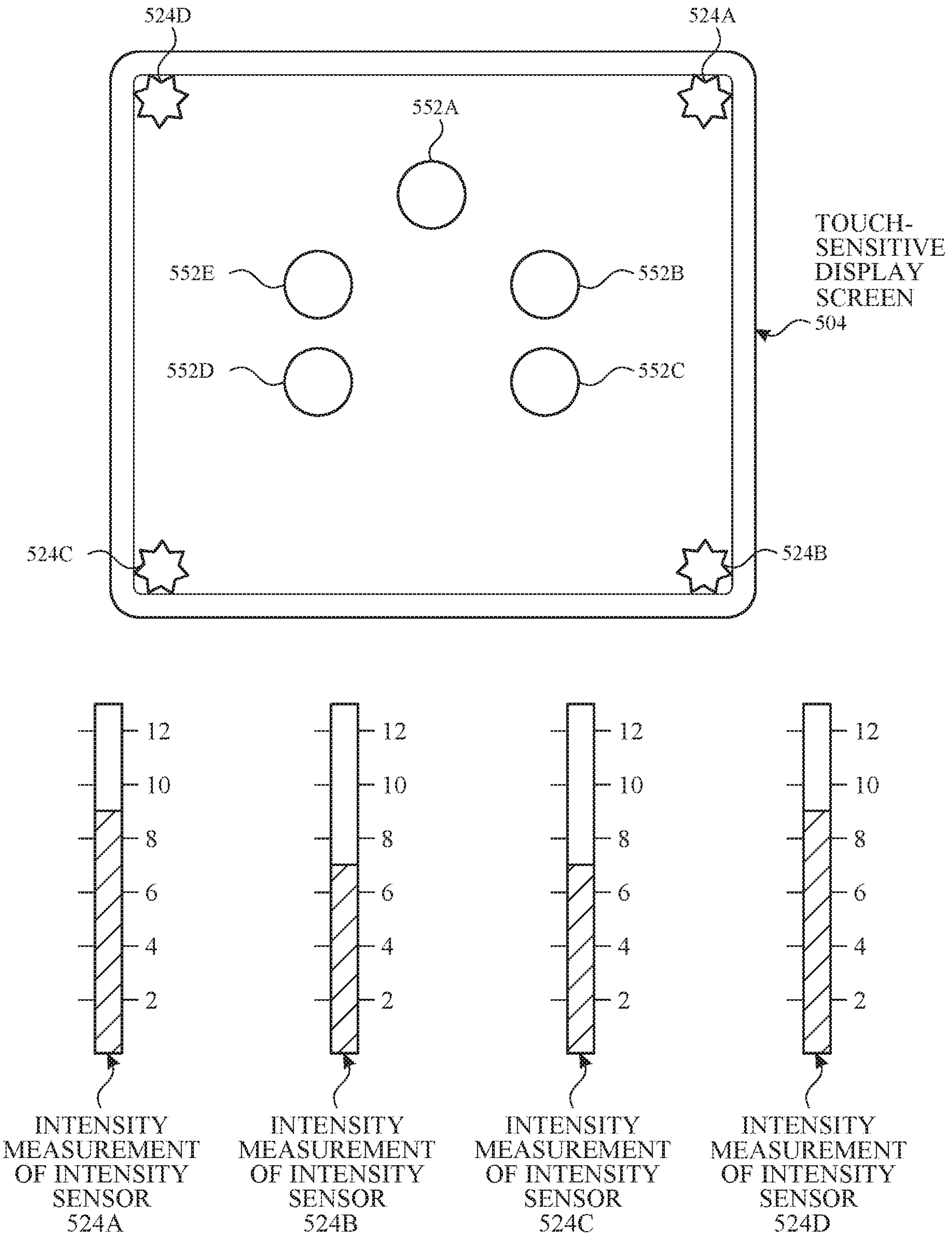
FIGS. 5C-5D illustrate exemplary components of a personal electronic device having a touch-sensitive display and intensity sensors in accordance with some embodiments.
Figure 5D:
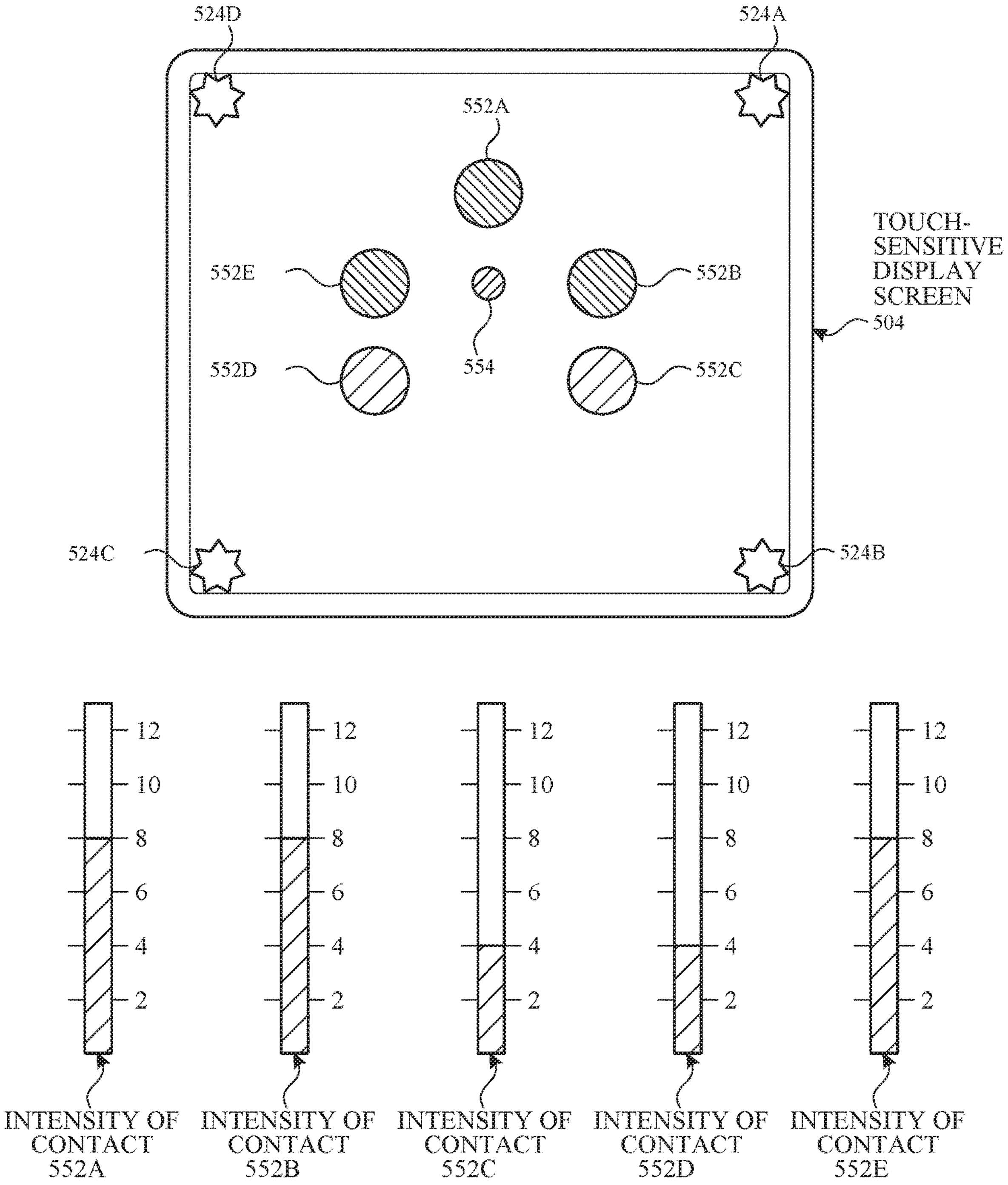

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
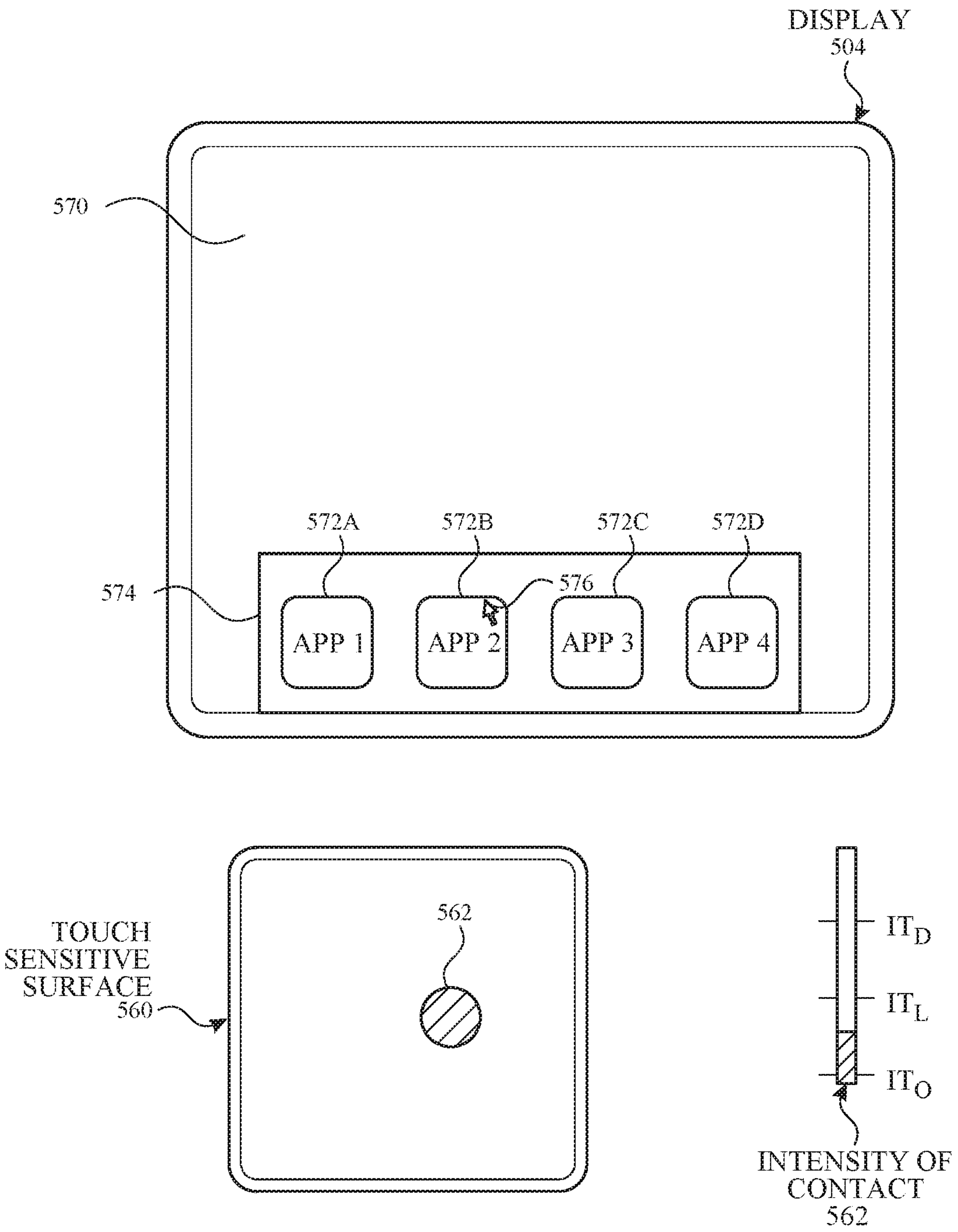
FIGS. 5E-5H illustrate exemplary components and user interfaces of a personal electronic device in accordance with some embodiments.
Figure 5F:
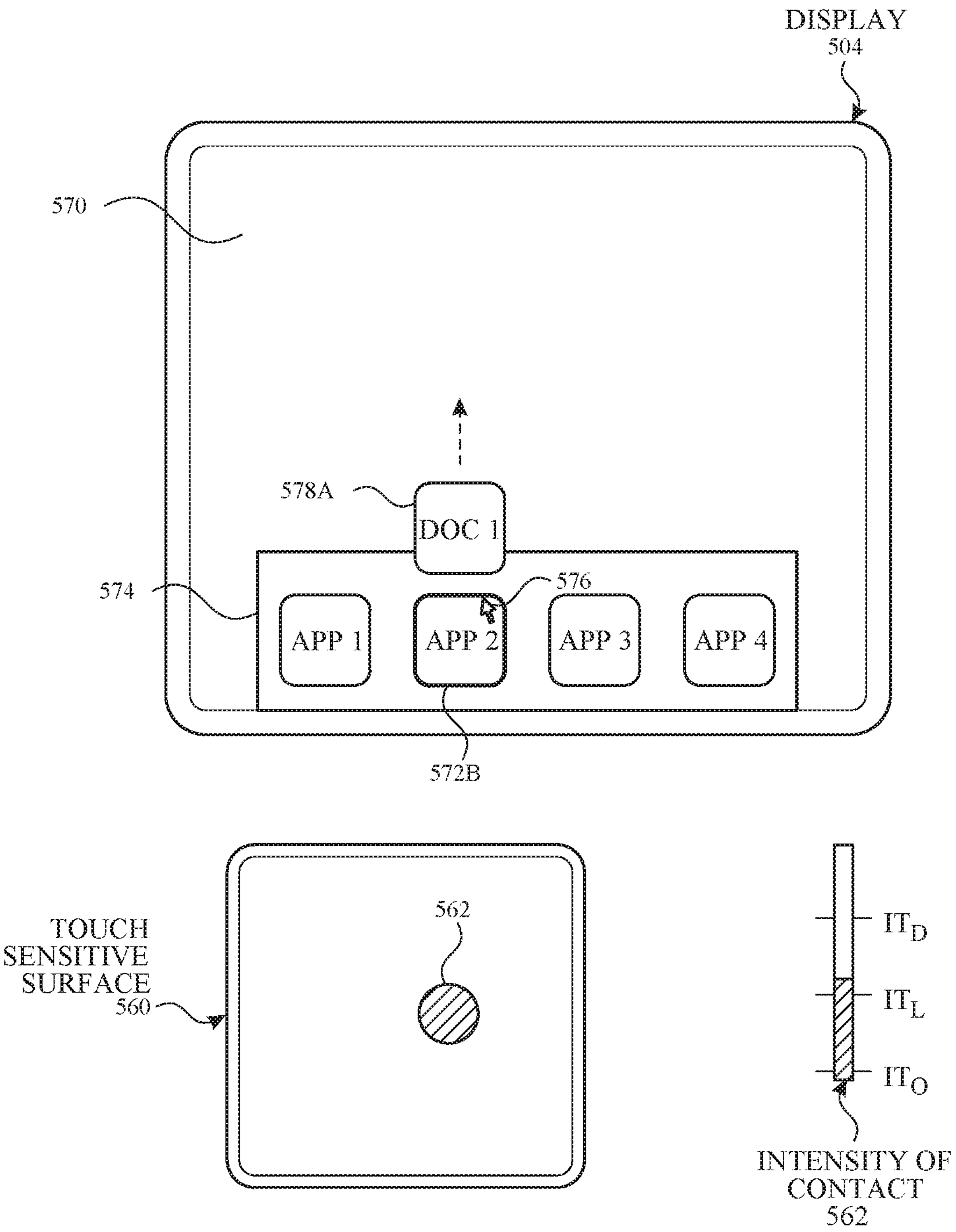
Figure 5G:
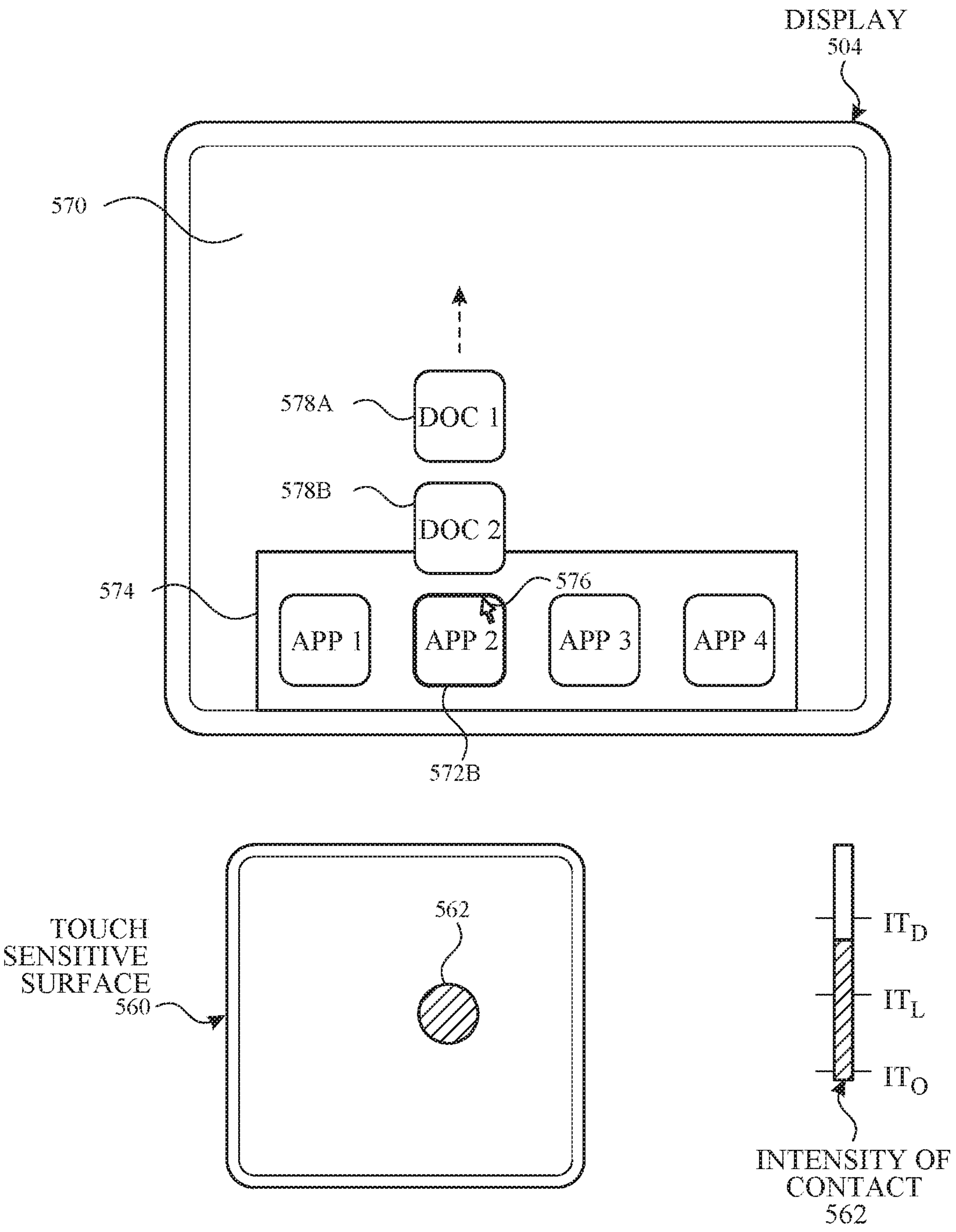
Figure 5H:
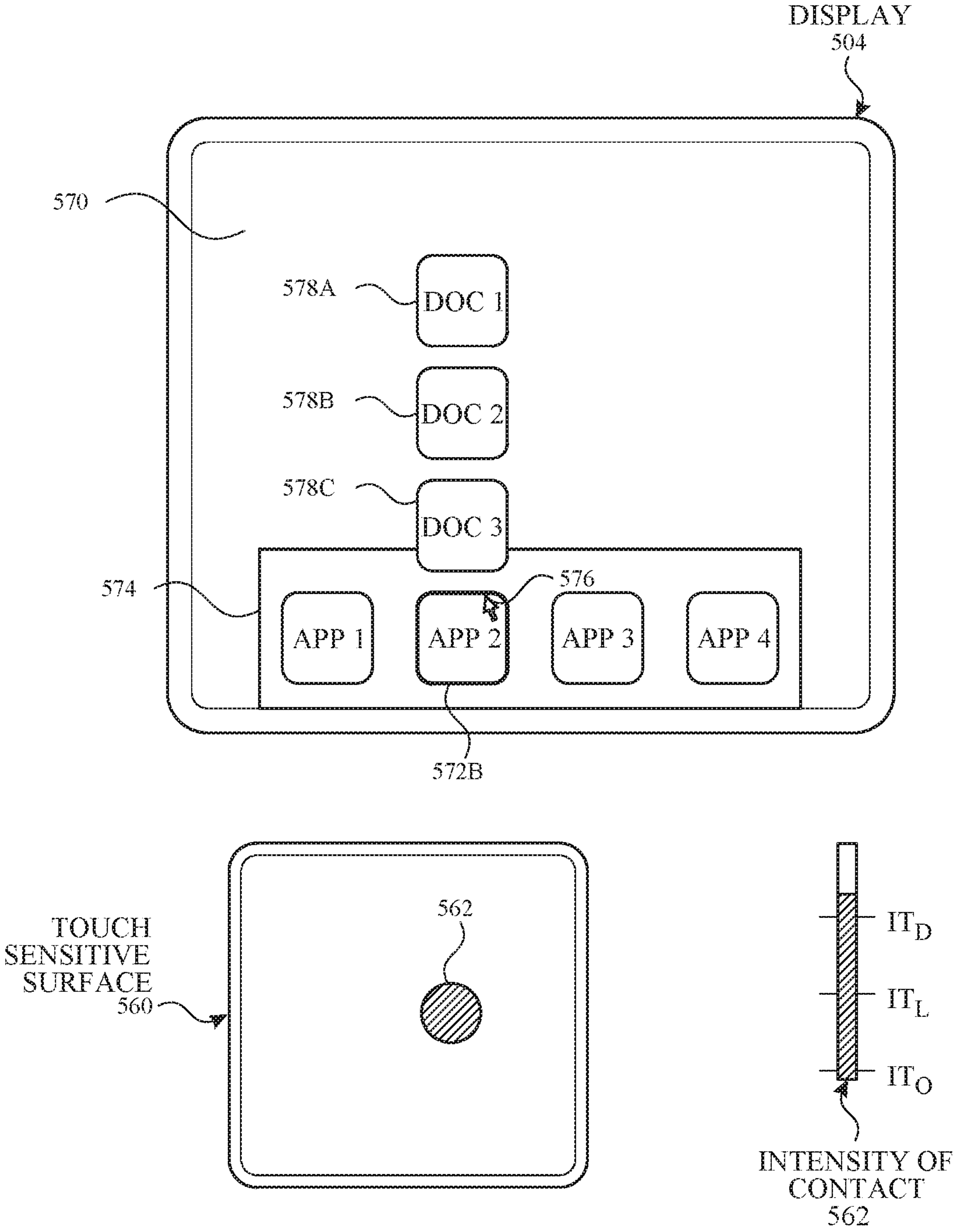
Figure 51:
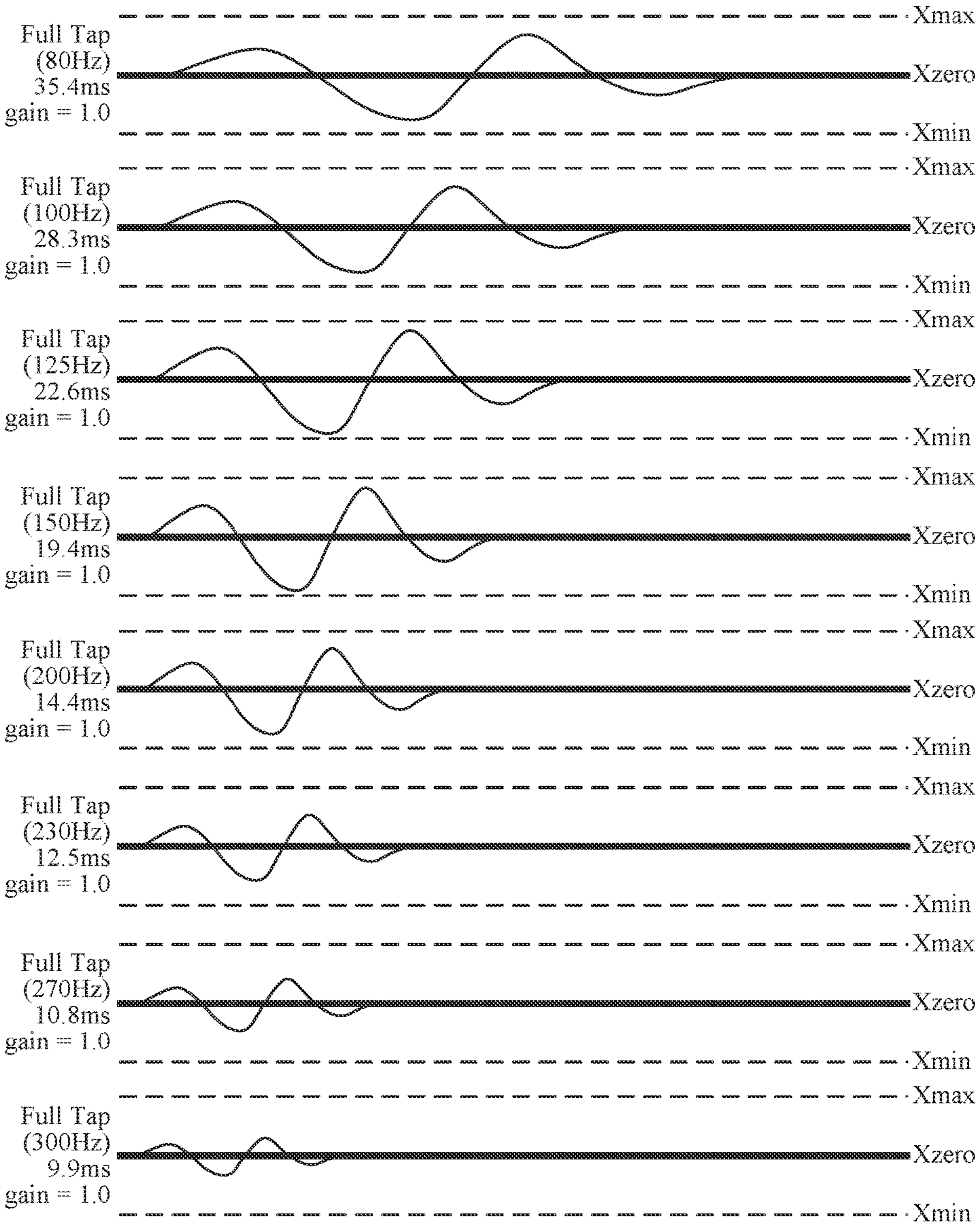

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

In some embodiments, electronic device 500 includes one or more tactile output generators, where the one or more tactile output generators generate different types of tactile output sequences, as described below in Table 1. In some embodiments, a particular type of tactile output sequence generated by the one or more tactile output generators of the device corresponds to a particular tactile output pattern. For example, a tactile output pattern specifies characteristics of a tactile output, such as the amplitude of the tactile output, the shape of a movement waveform of the tactile output, the frequency of the tactile output, and/or the duration of the tactile output. When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device.

Figure 5J:
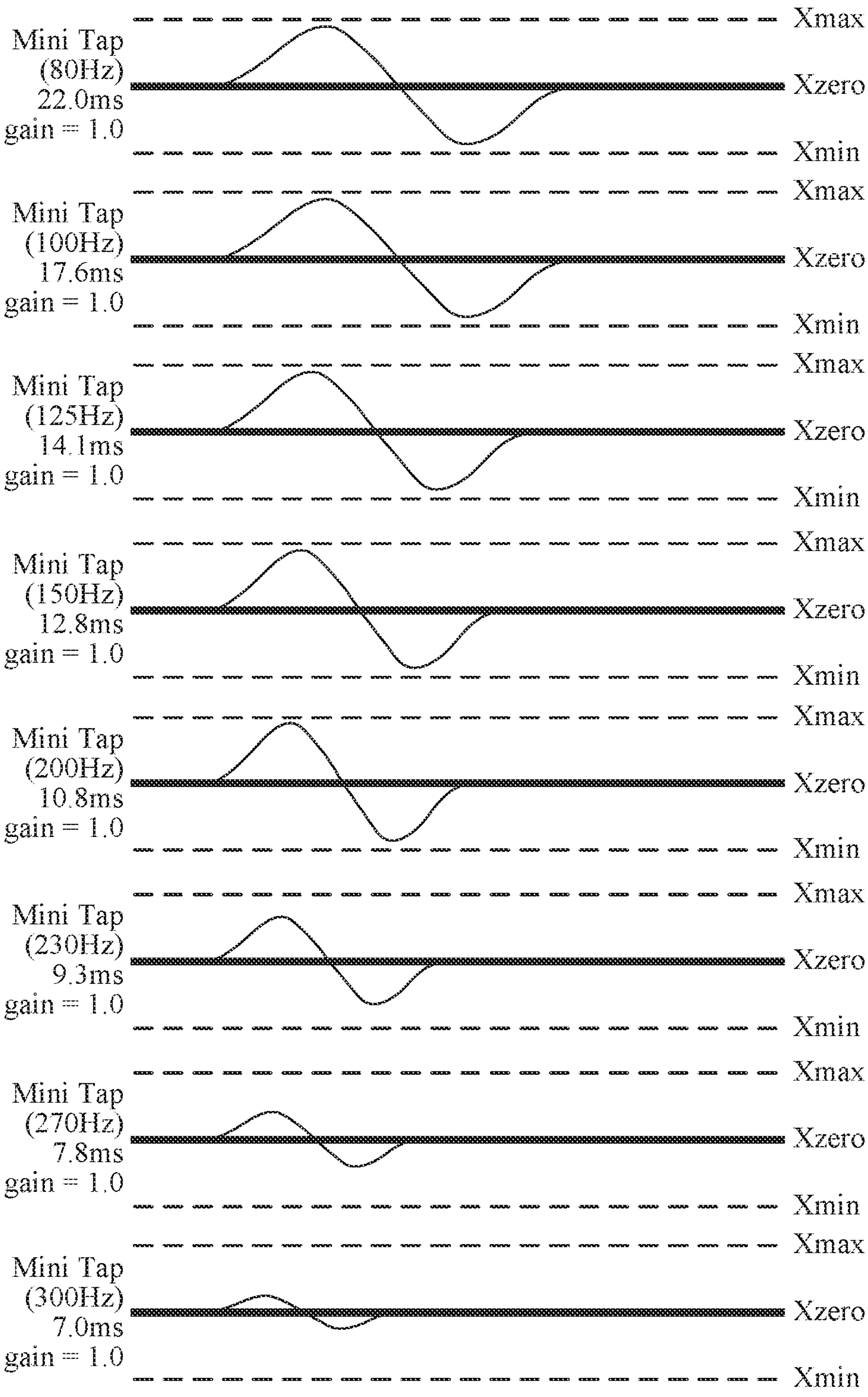
Figure 5K:
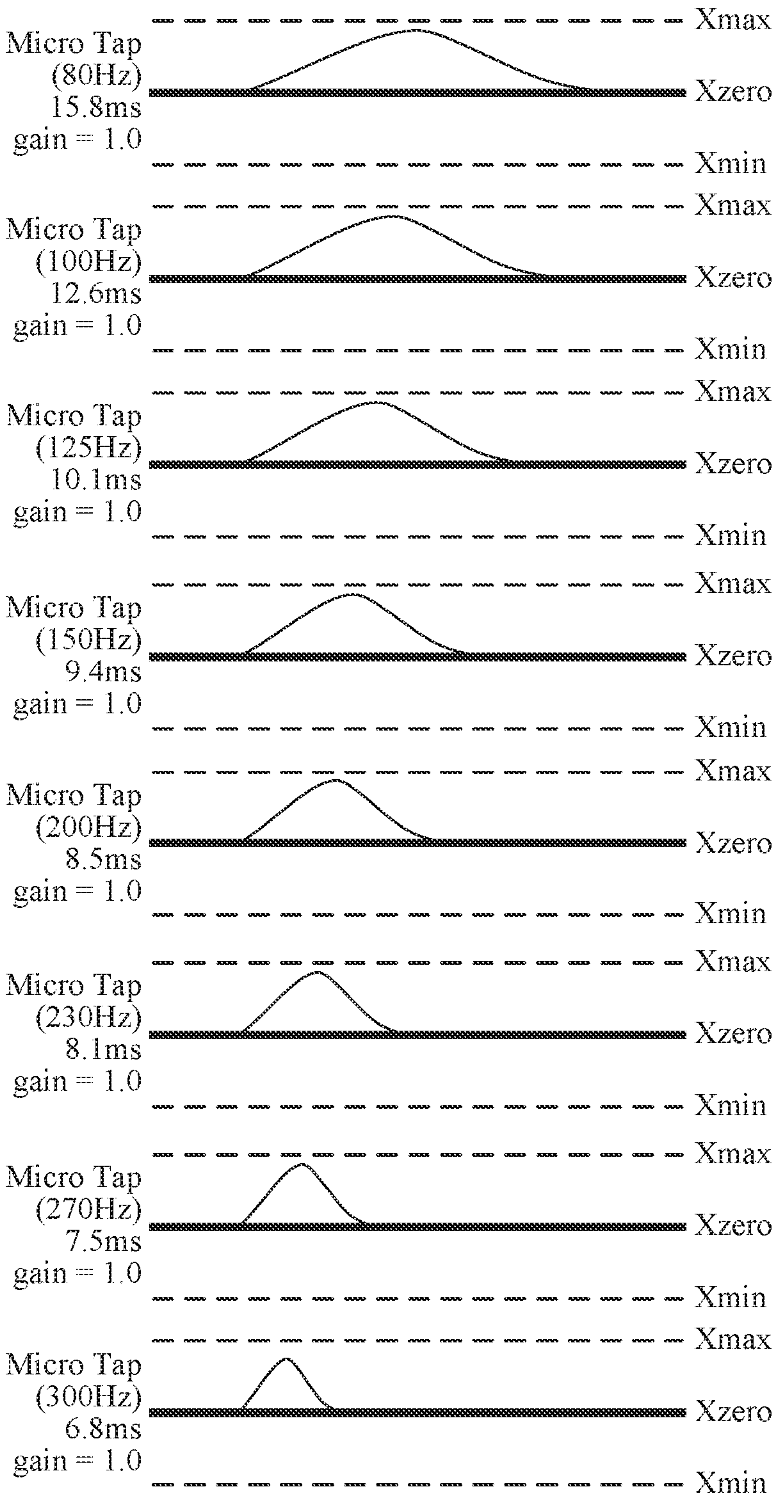
Figure 5L:
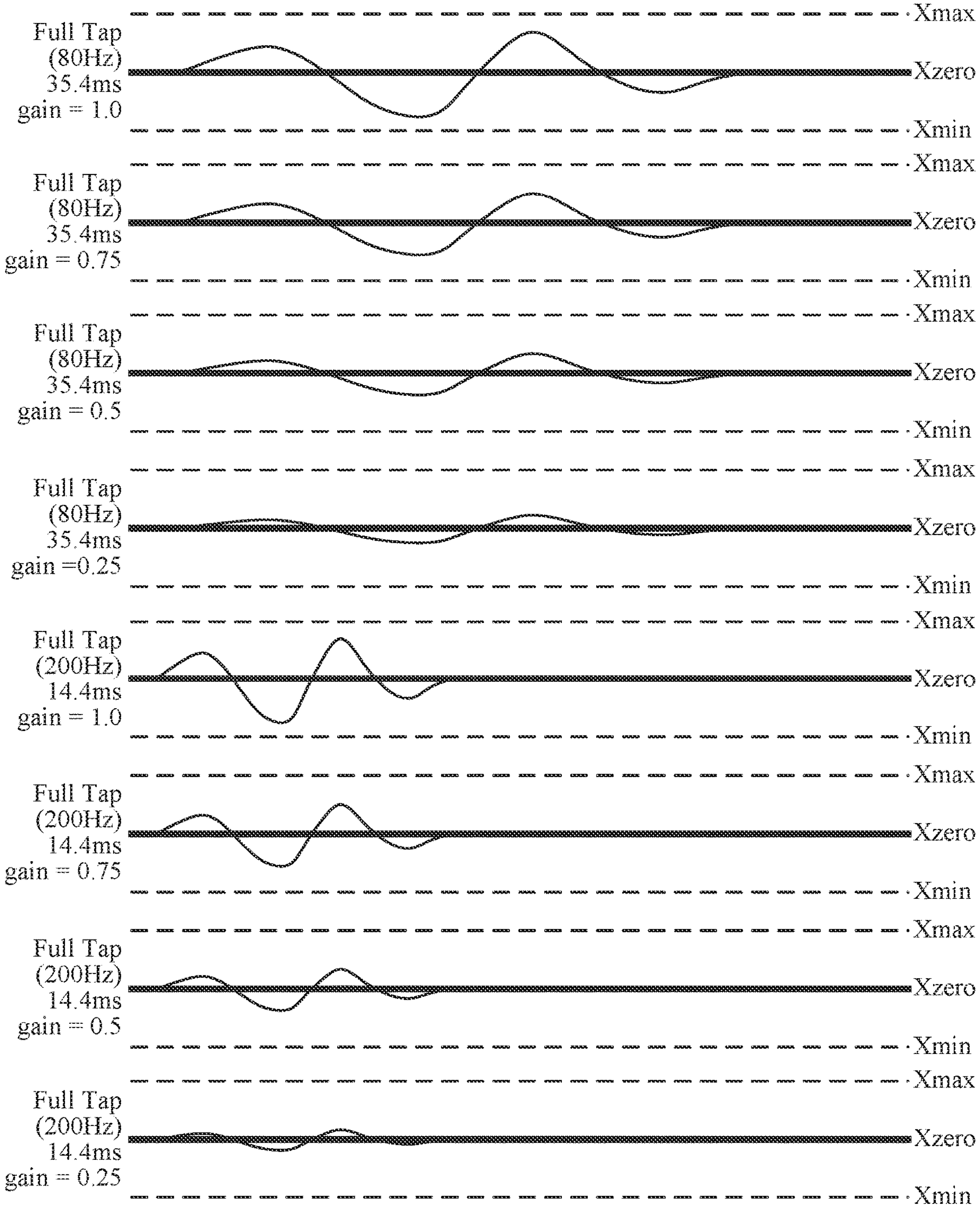
Figure 5M:
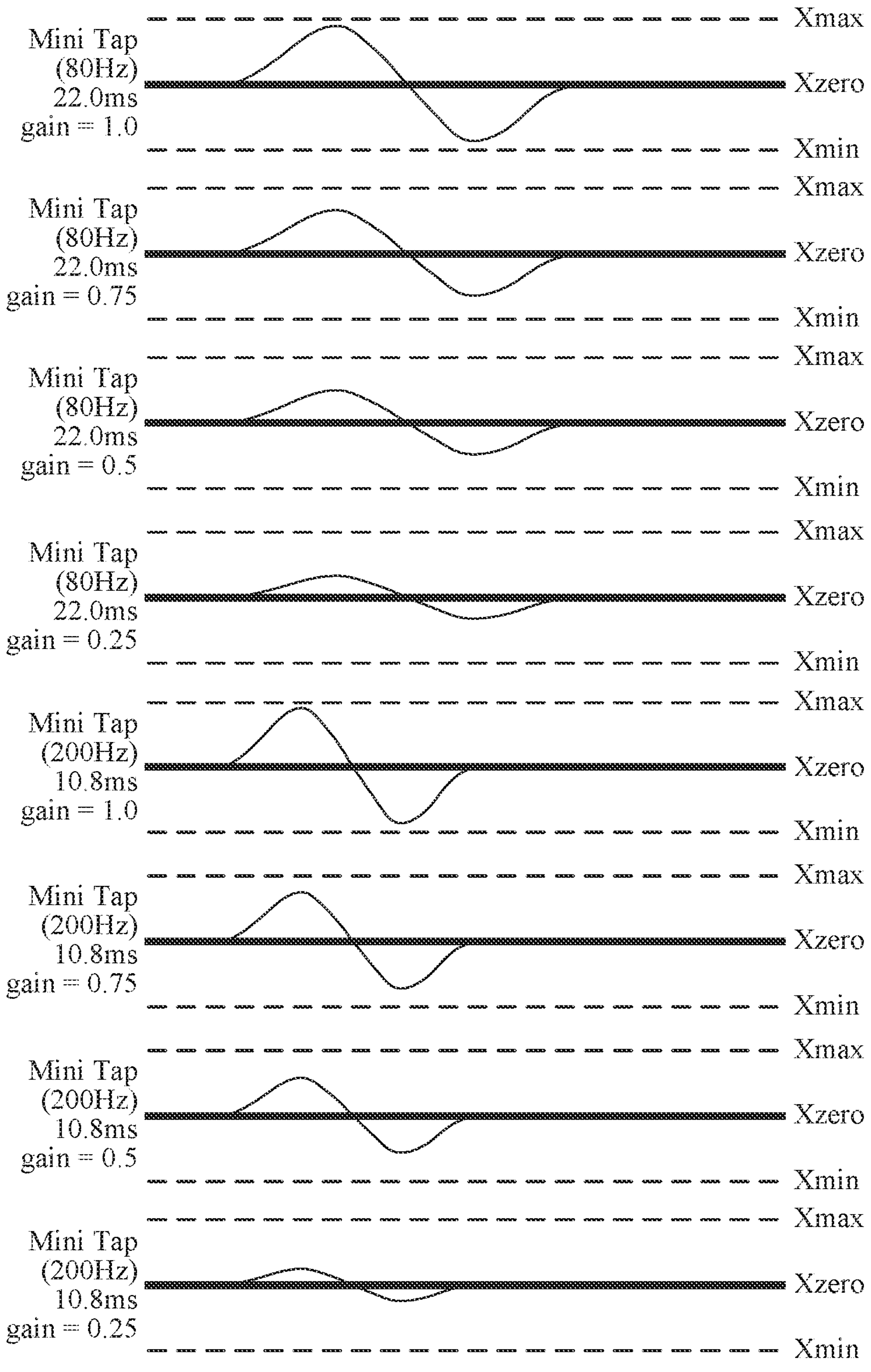
Figure 5N:
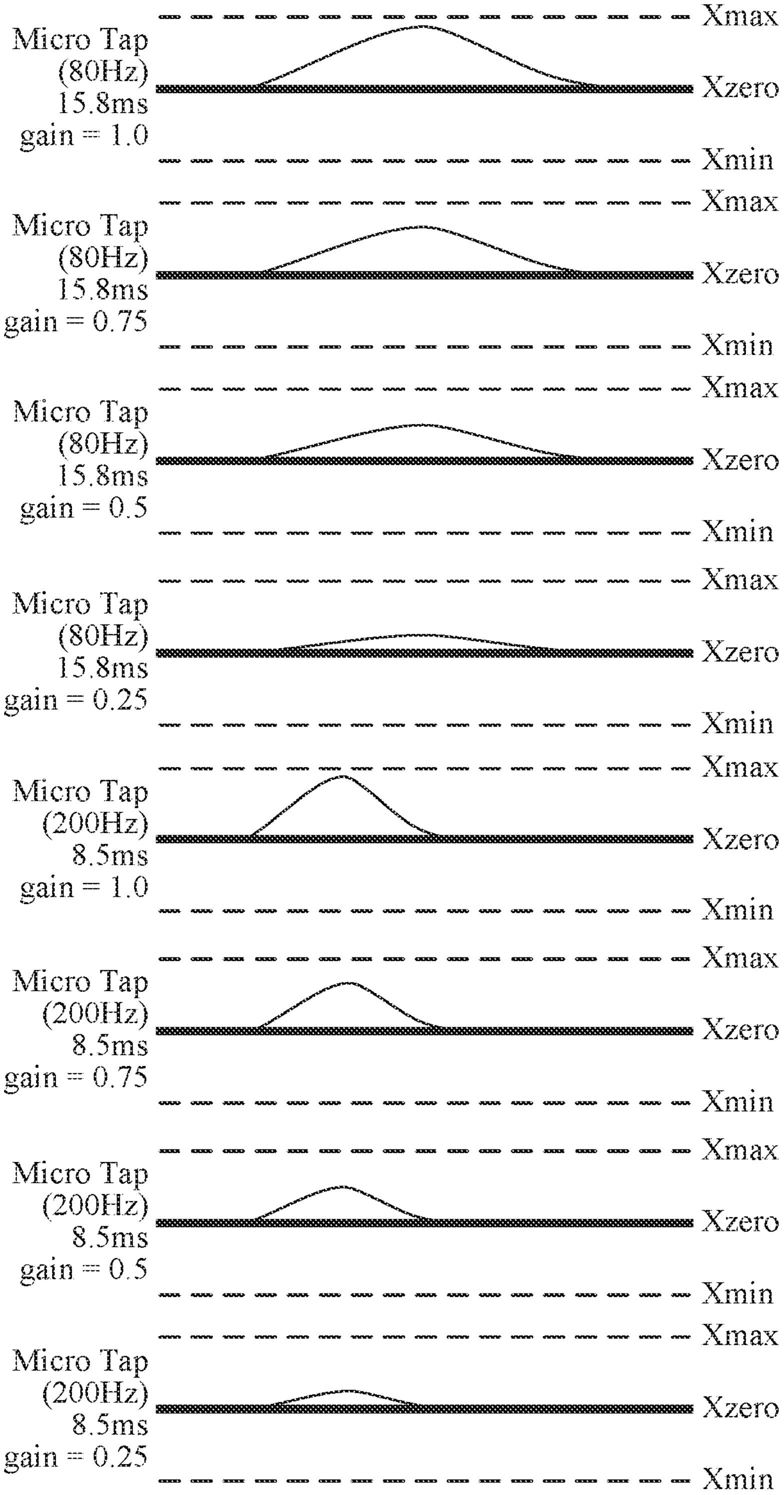

More specifically, FIGS. 5I-5K provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in these figures, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIGS. 5L-5N, which are each shown with variants having a gain of 1.0, 0.75, 0.5, and 0.25. As shown in FIGS. 5L-5N, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Hz, and 200 Hz).

FIGS. 5I-5N show tactile output patterns that have a particular waveform. The waveform of a tactile output pattern represents the pattern of physical displacements relative to a neutral position (e.g., Xzero) versus time that a moveable mass goes through to generate a tactile output with that tactile output pattern. For example, a first set of tactile output patterns shown in FIG. 5I (e.g., tactile output patterns of a "FullTap") each have a waveform that includes an oscillation with two complete cycles (e.g., an oscillation that starts and ends in a neutral position and crosses the neutral position three times). A second set of tactile output patterns shown in FIG. 5J (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in FIG. 5K (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIGS. 5I-5N include Xmin and Xmax values which represent the maximum and minimum extent of movement of the moveable mass. For larger electronic devices with larger moveable masses, there may be larger or smaller minimum and maximum extents of movement of the mass. The examples shown in FIGS. 5I-5N describe movement of a mass in one dimension, however similar principles would also apply to movement of a moveable mass in two or three dimensions.

As shown in FIGS. 5I-5K, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIGS. 5I-5N, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 5I). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIGS. 5I-5K, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

Although specific frequencies, amplitudes, and waveforms are represented in the sample tactile output patterns in FIGS. 5I-5K for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well. Table 1 below provides representative examples of tactile output/haptic feedback behaviors and configurations, and examples of their use with respect to the user interfaces for managing content-based tactile outputs that are illustrated and described herein.

TABLE 1

| Type of Tactile Output Sequence | Waveform | Textural (continuous) or Discrete |
|---|---|---|
| "Major" | MiniTap at 180 Hz | Discrete |
| "Minor" | MicroTap at 80 Hz | Textural |
| "Major-reduced" | MiniTap at 200 Hz | Discrete |
| "Minor-Reduced" | MicroTap at 200 Hz | Discrete |

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Invitations Associated with Accessing Locations of Findable Items

Users interact with electronic devices in many different manners. In some embodiments, an electronic device is able to track the location of an object such as a remote locator object. In some embodiments, access to such remote locator objects can be shared by an owner of the remote locator object with one or more other users. The embodiments described below provide ways in which an electronic device transmits and/or receives invitations associated with accessing locations of findable items, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6A:
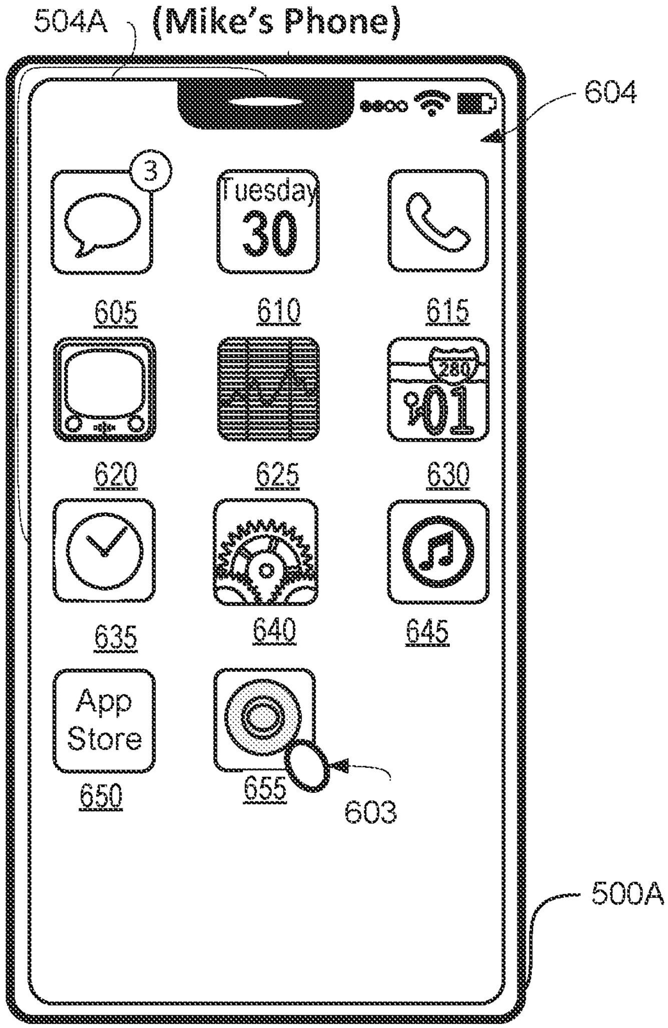
FIGS. 6A-6S illustrate exemplary ways in which electronic devices transmit and receive invitations associated with accessing locations of findable items, in accordance with some embodiments of the disclosure.
Figure 6B:
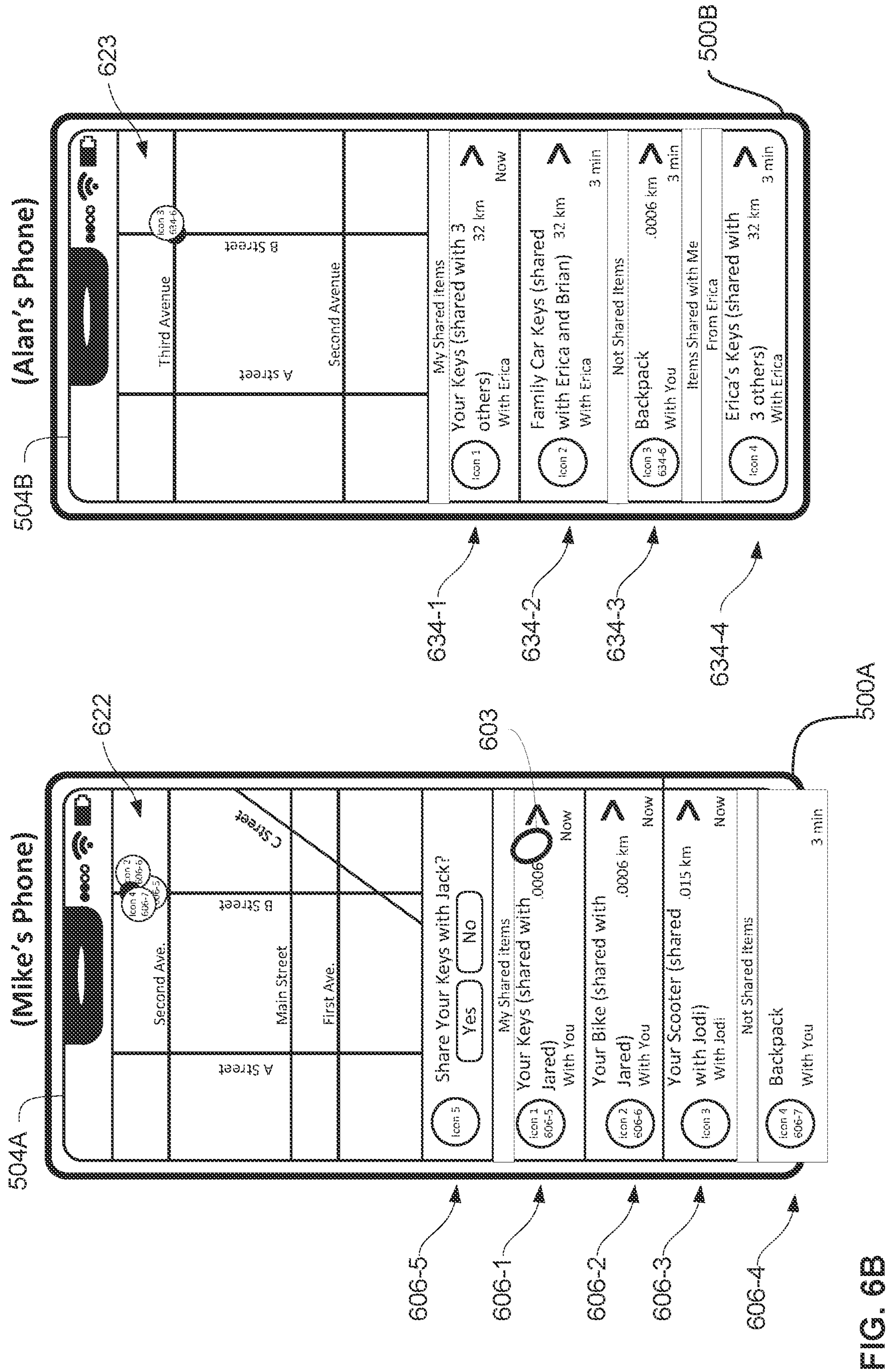
Figure 6C:
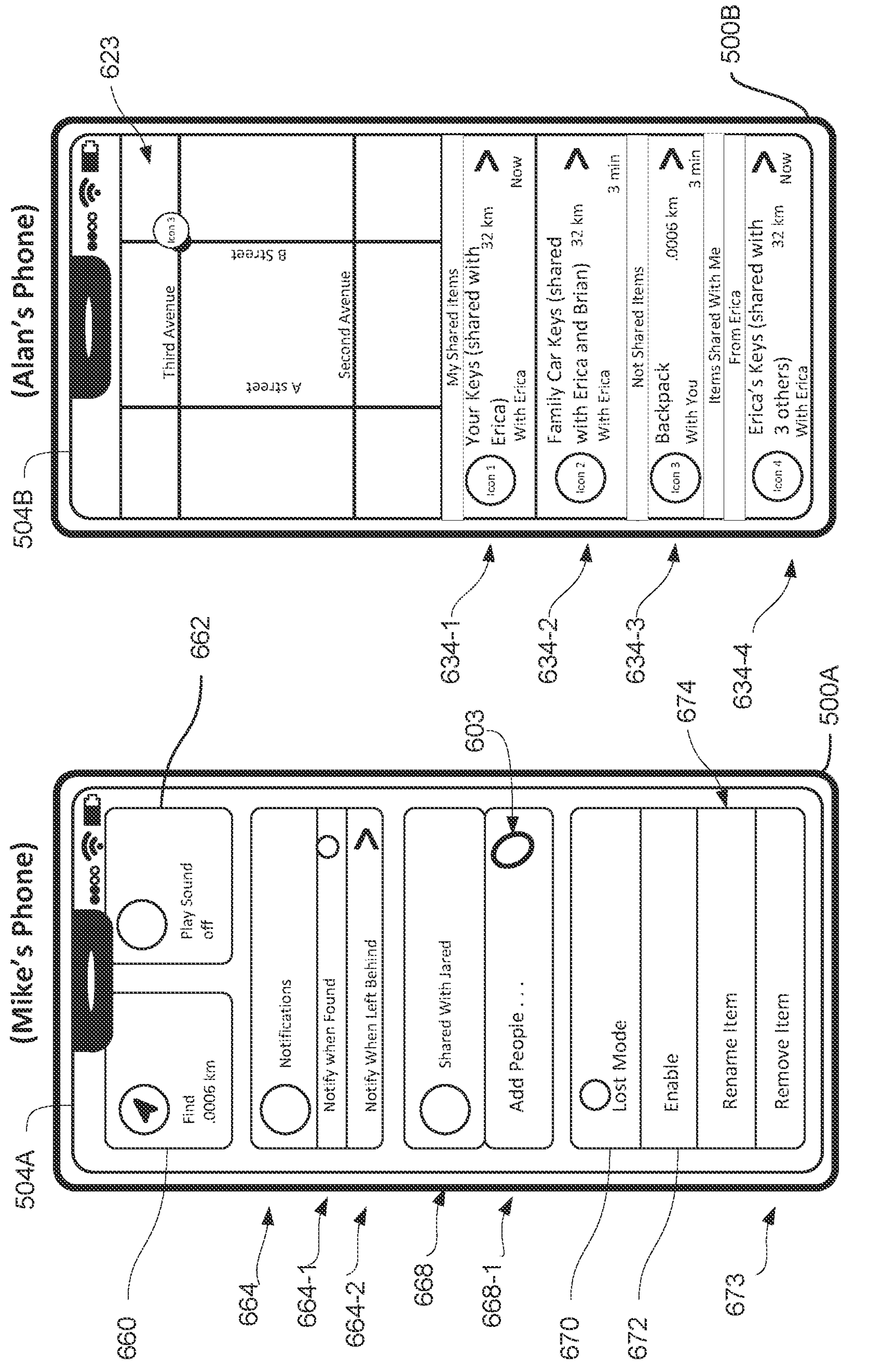
Figure 6D:
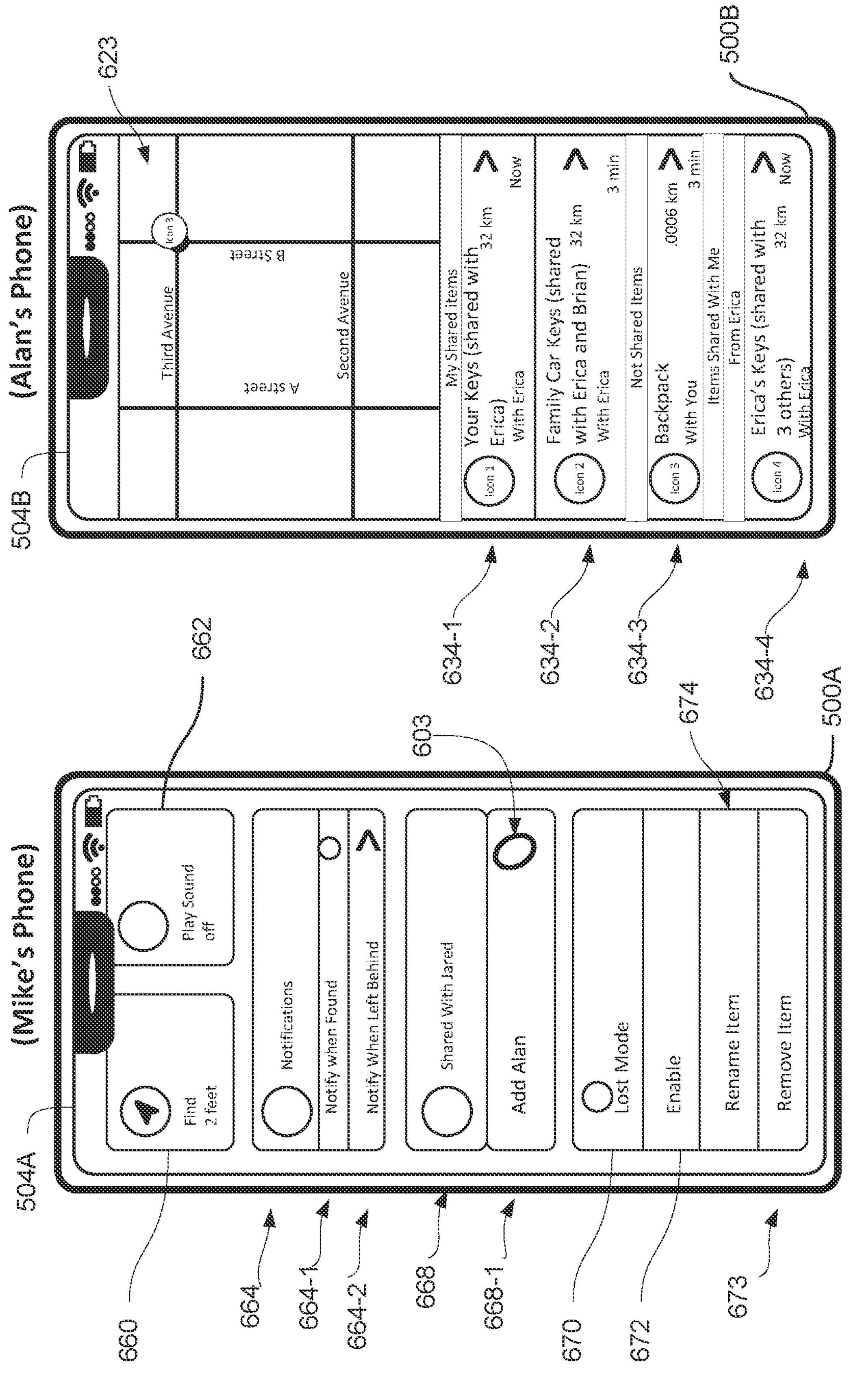
Figure 6E:
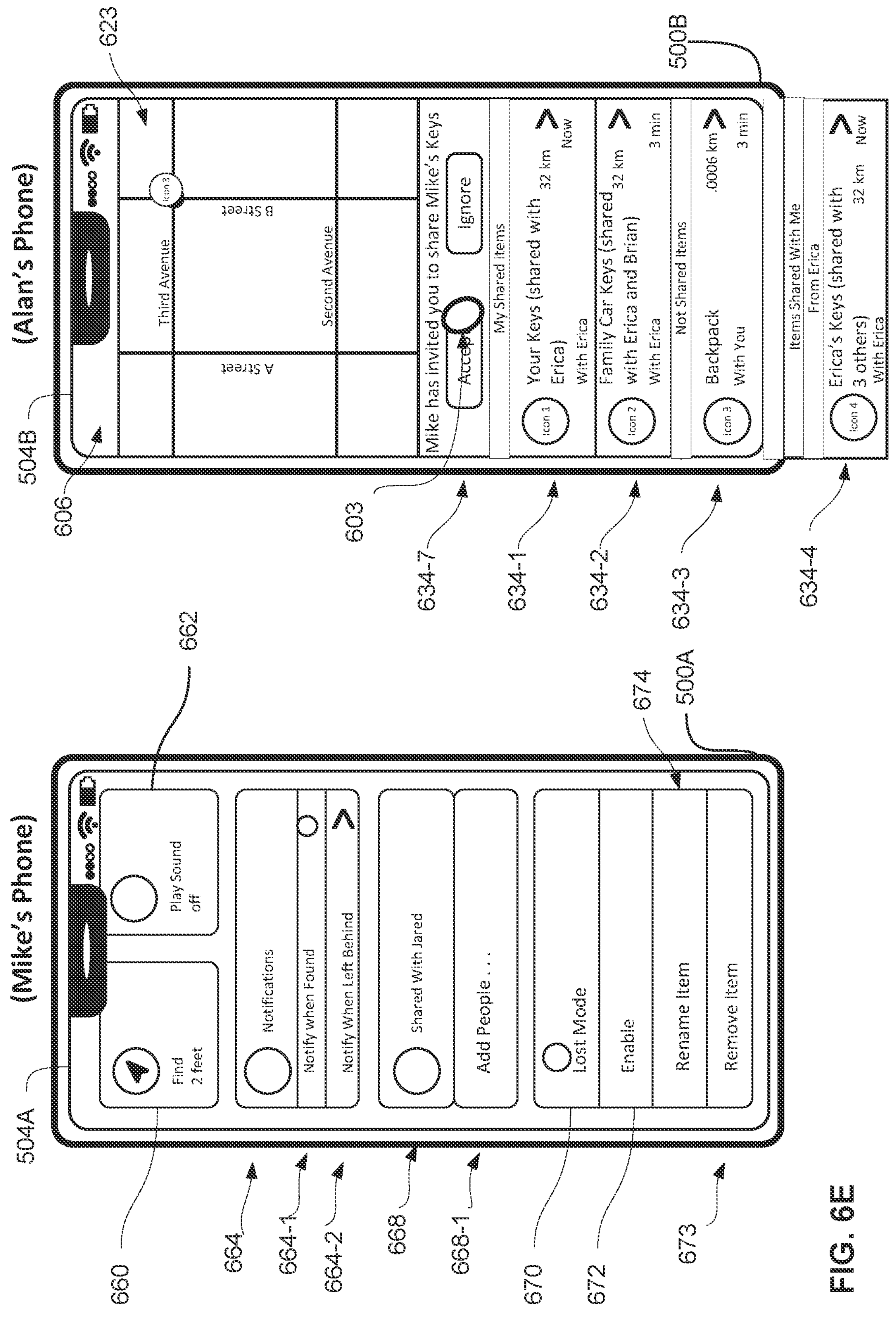
Figure 6F:
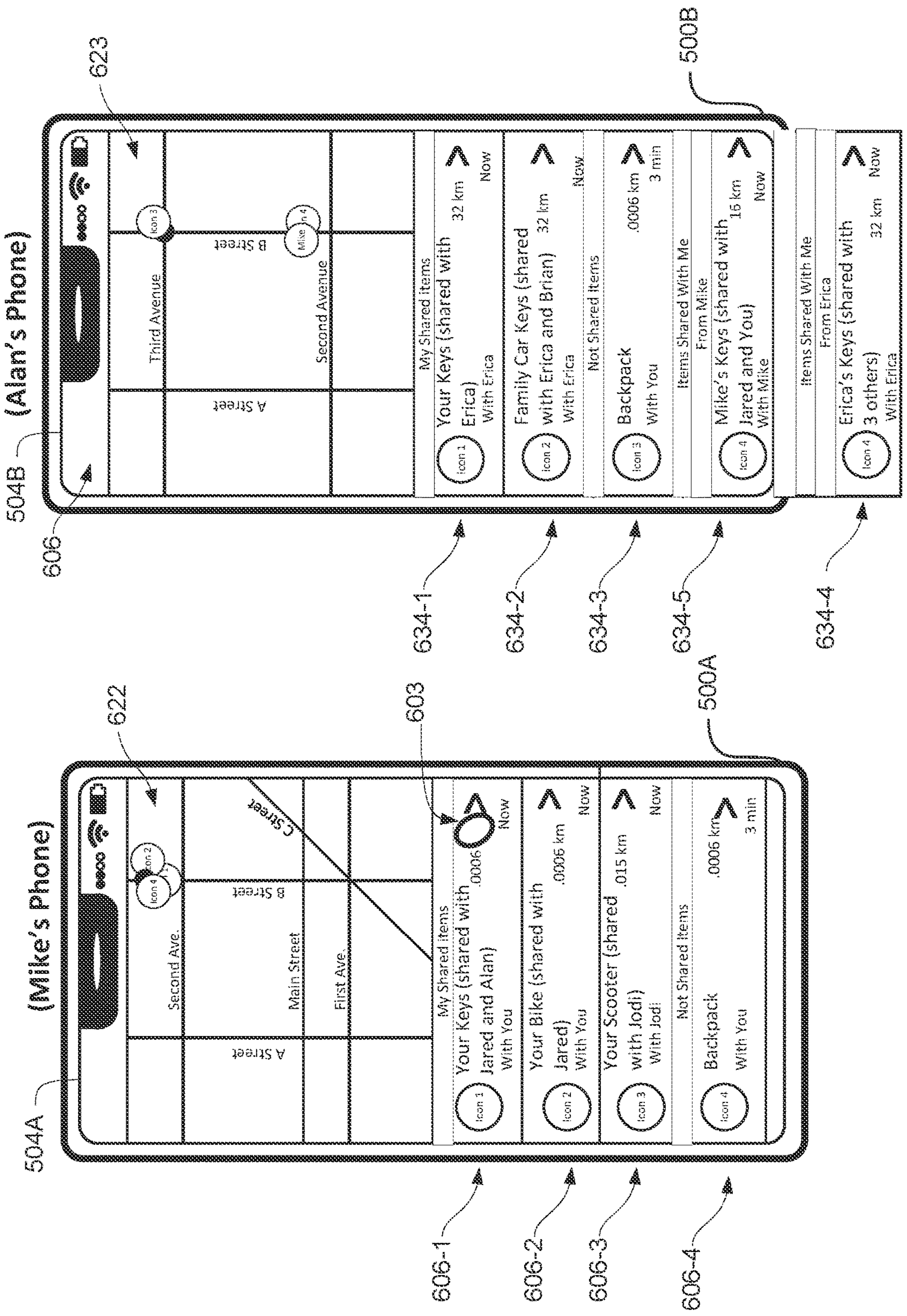
Figure 6G:
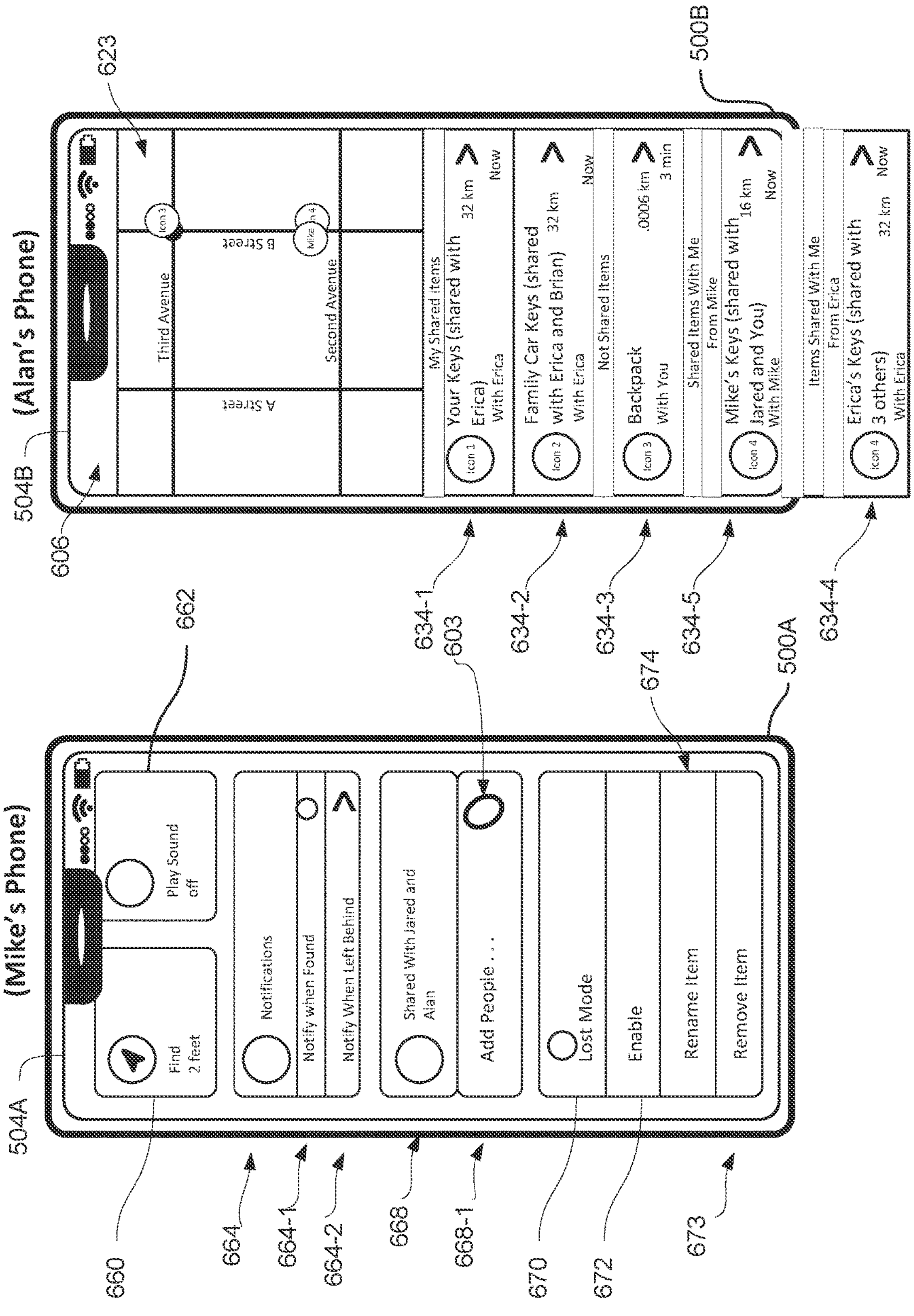
Figure 6H:
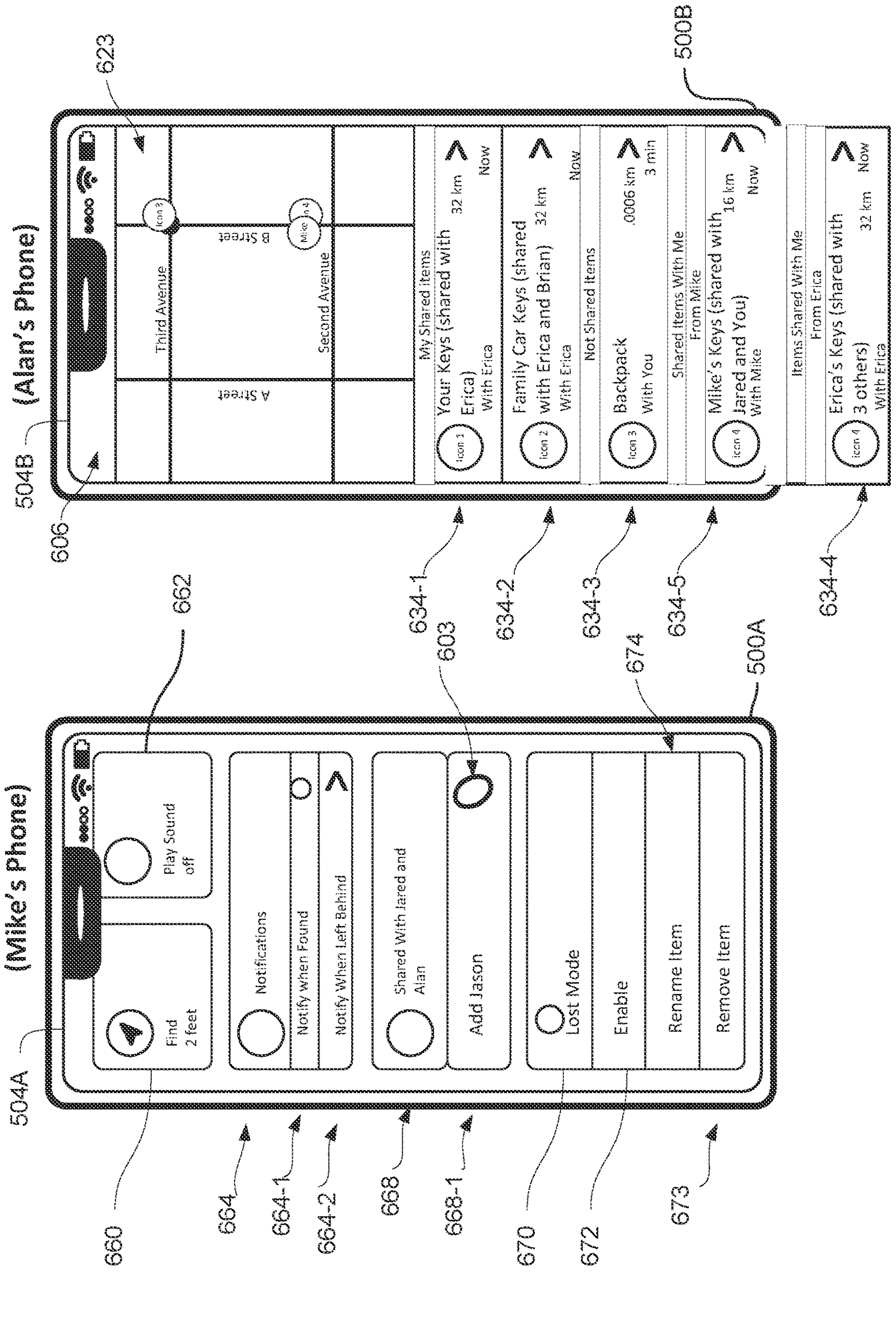
Figure 6I:
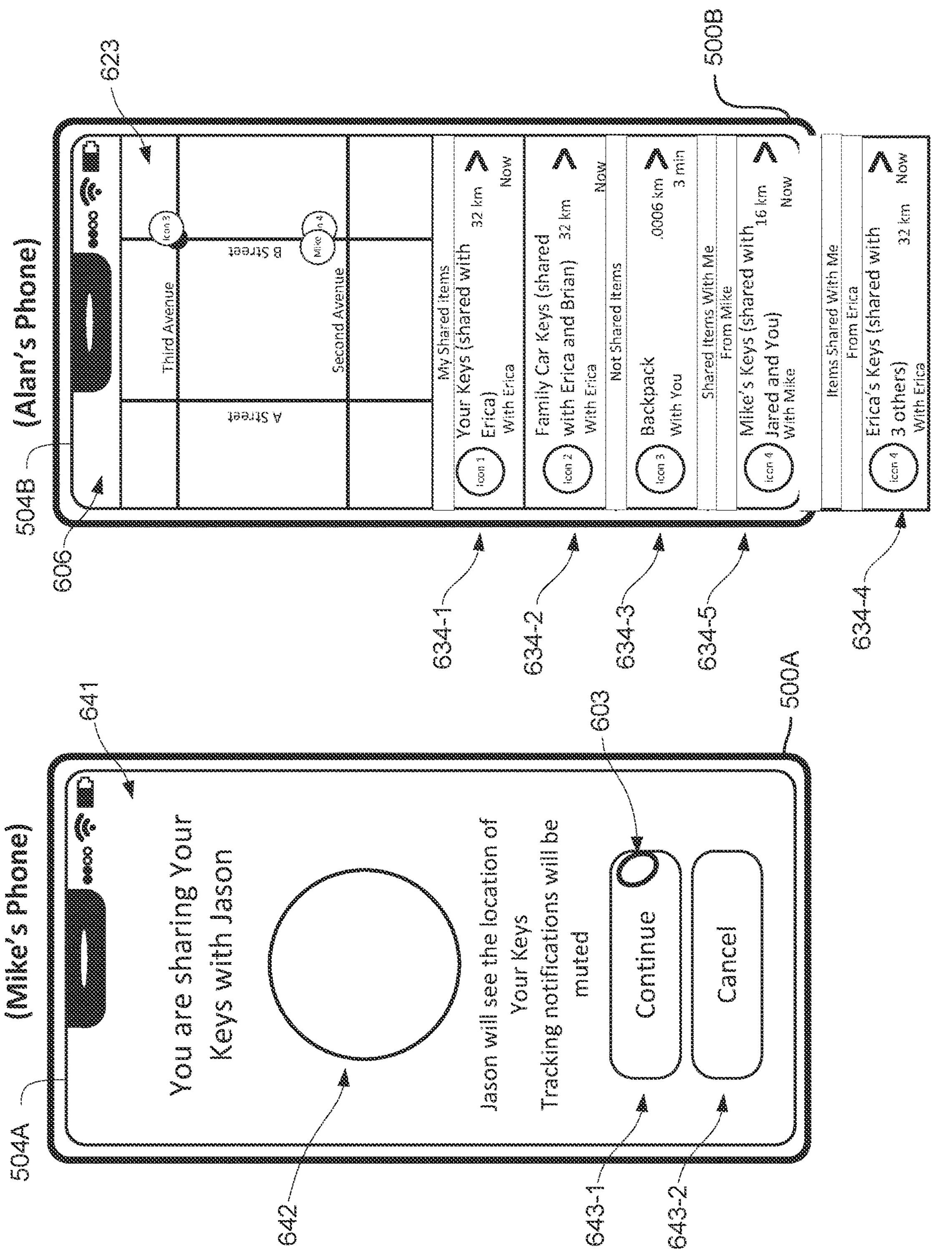
Figure 6J:
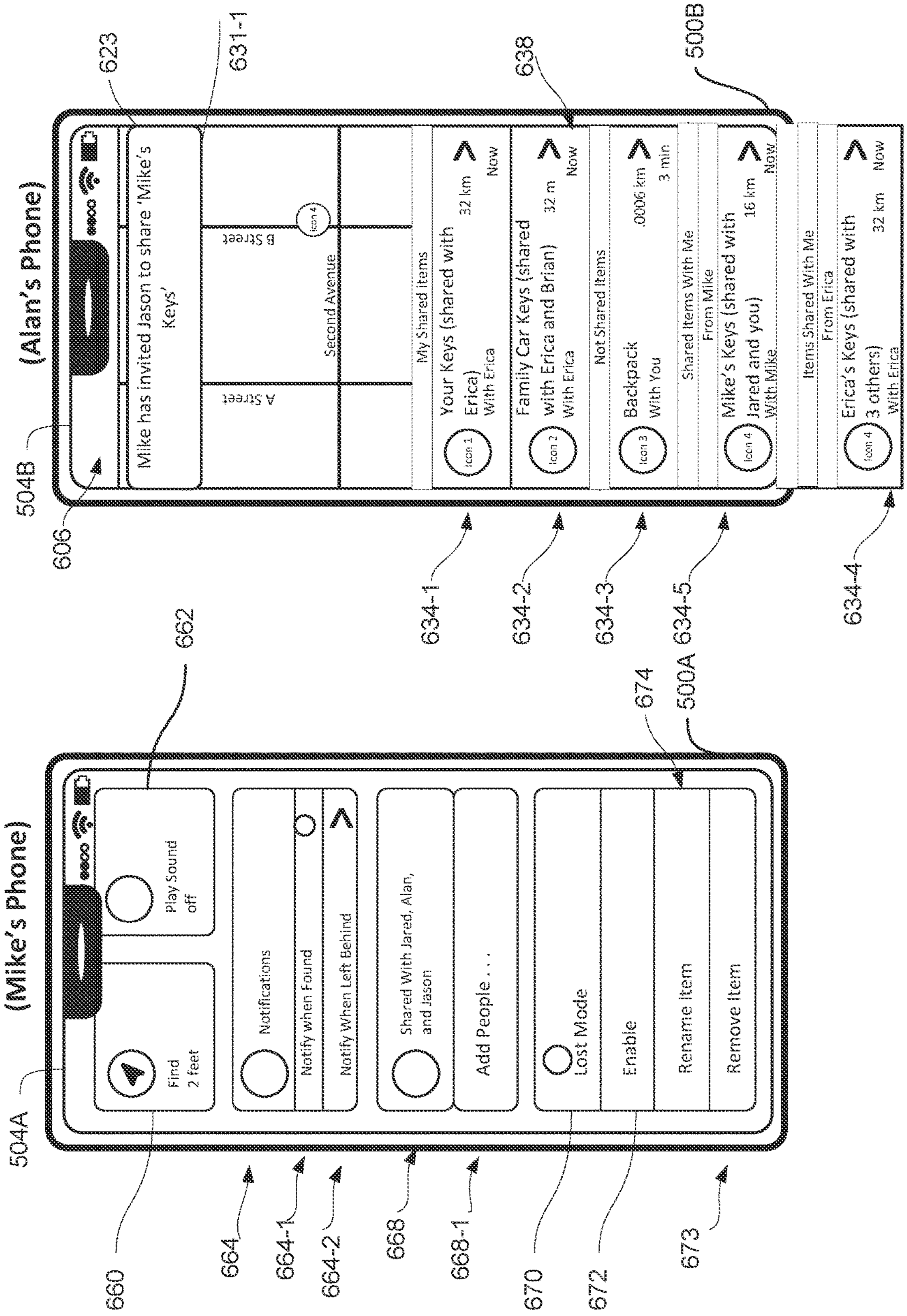
Figure 6K:
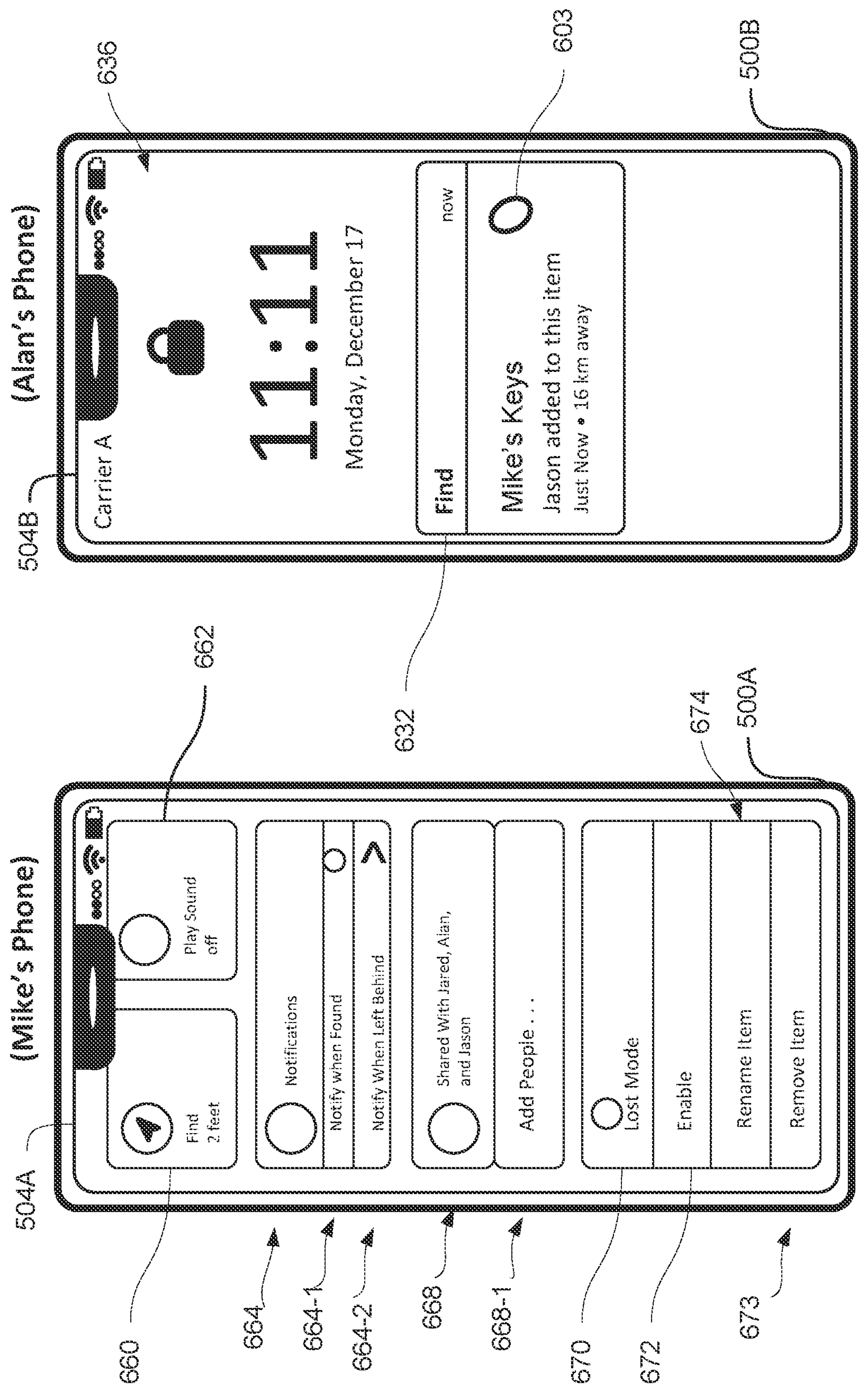
Figure 6L:
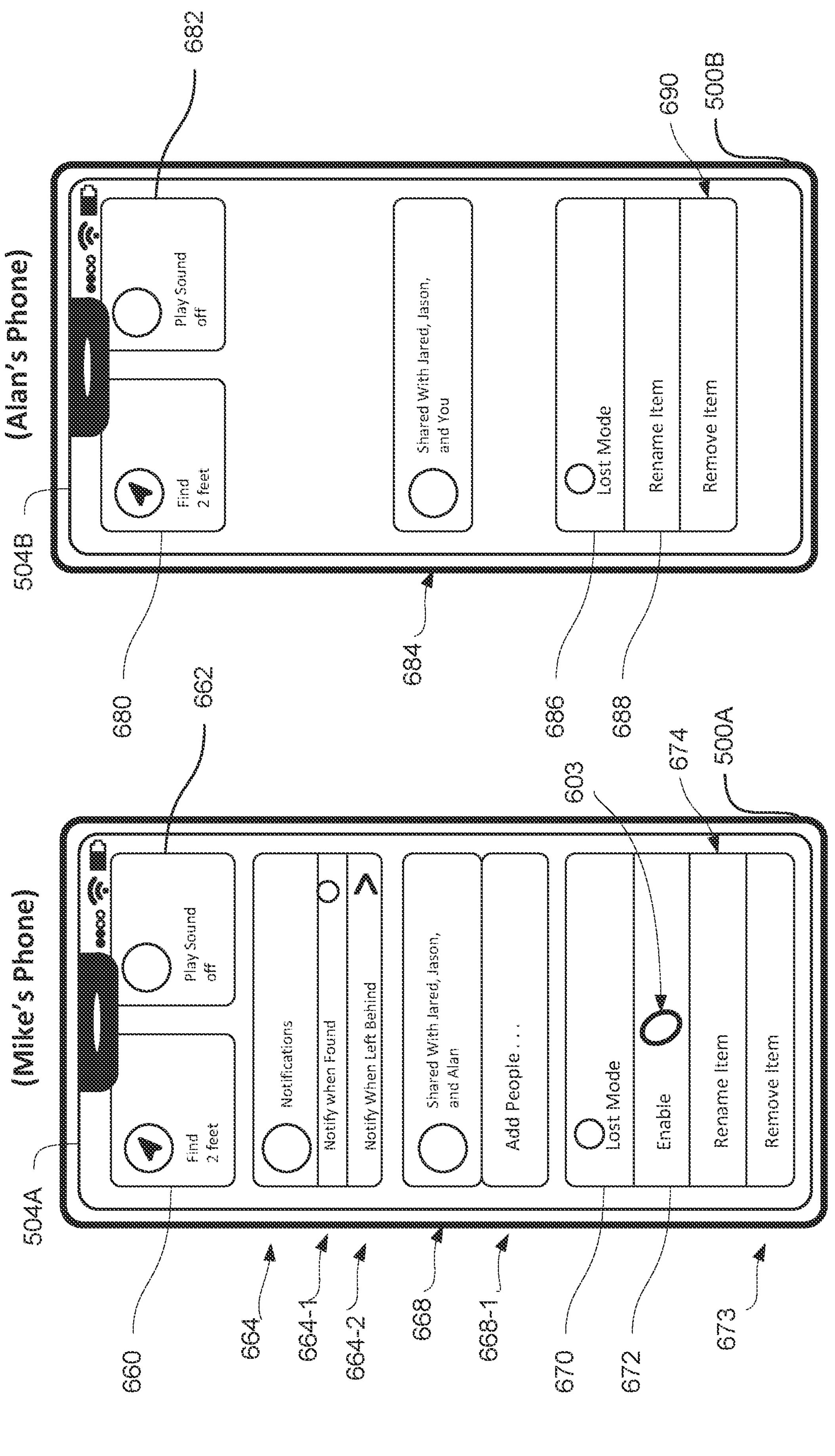
Figure 6M:
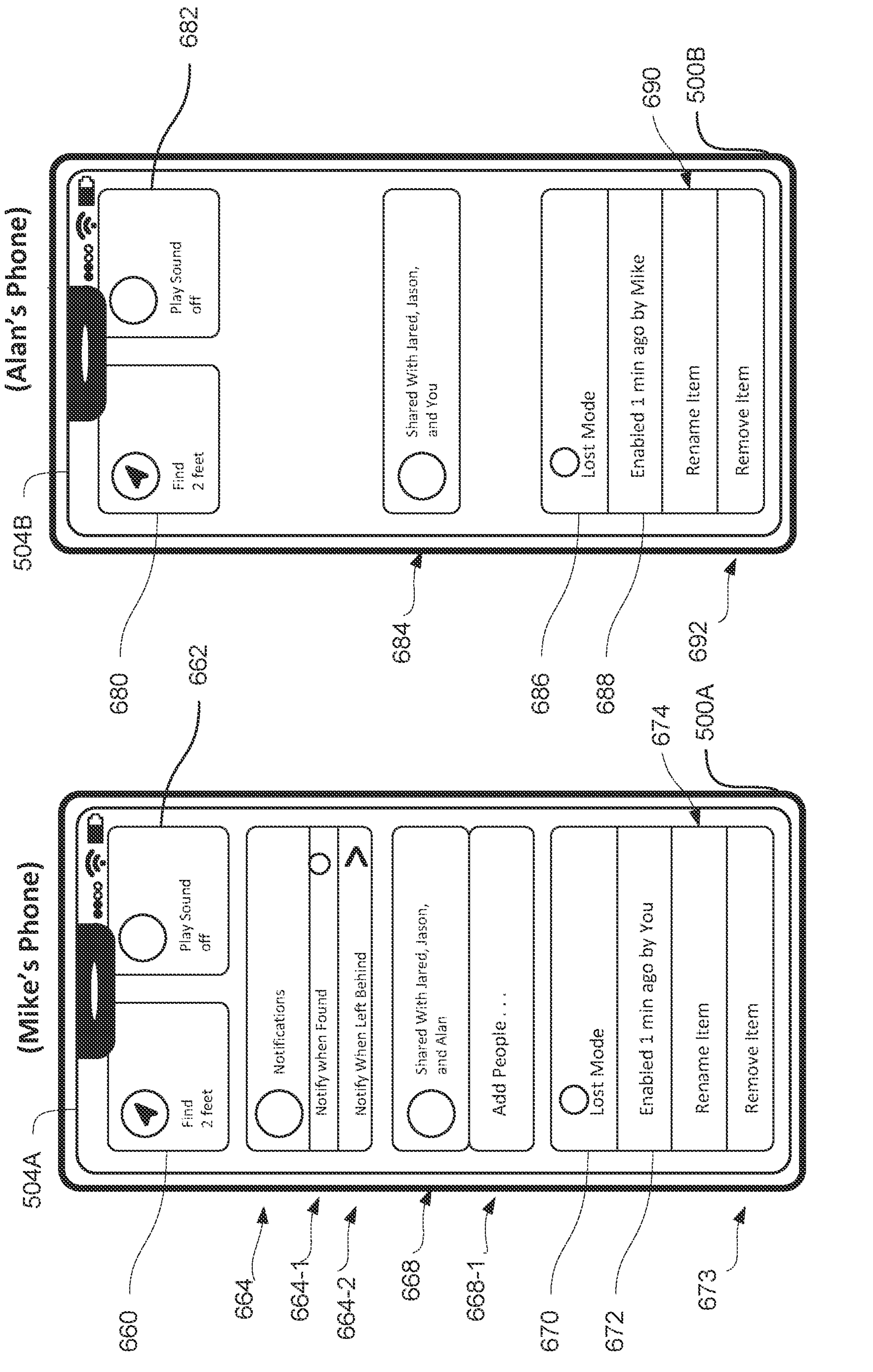
Figure 6N:
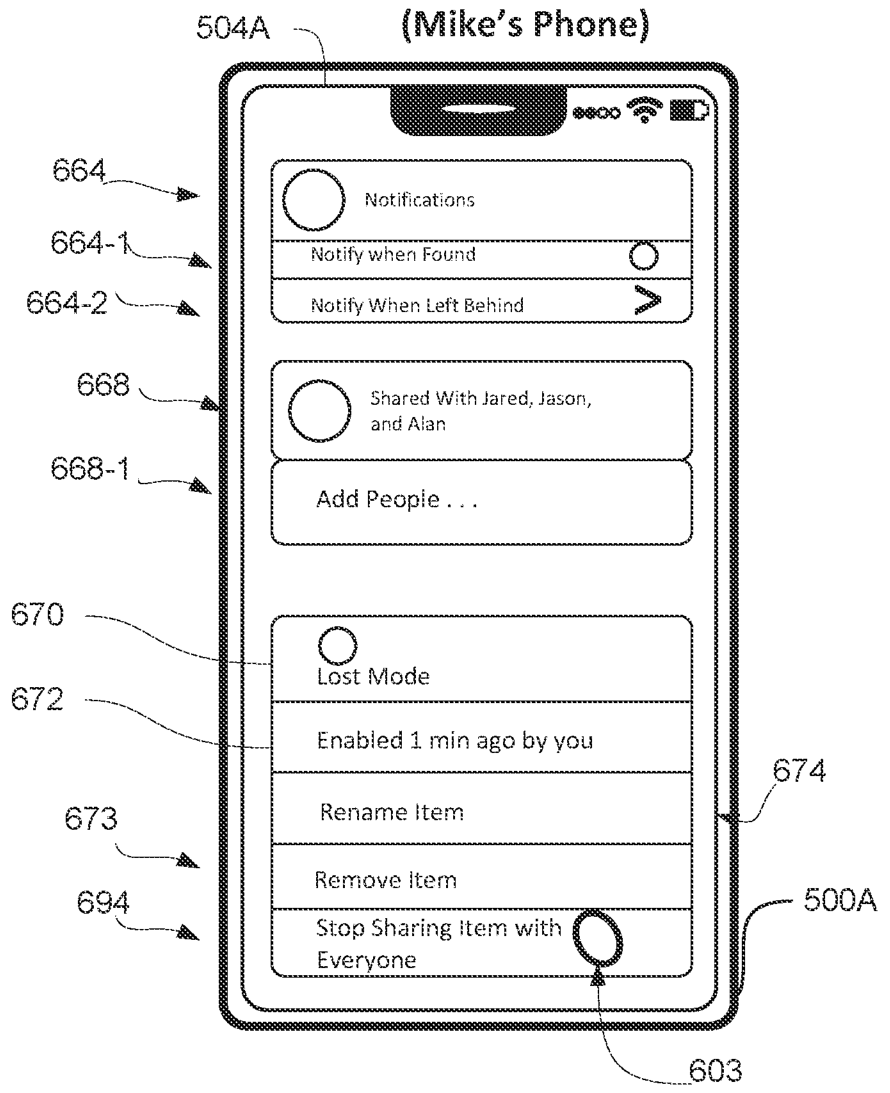
Figure 6O:
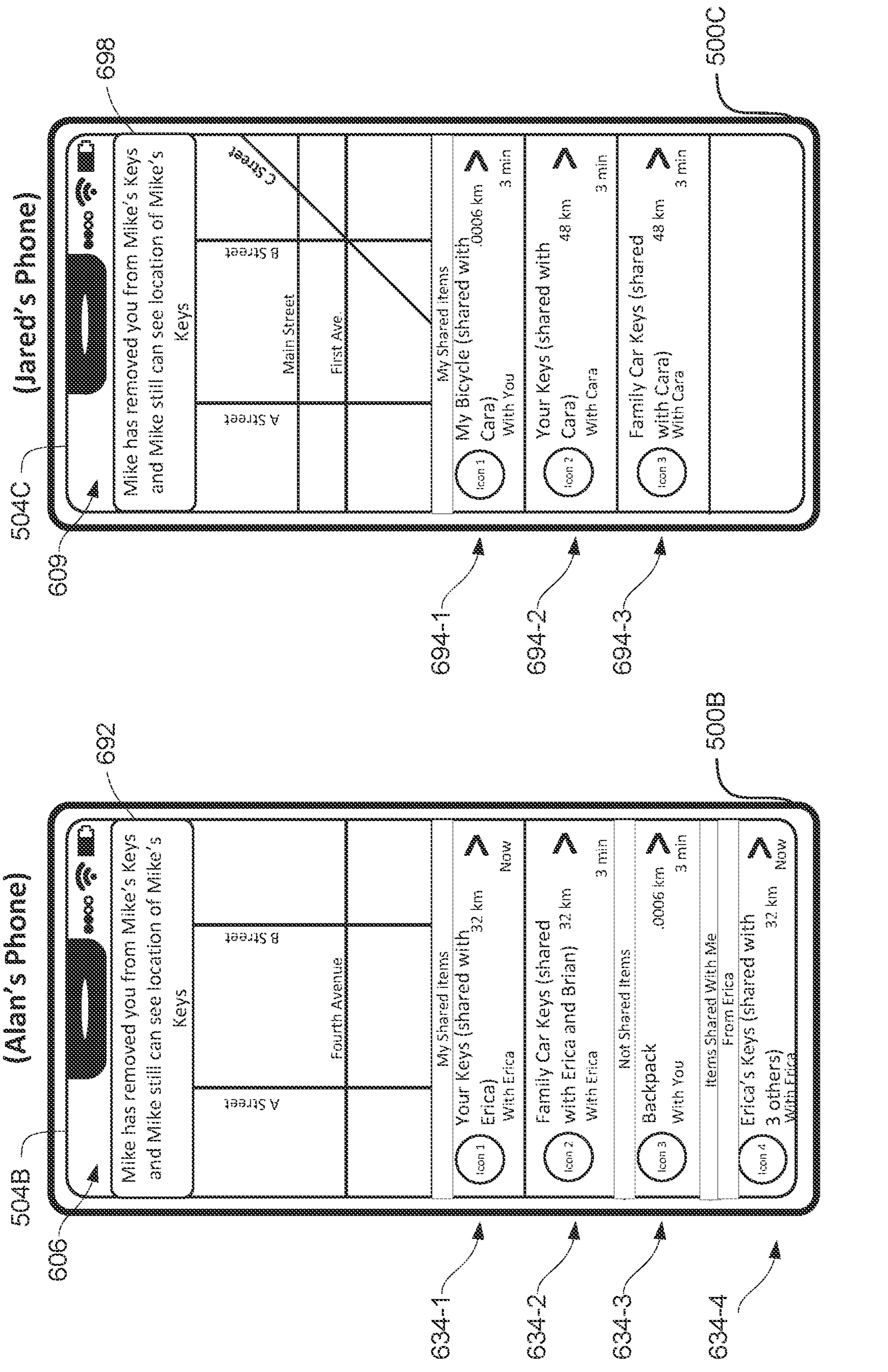
Figure 6P:
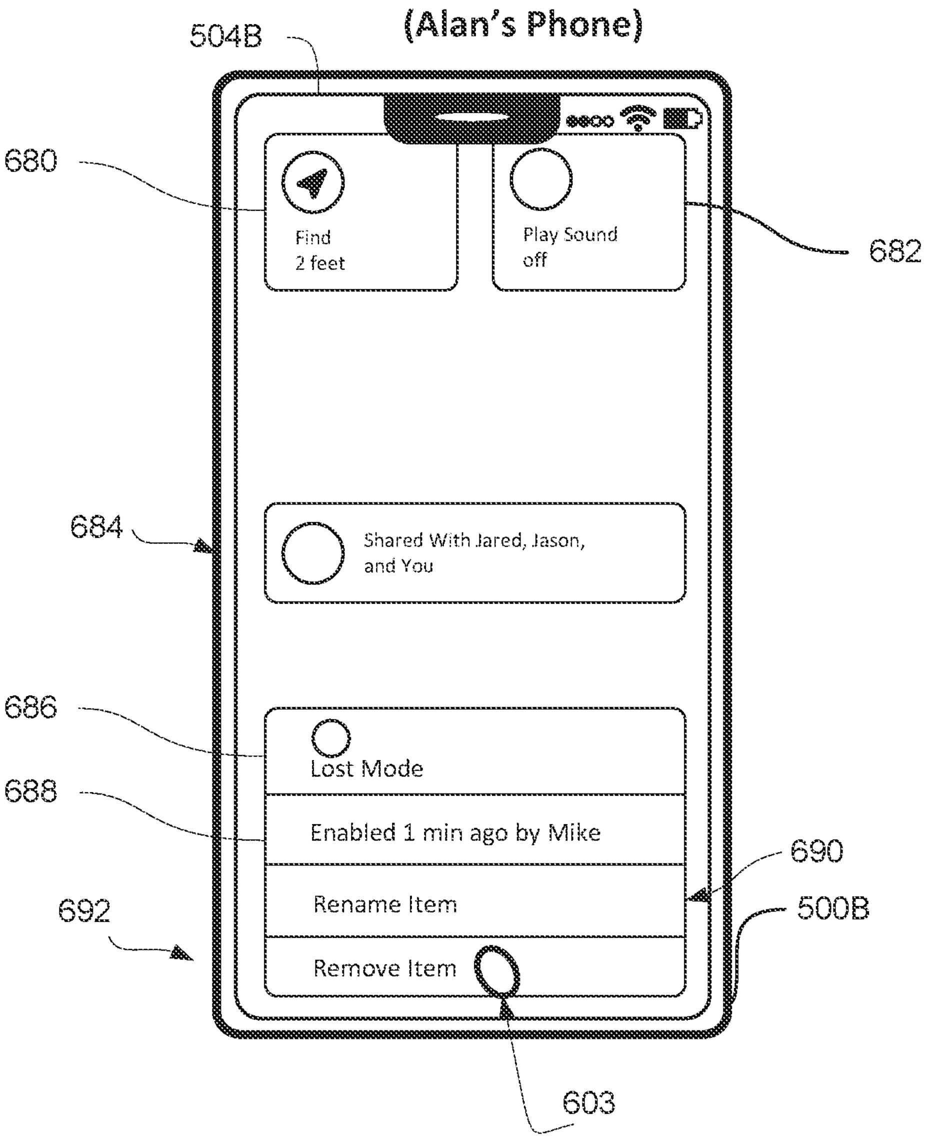
Figure 6Q:
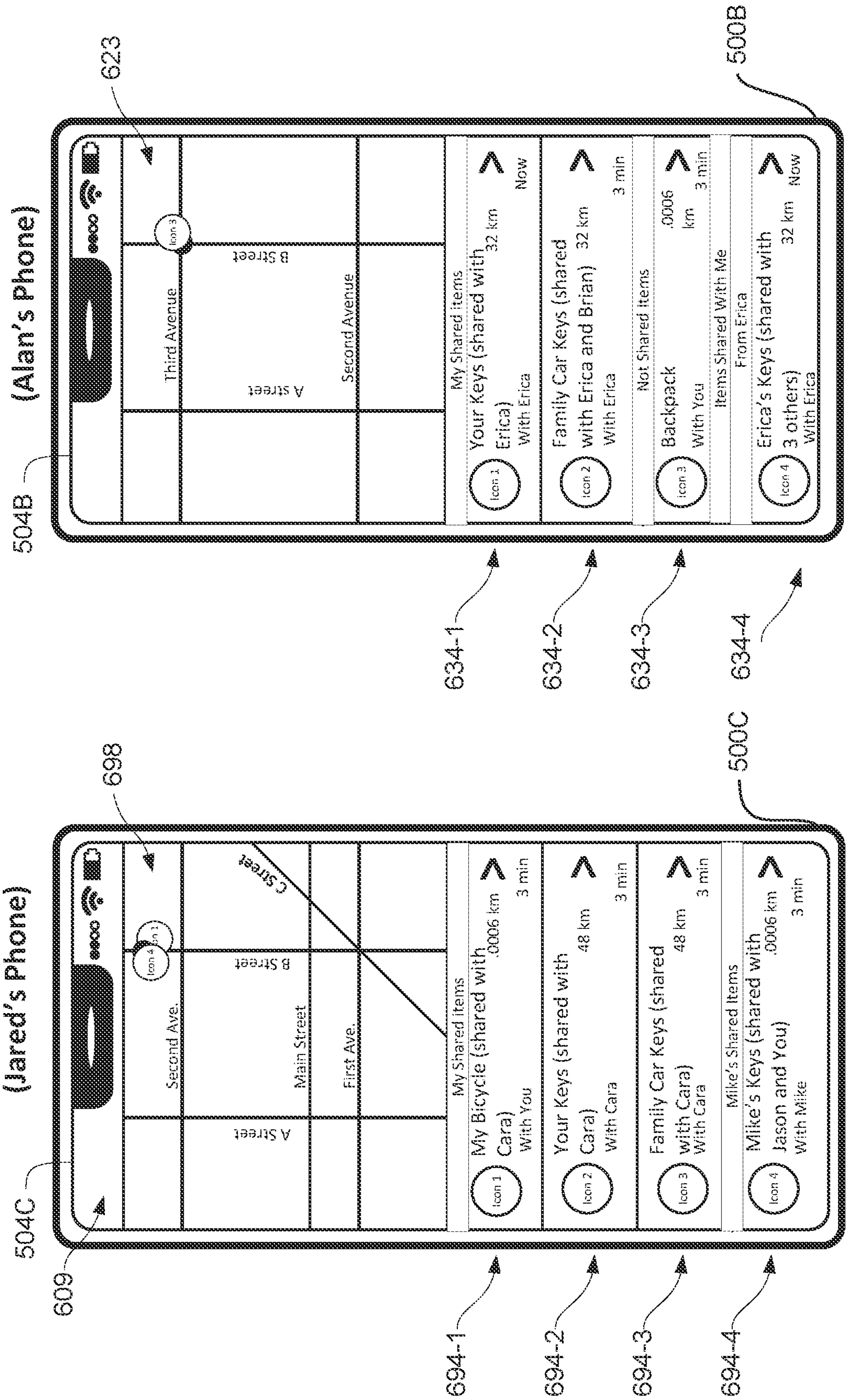
Figure 6R:
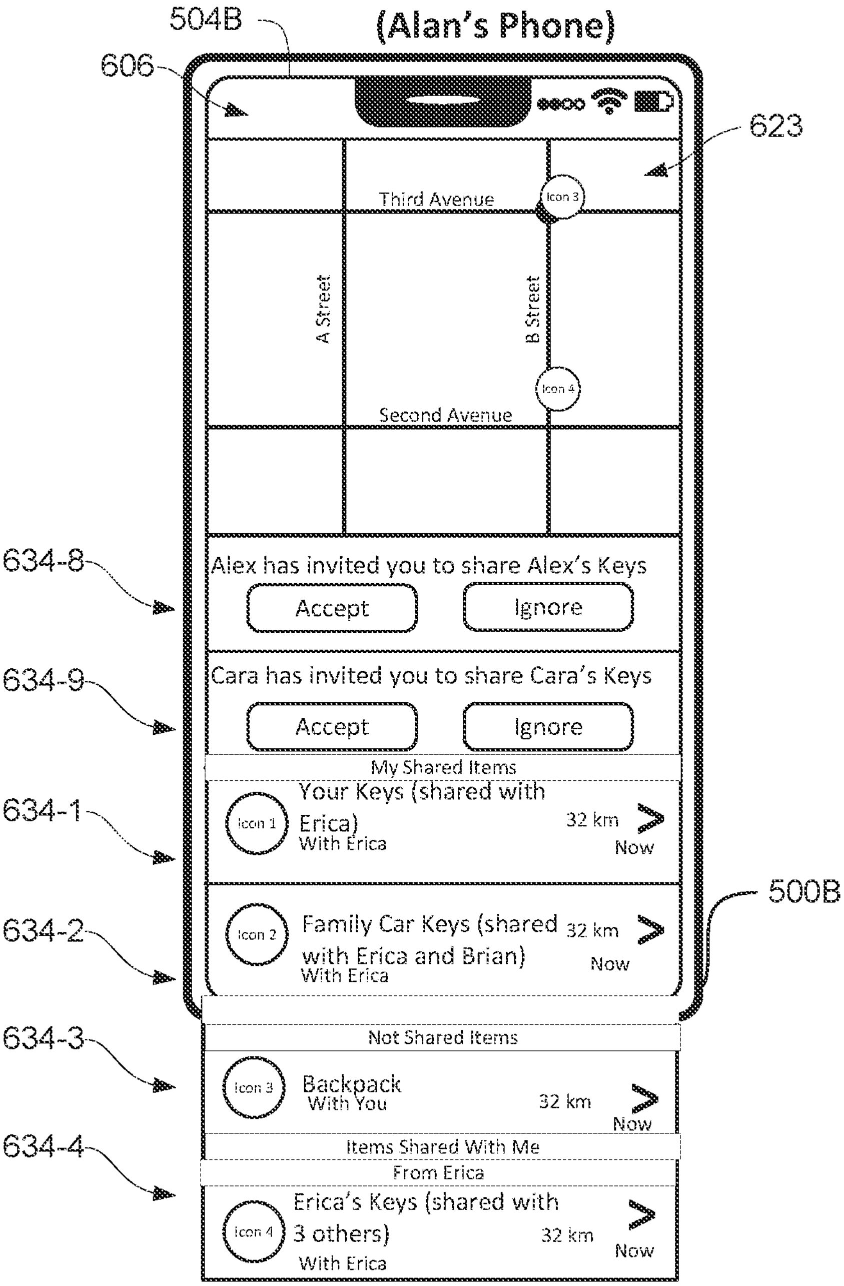
Figure 6S:
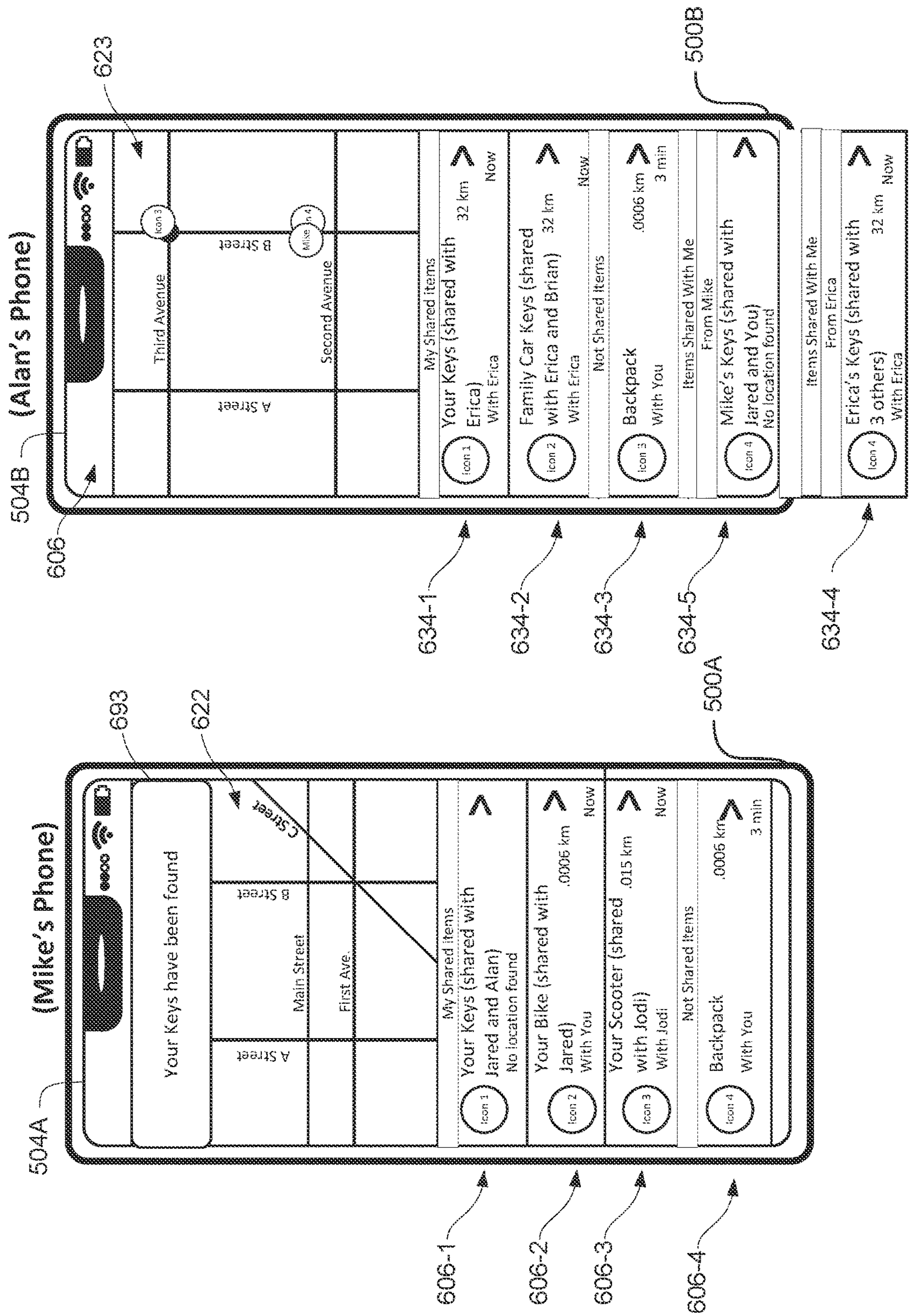

FIGS. 6A-6S illustrate exemplary ways in which electronic devices transmit and/or receive invitations associated with accessing locations of findable items, in accordance with some embodiments of the disclosure. The embodiments in these figures are used to illustrate the processes described below, including the processes described with reference to FIGS. 7A-70.

FIGS. 6A-6S illustrate an electronic device 500A associated with a first user, an electronic device 500B associated with a second user, and/or an electronic device 500C associated with a third user including touch screen 504A, touch screen 504B, and touch screen 504C, respectively, displaying one or more aspects of sharing and/or receiving invitations to track one or more findable items. For instance, and as shown in FIG. 6A, electronic device 500A represents "Mike's Phone," as titled at the top of electronic device 500A. Furthermore, and as shown in FIG. 6A, electronic device 500A displays a user interface 604 including an application icon 605, an application icon 610, an application icon 615, an application icon 620, an application icon 625, an application icon 630, an application icon 635, an application icon 640, an application icon 645, an application icon 650, and an application icon 655. In some embodiments, user interface 604 is a home screen user interface of device 500A (e.g., as described with reference to FIG. 4A), and includes the different application icons selectable to display different applications as described above. Application icon 655 optionally corresponds to an item locating application that displays information regarding one or more findable items the locations to which the first user (e.g., Mike) has access.

From FIG. 6A to FIG. 6B, and as shown in FIG. 6A, first user (e.g., Mike) selects application icon 655 (e.g., item locating application), such as via a tap of contact 603. This selection optionally includes a click, tap, slide, and/or hover input. In response, and as shown in FIG. 6B, electronic device 500A has launched the item locating application and/or displays a user interface of the item locating application via display 504A. In embodiments, the user interface of the item locating application in FIG. 6B on device 500A includes a list of findable items to which the first user (e.g., Mike) has access to the locations thereof. For instance, and as shown on device 500A in FIG. 6B, this list optionally includes findable items that are owned and shared by the first user (e.g., Mike), such as Your Keys in representation 606-1, Your Bike in representation 606-2, and Your Scooter in representation 606-3; findable items that are owned and not shared by the first user (e.g., Mike), such as Backpack in representation 606-4; and/or findable items that have been shared with the first user (e.g., Mike). This list is optionally displayed by device 500A in a grouped fashion, such that findable items owned and shared by the first user (e.g., Mike) are grouped together in a first section entitled My Shared Items, findable items that are owned and not shared by the first user (e.g., Mike) are grouped together in a second section entitled Not Shared Items, and findable items that are shared with the first user (e.g., Mike) are grouped together in a third section (e.g., in a section entitled Items Shared With Me). The findable items that are shared with the first user (e.g., Mike) are optionally further grouped by the user who shared the findable items, as will be described in more detail later.

In some embodiments, in accordance with a determination that the first user (e.g., Mike) has received a request to share access to a location of a findable item with another user, the user interface of the item locating application includes an indication of the request. For example, as shown in FIG. 6B, device 500A that is associated with the first user (e.g., Mike) has received a request from another device (e.g., associated with user Jack) to share a location of "Your Keys" (e.g., which are owned by Mike) with Jack, which causes the device 500A to display indication 606-5 (e.g., a notification) corresponding to the request. In some embodiments, the indication of the request is received when the other device (e.g., associated with the user Jack) detects an indication of location tracking by the findable item Your Keys, as similarly described below with reference to method 900. In some embodiments, the indication of the request is received when the other device (e.g., associated with the user Jack) detects user input for requesting access to the location of the findable item Your Keys, as similarly described below with reference to method 1100. In some embodiments, as shown in FIG. 6B, on device 500A, the indication 606-5 includes selectable options for responding to the request. For example, in FIG. 6B, the indication 606-5 at the device 500A includes a first option "Yes" that is selectable to grant the user Jack access to the location of the findable item Your Keys at the device that is associated with the user Jack. Additionally, in some embodiments, the indication 606-5 includes a second option "No" that is selectable to deny the user Jack access to the location of the findable item Your Keys.

In some embodiments, the user interface of the item locating application on device 500A in FIG. 6B includes a list of users that have access to the location of the findable items. For instance, and as shown in device 500A in FIG. 6B, representation 606-1 indicates that findable item "Your Keys" is shared with Jared, representation 606-2 indicates that findable item "Your Bike" is shared with Jared, representation 606-3 indicates that findable item "Your Scooter" is shared with Jodi, while representation 606-4 does not indicate that findable item "Backpack" is shared with any user (e.g., does not include an indication that it is shared with a user). In some embodiments, the user interface of device 500A in FIG. 6B includes an indication of which user the findable item is with, and/or one or more distance indications (0.5 km, 2 km, 4 km, 8 km, 16 km, 32 km, 64 km, or 88 km) that indicate the distance the items are from the electronic device 500A. This distance indication is optionally accompanied by a time indication (e.g., Now, 2 seconds ago, 1 minute ago, 1 hour ago, or 5 hours ago) that indicates when the distance indication was last updated. For instance, and as shown in the user interface of device 500A in FIG. 6B, representation 606-1 indicates that findable item "Your Keys" is with you (e.g., Mike), the distance is 0.0006 km, and the time this distance indication was last updated was Now. In some embodiments, a given representation 606 does not include an indication of a distance of the corresponding findable item when that findable item is indicated as being "With You" (e.g., is within a threshold distance of device 500A, such as 0.1, 0.5, 1, 5, 10, or 100 meters). Furthermore, representation 606-2 indicates that findable item "Your Bike" is with you (e.g., Mike), the distance is 0.0006 km, and the time this distance indication was last updated was Now. Additionally, representation 606-3 indicates that findable item "Your Scooter" is with Jodi, the distance is 0.015 km, and the time this distance indication was last updated was Now. Lastly, representation 660-4 indicates that findable item "Backpack" is with you (e.g., Mike), the distance is 0.0006 km, and the time this distance indication was last updated was 3 minutes ago.

In some embodiments, the user interface of the item locating application of device 500A in FIG. 6B includes a representation of a map 622 of a physical region surrounding and/or including the location of the first user (e.g., Mike) and/or device 500A. In some embodiments, the map 622 indicates the location of the first user (e.g., Mike) and/or device 500A as a darkened circle, the location of the findable items, such as a representation of Your Keys (icon 1 606-5) at a location on the map 622 corresponding to the location of Your Keys, a representation of backpack (icon 4 606-7) at a location on the map 622 corresponding to the location of backpack, and the location of Your Bike (icon 3 606-6) at a location on the map 622 corresponding to the location of Your Bike, and/or locations of additional users that share their location with the first user (e.g., Mike). As shown in FIG. 6B, no additional users are currently sharing their locations with Mike and thus, no additional user is displayed on map 622. As further shown in FIG. 6B, and as noted above, representations 606-1, 606-2, 606-3, and 606-4 indicate the corresponding icon number and/or the corresponding findable item (e.g., a graphic of the corresponding findable item) such that the first user (e.g., Mike) can identify the findable item on map 622. For instance, and as shown in the user interface of the item locating application of device 500A in FIG. 6B, icon 1 606-5, icon 2 606-6, and icon 4 606-7 are represented on map 622. In some embodiments, and as shown in FIG. 6B, the representations of the findable items on map 622 are bubbles and/or circles. However, the representations are optionally any shape and/or size. In some embodiments, and as shown in FIG. 6B, the representations of the findable items are stacked on map 622 because the locations of the findable items are in close proximity.

In some embodiments, different users that have access to the item locating application are presenting with an item locating application user interface similar to the first user's (e.g., Mike's) that includes a list of findable items to which the user has access to the location, such as the second user (e.g., Alan) of electronic device 500B in FIG. 6B. For instance, and as shown in FIG. 6B, electronic device 500B displays a user interface of the item locating application to the second user (e.g., Alan). As shown in device 500B in FIG. 6B, the item locating application lists representation 634-1, representation 634-2, representation 634-3, and representation 634-4, representing findable items Your Keys, Family Car Keys, Backpack, and Erica's Keys, respectively. As further shown in FIG. 6B, Your Keys and Family Car Keys are shared by Alan, Backpack is not shared by Alan with any user, and Erica's Keys are shared with Alan and shared by Erica.

Additionally, and as shown in the user interface of the item locating application of electronic device 500B in FIG. 6B, representation 634-1 indicates that findable item Your Keys are shared with Erica, are with Erica, the distance is 32 km, and the time this distance indication was last updated was Now. Representation 634-2 indicates that findable item Family Car Keys is shared with Erica, is with Erica, the distance is 32 km, and the time this distance indication was last updated was 3 minutes ago. Representation 634-3 indicates that findable item Backpack is with you, the distance is 0.0006 km, and the time this distance indication was last updated was 3 minutes ago. Representation 634-4 indicates that findable item Erica's Keys is shared with three other users (e.g., including Alan), is with Erica, the distance is 32 km, and the time this distance indication was last updated was 3 minutes ago. Furthermore, and as shown in the user interface of the item locating application of electronic device 500B in FIG. 6B, map 623 indicates the location of the second user (e.g., Alan) as a darkened circle, and a representation of backpack (icon 3 634-6) at a location on map 623 corresponding to the location of backpack.

From FIG. 6B to FIG. 6C, and as shown in FIG. 6B, device 500A detects selection of representation 606-1 corresponding to Your Keys, such as via a tap of contact 603. This selection is optionally a click, tap, slide, and/or hover input. In some embodiments, and in response to the device 500A detecting a selection of the findable item by the first user (e.g., Mike) in FIG. 6B, the item locating application presents a second user interface (e.g., findable item detail page) that is associated with the selected findable item and the first user (e.g., Mike). In some embodiments, and as shown in the second user interface of item locating application of device 500A of FIG. 6C, the second user interface optionally includes information about the first findable item and one or more selectable options to initiate actions specific to the first findable item (e.g., Your Keys). For instance, and as shown in the second user interface of electronic device 500A in FIG. 6C, the second user interface of the first user's (e.g., Mike) item locating application includes a selectable option 660 that is selectable to initiate a process to find the findable item (e.g., Your Keys), a selectable option 662 to play sounds from the findable item (e.g., Your Keys), a selectable option 664 for configuring notifications relating to the findable item including a selectable option 664-1 to enable an option to notify the first user when the findable item is found, and a selectable option 664-2 enable an option to notify the first user when the findable item is left behind.

Additionally, the second user interface of the first user's (e.g., Mike) item locating application of device 500A includes a selectable option 668 that indicates the names and/or identities of the users with which the findable item (e.g., Your Keys) is shared. For instance, and as shown in the second user interface of device 500A in FIG. 6C, selectable option 668 indicates that findable item (e.g., Your Keys) is shared with Jared. Furthermore, selectable option 668 includes a selectable option 668-1 via which the first user can add users and/or transmit additional invitations to additional users for accessing the location of the findable item. Furthermore, and as shown in the second user interface of device 500A in FIG. 6C, the second user interface includes a section 670 that indicates a label for lost mode for the findable item, which is described in more detail with reference to method 700. FIG. 6C further indicates that the second user interface includes a selectable option 672 to enable lost mode, a selectable option 674 to rename the findable item, and a selectable option 673 to remove the findable item from the item locating application of device 500A. It should be noted that in some embodiments, the second user interface for an owner of a findable item differs from that of a corresponding user interface for a user with which the findable item is shared, discussed in greater detail hereinafter such as with reference to FIG. 6K.

From FIG. 6C to FIG. 6D, and as shown in FIG. 6C, electronic device 500A detects that first user (e.g., Mike) selects selectable option 668-1 to add people (e.g., invite users) to receive an invitation to have access to the location of the first findable item (e.g., Mike's Keys), such as via a tap of contact 603. In some embodiments, in response, a list of users is displayed by device 500A based on and/or corresponding to the first user's contacts. In alternative embodiments, users are displayed by device 500A one at a time based on and/or corresponding to the first user's contacts. However, it should be noted that there are various ways the users are displayed by device 500A. For instance, and as shown in the second user interface of device 500A of FIG. 6D, electronic device 500A displays an indication of a user "Alan" in selectable option 668-1, and device 500A detects that first user (e.g., Mike) selects selectable option 668-1, such as via a tap of contact 603.

From FIG. 6D to FIG. 6E, and as shown in FIG. 6D, device 500A detects that the first user (e.g., Mike) selects selectable option 668-1 to initiate a process to send an invitation to Alan to have access to the location of the first findable item (e.g., Mike's Keys), such as via a tap of contact 603. In response, the item locating application of the first user (e.g., Mike) transmits an invitation (directly or indirect) to the device 500B of the second user (e.g., Alan). For instance, and as shown in FIG. 6E, device 500B updates the user interface of the item locating application to include a representation 634-7 of an invitation from Mike to share Mike's Keys. In some embodiments, when an invitation is received in the item locating application, device 500B shifts the list of findable items down in the user interface, potentially off of the display of device 500B as shown in FIG. 6E.

In some embodiments, and as shown in the user interface of the item locating application of device 500B of FIG. 6E, the invitation in representation 634-7 includes a first selectable option that is selectable by the second user (e.g., Alan) to initiate a process to accept the invitation for access to the location of the first findable item (e.g., Mike's Keys), as well as a second selectable option that is selectable to initiate a process to ignore the invitation for access to the location of the first findable item (e.g., Mike's Keys). In some embodiments, representation 634-7 includes an image of the first findable item, a text description of the first findable item, and/or an indication of the user who sent the invitation (e.g., includes the name of such user).

From FIG. 6E to FIG. 6F, device 500B detects that the second user (e.g., Alan) accepts the invitation from the first user (e.g., Mike), such as via a tap of contact 603, and transmits (directly or indirectly) this acceptance to device 500A. In response, and as shown in the user interface of item locating application of device 500B in FIG. 6F, the second user (e.g., Alan) now has access to the first findable item (e.g., Mike's Keys) as displayed in representation 634-5. As shown in FIG. 6F, the information accompanying the findable item (e.g., Mike's Keys) is optionally updated to reflect that Mike's Keys is shared with Jared and You (Alan, the second user). For instance, and as shown in the user interface of the item locating application of device 500B of FIG. 6F, representation 634-5 indicates that Mike's Keys are shared with Jared and You (e.g., Alan, the second user). Furthermore, and as shown in the user interface of the item locating application of device 500A in FIG. 6F, device 500A updates representation 606-1 to indicate that Your Keys (e.g., Mike's Keys) are shared with Jared and Alan. As further shown in the user interface of the item locating application of device 500B in FIG. 6F, map 623 now indicates the location of Mike's Keys (icon 4 634-7) as well as the location of the first user (e.g., Mike 634-8) who is sharing his locating with the second user (e.g., Alan).

From FIG. 6F to FIG. 6G, device 500A detects that the first user (e.g., Mike) selects representation 606-1 to go back into item detail page for Mike's Keys, such as via a tap of contact 603. In some embodiments, and as shown in the second user interface of the item locating application of device 500A of FIG. 6G, the second user interface of the first user (e.g., Mike) is updated to reflect the current status of the first findable item (e.g., Mike's Keys). For instance, and as shown in the second user interface of the item locating application of device 500A in FIG. 6G, representation 668 indicates that Mike's Keys are now shared with Jared and Alan.

From FIG. 6G to FIG. 6H, and as shown in FIG. 6G, device 500A detects that first user (e.g., Mike) selects selectable option 668-1 to add people (e.g., invite users) to receive an invitation to have access to the location of the first findable item (e.g., Mike's Keys), such as via a tap of contact 603. In response, as shown in FIG. 6H, the available users are displayed by device 500A in a list similar as discussed with reference to FIG. 6C.

From FIG. 6H to FIG. 6I, and as shown in FIG. 6H, device 500A detects that first user (e.g., Mike) selects selectable option 668-1 to add Jason to receive an invitation to have access to the location of the first findable item (e.g., Mike's Keys), such as via a tap of contact 603. In some embodiments, as shown in FIG. 6I, in response to detecting the selection of the selectable option 668-1 in FIG. 6H, the electronic device 500A displays confirmation user interface 641 to confirm sharing of access to the location of the first findable item (e.g., Mike's Keys) with Jason. For example, as shown in FIG. 6I, the confirmation user interface 641 indicates that sharing access to the location of the first findable item with Jason will allow Jason to see the location of the first findable item (e.g., Mike's Keys), which is represented by representation 642, as similarly discussed above, and/or that tracking notifications for the first findable item will be muted (e.g., for the duration that Mike's Keys are shared with Jason), such as the tracking notifications described below with reference to method 900. In some embodiments, as shown in FIG. 6I, the confirmation user interface 641 includes a first option 643-1 that is selectable to confirm sharing access to the location of the first findable item with Jason, and a second option 643-2 that is selectable to forgo sharing access to the location of the first findable item with Jason.

In FIG. 6I, the electronic device 500A detects a selection directed to the first option 643-1 in the confirmation user interface 641, such as via a tap of contact 603. In response, device 500A transmits (directly or indirectly) an invitation to the device(s) of Jason, as previously described. In some embodiments, if an invitation to access the location of the first findable item (e.g., Mike's Keys) is sent to an additional user (e.g., Jason), then users that the first findable item (e.g., Mike's Keys) is shared with will receive notifications that indicate that the new user (e.g., Jared) has been invited to access the location of the first findable item.

For instance, and as shown in electronic device 500B of FIG. 6J, notification 623 is displayed within the second user's (e.g., Alan) item locating application. Alternatively, and as shown in FIG. 6K, notification 632 is displayed on the lock screen of the second user's (e.g., Alan's) electronic device 500B. Notifications 623 and/or 632 optionally include the name of the newly invited user and/or whether the new user has accepted the invitation to access the location of the first findable item. Notifications 623 and 632 optionally additionally indicate the relevant findable item, the name of the user who shared the findable item with the new user, and/or the distance/time indications.

From FIG. 6K to FIG. 6L, and as shown in electronic device 500B of FIG. 6K, the second user (e.g., Alan) selects notification 632, such as via a tap of contact 603, to cause device 500B to display the second user interface for the first findable item (e.g., Mike's Keys), such as shown in FIG. 6L. In some embodiments, the selection of notification 632 alternatively causes device 500B to display the first user interface of the item locating application. As noted above, the second user interface of a user with which the findable item is shared optionally differs from the corresponding second user interface of a user who owns the findable item. For instance, and as shown in the second user interface of the item locating application of device 500B of FIG. 6L, the second user interface of the first user (e.g., Mike) who owns Mike's Keys differs from the second user interface of the second user (e.g., Alan) with which Mike's Keys is shared. As shown in FIG. 6L, the second user interface of device 500B of the second user includes a selectable option 680 to initiate a process to find the findable item. The second user interface of the second user also includes a selectable option 682 to play sound from the findable item. Furthermore, the second user interface of the second user includes a selectable option 684 that indicates a list of the users with whom the findable item is shared, but does not include a selectable option to add users for additional sharing. It should also be noted, and as shown in the second user interface of item locating application of device 500B of FIG. 6L, that the second user interface of the second user (e.g., Alan) does not include notification options related to the findable item (e.g., options 664 shown by device 500A in FIG. 6L), as a user with which the first findable item (e.g., Mike's Keys) is shared optionally does not receive such notifications for the findable item.

Additionally, in some embodiments, the second user interface of the first user (e.g., Mike) who owns Mike's Keys differs from the second user interface of the second user (e.g., Alan) with which Mike's keys is shared with respect to enabling a lost mode for the findable item. For example, as shown in FIG. 6L, the second user interface of the second user includes a section 686 corresponding to lost mode for the findable item, a selectable option 688 to rename the findable item (e.g., in the item locating application of the second user and/or in the item locating applications of multiple or all users who have access to the findable item), and a selectable option 690 that is selectable to remove the findable item, but does not include a selectable option to enable the lost mode (e.g., similar to selectable option 672 of the second user interface of the first user at electronic device 500A). Alternatively, in some embodiments, the second user interface of the second user (e.g., Alan) does include a selectable option to enable the lost mode for the findable item (e.g., Mike's Keys). For example, as shown in the second user interface of device 500B of FIG. 6M, the second user interface of the second user includes a selectable option 686 corresponding to lost mode for the findable item, a selectable option 688 to enable the lost mode, a selectable option 690 to rename the findable item (e.g., in the item locating application of the second user and/or in the item locating applications of multiple or all users who have access to the findable item), and a selectable option 692 that is selectable to remove the findable item. Device 500A in FIG. 6L is displaying the second user interface for the findable item from an owner's device (e.g., Mike), the details of which were previously described with reference to FIG. 6C.

From FIG. 6L to 6M, device 500A enables lost mode for the findable item in response to detecting that the first user (e.g., Mike) selected selectable option 672, such as via a tap of contact 603, as shown in second user interface of device 500A of FIG. 6L. In some embodiments, enabling lost mode for the first findable item (e.g., Mike's Keys) causes the first findable item (e.g., Mike's Keys) to display lost mode information on one or more electronic devices that are in proximity to the first findable item, such as one or more of information indicating that the first findable item is lost, information indicating a name of the owner of the first findable item, information indicating a phone number for the owner of the first findable item and/or information indicating an email address (and/or other contact information) for the owner of the first findable item (e.g., Mike's Keys), such as described in more detail with reference to method 700. In some embodiments, and when lost mode is enabled, the second user interface of user that have access to the findable item will include a visual indication indicating which user initiated the lost mode. This visual indication optionally includes an indication of how long ago (e.g., Now, 1 min. 5 min, 30 min, 5 hours, or 1 day) lost mode was initiated. For instance, and as shown in the second user interface of device 500A of FIG. 6M, the second user interface of the first user (e.g., Mike) includes a visual indication in option 672 that lost mode was enabled 1 min ago by you. Similarly, and as shown in the second user interface of device 500B of FIG. 6M, the second user interface of the second user (e.g., Alan) includes a visual indication in option 688 that lost mode was enabled 1 min ago by Mike.

In some embodiments, the owner of the first findable item (e.g., the first user and/or Mike of Mike's Keys) is able to revoke the second user's (or other shared user's such as Alan, Jason, and/or Jared) access to the location of the first findable item (e.g., Mike's Keys). In some embodiments, this revoking of the access of selected users occurs while maintaining the access of one or more other users with whom the location of the first finable item has been shared. Alternatively, the owner of the first findable item (e.g., Mike) is able to revoke the access of all users with whom the location of the first findable item (e.g., Mike's Keys) has been shared. For instance, and as shown in the second user interface of device 500A of FIG. 6N, the second user interface of the first user (e.g. Mike) includes a selectable option 694 to stop sharing the first findable item (e.g., Mike's Keys) with everyone.

From FIG. 6N to FIG. 6O, device 500A detects that the first user (e.g., Mike) has selected the selectable option 694 such as via a tap of contact 603. In response, and as shown in the user interfaces of device 500B and device 500C of FIG. 6O, the findable item (e.g., Mike's Keys) is no longer present within the item locating application and/or on the map of both the second user (e.g., Alan) and the third user (e.g., Jared), respectively. In embodiments, when the first user (e.g., Mike) stops sharing the first findable item (e.g., Mike's Keys) with one or more users, the one or more users receive notifications that the first user (e.g., Mike) has removed them from the findable item (e.g., Mike's Keys), such as notifications 692 and 698 displayed by devices 500B and 500C, respectively. Notifications 692 and 698 optionally include who removed access, what time the access was removed, the location of the findable item that is still accessible to the one or more users, and/or the users the location is still accessible to.

Alternatively, and as noted previously, a user with which the item is shared is able to remove a findable item from their item locating application. It should be noted that this action optionally only removes the findable item from the user's item locating application and the findable item and corresponding location/information optionally remains accessible to one or more (or optionally all) other users with which the item is shared and/or the owner of the first findable item. For instance, from FIG. 6P to 6Q, and as shown in the second user interface of device 500B of FIG. 6P, device 500B detects that the second user (e.g., Alan) selects a selectable option 692 to remove the first findable item (e.g., Mike's Keys) from the second user's (e.g., Alan) item locating application, such as via a tap of contact 603.

In response, FIG. 6Q illustrates the states of both the item locating application of the second user (e.g., Alan) and the third user (e.g., Jared) following the second user's (e.g., Alan) removal of the findable item (e.g., Mike's Keys). As shown in the user interface of device 500C of FIG. 6Q, the first findable item (e.g., Mike's Keys) remains shown in the user interface as representation 694-4. However, and as shown in the user interface of device 500B of FIG. 6Q, the first findable item (e.g., Mike's Keys) is no longer displayed within the second user's (Alan) item locating application. Furthermore, and as shown in the user interface of device 500C of FIG. 6Q, representation 694-4 indicates that the first findable item (e.g., Mike's Keys) is shared with Jason and you (Jared), but no longer with Alan.

In some embodiments, multiple invitations are transmitted by users of additional electronic devices to enable the a given user to gain access to locations of multiple findable items. These invitations are optionally displayed within the second user's item locating application. For instance, and as shown in FIG. 6R, the second user (e.g., Alan) receives an invitation from Alex to share Alex's Keys along with an invitation from Cara to share Cara's Keys. In response, both invitations are displayed by device 500B as representation 634-7 and representation 634-8, respectively, along with user selectable options to accept or deny the corresponding invitations.

As mentioned above with reference to FIGS. 6L-6M, the lost mode for the first findable item (e.g., Mike's Keys) has been enabled by the first user (e.g., Mike) at the electronic device 500A. For example, as indicated in indication 606-1 at the electronic device 500A and indication 634-5 at the electronic device 500B in FIG. 6S, a current location of the first findable item (e.g., Mike's Keys) is unknown (e.g., "No location found"). In some embodiments, while the lost mode is enabled for the first findable item (e.g., Mike's Keys), only the owner of the first findable item (e.g., Mike) receives alerts corresponding to a status of the location of the first findable item. For example, as shown in FIG. 6S, the electronic device 500A receives an indication that Mike's Keys have been located and/or retrieved by another user, and displays notification 693 alerting the first user (e.g., Mike) that their keys have been found. However, as shown in FIG. 6S, the indication is only transmitted to the electronic device 500A of the owner of Mike's Keys (e.g., Mike), and is thus optionally not transmitted to the electronic device 500B even though the second user (e.g., Alan) has access to the location of Mike's Keys. Accordingly, in some embodiments, the electronic device 500B does not display a notification alerting the second user that Mike's Keys have been found, as shown in FIG. 6S.

Figure 7A:
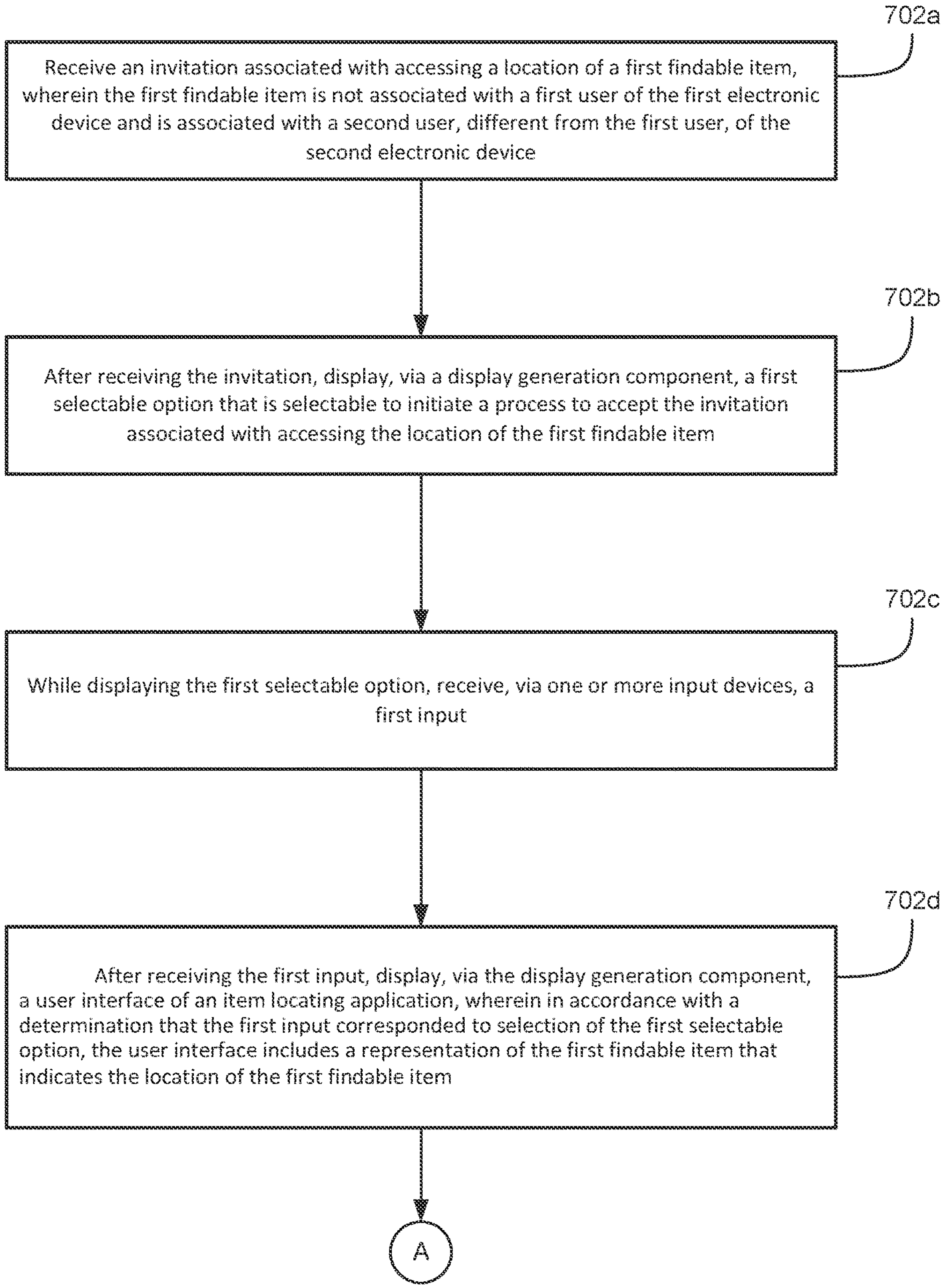
FIGS. 7A-7O are flow diagrams illustrating a method of transmitting and receiving invitations associated with accessing locations of findable items, in accordance with some embodiments of the disclosure.
Figure 7B:
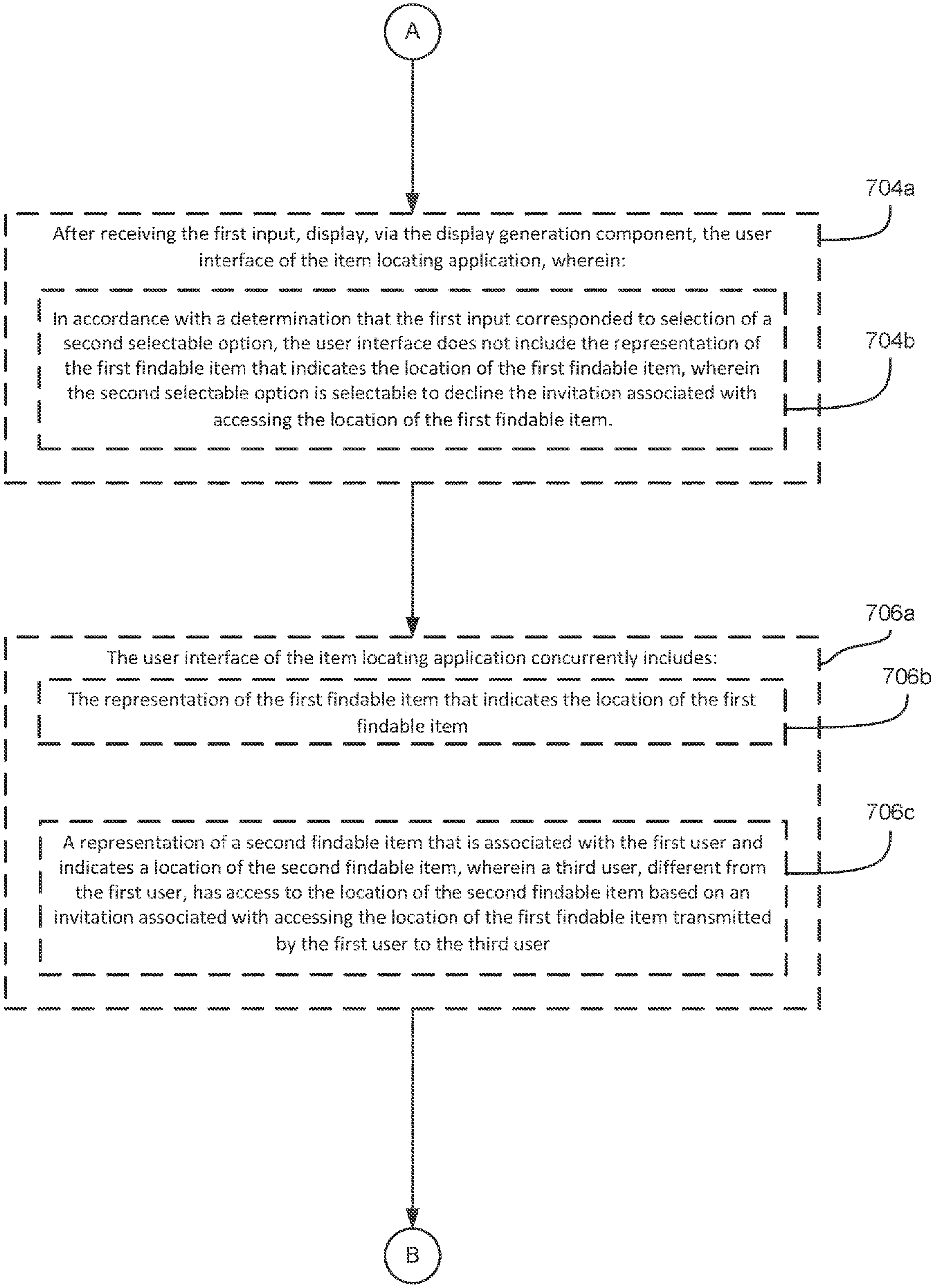
Figure 7C:
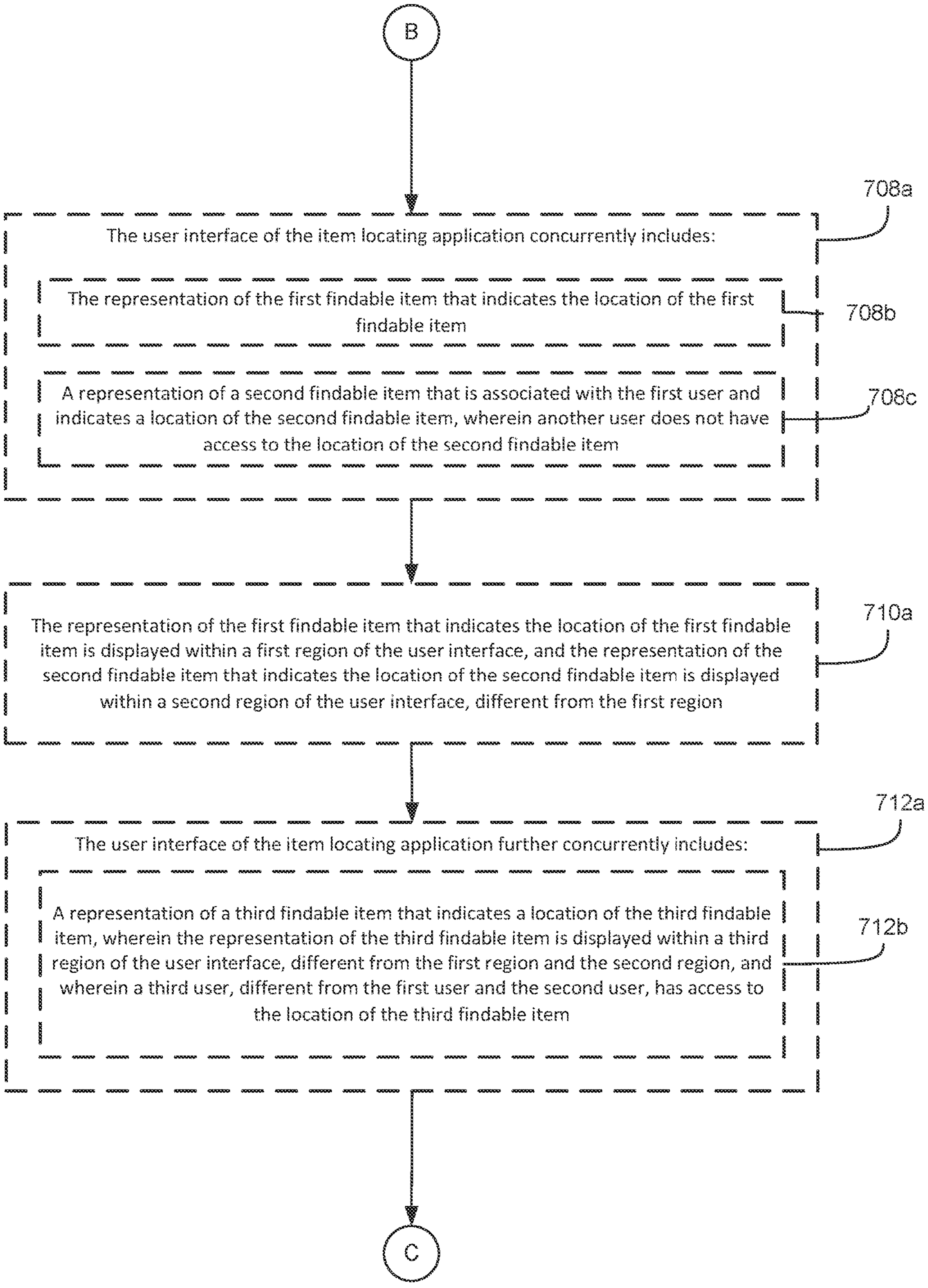
Figure 7D:
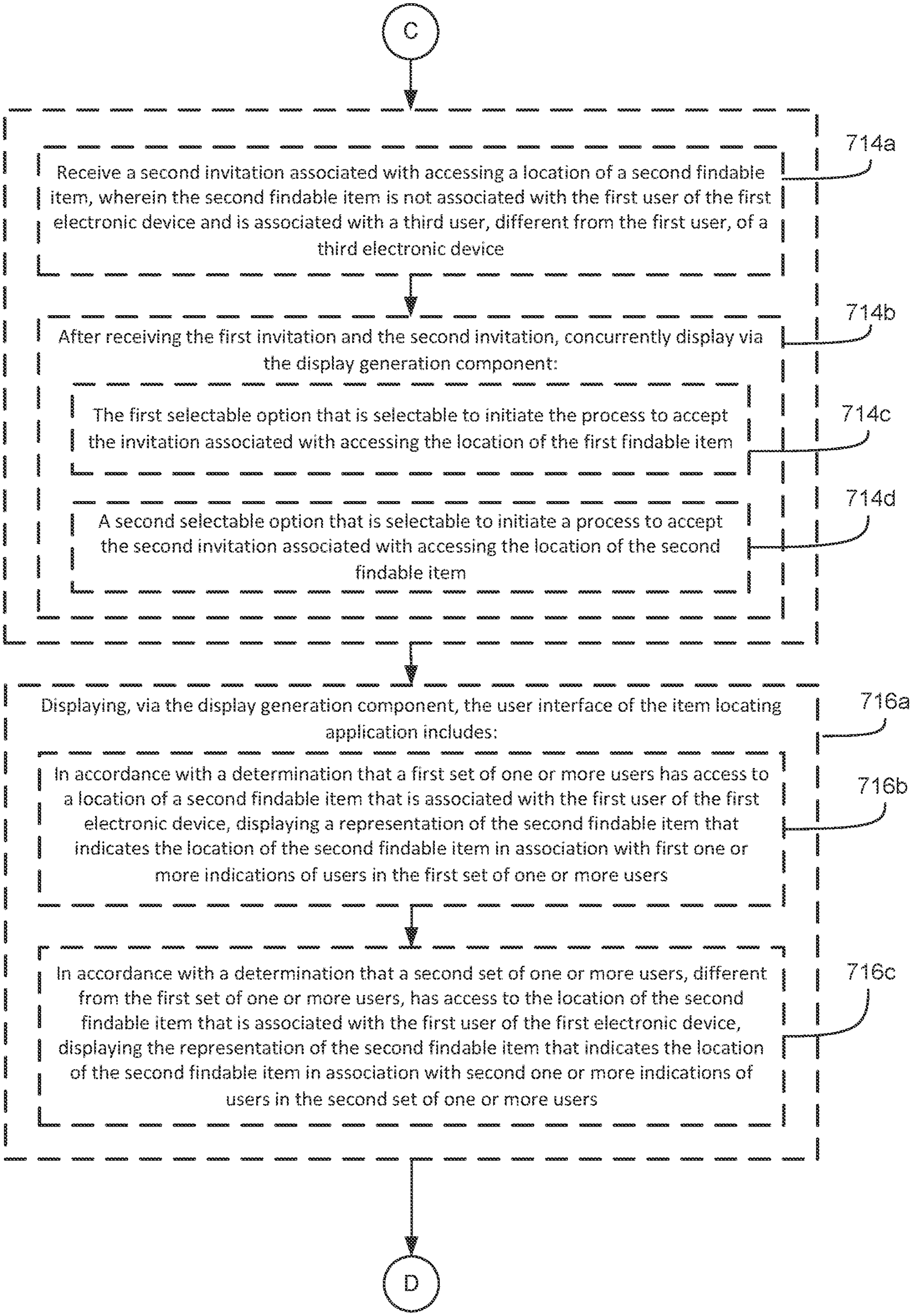
Figure 7E:
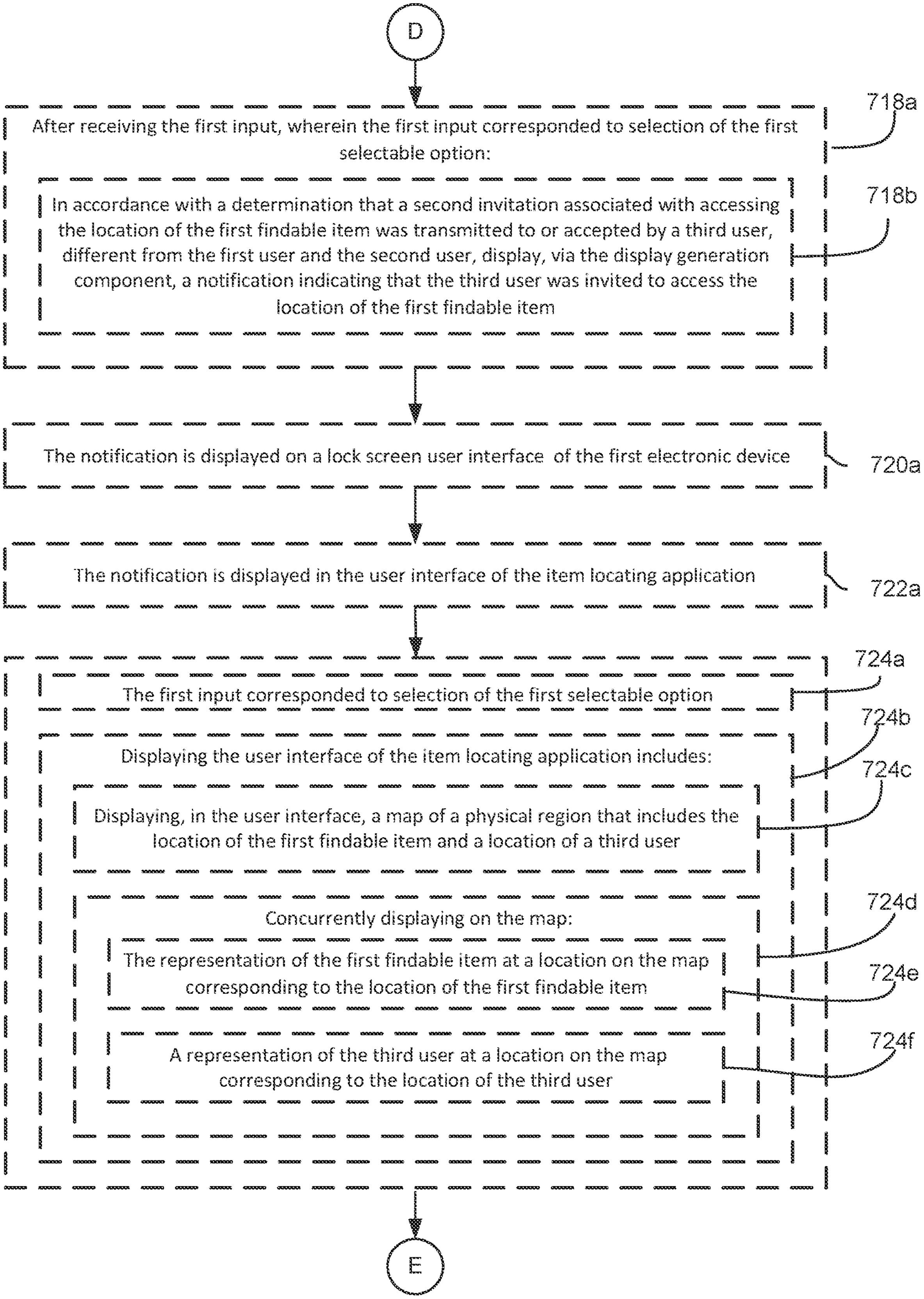
Figure 7F:
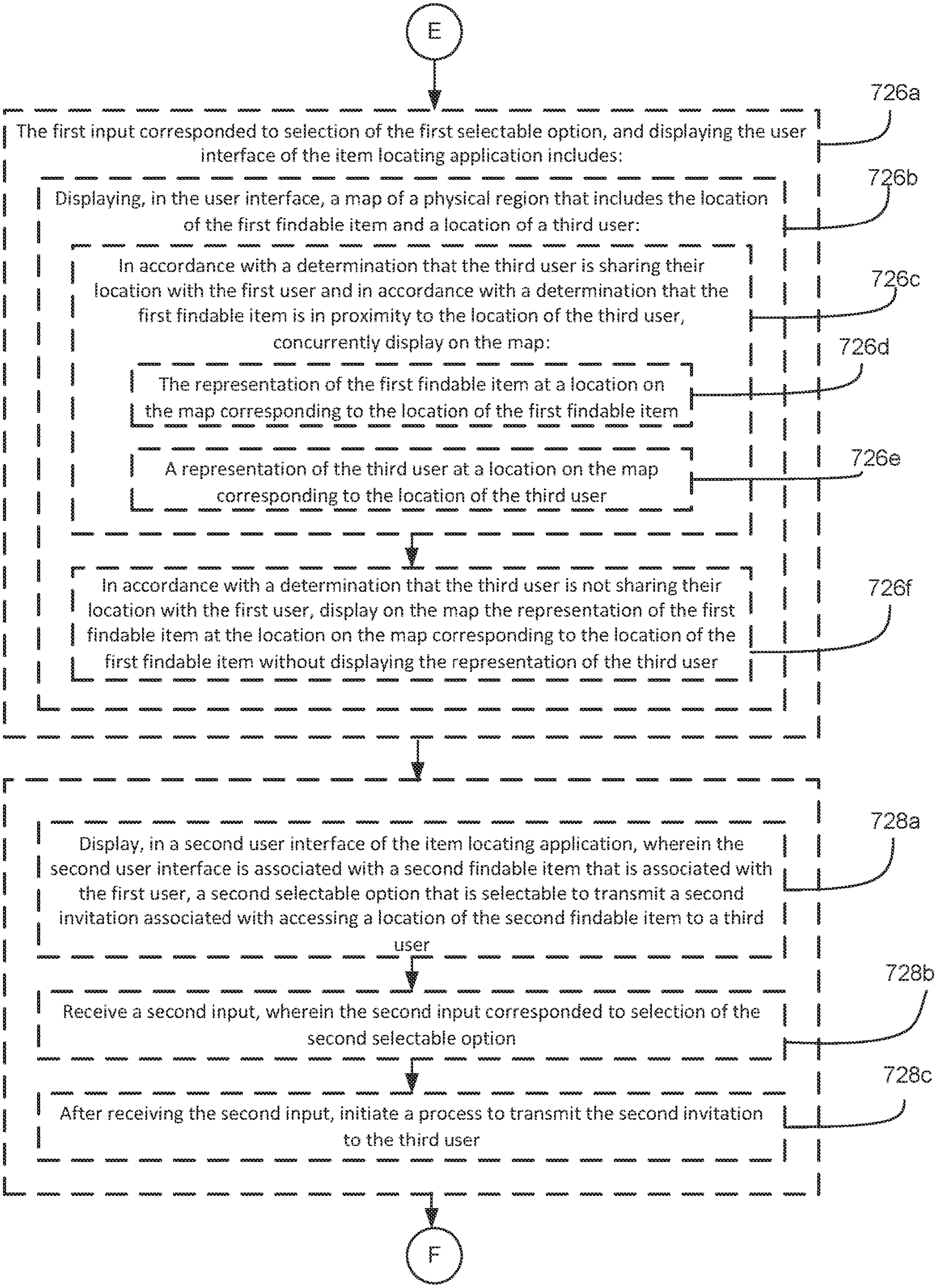
Figure 7G:
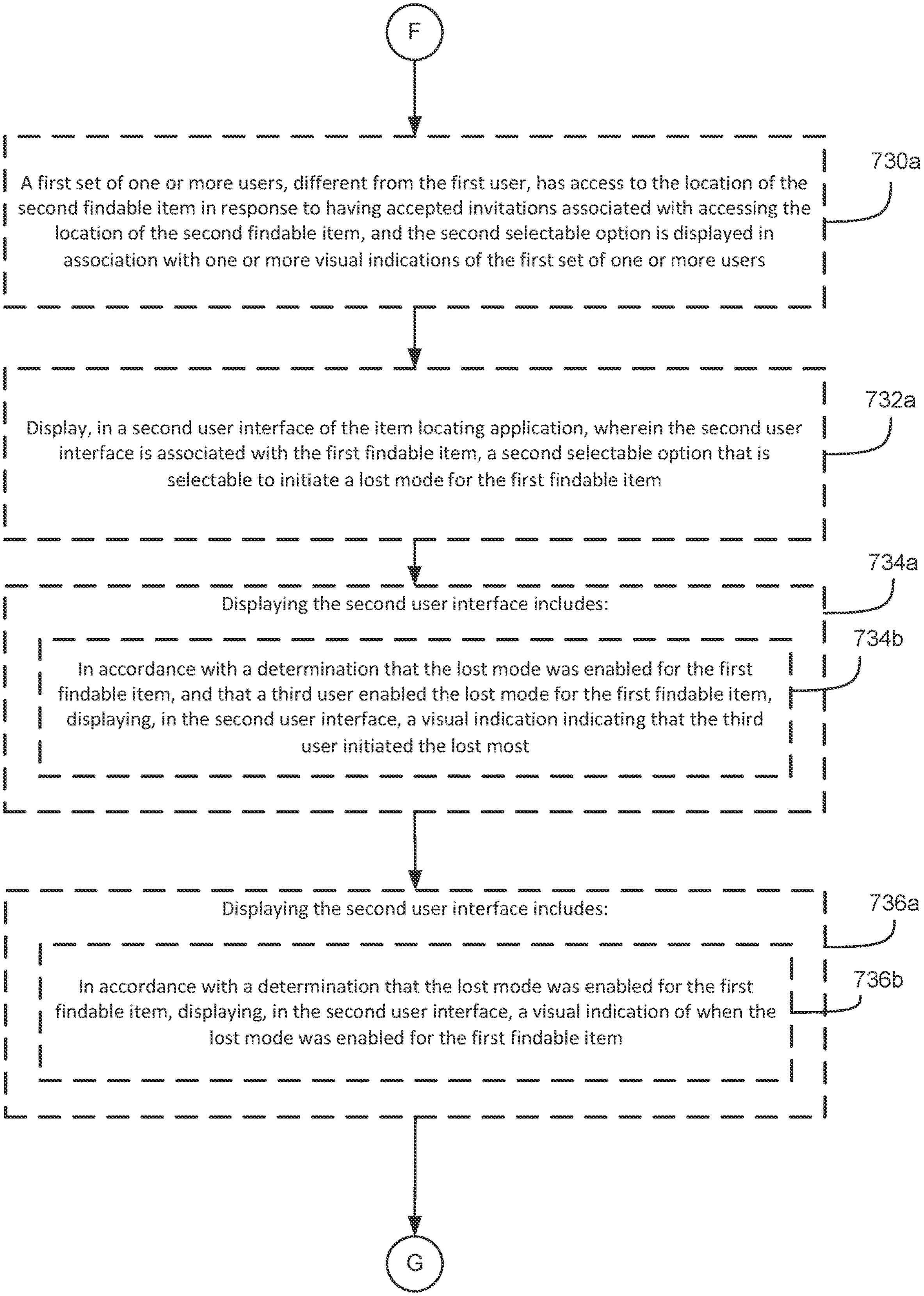
Figure 7H:
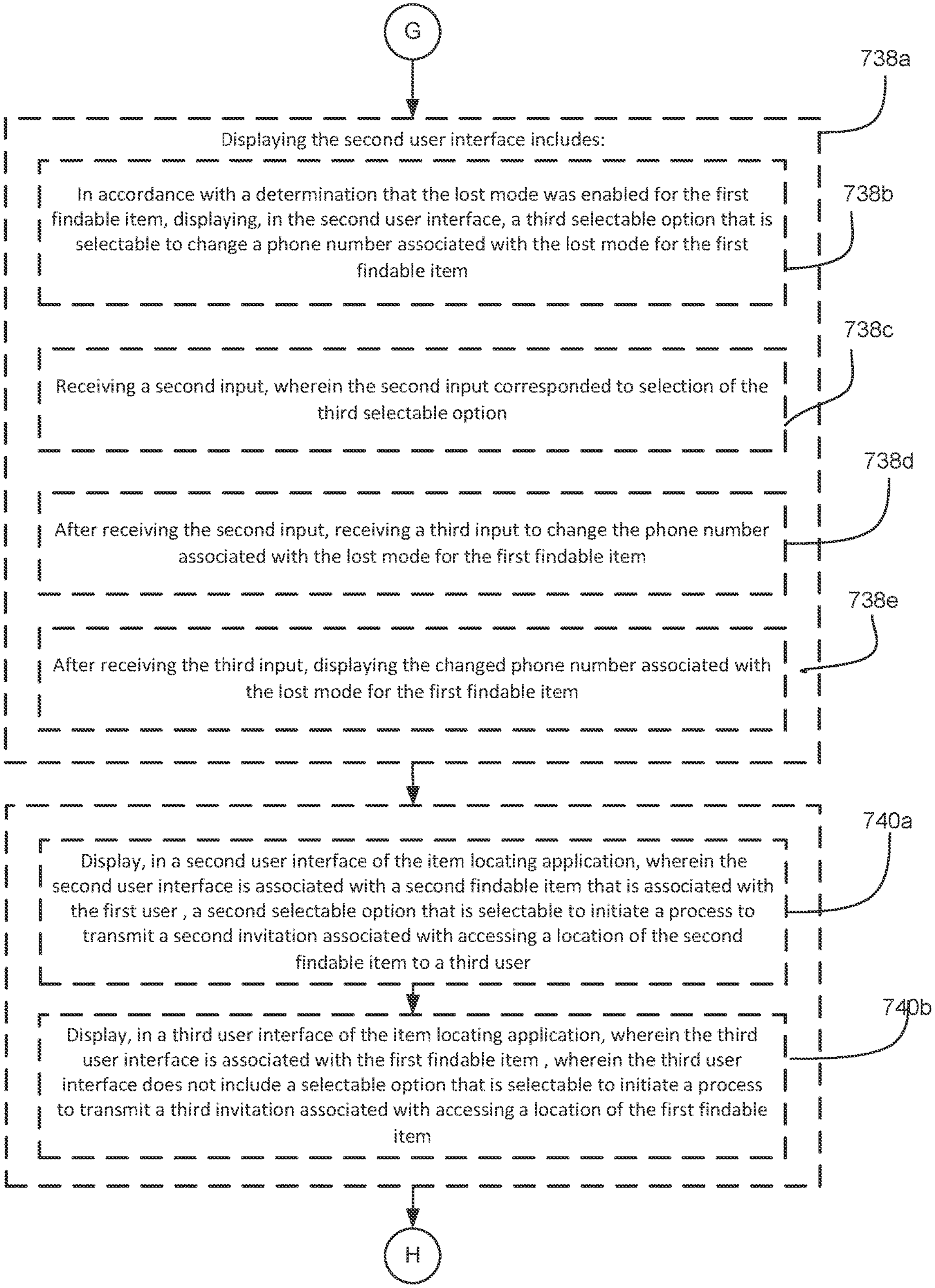
Figure 7I:
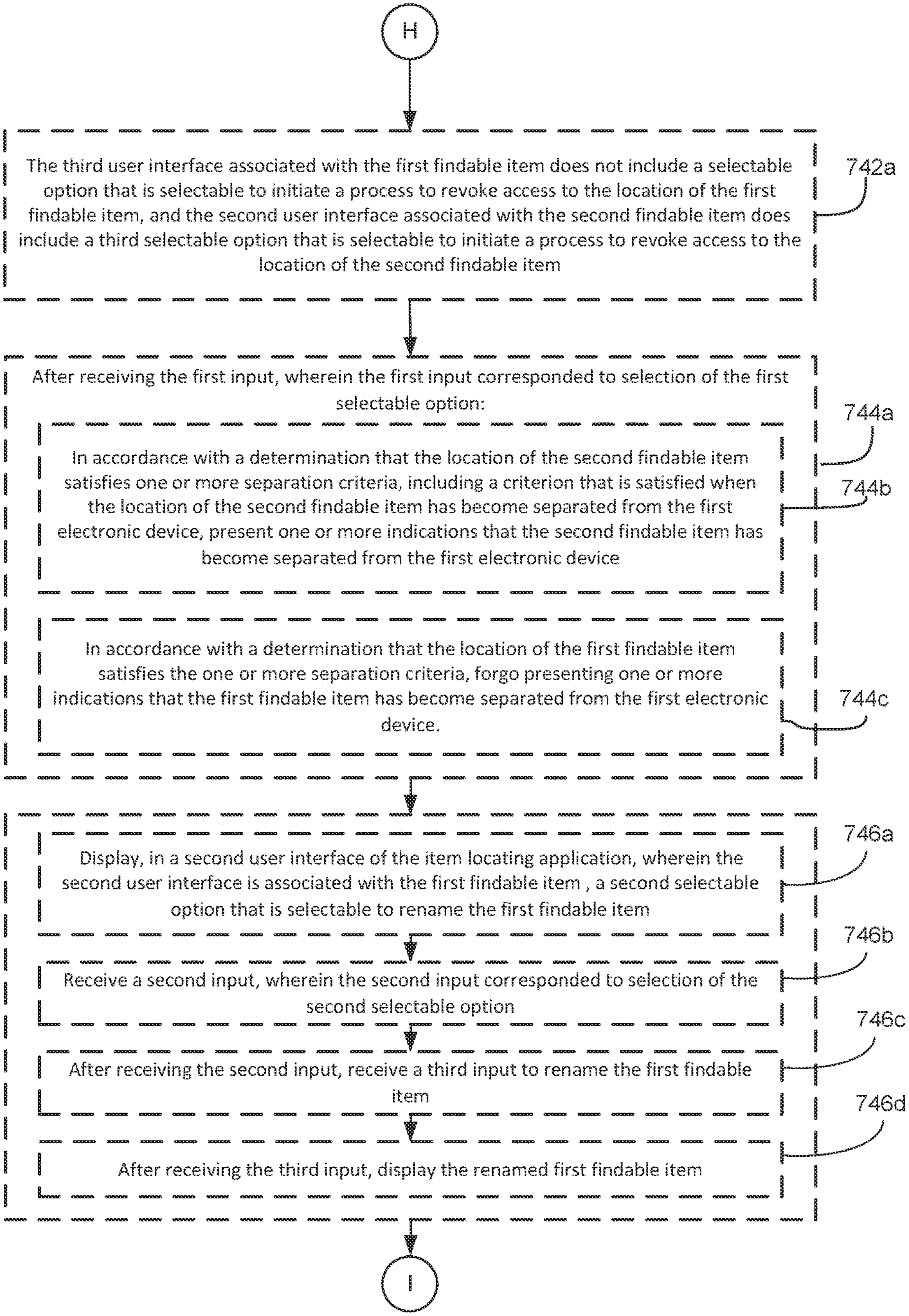
Figure 7J:
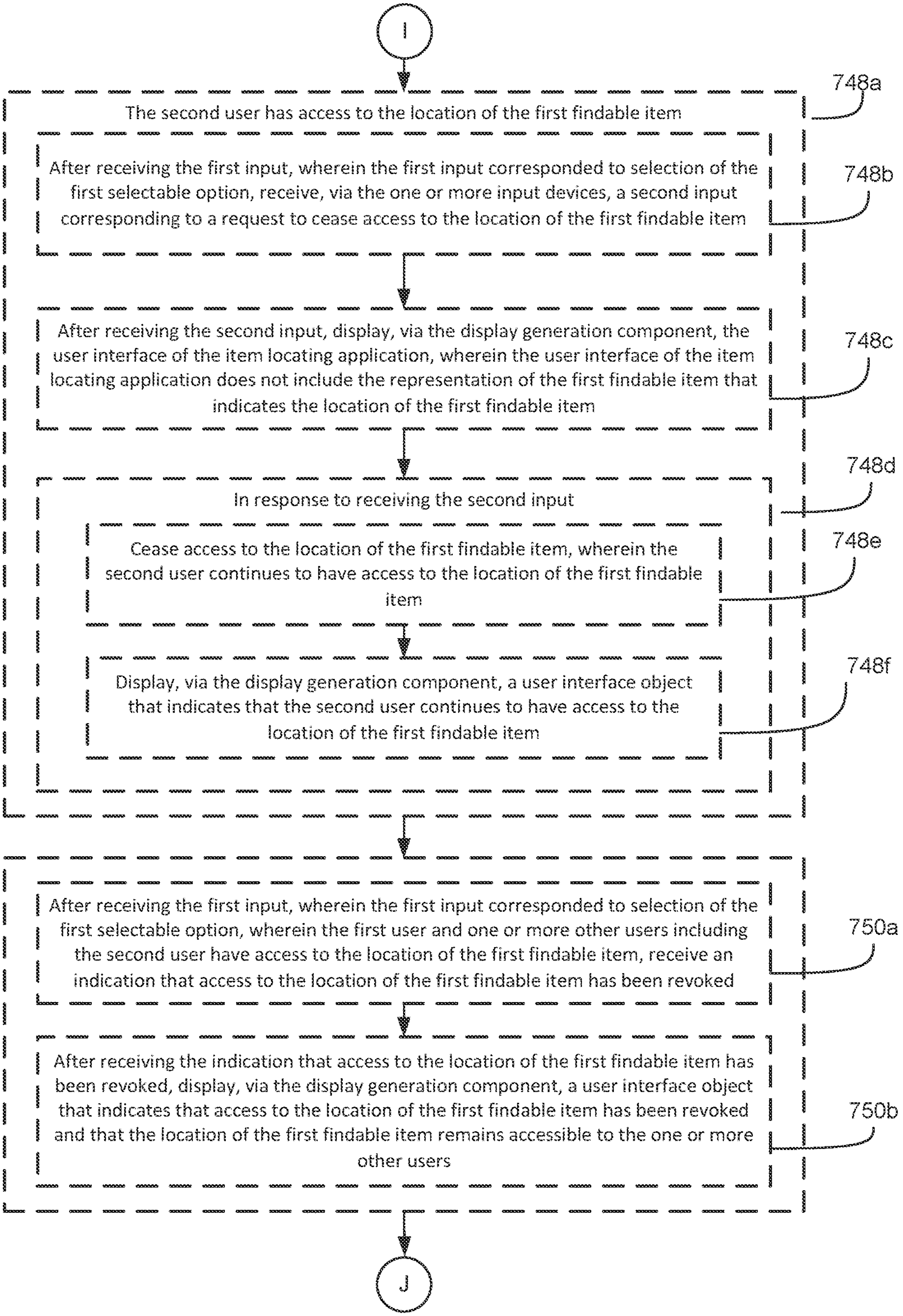
Figure 7K:
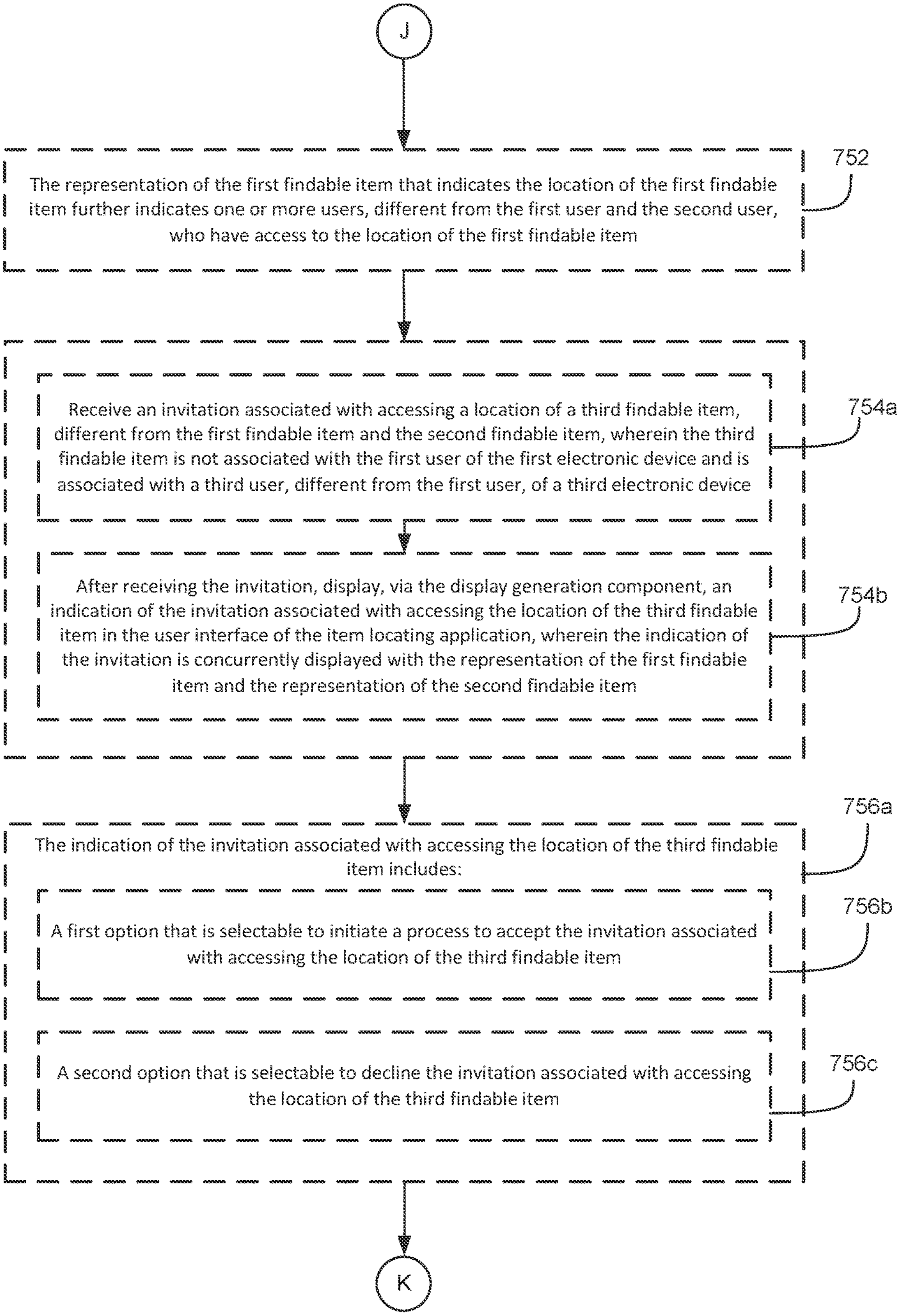
Figure 7L:
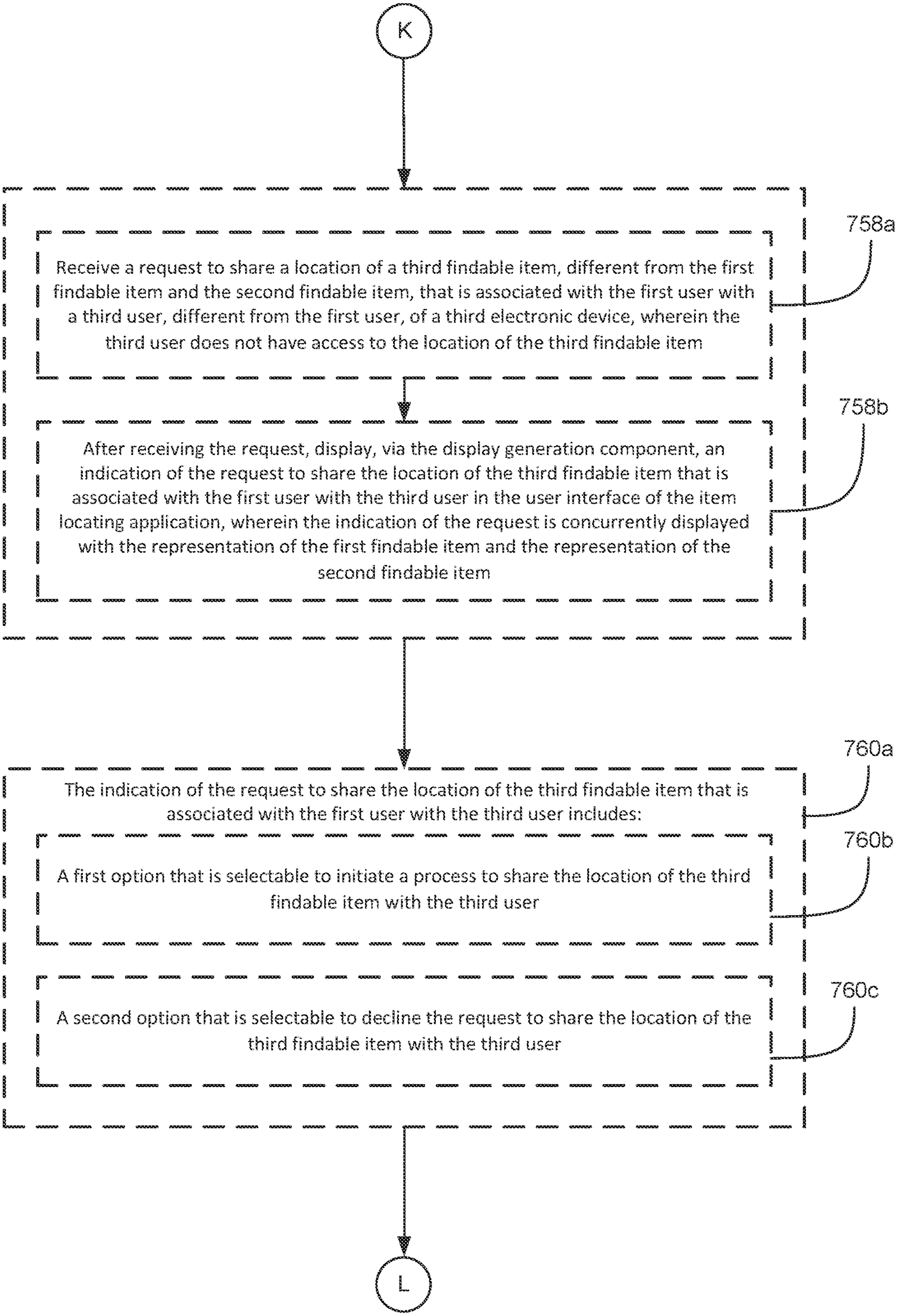
Figure 7N:
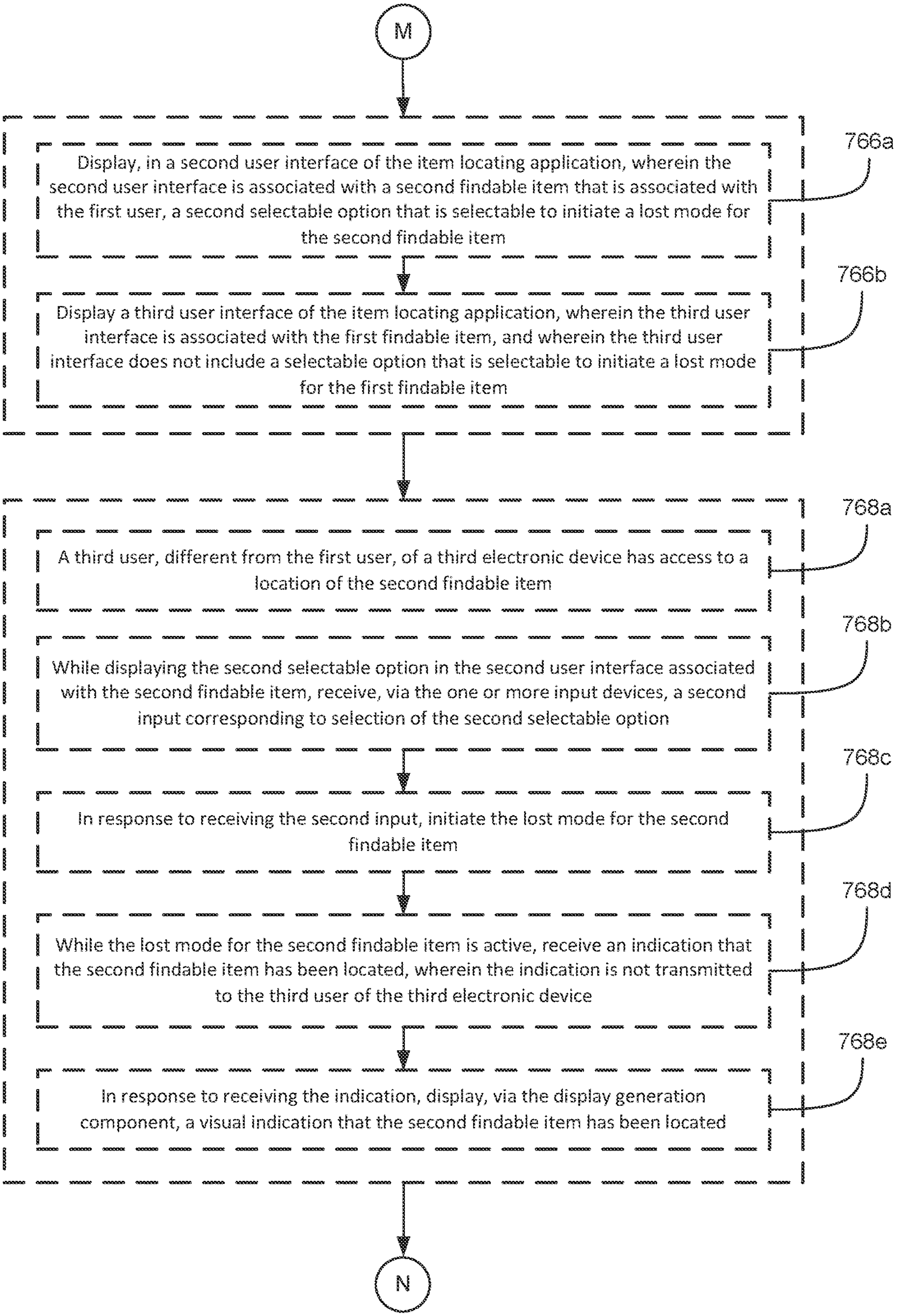

FIGS. 7A-70 are flow diagrams illustrating a method 700 of transmitting and/or receiving an invitation associated with accessing the location of a findable item, in accordance with some embodiments, such as in FIGS. 6A-6Q. The method 700 is optionally performed at an electronic device such as device 100, device 300, device 500 as described above with reference to FIGS. 1A-1B, 2-3, 4A-4B and 5A-5H. Some operations in method 700 are, optionally combined and/or the order of some operations is, optionally, changed.

In some embodiments, method 700 is performed at a first electronic device (e.g., 500B) in communication with a second electronic device (e.g., 500A), a display generation component, and one or more input devices. For example, a mobile device (e.g., a tablet, a smartphone, a media player, or a wearable device) including wireless communication circuitry, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external)). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users.

In some embodiments, the electronic device (e.g., 500B) receives (702*a*) an invitation associated with accessing a location of a first findable item (e.g., Mike's Keys), such as corresponding to invitation 634-7 shown in FIG. 6E (e.g., the invitation is optionally transmitted by a second user of a second electronic device to enable a first user of the first electronic device to gain access to a location of the first findable item (e.g., a physical item that the second user has ownership thereof). In some embodiments, the location is a physical location of the findable item within a physical environment.). In some embodiments, the first findable item (e.g., Mike's Keys) is not associated with a first user (e.g., Alan) of the first electronic device (e.g., 500B) and is associated with a second user (e.g., Mike), different from the first user (e.g., Mike), of the second electronic device (e.g., 500A). For example, the first findable item is associated with a user account of the second user, and is not associated with a user account of the first user. In some embodiments, the second user (optionally from the second electronic device) is able to track the location of the first findable item, and the second electronic device displays the location of the first findable item on a map. In some embodiments, the first findable item is a dedicated remote locator object that is able to be attached to a physical item to track the location of the physical item. In some embodiments, a respective remote locator object is a device with a battery, one or more wireless antenna and a processor that enables the device to function as a remote locator object when associated with another physical object associated with the user other than the user of the electronic device (e.g., wallet, purse, backpack, suitcase, car, or a set of keys). In some embodiments, the first findable item is configured to transmit location data of the first findable item to the electronic device (e.g., wirelessly, such as over Bluetooth, RF, IR, NFC, and/or Wi-Fi). In some embodiments, the first findable item is associated with a name or label that is identifiable on an electronic device (e.g., the electronic device and/or a second electronic device of the user associated with (e.g., owning) the first findable item). In some embodiments, the first findable item is a device that has remote locator object functionalities built-in in addition to non-location tracking functionalities, such as headphones, a bicycle, a watch and/or a tablet.

In some embodiments, after receiving the invitation, the electronic device (e.g., 500B) displays (702*b*) a first selectable option (e.g., Accept in FIG. 6E) that is selectable to initiate a process to accept the invitation associated with accessing the location of the first findable item (e.g., Mike's Keys), such as shown in invitation 634-7 in FIG. 6E. In some embodiments, and following the receiving of the invitation and/or in response to the receiving of the invitation, the display generation component displays a first selectable option to the first user, such as within a user interface element (e.g., a notification displayed on a lock screen user interface, a wake screen user interface, or a home screen user interface such as described with reference to FIG. 4A). In some embodiments, the first selectable option is selectable by the first user to initiate a process to accept the invitation to gain access to the location of the first findable item. In some embodiments, the invitation includes an indication of the first findable item (e.g., the name of the item and/or an image or graphical representation of the item) along with one or more user selectable buttons to accept or ignore the notification. In some embodiments, the indication may be an image of the first findable item, a text description of the first findable item, or both.

In some embodiments, while displaying the first selectable option (e.g., Accept in FIG. 6E), the electronic device (e.g., 500B) receives (702*c*) a first input (e.g., 603 in FIG. 6E) via the one or more input devices (e.g., 500B). In some embodiments, the first input includes a click, push, press, swipe, or the like detected, for example, via a touch-sensitive surface, a stylus, a keyboard or a mouse.

In some embodiments, after receiving the first input, the electronic device displays (702*d*), via the display generation component, a user interface of an item locating application, such as the user interface displayed by device 500B in FIG. 6F. In some embodiments, and following the receiving of the first input and/or in response to the receiving of the first input, the display generation component displays a user interface of an item locating application. In some embodiments, the item locating application is an application that displays one or more representations of one or more findable items and/or users along with indications of the locations of the one or more findable items and/or users. In some embodiments, the user opens the item locating application to view one or more items, such as the findable item, that the user owns or has gained access to via invitation. In some embodiments, the user selects one or more of the items to locate, and in response, the item locating application optionally displays to the user an indication of the location of the selected one or more items (e.g., on a map).

In some embodiments, in accordance with a determination that the first input (e.g., 603 in FIG. 6E) corresponded to selection of the first selectable option, the user interface includes (702*d*) a representation (e.g., 634-5) of the first findable item (e.g., Mike's Keys) that indicates the location of the first findable item, such as shown in the user interface displayed by device 500B in FIG. 6F. In some embodiments, if the first input included selection of the first selectable option, the location of the first findable item optionally becomes trackable via the item locating application, and the user interface of the item locating application optionally includes a representation of the first findable item along with an indication of the location of the first findable item. The location is optionally indicated on a virtual map, on a list, within an alternative user interface, or the like. For example, the location of the first findable item is optionally indicated by a representation of the first findable item (e.g., an image of the first findable item or a cartoon representation of the first findable item) displayed at a location on a map corresponding to the location of the first findable item. In some embodiments, the location of the first findable item is optionally indicated by a representation of the first findable item in a list of findable items, the first findable item shown next to a text description of a location of the findable item and/or a distance of the findable item from the first electronic device. In some embodiments, this list view displays a single item or multiple items. Inviting the first user to gain access to a location of a first findable item within an item locating application allows the first user to efficiently track the location of the first findable item even though it is associated with the second user.

In some embodiments, after receiving the first input, the electronic device (e.g., 500B) displays (704*a*) the user interface (e.g., 606 on device 500B in FIG. 6F) of the item locating application via the display generation component.

In some embodiments, in accordance with a determination that the first input corresponded to selection of a second selectable option (e.g., Ignore in FIG. 6E), the user interface does not include the representation of the first findable item that indicates the location of the first findable item, wherein the second selectable option is selectable to decline the invitation associated with accessing the location of the first findable item (704*b*). For instance, if the first user (e.g., Alan) selected the second selectable option (e.g., Ignore in FIG. 6E), the representation of the first findable item (e.g., Mike's Keys) would not be present within the user interface of the item locating application displayed on device 500B in FIG. 6F. In some embodiments, if the first input included selection of the second selectable option, the first findable item is not added to the item locating application and the location of the first findable item is not trackable via the item locating application. Declining access to a location of the first findable item within the item locating application allows for the first user to have control over which findable items to which the first user gains access, and improves privacy for the first user.

In some embodiments, the user interface of the item locating application includes (706*a*) the representation of the first findable item (e.g., Mike's Keys) that indicates the location of the first findable item (706*b*), such as shown in device 500B in FIG. 6F. In some embodiments, the user interface of the item locating application includes a list of findable items the locations to which the first user has access, including the first findable item.

In some embodiments, the user interface (e.g., 606) further includes (706*c*) a representation of a second findable item (e.g., Your Keys) that is associated with the first user and indicates a location of the second findable item, wherein a third user (e.g., Erica), different from the first user, has access to the location of the second findable item (e.g., Your Keys) based on an invitation associated with accessing the location of the second findable item (e.g., Your Keys) transmitted by the first user (e.g., Alan) to the third user (e.g., Erica), such as shown in device 500B in FIG. 6F. In some embodiments, the user interface of the item locating application includes a representation of a second findable item (associated with and/or owned by the first user) along with an indication of the location of the second findable item. In some embodiments, the location is indicated within the user interface as discussed previously. In some embodiments, the second findable item was shared by the first user with a third user such that the third user has access to the location of the second findable item. However, the second findable item is optionally not an item owned by a different user and shared with the first user. If other items are shared with the first user, the user interface optionally also includes representations of those other items. Displaying items shared by the user within the same user interface as items shared with the user reduces the number of inputs needed for the first user to view the location of all items to which the user has access.

In some embodiments, the user interface of the item locating application includes (708*a*) the representation of the first findable item (e.g., Mike's Keys) that indicates the location of the first findable item (708*b*), such as shown in device 500B in FIG. 6F. In some embodiments, and as noted above, the user interface of the item locating application includes a list of findable items, the locations to which the first user has access, including the first findable item. In some embodiments, the user interface (e.g., 606) further includes a representation of a second findable item (e.g., Backpack) that is associated with the first user and indicates a location of the second findable item (e.g., Backpack), wherein another user does not have access to the location of the second findable item (708*c*), such as shown in device 500B in FIG. 6F where Backpack is not shared with other users. In some embodiments, the user interface of the item locating application includes a representation of a second findable item (associated with and/or owned by the first user) along with an indication of the location of the second findable item. In some embodiments, the location is indicated within the user interface as discussed previously. In some embodiments, the second findable item is not shared by the first user with any other users. If the first user is associated with other items that are not shared with other users, the user interface optionally also includes representations of those other items. Displaying items shared by the user within the same user interface as items owned by the user and not shared with other users reduces the number of inputs needed for the user to view the location of all items to which the user has access.

In some embodiments, the representation of the first findable item (e.g., Mike's Keys) that indicates the location of the first findable item is displayed within a first region of the user interface, such as in the "Items Shared With Me" section of the user interface of device 500B in FIG. 6F, and the representation of the second findable item (e.g., Backpack) that indicates the location of the second findable item is displayed within a second region of the user interface, different from (e.g., and visually distinguished from) the first region (710*a*), such as shown in the "Note Shared Items" section of the user interface of device 500B in FIG. 6F. In some embodiments, the user interface of the item locating application displays the representations of findable items to which the user has access (e.g., via invitations from other users) together in a grouped fashion in a first region of the user interface. For instance, the representations of findable items that have been shared with the user (and their corresponding locations) are optionally displayed within a first region of the user interface, whereas the representations of findable items that are owned by and/or shared by the user (and their corresponding location) are optionally displayed within a second, different, region of the user interface Additionally, the representations of findable items that are owned by the user and have not been shared with anyone (and their corresponding locations) are optionally displayed within a third, different, region of the user interface. Displaying the findable items shared with the user within a different region of the user interface from findable items owned by and/or shared by the first user reduces the number of inputs needed for the user to view different types of items within the user interface, and also clearly conveys the shared and/or sharing status of a given item in the user interface.

In some embodiments, the user interface of the item locating application further concurrently includes (712*a*) a representation of a third findable item (e.g., Your Keys) that indicates a location of the third findable item, wherein the representation of the third findable item is displayed within a third region of the user interface, different from the first region and the second region (e.g., and visually distinguished from), such as in the "My Shared Items" section of the user interface of device 500B in FIG. 6F, and wherein a third user (e.g., Erica), different from the first user (e.g., Alan) and the second user (e.g., Mike), has access to the location of the third findable item (e.g., Your Keys), as shown in the user interface of device 500B in FIG. 6F (712*b*). In some embodiments, the user interface of the item locating application displays the representations of findable items (and their corresponding locations) that are owned by a third user in a third region of the user interface. For instance, if the first user has access to a first findable items that is associated with a second user and a third findable item that is associated with a third user, the first findable item and the third findable item are optionally displayed in separate regions. Furthermore, and as noted above, a findable item (or, optionally, any findable item) that is owned by the first user is optionally displayed in a separate region from both the first findable item and the third findable item. Displaying the findable items shared with the first user and owned by different users in different sections reduces the number of inputs needed for the user to easily view the owners of the corresponding findable items.

In some embodiments, the representation of the first findable item that indicates the location of the first findable item further indicates one or more users, different from the first user and the second user, who have access to the location of the first findable item (752), such as indication of a number of users having access to a location of findable item "Erica's Keys" as shown in indication 634-4 in FIG. 6B. For example, the representation of the first findable item includes information identifying the one or more users and/or a characteristic of the one or more users. In some embodiments, the information includes names of the one or more users (e.g., "shared with John") and/or a number of the one or more users who have access to the location of the third findable item (e.g., "shared with 3 others"). In some embodiments, because the second findable item is not shared with another user (e.g., other users do not have access to the location of the second findable item), the first electronic device forgoes displaying the representation of the second findable item with information indicating one or more users who have access to the location of the second findable item. Displaying the findable items shared with the first user with information indicating other users who also have access to the locations of the findable items facilitates discovery as to who has access to the locations of the findable items and/or reduces the number of inputs needed for the user to easily view who has access to the locations of the findable items, thereby improving user-device interaction and user privacy.

In some embodiments, the first electronic device receives (754*a*) an invitation associated with accessing a location of a third findable item, different from the first findable item and the second findable item (e.g., the invitation is optionally transmitted by a third user of a third electronic device to enable the first user of the first electronic device to gain access to a location of the third findable item (e.g., a physical item that the third user has ownership thereof), as similarly described above with reference to step(s) 702. In some embodiments, the location is a physical location of the third findable item within a physical environment.), such as an invitation from "Mike" to share findable item "Mike's Keys" as shown in FIG. 6E, wherein the third findable item is not associated with the first user of the first electronic device and is associated with a third user, different from the first user, of a third electronic device.

In some embodiments, after receiving the invitation (and optionally before receiving input responding to the invitation at the first electronic device and while the invitation remains outstanding), the first electronic device displays (754*b*), via the display generation component, an indication of the invitation (e.g., indication 634-7 as shown in FIG. 6E) associated with accessing the location of the third findable item in the user interface of the item locating application, wherein the indication of the invitation is concurrently displayed with the representation of the first findable item and the representation of the second findable item, such as indications 634-1 and 634-4 in FIG. 6E. For example, following the receiving of the invitation and/or in response to the receiving of the invitation, the first electronic device displays a user interface element (e.g., a notification displayed on a lock screen user interface, a wake screen user interface, or a home screen user interface such as described with reference to FIG. 4A). In some embodiments, after receiving the invitation, the first electronic device receives an input corresponding to a request to display the user interface of the item locating application described above with reference to step(s) 702. For example, the first electronic device detects a selection input (e.g., having one or more characteristics of inputs described above with reference to step(s) 702) directed to the user interface element (e.g., the notification) discussed above. In some embodiments, the indication of the invitation is displayed concurrently with the representation of the first findable item and the representation of the second findable item in the user interface of the item locating application. For example, the indication of the invitation is displayed at a prioritized position (e.g., at a top of) in the first region discussed above with reference to step(s) 710, such as a top of a list of the findable items that have been shared with the first user (e.g., the findable items to which the user has been granted access to location information of the findable items). In some embodiments, the invitation includes an indication of the third findable item (e.g., the name of the item and/or an image or graphical representation of the item) along with one or more user selectable buttons to accept or decline sharing of the location of third findable item with the first user. In some embodiments, the indication of the third findable item is an image of the third findable item, a text description of the third findable item, or both. Displaying an invitation to access a location of a findable item in a user interface of an item locating application that includes representations of findable items shared with the first user and/or owned by the first user facilitates discovery that the first user has a pending invitation and/or reduces the number of inputs needed for the user to easily view and/or interact with the pending invitation, thereby improving user-device interaction.

In some embodiments, the indication of the invitation associated with accessing the location of the third findable item includes (756*a*) a first option (e.g., "Accept" option in FIG. 6E) that is selectable to initiate a process to accept the invitation associated with accessing the location of the third findable item (756*b*) (e.g., as similarly described above with reference to step(s) 702). For example, if the first electronic device detects a selection of the first option in the indication, the location of the third findable item becomes trackable via the item locating application, and the user interface of the item locating application includes a representation of the third findable item along with an indication of the location of the third findable item. The location is optionally indicated on a virtual map, on a list, within an alternative user interface, or the like. For example, the location of the third findable item is indicated by a representation of the third findable item (e.g., an image of the third findable item or a cartoon representation of the third findable item) displayed at a location on a map corresponding to the location of the first findable item. In some embodiments, the location of the third findable item is indicated by a representation of the third findable item in the list of findable items (e.g., including the first findable item), the third findable item shown next to a text description of a location of the findable item and/or a distance of the findable item from the first electronic device.

In some embodiments, the indication of the invitation associated with accessing the location of the third findable item includes a second option (e.g., "Ignore" option in FIG. 6E) that is selectable to decline the invitation associated with accessing the location of the third findable item (756*c*) (e.g., as similarly described above with reference to step(s) 704). For example, the second option is selectable to forgo accessing the location of the third findable item (e.g., via the user interface of the item locating application). In some embodiments, selecting the second option causes the first electronic device to cease displaying the indication of the invitation via the display generation component. For example, the first electronic device ceases displaying the indication of the invitation in the user interface of the item locating application, the home screen user interface of the first electronic device, the lock screen user interface of the first electronic device, and/or the wake screen user interface of the first electronic device. In some embodiments, in response to detecting the selection of the second option, the first electronic device transmits an indication to the third electronic device that informs (e.g., visually and/or audibly) the third user of the third electronic device that the first user has declined the invitation. Additionally, in some embodiments, if the second option to decline the invitation is selected, the user interface of the item locating application will not include a representation of the third findable item that indicates the location of the third findable item (e.g., having one or more characteristics of the representation of the first findable item discussed above with reference to step(s) 702 and/or the representation of the second findable item discussed above with reference to step(s) 708). Displaying an invitation to access a location of a findable item in a user interface of an item locating application that includes representations of findable items shared with the first user and/or owned by the first user facilitates discovery that the first user has a pending invitation and/or reduces the number of inputs needed for the user to easily accept or deny the invitation, thereby improving user-device interaction.

In some embodiments, the first electronic device receives (758*a*) a request to share a location of a third findable item, different from the first findable item and the second findable item, that is associated with the first user with a third user, different from the first user, of a third electronic device, such as request received from "Jack" to share findable item "Your Keys" as shown in FIG. 6B, wherein the third user does not have access to the location of the third findable item (e.g., when the request is received). For example, the request is transmitted by a third user of a third electronic device requesting that the first user of the first electronic device grant the third user access to a location of the third findable item (e.g., a physical item that the first user has ownership thereof). In some embodiments, the location is a physical location of the third findable item within a physical environment. In some embodiments, the third user transmits the request via a user interface of an item locating application running on the third electronic device (e.g., similar to the item locating application discussed above with reference to step(s) 702), as described in more detail below with reference to method 1100. In some embodiments, the third user transmits the request after receiving a notification of tracking by the third findable item (e.g., the third findable item has previously been travelling with the third user recently), as similarly described below with reference to method 900.

In some embodiments, after (e.g., in response to) receiving the request (and optionally before receiving input responding to the request at the first electronic device and while the request remains outstanding), the first electronic device displays (758*b*), via the display generation component, an indication (e.g., indication 606-5 in FIG. 6B) of the request to share the location of the third findable item that is associated with the first user with the third user in the user interface of the item locating application, wherein the indication of the request is concurrently displayed with the representation of the first findable item and the representation of the second findable item. For example, following the receiving of the request and/or in response to the receiving of the request, the first electronic device displays a user interface element (e.g., a notification displayed on a lock screen user interface, a wake screen user interface, or a home screen user interface such as described with reference to FIG. 4A). In some embodiments, after receiving the request, the first electronic device receives an input corresponding to a request to display the user interface of the item locating application described above with reference to step(s) 702. For example, the first electronic device detects a selection input (e.g., having one or more characteristics of inputs described above with reference to step(s) 702) directed to the user interface element (e.g., the notification) discussed above. In some embodiments, the indication of the request is displayed concurrently with the representation of the first findable item and the representation of the second findable item in the user interface of the item locating application. For example, the indication of the request is displayed at a prioritized position (e.g., at a top of) in the first region discussed above with reference to step(s) 710, such as a top of a list of the findable items that have been shared with the first user (e.g., the findable items to which the user has been granted access to location information of the findable items). In some embodiments, the request includes an indication of the third findable item (e.g., the name of the item and/or an image or graphical representation of the item) along with one or more user selectable buttons to grant or deny sharing of the location of third findable item with the third user. In some embodiments, the indication of the third findable item is an image of the third findable item, a text description of the third findable item, or both. Displaying a request to provide access to a location of a findable item in a user interface of an item locating application that includes representations of findable items shared with the first user and/or owned by the first user facilitates discovery that the first user has a pending request and/or reduces the number of inputs needed for the user to easily view and/or interact with the pending request, thereby improving user-device interaction.

In some embodiments, the indication of the request to share the location of the third findable item that is associated with the first user with the third user includes (760*a*) a first option (e.g., "Yes" option in FIG. 6B) that is selectable to initiate a process to share the location of the third findable item with the third user (760*b*). In some embodiments, if the first electronic device detects selection of the first option, the location of the third findable item optionally becomes trackable via the item locating application running on the third electronic device, and the user interface of the item locating application optionally includes a representation of the third findable item along with an indication of the location of the third findable item. The location is optionally indicated on a virtual map, on a list, within an alternative user interface, or the like. For example, the location of the third findable item is optionally indicated by a representation of the third findable item (e.g., an image of the third findable item or a cartoon representation of the third findable item) displayed at a location on a map corresponding to the location of the third findable item. In some embodiments, the location of the third findable item is optionally indicated by a representation of the third findable item in a list of findable items, the third findable item shown next to a text description of a location of the third findable item and/or a distance of the third findable item from the third electronic device. In some embodiments, this list view displays a single item or multiple items.

In some embodiments, the indication of the request to share the location of the third findable item that is associated with the first user with the third user includes a second option (e.g., "No" option in FIG. 6B) that is selectable to decline the request to share the location of the third findable item with the third user (760*c*). For example, the second option is selectable to forgo providing the third user with access to the location of the third findable item (e.g., via the user interface of the item locating application running on the third electronic device). In some embodiments, selecting the second option causes the first electronic device to cease displaying the indication of the request via the display generation component. For example, the first electronic device ceases displaying the indication of the request in the user interface of the item locating application, the home screen user interface of the first electronic device, the lock screen user interface of the first electronic device, and/or the wake screen user interface of the first electronic device. In some embodiments, in response to detecting the selection of the second option, the first electronic device transmits an indication to the third electronic device that informs (e.g., visually and/or audibly) the third user of the third electronic device that the first user has declined the request. Additionally, in some embodiments, if the second option to decline the request is selected, the user interface of the item locating application will not include the representation of the third findable item that indicates the location of the third findable item as discussed above. In some embodiments, the first electronic device declines the request to share the location of the third findable item with the third user in response to detecting a gesture for dismissing the request (optionally without displaying and/or detecting selection of a selectable option). For example, while the indication of the request is displayed, if the first electronic device detects a swipe gesture (e.g., a swipe of a contact on a touch-sensitive surface of the first electronic device) or a long press (e.g., press/hold of a contact on a touch-sensitive surface of the first electronic device for a threshold amount of time, such as 0.75, 1, 1.5, 2, 3, 4, or 5 seconds) directed to the indication of the request, the first electronic device declines the request to share the location of the third findable item with the third user in the manner discussed above. Displaying a request to provide access to a location of a findable item in a user interface of an item locating application that includes representations of findable items shared with the first user and/or owned by the first user facilitates discovery that the first user has a pending request and/or reduces the number of inputs needed for the user to easily grant or deny the pending request, thereby improving user-device interaction.

In some embodiments, the electronic device (e.g., 500B) receives (714*a*) a second invitation associated with accessing a location of a second findable item (e.g., Alex's Keys), such as indicated by representation 634-8 shown in FIG. 6Q, wherein the second findable item (e.g., Alex's Keys) is not associated with the first user (e.g., Alan) of the first electronic device and is associated with a third user (e.g., Alex), different from the first user (e.g., Alan), of a third electronic device, such as shown in device 500B in FIG. 6Q. In some embodiments, a second invitation is optionally transmitted by a third user of a third electronic device to enable the first user of the first electronic device to gain access to a location of a second findable item (e.g., a physical item that the third user has ownership thereof). In some embodiments, and as noted above, the location is a physical location of the findable item within a physical environment.

In some embodiments, after receiving the first invitation and the second invitation, the electronic device displays (714*b*) (e.g., within a user interface of an item locating application) the first selectable option (e.g., Accept in representation 634-8 in FIG. 6Q) that is selectable to initiate the process to accept the invitation associated with accessing the location of the first findable item (714*c*). In some embodiments, and following the receiving of the invitation and/or in response to the receiving of the invitation, the display generation component displays a first selectable option to the first user, such as within a user interface element (e.g., a notification displayed on a lock screen user interface, a wake screen user interface, or a home screen user interface such as described with reference to FIG. 4A). In some embodiments, the first selectable option is selectable by the first user to initiate a process to accept the invitation to gain access to the location of the first findable item. In some embodiments, the invitation includes an indication of the first findable item (e.g., the name of the item and/or an image or graphical representation of the item) along with one or more user selectable buttons to accept or ignore the notification. In some embodiments, the indication is an image of the first findable item, a text description of the first findable item, or both.

In some embodiments, the electronic device (e.g., 500B) further displays (714*d*) a second selectable option (e.g., Accept in representation 634-9 in FIG. 6Q) that is selectable to initiate a process to accept the second invitation associated with accessing the location of the second findable item (e.g., Alex's Keys), such as shown in device 500B FIG. 6Q. Thus, if the electronic device has multiple outstanding invitations for accessing the locations of multiple findable items, the electronic device optionally concurrently displays representations of those invitations (e.g., 634-8 or 634-9) in the user interface of the item locating application, such as shown in FIG. 6Q. In some embodiments, and following the receiving of the second invitation and/or in response to the receiving of the second invitation, the display generation component displays a second selectable option to the first user, such as within a user interface element (e.g., a notification displayed on a lock screen user interface, a wake screen user interface, or a home screen user interface such as described with reference to FIG. 4A). In some embodiments, the second selectable option is selectable by the first user to initiate a process to accept the second invitation to gain access to the location of the second findable item. In some embodiments, the second invitation includes an indication of the second findable item (e.g., the name of the item and/or an image or graphical representation of the item) along with one or more user selectable buttons to accept or ignore the notification. In some embodiments, the indication is an image of the first findable item, a text description of the second findable item, or both. Displaying multiple invitations to gain access to the location of different findable items at the same time reduces the number of inputs needed for the first user to review the available invitations and/or findable items.

In some embodiments, the electronic device (e.g., 500B) displays (716*a*) the user interface (e.g., 606) of the item locating application via the display generation component, such as the user interface displayed by device 500B in FIG. 6F, which includes in accordance with a determination that a first set of one or more users has access to a location of a second findable item (e.g., Your Keys 634-1) that is associated with the first user (e.g., Alan) of the first electronic device (e.g., 500B) (e.g., the first user of the first electronic device invited a first set of one or more users to have access to the location of a second findable item that is owned by the first user, and the users of the first set of users have accepted the invitation allowing the users of the first set of users to have access to the location of the second findable item), a representation of the second findable item (e.g., Your Keys 634-1) that indicates the location of the second findable item, such as the location information included in representation 634-1 in FIG. 6F, in association with first one or more indications of users in the first set of one or more users (716*b*), such as indicated by "shared with Erica" in representations 634-1 in device 500B in FIG. 6F. In some embodiments, the user interface of the item locating application displays a list of (all) users that have access to the location of the second findable item. For instance, the user interface includes a list of indications of the names of the users within the first set of users. In some embodiments, the user interface includes one or more distance indications (1 foot, 5 feet, 1 mile, 5 miles, or 20 miles) that indicate the distance the items are from the electronic device. This distance indication is optionally accompanied by a time indication (e.g., Now, 2 seconds ago, 1 minute ago, 1 hour ago, or 5 hours ago) that indicates when the distance indication was last updated. For instance, the user interface for the first user optionally indicates the distance the second findable item is from the electronic device and/or first user along with a time indication indicating how long it has been since this distance was updated.

In some embodiments, in accordance with a determination that a second set of one or more users, different from the first set of one or more users, has access to the location of the second findable item that is associated with the first user of the first electronic device, the electronic device (e.g., 500B) displays the representation of the second findable item that indicates the location of the second findable item in association with second one or more indications of users in the second set of one or more users (716*c*). For instance, if Your Keys in FIG. 6F is shared with a different, second set of users, the representation 634-1 of the second findable item would optionally be displayed with indications of such second set of users instead. For instance, and in some embodiments, the user interface includes a list of indications of the users within the second set of users and/or the information described above with reference to the first set of one or more user. Additionally, the users with which the findable item is shared are enabled to optionally view the representation of the findable items along with the distance indication and time indication. Displaying the list of users with whom the second findable item has been shared improves privacy for the first user, as the first user is made aware of who has access to the location of the second findable item.

In some embodiments, while the first set of one or more users or the second set of one or more users has access to the location of the second findable item that is associated with the first user of the first electronic device, the first electronic device receives (762*a*), via the display generation component, a second input corresponding to a request to share access to the location of the second findable item with a respective user, such as selection of selectable option 668-1 in FIG. 6H for sharing findable item “Your Keys” with “Jason” via contact 603. For example, the item locating application includes a second user interface (e.g., an item page) specific to the second findable item. The second user interface optionally includes information about the second findable item and one or more selectable options to initiate actions specific to the second findable item. For instance, in some embodiments, the second user interface of the second findable item associated with the first user optionally includes information about the second findable item and a second selectable option that is selectable to transmit invitations associated with accessing a location of the second findable item to users, such as similarly described above with reference to step(s) 702. In some embodiments, the second input corresponds to a request to provide access to a new user to the location of the second findable item (e.g., and transmitting an invitation to access the location of the second findable item to the new user). Particularly, in some embodiments, the second input corresponds to selection of the second selectable option, which causes the first electronic device to transmit an invitation associated with accessing a location of the second findable item to the respective user (e.g., who does not already have access to the location of the second findable item). For example, the first electronic device detects, via a touch-sensitive surface of the first electronic device (e.g., such as the touch screen of the first electronic device), a tap or touch at a location of the touch-sensitive surface corresponding to the second selectable option. In some embodiments, the first electronic device detects the selection of the second selectable option via a physical input device in communication with the first electronic device, such as one of the input devices discussed above with reference to step(s) 702. In some embodiments, the second input corresponds to approval/acceptance of a request from the respective user to provide the respective user with access to the location of the second findable item (e.g., as similarly described above with reference to step(s) 720 and/or 722).

In some embodiments, in response to receiving the second input (762*b*), in accordance with a determination that the first set of one or more users has access to the location of the second findable item that is associated with the first user of the first electronic device (e.g., as similarly described above with reference to step(s) 726), the first electronic device displays (762*c*), via the display generation component, an indication that the one or more users in the first set of one or more users will be alerted that the location of the second findable item will be accessible by the respective user, such as via alert 631-1 as shown in FIG. 6J. For example, the first electronic device displays an alert (e.g., a notification) and/or a user interface including a message informing the first user that sharing access to the location of the second findable item with the respective user will alert the one or more users in the first set of one or more users (e.g., via electronic devices associated with the one or more users) that the respective user will be able to locate the second findable item (e.g., view the location of the second findable item). Additionally, in some embodiments, the message informs the first user that sharing access to the location of the second findable item with the respective user will cause tracking notifications for the second findable item to be disabled (e.g., for a predetermined amount of time, such as a duration that the respective user has access to the location of the second findable item), such as the tracking notifications discussed below with reference to method 800.

In some embodiments, in accordance with a determination that the second set of one or more users has access to the location of the second findable item that is associated with the first user of the first electronic device (e.g., as similarly described above with reference to step(s) 726), the first electronic device displays (762*d*), via the display generation component, an indication that the one or more users in the second set of one or more users will be alerted that the location of the second findable item will be accessible by the respective user, similar to the alert 631-1 shown in FIG. 6J (e.g., as similarly discussed above but specific to the one or more users in the second set of one or more users). Providing a reminder that one or more users with whom a findable item is already shared will be alerted in response to sharing the location of the findable item with a respective user who does not currently have access to the location of the findable item helps improve privacy for the one or more users, as the one or more users are made aware of who will also have access to the location of the findable item, thereby improving user-device interaction.

In some embodiments, after receiving the first input (e.g., 603 in FIG. 6E), wherein the first input corresponded to selection of the first selectable option (718*a*), such as selection of “Accept” in FIG. 6E (In some embodiments, the first input includes the first user tapping on, sliding across, or otherwise selecting the first selectable option.), in accordance with a determination that a second invitation associated with accessing the location of the first findable item (e.g., Mike’s Keys) was transmitted to or accepted by a third user (e.g., Jared), different from the first user (e.g., Alan) and the second user (e.g., Mike), such as Mike inviting Jason to gain access to Mike’s Keys in FIG. 6H, the electronic device (e.g., 500B) displays (718*b*) a notification (e.g., 631-1 or 632) indicating that the third user (e.g., Jared) was invited to access the location of the first findable item (e.g., Mike’s Keys) such as shown on device 500B in FIG. 6I and/or FIG. 6J. In some embodiments, if the first findable item is shared by the second user with a third user, different from the first user and the second user, the first user will receive a notification that indicates that the third user was invited to access the location of the first findable item. This notification is optionally displayed in various ways, discussed in detail hereinafter. In some embodiments, the notification that is displayed or otherwise provided (e.g., via audio) indicates the name of the third user and/or indicates whether the third user was invited to access the location of the first findable item and/or indicates whether the third user accepted the invitation to access the location of the first findable item. Notifying the first user when a new user is invited to access the location of the first findable item allows the first user to keep track of who can view the location of the first findable item and improves privacy for the first user.

In some embodiments, the electronic device (e.g., 500B) displays (720*a*) the notification (e.g., 632) on a lock screen user interface (e.g., a user interface displayed by the electronic device when the electronic device is in a locked state, and prior to an authentication input (e.g., biometric authentication, password based authentication, PIN-based authentication or otherwise) being detected at the electronic device) of the first electronic device (e.g., 500B), such as shown in device 500B in FIG. 6J. In some embodiments, the notification is displayed on a lock screen user interface of the first electronic device when the first user is not presently interacting with the first electronic device. In some embodiments, the notification is selectable to cause display of the above-described user interface of the item locating application. In some embodiments, the notification is displayed overlaid on another user interface displayed by the electronic device when the notification is received (e.g., a home screen user interface, a user interface of an application other than the item locating application, or another user interface displayed by the electronic device). Notifying the first user on a lock screen ensures the first user receives the notification even when the user is not otherwise viewing or interacting with the electronic device and/or the item locating application.

In some embodiments, the electronic device (e.g., 500B) displays (722*a*) the notification (e.g., 631-1) in the user interface of the item locating application, such as shown in device 500B in FIG. 6I. In some embodiments, the notification is displayed within the user interface of the item locating application when the first user is presently using the item locating application. In some embodiments, outstanding invitations (e.g., invitation to which the first user has not yet responded) are displayed together in the item locating user interface and continue to grow in number as new outstanding invitations are received. In response to the first user responding to an outstanding invitation (whether affirmatively or negatively), the electronic device optionally removes the invitation from the item locating user interface. Notifying the first user within the item locating application ensures the first user is presented the notification in a user interface in which the corresponding findable items will eventually be displayed.

In some embodiments, the first input (e.g., 603 of FIG. 6E) corresponded to selection of the first selectable option (e.g., Accept in FIG. 6E) (724*a*), and displaying the user interface of the item locating application includes (724*b*) the electronic device (e.g., 500B) displaying a map (e.g., 623) of a physical region that includes the location of the first findable item (e.g., icon 4) and a location of a third user (724*c*), such as the location of Erica being included in the region of map 623 of device 500B in FIG. 6F. In some embodiments, the user interface of the item locating application includes the display of a map of a physical region surrounding the location of the first user. In some embodiments, the map region includes the location of the first user. In some embodiments, the map region includes a location of the first findable item and/or a location of a third user. The third user is optionally the second user, or a different user who is associated with the first findable item.

In some embodiments, displaying the user interface of the item locating application includes concurrently displaying on the map (e.g., 623) (724*d*) the representation of the first findable item (e.g., Mike's Keys icon 4) at a location on the map (e.g., 623) corresponding to the location of the first findable item (e.g., Mike's Keys) (724*e*), and a representation of the third user at a location on the map corresponding to the location of the third user (7240, such as if a representation of Erica were displayed at the location of Erica in map 623 of device 500B in FIG. 6F. In some embodiments, the representation of the first findable item and the representation of the third user are represented on the map as bubbles and/or circles. However, it should be understood that these representations are optionally any shape and/or size. In some embodiments, representation of the third user is only shown on the map if the third user is sharing their location with the first user—otherwise, the representation of the third user is optionally not displayed on the map. Displaying the location of the first findable item and the location of the third user allows the first user to be aware of the location of the findable items and/or users associated with the findable items within the map area, which further improves the privacy of the first user.

In some embodiments, the first input (e.g., 603 of FIG. 6E) corresponded to selection of the first selectable option (e.g., Accept in FIG. 6E), and displaying the user interface of the item locating application includes (726*a*) displaying a map (e.g., 623) of a physical region that includes the location of the first findable item (e.g., Mike's Keys) and a location of a third user displayed via the user interface, such as if a location of Erica included in the region of map 623 of device 500B in FIG. 6F (726*b*). In some embodiments, and as discussed previously, the user interface of the item locating application includes the display of a map of a physical region surrounding/including the location of the first user, including one or more of the previously discussed features.

In some embodiments, in accordance with a determination that the third user (e.g., Erica) is sharing their location with the first user (e.g., Alan) and in accordance with a determination that the first findable item (e.g., Mike's Keys) is in proximity to the location of the third user (e.g., Erica), the electronic device (e.g., 500B) concurrently displays (726*c*) the following on the map (e.g., 623). In some embodiments, the third user has chosen to share their location with the first user such that the first user can see the location of the third user via the item locating application.

In some embodiments, the electronic device displays the representation of the first findable item (e.g., Mike's Keys as icon 4) at a location on the map (e.g., 623) corresponding to the location of the first findable item (726*d*), such as shown in device 500B in FIG. 6F.

In some embodiments, the electronic device displays a representation of the third user (e.g., Erica) at a location on the map corresponding to the location of the third user (e.g., Erica), such as if map 623 of device 500B in FIG. 6F included a representation of Erica displayed at a location on map 623 corresponding to the location of Erica (726*e*). In some embodiments, the representation of the first findable item and the representation of the third user are represented on the map as bubbles and/or circles. However, it should be understood that these representations are optionally any shape and/or size.

In some embodiments, in accordance with a determination that the third user (e.g., Erica) is not sharing their location with the first user, the electronic device (e.g., 500B) displays (e.g., 726*f*) the representation of the first findable item (e.g., Mike's Keys as icon 4) at the location on the map (e.g., 623) corresponding to the location of the first findable item on the map (e.g., 623) without displaying the representation of the third user (e.g., Erica), such as shown in map 623 in FIG. 6F, which includes a representation of Mike's Keys but does not include a representation of Erica. In some embodiments, the third user has not chosen to share their location with the first user. Accordingly, even if the first findable item is with the third user, the item locating application only displays the location of the first findable item but not the location of the third user. Selectively displaying location information for findable items and associated users allows the first user to fully understand the location of the findable items and/or users associated with the findable items within the map area, when available, which further improves the privacy of the first user.

In some embodiments, displaying the user interface of the item locating application includes in accordance with the determination that the third user is sharing their location with the first user and in accordance with the determination that the first findable item is in proximity to the location of the third user, the representation of the third user (e.g., icon corresponding to "Mike" on map 623 in FIG. 6F) is displayed at the location on the map corresponding to the location of the third user based on a determination (e.g., calculation and/or estimation) of the location of the third user that is independent of a determination of the location of the first findable item (764), similarly represented by "Icon 4" on the map 623 in FIG. 6F. For example, the location of the third user is determined by the first electronic device based on location data of the third electronic device with which the third user is associated that is provided to the first electronic device (e.g., directly or indirectly via a server (e.g., wireless communication terminal) in communication with the third electronic device using Bluetooth, RF, IR, NFC, and/or Wi-Fi). In some embodiments, the location data of the third electronic device is different (e.g., separate from) location data of the first findable item and the first electronic device determines the location of the first findable item based on its location data irrespective of the location data of the third electronic device. Displaying location information for findable items and associated users based on independent determination of the locations of the findable items and associated users helps improve accuracy regarding the location information for the findable items and the associated users within the map area, when available.

In some embodiments, in a second user interface of the item locating application, wherein the second user interface is associated with a second findable item (e.g., Mike's Keys) that is associated with the first user (e.g., Mike) (e.g., the first user is the owner of the second findable item), such as the user interface associated with Mike's Keys displayed by device 500A in FIG. 6H, the electronic device (e.g., 500A) displays (728*a*) a second selectable option (e.g., 668-1) that is selectable to initiate a process to transmit a second invitation associated with accessing a location of the second findable item to a third user (e.g., Jason), such as shown in device 500A in FIG. 6H. In some embodiments, the item locating application includes a second user interface (e.g., an item page) specific to the second findable item. The second user interface optionally includes information about the second findable item and one or more selectable options to initiate actions specific to the second findable item, discussed in greater detail hereinafter. For instance, in some embodiments, the second user interface of the second findable item associated with the first user optionally includes information about the second findable item and a second selectable option that is selectable to transmit invitations associated with accessing a location of the second findable item to users, such as described herein.

In some embodiments, the electronic device (e.g., 500A) receives (728*b*) a second input (e.g., 603 in FIG. 6H), wherein the second input corresponded to selection of the second selectable option (e.g., 668-1). In some embodiments, after receiving the second input (e.g., 603 in FIG. 6H), the electronic device (e.g., 500A) initiates (728*c*) a process to transmit the second invitation to the third user (e.g., Jason), such as transmission of the invitation in response to device 500A detecting selection of option 668-1 in FIG. 6H. For instance, the second selectable option is optionally selectable to transmit a second invitation associated with accessing a location of the second findable item to a third user. In some embodiments, the second user interface has analogous information/content as a user interface displayed by the electronic device of the second user from which the invitation to gain access to the location of the first findable item was initiated. Transmitting invitations associated with accessing locations of findable items allows the first user to efficiently share the locations of the findable items while controlling who has access to the locations of the findable items.

In some embodiments, a first set of one or more users (e.g., as shown in 668 in FIG. 6H), different from the first user (e.g., Mike), has access to the location of the second findable item (e.g., Mike's Keys) in response to having accepted invitations associated with accessing the location of the second findable item (e.g., Mike's Keys), such as Jared and Alan having access to the location of Mike's Keys in FIG. 6H, and the electronic device (e.g., 500A) displays (730*a*) the second selectable option (e.g., 668-1) in association with one or more visual indications of the first set of one or more users, such as the indication "Shared With Jared and Alan" shown in the user interface displayed by device 500A in FIG. 6H. In some embodiments, the second user interface of the second findable item optionally includes a list of users that have access to the location of the second findable item. This list of users is optionally displayed along with (e.g., within, next to, in proximity to and/or adjacent to) the second selectable option, such that the first user knows which users have access to the second findable item when determining who to send a new invitation to. Displaying a list of the users who have access to the findable item along with the selectable option to invite new users clearly conveys item access to the first user to make informed selections/invitations, and improves the privacy of the first user.

In some embodiments, the first electronic device displays (766*a*), in a second user interface of the item locating application, wherein the second user interface is associated with a second findable item that is associated with the first user, a second selectable option that is selectable to initiate a lost mode (e.g., as described with reference to step(s) 748 and/or 750) for the second findable item, such as selectable option 672 displayed on "Mike's Phone" as shown in FIG. 6L. In some embodiments, the device of a user with which an item has been shared displays a user interface (e.g., an item page) containing information about the findable item and one or more selectable options to initiate actions specific to the findable item. In some embodiments, the second user interface (e.g., the item page user interface) includes a selectable option to enable and/or disable lost mode. In some embodiments, this selectable option is present in the item detail user interface of the user who shared the findable item (e.g., the owner of the item) without being presented in the item detail user interface of one or more (or, optionally, all) other users with whom the item is shared, as discussed below. In some embodiments, enabling lost mode for the second findable item causes the second findable item to display lost mode information on one or more electronic devices that are in proximity to (e.g., within 0.1, 0.3, 1, 3, 5, 10, 20, 50, 100, 200, 500 or 1000 cm) the second findable item, such as one or more of information indicating that the second findable item is lost, information indicating a name of the owner of the second findable item, information indicating a phone number for the owner of the second findable item and/or information indicating an email address (or other contact information) for the owner of the second findable item.

In some embodiments, the first electronic device displays (766*b*) a third user interface of the item locating application, wherein the third user interface is associated with the first findable item (e.g., which is optionally owned by the second user, and not the first user, and the third user interface is the item detail user interface for the first findable item), and wherein the third user interface does not include a selectable option that is selectable to initiate a lost mode for the first findable item, as similarly shown on "Alan's Phone" in FIG. 6L. For example, the item page user interface for the first findable item does not include selectable options to enable and/or disable lost mode for the first findable item. Particularly, in some embodiments, the third user interface does not include the selectable option that is selectable to initiate the lost mode for the first findable item because the first user is not associated with (e.g., is not the owner of) the first findable item. In other words, only the second user is optionally able to initiate the lost mode for the first findable item because the second user is the owner of the first findable item. In some embodiments, as discussed in more detail below, though the first user is unable to initiate the lost mode for the first findable item, the first electronic device alerts the first user (e.g., via a notification and/or other textual indication) in the third user interface that is associated with the first findable item whether lost mode has been activated for the first findable item (e.g., by the second user). In some embodiments, the notification and/or other textual indication indicates to the first user when and/or how long the lost mode has been enabled for the first findable item (e.g., 1 minute ago, 1 hour ago, or 1 day ago). Accordingly, in some embodiments, when displaying a user interface that is associated with a findable item in the item locating application at the first electronic device, if the findable item is associated with the first user of the first electronic device (e.g., the findable item is owned by the user of the first electronic device, such as the second findable item discussed above), the user interface that is associated with the findable item includes a selectable option that is selectable to initiate a lost mode for the findable item. In some embodiments, if the findable item is not associated with the first user of the first electronic device (e.g., the findable item is shared with the first user but is not owned by the first user, such as the third findable item discussed above), the user interface that is associated with the findable item does not include the selectable option that is selectable to initiate the lost mode for the findable item. Selectively providing the option to initiate a lost mode for a findable item gives the owner of the findable item sole control over initiating the lost mode for the findable item, thereby improving privacy for the owner and/or user-device interaction.

In some embodiments, a third user, different from the first user, of a third electronic device has access to a location of the second findable item (768*a*) (e.g., the third user is able to view and track the location of the second findable item because the first user has shared access to the location of the second findable item with the third user). In some embodiments, while displaying the second selectable option in the second user interface associated with the second findable item, the first electronic device receives (768*b*), via the one or more input devices, a second input corresponding to selection of the second selectable option, such as selection of selectable option 672 on "Mike's Phone" via contact 603 as shown in FIG. 6L. For example, the first electronic device detects, via a touch-sensitive surface of the first electronic device (e.g., such as the touch screen of the first electronic device), a tap or touch at a location of the touch-sensitive surface corresponding to the second selectable option. In some embodiments, the first electronic device detects the selection of the second selectable option via a physical input device in communication with the first electronic device, such as one of the input devices discussed above with reference to step(s) 702.

In some embodiments, in response to receiving the second input, the first electronic device initiates (768*c*) the lost mode for the second findable item, as similarly indicated in selectable option 672 as shown in FIG. 6M. For example, the first electronic device activates the lost mode for the second findable item, as similarly discussed above with reference to step(s) 746. In some embodiments, while the lost mode for the second findable item is active, the first electronic device receives (768*d*) an indication that the second findable item has been located, as similarly described with reference to FIG. 6S, wherein the indication is not transmitted to the third user of the third electronic device.

In some embodiments, in response to receiving the indication, the first electronic device displays (768*e*), via the display generation component, a visual indication that the second findable item has been located, such as indication 693 displayed on "Mike's Phone" as shown in FIG. 6S. For example, while the lost mode for the second findable item is active (e.g., after receiving the second input as discussed above), the first electronic device receives an indication that the second findable item has been located by another electronic device that is proximate to the second findable item and/or by a server (e.g., a wireless communications terminal) that is in communication with the second findable item, the first electronic device, and/or the other electronic device. As an example, the server is notified of the location of the second findable item by the other electronic device (e.g., or the second findable item transmits location data to the server) and the server subsequently notifies the first electronic device that the second findable item has been found, which includes transmitting the indication to the first electronic device. In some embodiments, after (e.g., in response to) receiving the indication, the first electronic device displays an item-locating alert (e.g., a message) informing the first user that the second findable item has been found, including a current location of the second findable item, contact information (e.g., name, number, and/or email address) corresponding to a user who located the second findable item (e.g., and who currently is in possession of the second findable item), and/or a representation of the second findable item (e.g., an image or cartoon representation of the second findable item), thereby enabling the first user to locate the second findable item. In some embodiments, the first electronic device receives the indication that the second findable item has been located without the indication being transmitted to the third electronic device. For example, the third electronic device does not display an alert though the second findable item is shared with the third user of the third electronic device. Accordingly, in some embodiments, while a lost mode for a findable item is active, if the findable item is associated with the first user of the first electronic device (e.g., the findable item is owned by the user of the first electronic device, such as the second findable item discussed above), the first electronic device is configured to receive indications that the findable item has been located (e.g., including displaying a visual indication that the findable item has been located). In some embodiments, if the findable item is not associated with the first user of the first electronic device (e.g., the findable item is shared with the first user but is not owned by the first user, such as the third findable item discussed above with reference to step(s) 746), the first electronic device is not configured to receive indications that the findable item has been located (e.g., including forgoing displaying the visual indication that the findable item has been located). Selectively providing item-locating alerts for a findable item while the findable item is in a lost mode, without providing item-locating alerts to other users who have access to the location of the findable item, enables the owner of the findable item sole control over locating the findable item, thereby improving privacy for the owner and/or user-device interaction.

In some embodiments, in a second user interface of the item locating application, wherein the second user interface is associated with the first findable item (e.g., Mike's Keys), such as the user interface associated with Mike's Keys displayed by device 500A in FIG. 6H, the electronic device (e.g., 500A) displays (732*a*) a second selectable option (e.g., 670) that is selectable to initiate a lost mode for the first findable item (e.g., Mike's Keys), such as shown in device 500A in FIG. 6H. In some embodiments, and as noted above, the second user interface includes a selectable option to enable and/or disable lost mode. In some embodiments, this selectable option is optionally present in the item detail user interface of the user who shared the findable item (e.g., the owner of the item) and the item detail user interface of one or more (or, optionally, all) other users with whom the item is shared. In some embodiments, enabling lost mode for the first findable item causes the first findable item to display lost mode information on one or more electronic devices that are in proximity to (e.g., within 0.1, 0.3, 1, 3, 5, 10, 20, 50, 100, 200, 500 or 1000 cm) the first findable item, such as one or more of information indicating that the first findable item is lost, information indicating a name of the owner of the first findable item, information indicating a phone number for the owner of the first findable item and/or information indicating an email address (or other contact information) for the owner of the first findable item. Allowing one or more (or, optionally, all) users with access to the findable item to enable or disable lost mode for the findable item ensures that lost mode can be easily enabled, which improves the likelihood that the findable item will be found.

In some embodiments, displaying the second user interface includes (734*a*) in accordance with a determination that the lost mode was enabled for the first findable item, and that a third user (e.g., the first user, the second user, or a different user) enabled the lost mode for the first findable item, displaying (734*b*) a visual indication (e.g., 688) in the second user interface indicating that the third user (e.g., Mike) initiated the lost mode, such as shown in the user interface displayed by device 500B in FIG. 6L, which includes indication 688 that indicates that the lost mode had been enabled, and indicates that Mike enabled the lost mode. In some embodiments, and as noted above, the second user interface includes a selectable option to enable and/or disable lost mode. In some embodiments, and when lost mode is enabled, a visual indication is displayed indicating which user initiated the lost mode. For instance, if the third user initiated lost mode, the second user interface will display a visual indication of the name of the third user and/or that the third user initiated lost mode. If a different user had enabled the lost mode, the second user interface would optionally include an indication of that different user instead. Alerting the owner and the users with which the item is shared to who initiated lost mode allows the users with access to the findable item to know who initiated lost mode, which also informs such users of who has been taking action with respect to the findable item, thus improving privacy.

In some embodiments, displaying the second user interface includes (736*a*) in accordance with a determination that the lost mode was enabled for the first findable item (e.g., Mike's Keys), displaying (736*b*) in the second user interface, a visual indication (e.g., 688) of when the lost mode was enabled for the first findable item (736*b*), such as the indication of "1 min ago" shown in the user interface displayed by device 500B in FIG. 6L. In some embodiments, and when lost mode is enabled, a visual indication is displayed indicating how long ago (e.g., Now, 1 min, 5 min, 30 min, 5 hours, or 1 day) lost mode was initiated. For instance, if the third user initiated lost mode 2 minutes ago, the second user interface will optionally display a visual indication that the third user initiated lost mode 2 minutes ago. Alerting the owner and the users with which the item is shared how long ago lost most was initiated, allows the users with access to the findable item to know how long the item has been indicated as missing.

In some embodiments, displaying the second user interface includes (738*a*) in accordance with a determination that the lost mode was enabled for the first findable item, (e.g., Mike's Keys) displaying (738*b*) in the second user interface a third selectable option that is selectable to change a phone number associated with the lost mode for the first findable item (e.g., Mike's Keys), such as if the user interface displayed by device 500B in FIG. 6L included an option that is selectable to change the phone number associated with the lost mode for Mike's keys. In some embodiments, and optionally when lost mode is enabled, a third selectable option is displayed to change a phone number (or other contact information to be indicated in the lost mode information, as previously described) associated with the lost mode for the first findable item. In some embodiments, this selectable option is optionally present in the item detail user interface for the findable item of the user who shared the findable item, and the item detail user interface for the findable item of one or more (or, optionally, all) other users with whom the item is shared.

In some embodiments, the electronic device (e.g., 500B) receives (783*c*) a second input, wherein the second input corresponded to selection of the third selectable option, such as selection of the option to change the phone number associated with the lost mode in the user interface of device 500B shown in FIG. 6L. In some embodiments, after receiving the second input, the electronic device (e.g., 500B) receives (738*d*) a third input to change the phone number associated with the lost mode for the first findable item (e.g., Mike's Keys), such as entry of a phone number via a soft keypad displayed by device 500B after and/or in response to the second input. In some embodiments, after receiving the third input, the electronic device (e.g., 500B) displays (738*e*) the changed phone number associated with the lost mode for the first findable item. For instance, if Alan changes the phone number via a selectable option in the user interface displayed by device 500B in FIG. 6J, the phone number associated with lost mode for Mike's Keys will optionally be updated, and device 500B would optionally display such updated phone number in the user interface displayed by device 500B in FIG. 6L. In some embodiments, the phone number associated with the lost mode for the first findable item is updated in the lost mode information displayed to one or more electronic devices in proximity to the first findable item. This updated phone number is also displayed within the item detail user interface for the findable item of (one or more) (or optionally all) other users with whom the item is shared. Changing/updating the phone number for lost mode allows one or more (or, optionally, all) users with access to the findable item to be contacted if the findable item is found.

In some embodiments, in a second user interface of the item locating application, wherein the second user interface is associated with a second findable item (e.g., Mike's Keys) that is associated with the first user (e.g., Mike), such as the user interface associated with Mike's Keys displayed by device 500A in FIG. 6L, the electronic device (e.g., 500A) displays (740*a*) (e.g., the first user is the owner of the second findable item, and the second user interface is an item detail user interface for the second findable item), a second selectable option (e.g., 668-1) that is selectable to initiate a process to transmit a second invitation associated with accessing a location of the second findable item (e.g., Mike's Keys) to a third user (e.g., Jason), such as shown by device 500A in FIG. 6L. In some embodiments, and as noted above, the user interface associated with the findable item includes a selectable option to transmit invitations associated with accessing the location of the findable item to users, as previously described.

In some embodiments, the electronic device displays (740*b*) a third user interface of the item locating application, wherein the third user interface is associated with the first findable item (e.g., Mike's Keys), such as the user interface associated with Mike's Keys displayed by device 500B in FIG. 6L (e.g., which is optionally owned by the second user, and not the first user, and the third user interface is the item detail user interface for the first findable item), wherein the third user interface does not include a selectable option that is selectable to initiate a process to transmit a third invitation associated with accessing a location of the first findable item, such as a lack of an option shown in the user interface of device 500B in FIG. 6L for adding additional users to Mike's Keys. In some embodiments, the device of a user with which the item has been shared displays a user interface (item page) containing information about the findable item and one or more selectable options to initiate actions specific to the findable item. However, in some embodiments, this user interface does not include selectable options to initiate transmission of invitations associated with accessing the location of the findable item to other users. Selectively providing the option to transmit invitations gives the owner of the item control over which users receive invitations, thereby improving privacy for the owner.

In some embodiments the third user interface (e.g., of device 500A in FIG. 6L) associated with the first findable item does not include a selectable option that is selectable to initiate a process to revoke access to the location of the first findable item (e.g., Mike's Keys), such as the user interface associated with Mike's Keys displayed by device 500B in FIG. 6L not including a selectable option for revoking other users' access to the location of Mike's keys, and the second user interface (e.g., of device 500A in FIG. 6L) associated with the second findable item does include a third selectable option that is selectable to initiate a process to revoke access to the location of the second findable item (742*a*), such as the user interface associated with Mike's Keys displayed by device 500A in FIG. 6M including option 694 that is selectable to revoke other users' access to the location of Mike's keys. In some embodiments, the user interface displayed by the device of the user associated with the second findable item further includes a selectable option that is selectable to initiate a process to revoke access to the location of the second findable item. For example, if the user has shared access to the location of the second findable item with one or more other users, the item detail user interface displayed by the device of the user includes one or more selectable options that are selectable to revoke access to the location of the second findable item from the one or more other users. In contrast, in some embodiments, the user interface of a user with which the item has been shared does not include a selectable option that is selectable to initiate a process to revoke access to the location of the first findable item. Selectively providing the option to revoke access gives the owner of the item control over which users have access to the findable item, thereby improving privacy for the owner.

In some embodiments, after receiving the first input, (e.g., 603 of FIG. 6E) wherein the first input corresponded to selection of the first selectable option (744*a*), in accordance with a determination that the location of the second findable item (e.g., Mike's Keys) satisfies one or more separation criteria, including a criterion that is satisfied when the location of the second findable item has become separated from the first electronic device, the electronic device (e.g., 500A) presents (744*b*) one or more indications that the second findable item (e.g., Mike's Keys) has become separated from the first electronic device (e.g., 500A). For instance, if Mike has been separated from Mike's Keys, electronic device 500A optionally generates a visual and/or audio indication that indicates that Mike's Keys have been separated from device 500A. In some embodiments, if the electronic device determines that the user and/or electronic device associated with the second findable item has been separated from the second findable item by at least a threshold distance (e.g., 0.5 km, 2 km, 4 km, 8 km, 16 km, 32 km, 64 km, or 88 km), the electronic device presents (audio and/or visual) separation alerts that indicate that the second findable item has been separated from the electronic device.

In some embodiments, in accordance with a determination that the location of the first findable item (e.g., Mike's Keys) satisfies the one or more separation criteria, the electronic device (e.g., 500B) will not present (744*c*) one or more indications that the first findable item has become separated from the first electronic device (e.g., 500B)). For instance, if Alan has been separated from Mike's Keys, electronic device 500B optionally will not generate a visual and/or audio indication that indicates that Mike's Keys have been separated from device 500B. In some embodiments, the electronic device does not present separation alerts for items whose locations have been shared with the electronic device (e.g., via the above-described invitations), even if those shared items otherwise satisfy the one or more separation criteria. Selectively generating separation alerts allows the owner to know when the item has been separated and avoids unnecessary alert generation for other users who are more likely to be separated from the findable item.

In some embodiments, the electronic device (e.g., 500A) displays (746*a*) a second user interface of the item locating application, wherein the second user interface is associated with the first findable item (e.g., Mike's Keys) (e.g., the second user interface is an item detail user interface for the first findable item), such as the user interface associated with Mike's Keys displayed by device 500A in FIG. 6K or device 500B in FIG. 6K, and the second user interface includes a second selectable option (e.g., 674 or 690 in FIG. 6K) that is selectable to rename the first findable item, such as shown in device 500A or 500B in FIG. 6K. In some embodiments, the second user interface includes a selectable option that is selectable to rename the findable item. In some embodiments, this selectable option is present within the second user interface associated with the findable item and other corresponding user interfaces of users with which the findable item is shared.

In some embodiments, the electronic device (e.g., 500A) receives (e.g., 746*b*) a second input, wherein the second input corresponded to selection of the second selectable option, such as selection of option 674 or 690 in FIG. 6K. In some embodiments, after receiving the second input, the electronic device (e.g., 500A) receives (746*c*) a third input to rename the first findable item, such as a text input provided via a soft keyboard displayed by device 500A or 500B in response to selection of options 674 or 690 in FIG. 6K. In some embodiments, the users with which the first findable item is shared are enabled to rename the first findable item by inputting the updated name into the corresponding second user interface In some embodiments, after receiving the third input, the electronic device (e.g., 500A) displays (746*d*) the renamed first findable item. For example, if device 500B in FIG. 6K detected an input to rename Mike's Keys to Mike's Car Keys as described above, device 500B would optionally update the name of Mike's Keys in the item locating application to Mike's Car Keys. In the event a first user renames the item, the renamed first findable item is optionally updated only within the first user's second user interface (and not updated for other users with whom the location of the first findable item is shared and/or not updated for the second user). Alternatively, in the event the first user renames the first findable item, the name is optionally updated in (every) other users' item detail user interfaces with which the second findable item is shared and/or the second user. Allowing users with which the item is shared the ability to rename the item provides the users some control over the title/display of the findable item.

In some embodiments, the second user (e.g., Mike) has access to the location of the first findable item (748*a*) (e.g., because the second user is the owner of the first findable item), such as in FIG. 6O in which device 500B is displaying a user interface for Mike's Keys, to which Mike has access. In some embodiments, after receiving the first input (e.g., 603 of FIG. 6E), wherein the first input corresponded to selection of the first selectable option (e.g., Accept of FIG. 6E), electronic device (e.g., 500B) receives (748*b*) a second input (e.g., 603 in FIG. 6O) corresponding to a request to cease access to the location of the first findable item (e.g., Mike's Keys), such as selection of option 692 in FIG. 6O. In some embodiments, one or more (or, optionally, all) user with which the item is shared is capable of removing a findable item from their item locating application. It should be noted that this action optionally only removes the findable item from the user's specific item locating application and the findable item and corresponding location/information optionally remains accessible to one or more (or, optionally, all) other users with which the item is shared and/or the owner of the first findable item. For instance, in some embodiments, the second user optionally submits a request to remove the second user from having access to the location of the first findable item.

In some embodiments, after receiving the second input (e.g., 603 in FIG. 6O), the electronic device (e.g., 500B) displays (748*c*) the user interface of the item locating application via the display generation component, such as the user interface displayed by device 500B in FIG. 6P, wherein the user interface of the item locating application does not include the representation of the first findable item (e.g., Mike's Keys) that indicates the location of the first findable item, such as the user interface displayed by device 500B in FIG. 6P no longer including a representation of Mike's Keys on map 623 and/or in the list of findable items shown below map 623. In some embodiments, once the electronic device recognizes and/or receives the request to cease access to the location of the first findable item, the user interface of the item locating application no longer displays the representation of the first findable item or its associated location.

In some embodiments, in response to receiving the second input (e.g., 603 in FIG. 6O) (748*d*), the electronic device (e.g., 500B) ceases (748*e*) having access to the location of the first findable item (e.g., Mike's Keys), such as device 500B in FIG. 6P no longer having access to Mike's Keys, wherein the second user (e.g., Mike or Jared) continues to have access to the location of the first findable item, such as shown in the user interface displayed by device 500C in FIG. 6P.

In some embodiments, the electronic device (e.g., 500B) displays (748*f*) a user interface object that indicates that the second user continues to have access to the location of the first findable item, such as if device 500B were to display a notification in response to the input detected in FIG. 6O that indicates that Mike and/or Jared and/or Jason continue to have access to the location of Mike's Keys. In some embodiments, and in response to receiving the request to cease access to the location of the first findable item, the access to the location of the first findable item is ceased for the first user but the second user continues to have access to the location of the first findable item. In some embodiments, the first user receives a notification that indicates that the second user continues to have access to the location of the first findable item. In some embodiments, the notification includes indications of other users who also have access to the location of the first findable item. Allowing one or more (or, optionally, all) users to remove the findable item from the item locating application provides the users with control over the items they have access to.

In some embodiments, after receiving the first input (e.g., 603 of FIG. 6E), wherein the first input corresponded to selection of the first selectable option (e.g., Accept of FIG. 6E), wherein the first user (e.g., Alan) and one or more other users including the second user (e.g., Mike) have access to the location of the first findable item (e.g., Mike's Keys), the electronic device (e.g., 500B) receives (750*a*) an indication that access to the location of the first findable item (Mike's Keys) has been revoked (e.g., by the owner of the first findable item), such as in response to device 500A detecting selection of option 694 in FIG. 6M. In some embodiments, the owner of the first findable item is able to revoke the first user's (or other shared users') access to the location of the first findable item. In some embodiments, the owner of the first findable item is able to revoke the access of the first user while maintaining the access of one or more other users with whom the location of the first findable item has been shared. In some embodiments, the owner of the first findable item is able to revoke the access of all users with whom the location of the first findable item has been shared. In some embodiments, after (e.g., in response to) receiving the indication that access to the location of the first findable item has been revoked, the electronic device displays (750*b*) a user interface object (e.g., a notification) that indicates that access to the location of the first findable item has been revoked and that the location of the first findable item remains accessible to the one or more other users, such notifications 692 and/or 698 displayed by devices 500B and/or 500C in FIG. 6N. In some embodiments, the electronic device presents (e.g., via audio and/or video) an alert or notification to the user such that the user is made aware that their access to the location of the first findable item is revoked. This alert/object is optionally displayed in various ways such as on a lock screen user interface, as a pop-up notification, within the item locating application and/or within a different user interface displayed by the electronic device, as previously described with respect to the notification of the invitation to gain access to the location of the first findable item sent to other users by the second user. In some embodiments, the notification includes a list of users that still have access to the location of the first findable item. Alerting a user when access to a findable item is revoked allows the user to accurately keep track of the findable items to which the user has access.

In some embodiments, after receiving the first input, wherein the first input corresponded to selection of the first selectable option, wherein the first user and one or more other users including the second user have access to the location of the first findable item, the first electronic device receives (770*a*), via the one or more input devices, a second input corresponding to a request to remove access to the location of the first findable item (e.g., which the first user is not the owner of), such as selection of selectable option 692 via contact 603 as shown in FIG. 6P. In some embodiments, one or more (or, optionally, all) users with which the first findable item is shared are capable of removing the first findable item from their item locating application. It should be noted that this action optionally only removes the findable item from the user's specific item locating application and the findable item and corresponding location/information optionally remains accessible to one or more (or, optionally, all) other users with which the item is shared (and/or was shared when the second input was detected) and/or the owner of the first findable item, as discussed below. In some embodiments, the second input corresponds to selection of a selectable option in the user interface of the item locating application specific to the first findable item and that is displayed at the first electronic device. In some embodiments, the selectable option is selectable to initiate a process to remove the first user from having access to the location of the first findable item.

In some embodiments, after (e.g., in response to) receiving the second input, the first electronic device displays (770*b*), via the display generation component, a user interface object (e.g., a notification) that indicates that the location of the first findable item remains accessible to the one or more other users, including the second user (e.g., the owner of the first findable item) of the second electronic device, such as display of notification 692 as shown in FIG. 6O. In some embodiments, the electronic device presents (e.g., via audio and/or video) an alert or notification to the first user confirming to the first user that their access to the location of the first findable item is removed. This alert/notification is optionally displayed in various ways such as on a lock screen user interface, as a pop-up notification, within the item locating application and/or within a different user interface displayed by the first electronic device, as previously described with respect to the notification of the invitation to gain access to the location of the first findable item sent to other users by the second user. In some embodiments, the notification includes a list of users that still have access to the location of the first findable item and indicates that the list of users, including the second user with whom the first findable item is associated (e.g., owned by), can still access the location of the first findable item (e.g., in their specific item locating applications). Additionally, in some embodiments, the user interface object includes an indication that tracking notifications for the first findable item will be enabled at the first electronic device, such as the tracking notifications discussed below with reference to method 700. Alerting a user when access to a findable item is revoked allows the user to accurately keep track of the findable items to which the user has access and/or helps improve user security with respect to a discoverable location of the user, thereby improving user-device interaction.

Figure 7O:
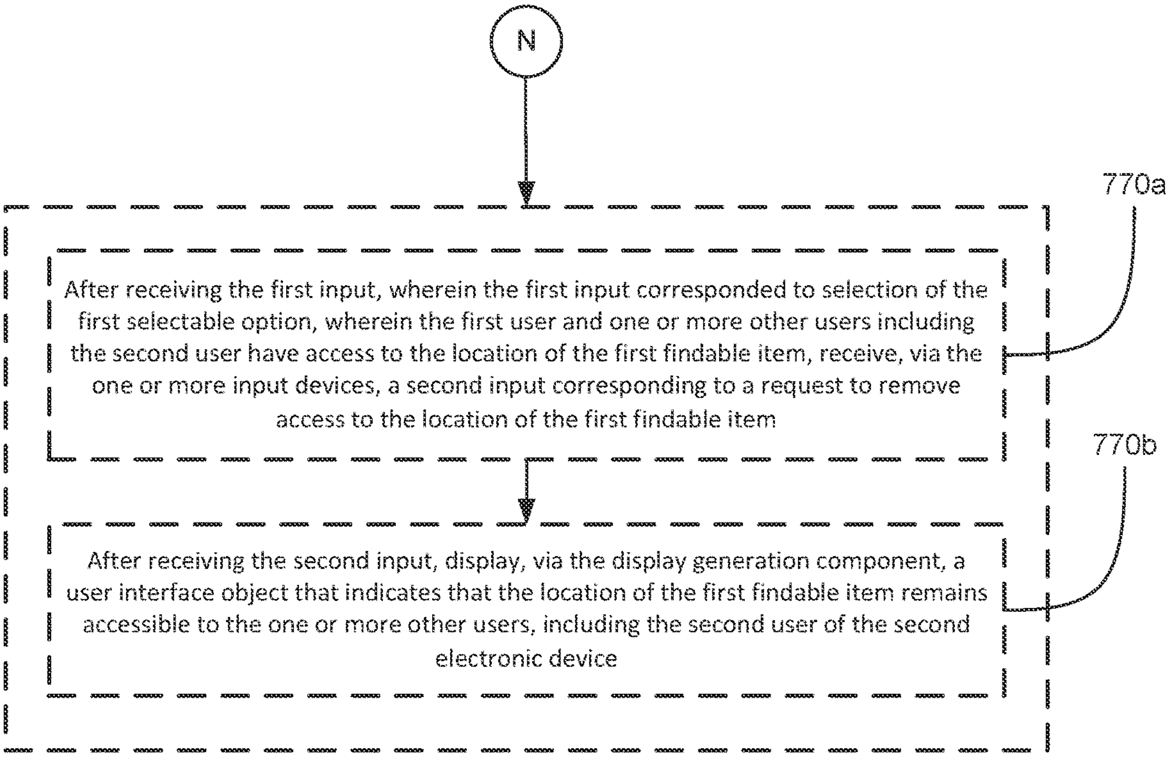

It should be understood that the particular order in which the operations in FIGS. 7A-7O have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900 and/or 1100) are also applicable in an analogous manner to method 700 described above with respect to FIGS. 7A-7O. For example, findable items, sharing access to findable items, displaying item locating applications, displaying user interfaces associated with findable items, and receiving invitations associated with accessing the locations of findable items described above with reference to method 700 optionally have one or more of the characteristics of remote locator objects, sharing access to remote locator objects, displaying item locating applications, displaying user interfaces associated with remote locator objects, displaying notifications related to remote locator objects, and receiving invitations associated with accessing the locations of remote locator objects described herein with reference to other methods described herein (e.g., methods 900 and/or 1100). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIGS. 7A-7J are, optionally, implemented by components depicted in FIGS. 1A-1B. For example, receiving operations 702*a*, 702*c*, 754*a*, 758*a*, 762*a*, 768*b*, and 770*a* and displaying operations 702*b*, 702*d*, 754*b*, 758*b*, 762*c*, 762*d*, 766*a*, 766*b*, 768*e*, and 770*b* are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Notification of Tracking by a Remote Locator Object

Users interact with electronic devices in many different manners. In some embodiments, a remote locator object is able to report and/or make its location accessible to an electronic device. The embodiments described below provide ways in which an electronic device provides an alert that an unknown remote locator object is tracking the user's location, thus enhancing the user's interactions with the electronic device and enhancing privacy for the user. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 8B:
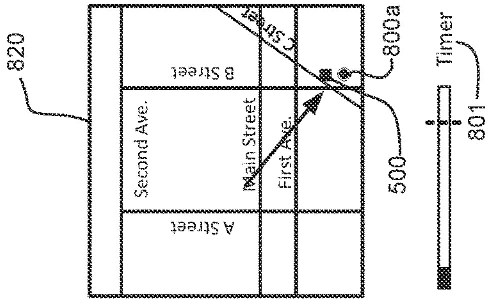
FIGS. 8A-8N illustrate exemplary ways in which an electronic device displays notifications of tracking by an unknown remote locator object in accordance with some embodiments of the disclosure.
Figure 8C:
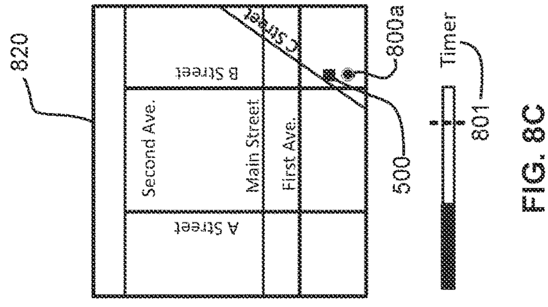
Figure 8A:
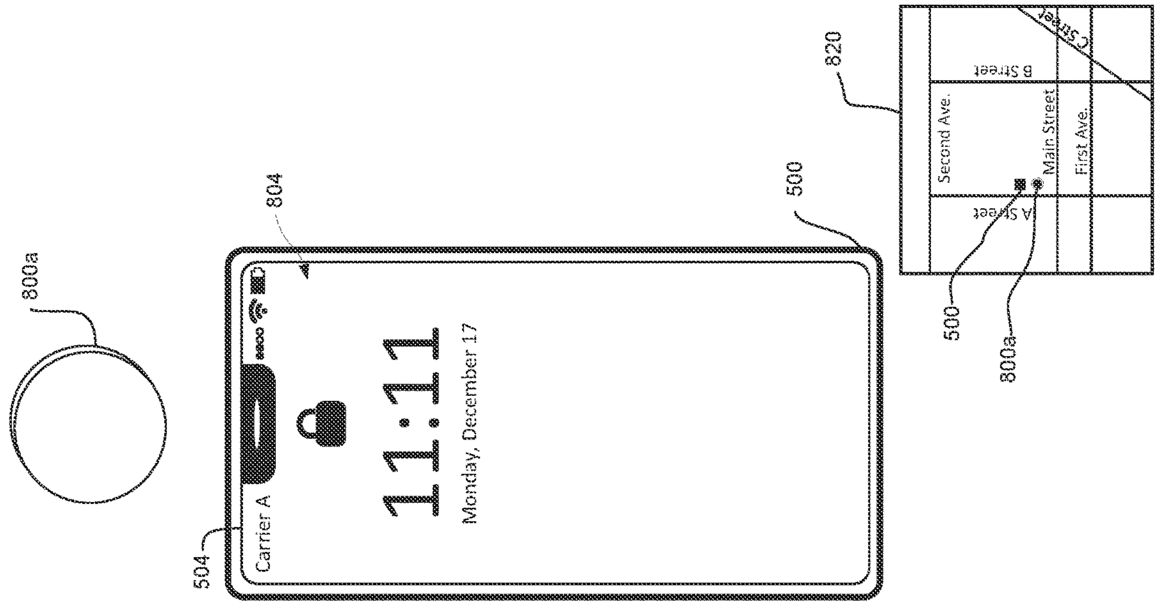
Figure 8E:
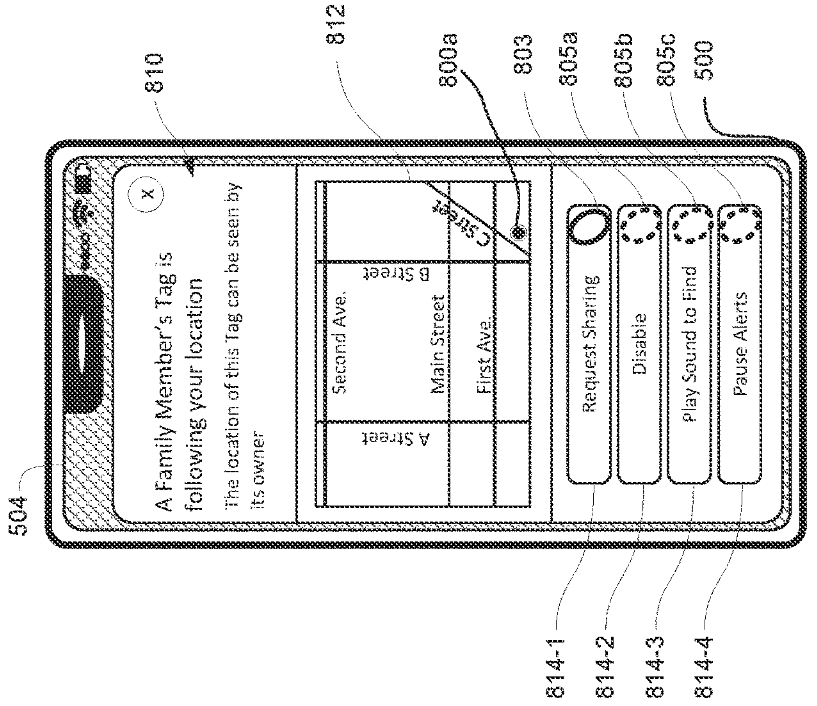
Figure 8D:
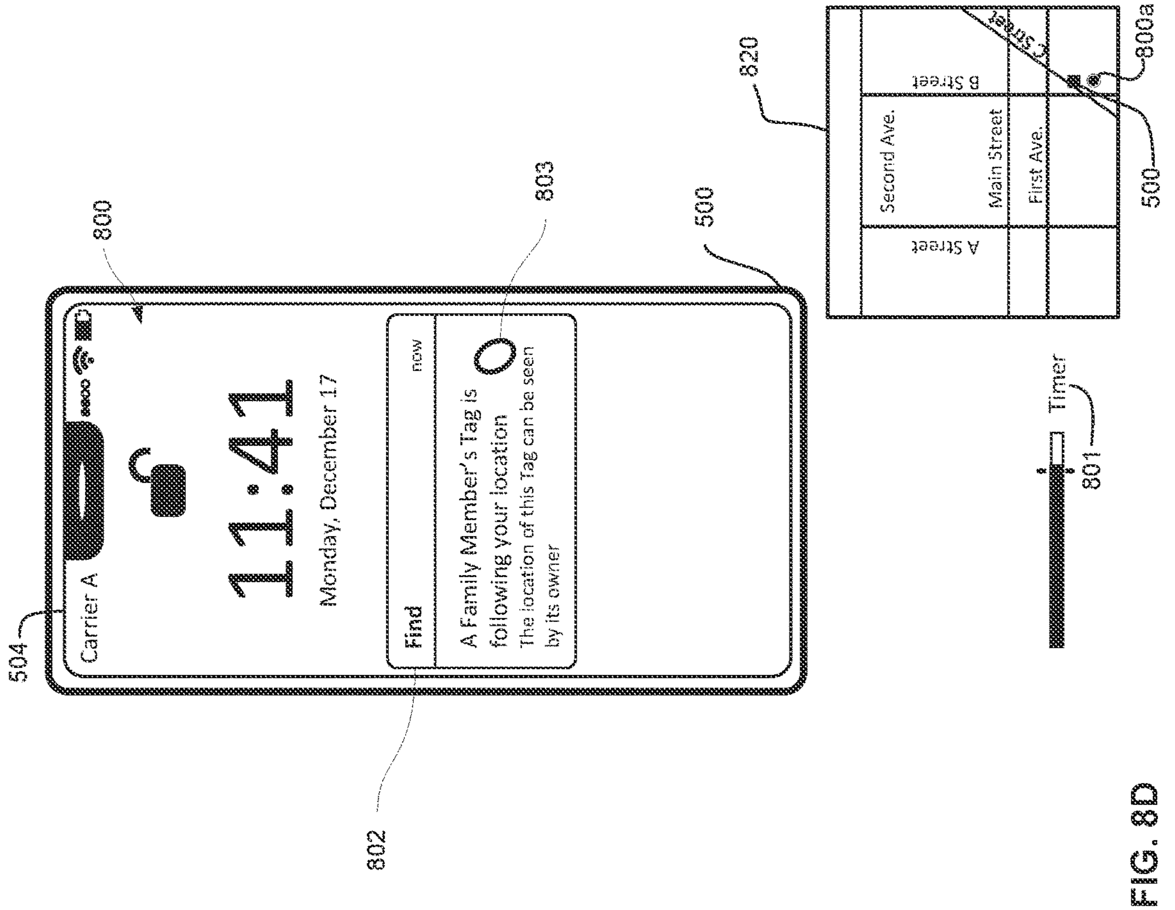
Figure 8G:
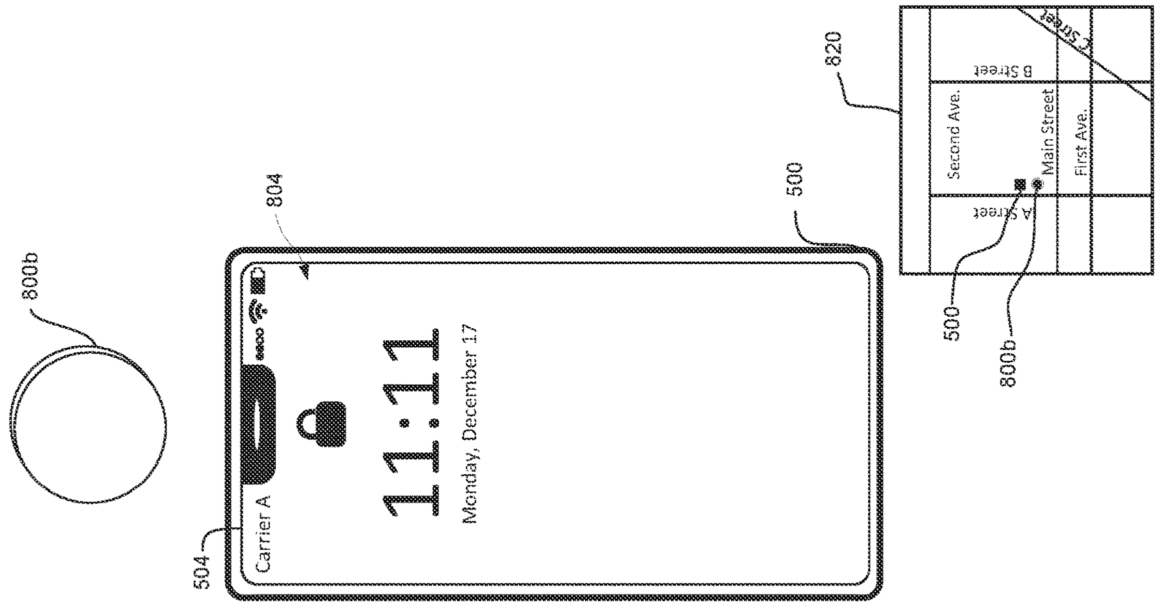
Figure 8F:
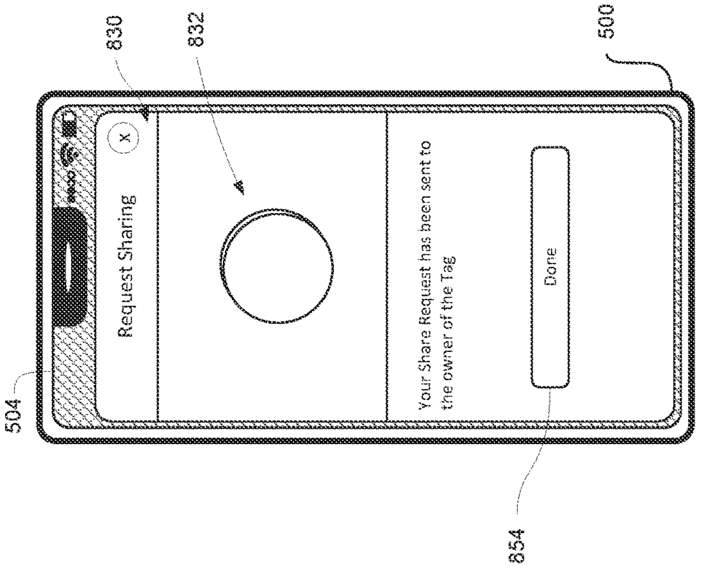
Figure 8H:
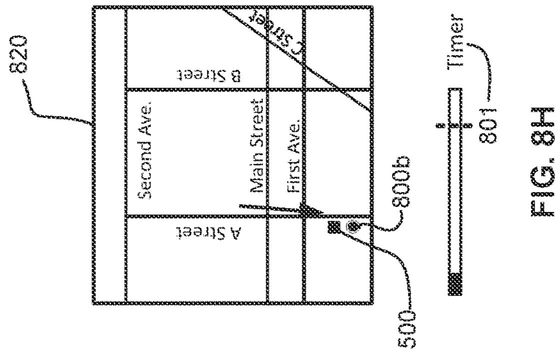
Figure 8I:
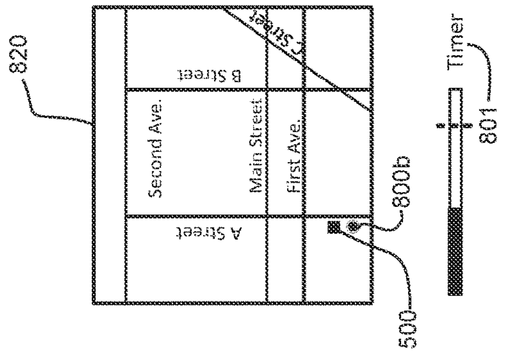
Figure 8J:
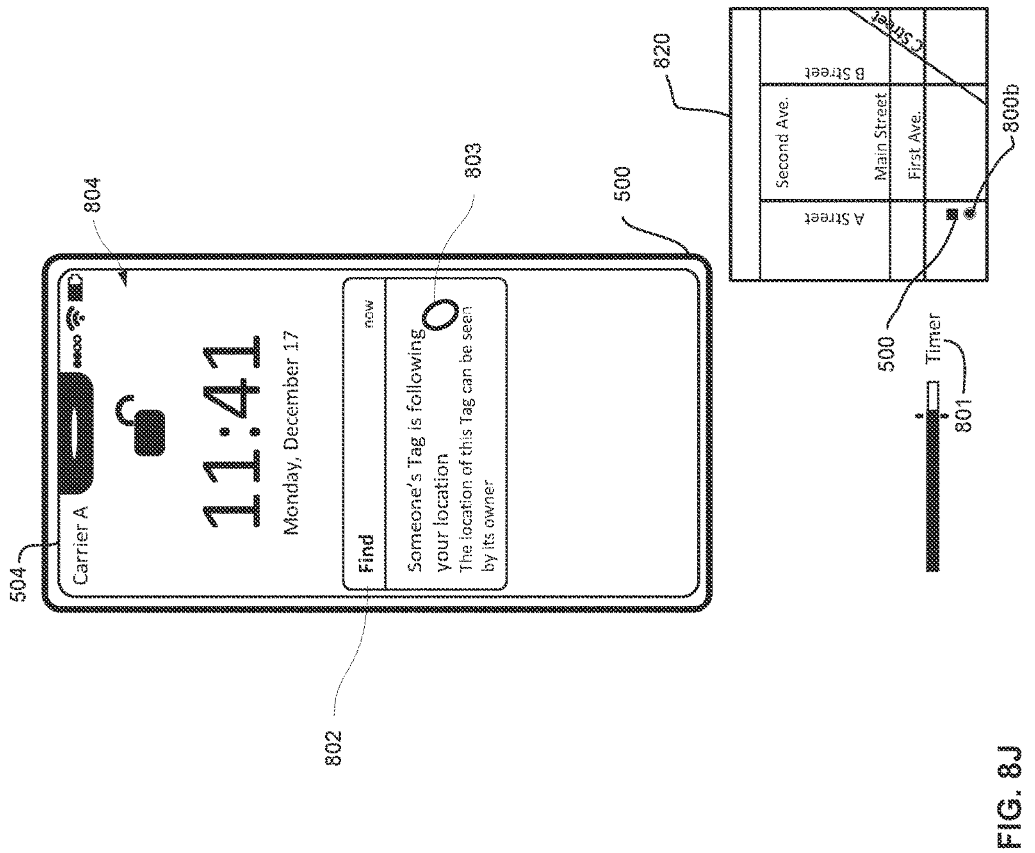
Figure 8L:
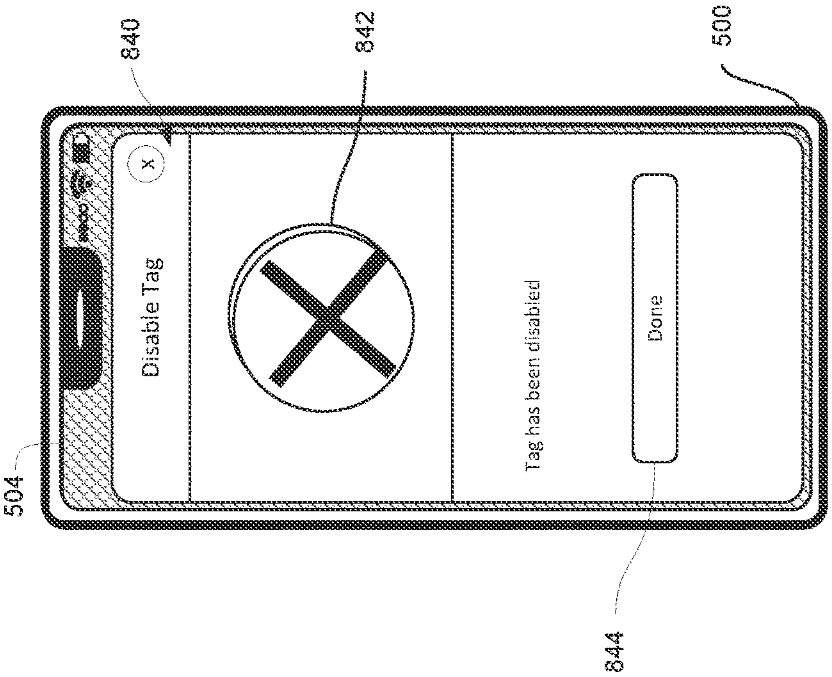
Figure 8K:
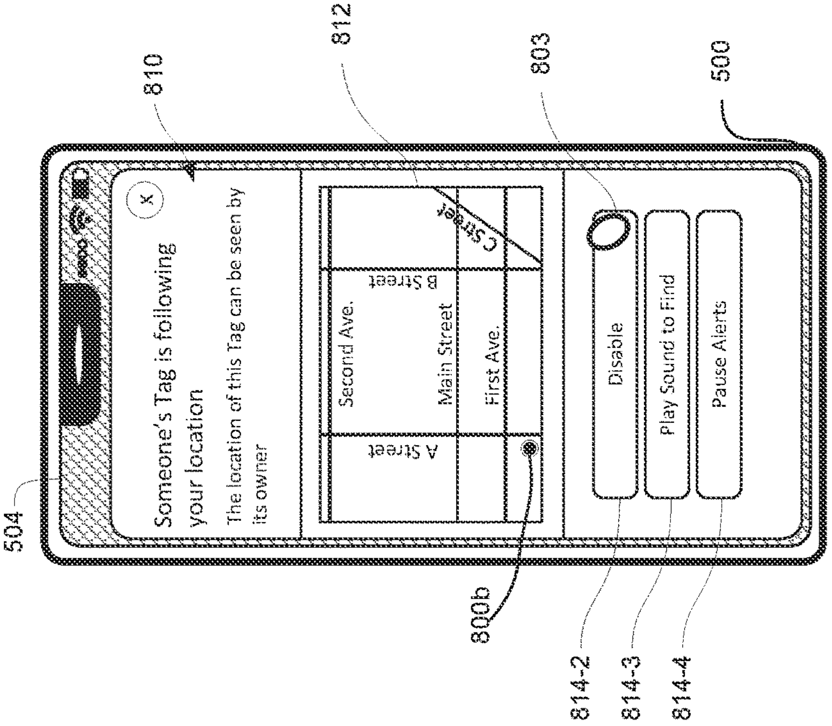
Figure 8N:
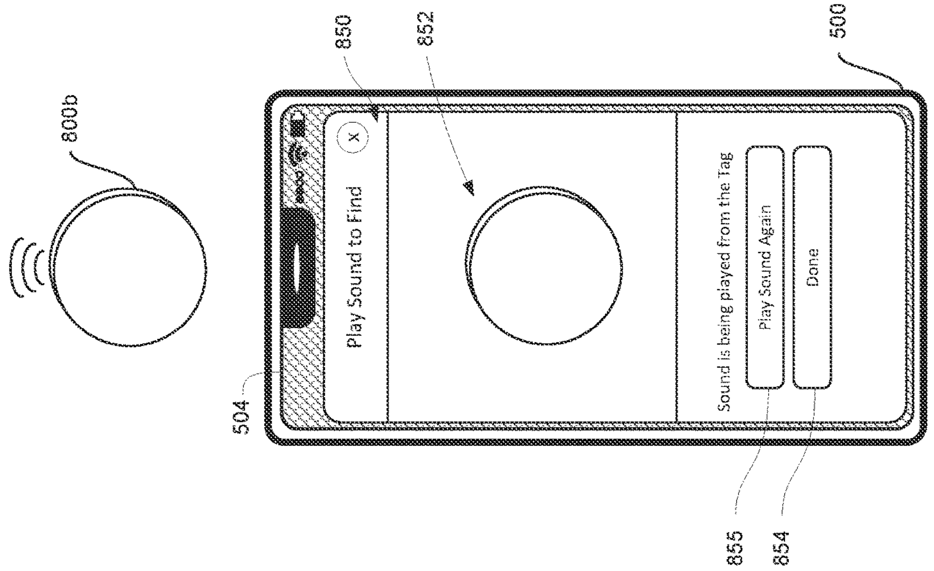

FIGS. 8A-8N illustrate exemplary ways in which an electronic device displays notifications of tracking by an unknown remote locator object in accordance with some embodiments of the disclosure. The embodiments in these figures are used to illustrate the processes described below, including the processes described with reference to FIGS. 9A-9E.

FIGS. 8A-8N illustrate an electronic device 500 displaying notifications of tracking by one or more unknown remote locator objects. FIG. 8A illustrates an exemplary device 500 that includes touch screen 504. As shown in FIG. 8A, the electronic device 500 presents a lock screen user interface 804 (e.g., a wake screen user interface). In some embodiments, lock screen user interface 804 is the user interface that is displayed when electronic device 500 is awoken (e.g., from a sleep, a power off, or locked state). In some embodiments, a first remote locator object ("remote locator object," "findable item") 800*a* is at or near a location of the electronic device 500. For example, as shown in the map view 820 in FIG. 8A, a location of the first remote locator object 800*a* is at or near (e.g., within a first threshold distance of, such as 0.1, 0.5, 1, 1.5, 2, 5, 10, or 20 m) a location associated with the electronic device 500. Additional examples of the first threshold distance are described below in method 900. In some embodiments, the user of the electronic device 500 is unaware of the presence of the first remote locator object 800*a*. As shown in the map view 820, the first remote locator object 800*a* and the electronic device 500 are optionally located on A Street. It should be understood that, as described below, the location of the electronic device 500 and the location of the user of the electronic device 500 are referred to herein interchangeably.

In some embodiments, the electronic device 500 generates (e.g., displays) a notification of tracking by the first remote locator object when electronic device 500 (e.g., or a server in communication with the electronic device 500) determines that the location of the first remote locator object 800*a* has been following the user's location (e.g., the location associated with the electronic device 500). In some embodiments, the remote locator object is determined to be following the user's location if the position of the first remote locator object 800*a* is the same as (or within the first threshold distance of, such as 0.1, 0.5, 1, 1.5, 2, 5, 10, or 20 m) the user's location for a threshold amount of time (e.g., 5 minutes, 10 minutes, 30 minutes, 1 hour, 2 hours, 4 hours, or 5 hours). In some embodiments, the first remote locator object 800*a* is determined to be following the user's location if the position of the first remote locator object 800*a* is the same as the user's position after moving for a threshold distance (e.g., 5, 10, 20, 40, 50, 100, 200, or 500 m, or 1, 2, 5, or 10 km). Additional examples of the threshold distance and the threshold amount of time are given below in method 900. In some embodiments, the first remote locator object is determined to be following the user's location if the position of the remote locator object remains within the first threshold distance from the user during and after moving for more than the threshold distance. In some embodiments, any combination of the above are factors or requirements (e.g., criteria) for determining whether the first remote locator object 800*a* is following the user.

For example, as shown in the map view 820 in FIG. 8B, the electronic device 500 and the first remote locator object 800*a* have moved together from A Street to the intersection of B Street and C Street. In some embodiments, as discussed above, the electronic device 500 detects that the location of the first remote locator object 800*a* is the same as or is within the first threshold distance of the location of the user of the electronic device 500. Additionally or alternatively, for example, the electronic device 500 detects that the electronic device 500 and the first remote locator object 800*a* have moved together more than the threshold distance discussed above. In some embodiments, the electronic device 500 determines whether the first remote locator object 800*a* has been moving with the electronic device 500 for the threshold amount of time, as represented by the advancement of the time bar in FIG. 8B. As shown in FIG. 8B, because the time bar has not yet reached the timer marker 801 (representing the above-described threshold amount of time), the electronic device 500 determines that the first remote locator object 800*a* has not been moving with the electronic device 500 for the threshold amount of time, and does not yet generate a notification of tracking.

In some embodiments, the electronic device 500 (e.g., continuously or intermittently) polls the location of the first remote locator object 800*a* to determine whether the first remote locator object 800*a* has been moving with the user of the electronic device 500 over more than the threshold distance discussed above and/or for more than the threshold amount of time discussed above. For example, as shown in FIG. 8C, the electronic device 500 determines that the location of the first remote locator object 800*a* is still at or within the first threshold distance of the location associated with the electronic device 500. As shown in the map view 820 of FIG. 8C, the first remote locator object 800*a* and the electronic device 500 are both still located at the intersection of B Street and C Street. Additionally, as shown in FIG. 8C, the electronic device 500 optionally determines whether the first remote locator object 800*a* and the electronic device 500 have been together (e.g., at or within the first threshold distance of the same location) for the threshold amount of time. While the first remote locator object 800*a* and the electronic device 500 are still both located at the same location (e.g., relative to when the electronic device 500 last polled the location of the first remote locator object 800*a*), as indicated by the advancement of the time bar in FIG. 8C, the first remote locator object 800*a* and the electronic device 500 have not been together for more than the threshold amount of time, and thus the electronic device 500 forgoes display of a notification that the first remote locator object is tracking the user's location.

In some embodiments, when the electronic device 500 determines that the location of the first remote locator object 800*a* has been at or within the first threshold distance of the user's location for more than the threshold amount of time, the electronic device 500 generates a notification 802, as shown in FIG. 8D. For example, as shown in the map view 820 in FIG. 8D, the first remote locator object 800*a* and the electronic device 500 remained at the same location (e.g., within the first threshold distance of each other) relative to when the electronic device 500 last polled the location of the first remote locator object 800*a*. Further, the electronic device 500 optionally determines that the first remote locator object 800*a* has been following the location of the electronic device 500 for more than the threshold amount of time, as indicated by the advancement of the time bar past the timer marker 801 in FIG. 8D, which prompts the electronic device 500 to display the notification 802, as discussed below.

In some embodiments, the electronic device 500 displays the notification 802 in the lock screen user interface 804, as shown in FIG. 8D. In some embodiments, notification 802 notifies the user that an unknown (e.g., unaffiliated with the user of the electronic device 500) remote locator object (e.g., optionally a "tag") is tracking (e.g., following) the user's location. In some embodiments, notification 802 indicates to the user that the owner of the unknown remote locator object is able to see the location of the remote locator object. In some embodiments, a respective remote locator object is determined to be unknown if the respective remote locator object is not associated with the user/user account of electronic device 500 and is not being shared with the user/user account of device 500 (e.g., is associated with another user account). In some embodiments, a remote locator object that has previously been shared with the user but is not currently shared with the user is also considered to be an unknown remote locator object that would trigger tracking alerts. Additional details relating to unknown remote locator objects are provided in method 900.

In some embodiments, the owner of the remote locator object and the user of the electronic device 500 are members of a predefined group of users. For example, the predefined group of users is a family account (e.g., a shared account) that includes the owner of the first remote locator object 800*a* and the user of the electronic device 500. As shown in FIG. 8D, the notification 802 optionally indicates that the owner of the first remote locator object 800*a* is a family member (e.g., a member of the family account that includes the user of the electronic device 500). In some embodiments, when the owner of the remote locator object and the user of the electronic device 500 are members of the predefined group of users, the notification 802 includes a name associated with the owner of the remote locator object (e.g., to indicate to the user that a particular family member's tag is at the user's location).

It is understood that although notification 802 is illustrated as being displayed on lock screen user interface 804, notification 802 is optionally displayed on other user interfaces (e.g., in one or more of all situations in which other notifications can be displayed). For example, the notification 802 is optionally displayed on a home screen user interface of the electronic device 500, in a predefined region (e.g., a top region) of the home screen user interface, over a user interface of an application that is installed on the electronic device 500, and/or on a lock screen user interface of a second electronic device in communication with the electronic device 500.

In FIG. 8D, the electronic device 500 receives user input 803 (e.g., a tap or touch detected on the touch screen 504) selecting notification 802. In some embodiments, in response to receiving the user input, electronic device 500 displays information user interface 810, as shown in FIG. 8E. In some embodiments, information user interface 810 is a card user interface that is overlaid over another user interface (e.g., such as a home screen user interface of the electronic device 500 or the lock screen user interface or the user interface displayed by device 500 when input 803 was detected on notification 802). As shown in FIG. 8E, in some embodiments, information user interface 810 includes a map 812 that indicates a current location of the first remote locator object 800*a* that is tracking the user. For example, the map 812 includes a representation of the first remote locator object 800*a* displayed at a location on the map that corresponds to the current location of the first findable item 800*a* (e.g., at the intersection of B Street and C Street), as shown. In some embodiments, information user interface 810 includes selectable options 814-1 to 814-4 for performing functions with respect to the first remote locator object 800*a* that is tracking the user, as discussed below.

In some embodiments, the information user interface 810 includes a request sharing option 814-1. In some embodiments, the electronic device 500 displays the request sharing option 814-1 in user interface 810 depending on whether one or more criteria are satisfied. As discussed above, the user of the electronic device 500 and the owner of the first remote locator object 800*a* are optionally members of a predefined group of users (e.g., a family account). In some embodiments, the one or more criteria include a criterion that is satisfied when the owner of the first remote locator object 800*a* and the user of the electronic device 500 are members of the predefined group of users. In some embodiments, the user interface 810 (e.g., optionally a top region of the user interface 810) indicates that the owner of the first remote locator object 800*a* is a member of the predefined group of users that includes the user of the electronic device (e.g., "A Family Member's Tag is following your location"), as shown in FIG. 8E. Accordingly, as shown in FIG. 8E, the electronic device 500 displays the request sharing option 814-1 in the information user interface 810 because the one or more criteria are satisfied. In some embodiments, as described herein later, in accordance with a determination that the one or more criteria are not satisfied because the owner of a respective remote locator object and the user of the electronic device 500 are not members of the same predefined group of users, the electronic device 500 forgoes displaying the request sharing option 814-1 in the information user interface 810. In some embodiments, as discussed below, the request sharing option 814-1 is selectable to initiate a process to request that the owner of the first remote locator object 800*a* share the location of the first remote locator object 800*a* with the user (e.g., and thus the electronic device 500).

In some embodiments, the information user interface 810 includes a disable option 814-2 that is selectable to initiate a process to disable the first remote locator object 800*a*. For example, in response to receiving user input (e.g., user input 805*a*) directed to the disable option 814-2, the electronic device 500 displays one or more instructions for guiding the disabling of the first remote locator object 800*a* (e.g., instructions for removing a battery from the first remote locator object 800*a*). In some embodiments, the disable option 814-2 is selectable to cause the electronic device 500 to deactivate the first remote locator object 800*a* (e.g., to cause the first remote locator object 800*a* to enter a sleep state, to power off, and/or to enter a low power mode). In some embodiments, the information user interface 810 further includes a play sound option 814-3 that is selectable to initiate a process to cause the first remote locator object 800*a* to output audio. For example, in response to receiving user input (e.g., user input 805*b*) directed to the play sound option 814-3, the electronic device 500 causes the first remote locator object 800*a* to emit an audible sound (e.g., a ring, a chime, and/or a tune) that allows the user of the electronic device 500 to locate the first remote locator object 800*a*.

In some embodiments, the information user interface 810 further includes a pause alerts option 814-4 that is selectable to initiate a process to pause future tracking alerts for the first remote locator object 800*a* (e.g., to ignore the presence of the first remote locator object 800*a*). For example, in response to receiving user input (e.g., user input 805*c*) directed to the pause alerts option 814-4, the electronic device 500 suppresses future tracking alerts (e.g., display of notification 802) for the first remote locator object 800*a* for a predefined time period (e.g., indefinitely, or the rest of the day, for 1, 2, 3, 5, 10, or 12 hours, for the rest of the week, or until the user leaves a particular location (e.g., the user's current location)). In some embodiments, the electronic device 500 suppresses future tracking alerts for a user-defined time period (e.g., for the rest of the day, for 1, 2, 3, 5, 10, or 12 hours, for the rest of the week, or until the user leaves a particular location (e.g., the user's current location)).

In FIG. 8E, the electronic device 500 receives user input 803 selecting selectable option 814-1. In some embodiments, as mentioned above, in response to receiving the user input, the device 500 initiates a process for requesting that the owner of the first remote locator object 800*a* share the location of the first remote locator object 800*a* with the user of the electronic device 500. For example, as shown in FIG. 8F, the electronic device 500 displays a sharing user interface 830 indicating that the request has been sent to the owner of the first remote locator object 800*a* (e.g., to one or more electronic devices (e.g., similar to electronic device 500) associated with the owner of the first remote locator object 800*a*). As shown in FIG. 8F, the sharing user interface 830 optionally includes a representation 832 of the first remote locator object that is tracking the user. In some embodiments, representation 832 is an icon of the first remote locator object. In some embodiments, representation 832 is an interactable model of the first remote locator object. For example, a user input (e.g., a tap or touch input detected on the touch screen 504) directed to the representation 832 optionally causes the electronic device 500 to spin or rotate the representation 832 in accordance with the user input. In some embodiments, representation 832 spins, rotates or otherwise animates on its own while being displayed in the sharing user interface 830 (e.g., without user involvement (e.g., user input)). In some embodiments, as shown in FIG. 8F, the sharing user interface 830 includes a selectable option 854 that is selectable to cause the electronic device 500 to cease display of the sharing user interface 830 (e.g., to navigate backward and/or redisplay the information user interface 810 of FIG. 8E).

In some embodiments, when the electronic device 500 sends the request to the owner of the first remote locator object 800*a* to share the location of the first remote locator object 800*a* with the user of the electronic device 500, a second electronic device associated with the owner of the first remote locator object 800*a* optionally presents a notification of the share request to the owner. For example, the second electronic device displays a notification of the share request on a lock screen user interface (e.g., similar to lock screen user interface 804 in FIG. 8A) displayed via a display (e.g., a touch screen) of the second electronic device. In some embodiments, if the user of the second electronic device (e.g., the owner of the first remote locator object 800*a*) approves the share request (e.g., by selecting an accept/approve option associated with the share request), the location of the first remote locator object 800*a* becomes known to the electronic device 500. For example, as described below, the location of the first remote locator object 800*a* becomes readily trackable and/or viewable by the user of the electronic device 500.

In some embodiments, when the location of the first remote locator object 800*a* is shared with the user of the electronic device 500, tracking alerts (e.g., such as notification 802) are no longer displayed on electronic device 500 (e.g., for as long as the location of the first remote locator object 800*a* remains shared with the user of the electronic device 500). In some embodiments, after the request to share the location of the first remote locator object 800*a* is approved, the first remote locator object 800*a* is added to the user's application for tracking and finding items (e.g., such as the item finding application described above in method 700) and is optionally displayed on a user interface of the application as an item that electronic device 500 is tracking (such as similarly shown previously in FIG. 6B). In some embodiments, if the request to share the location of the first remote locator object 800*a* with the user of the electronic device 500 is not approved by the owner of the first remote locator object 800*a*, the first remote locator object 800*a* remains unknown to the electronic device 500.

FIGS. 8G-8N illustrates an exemplary embodiment of displaying a tracking notification of an unknown remote locator object that is associated with an owner who is not a member of a predefined group of users that includes the user of the electronic device 500. As described above, in some embodiments, when a respective remote locator object is following the user of the electronic device 500, and the owner of the respective remote locator object is a member of a predefined group of users (e.g., a family account) that includes the user of the electronic device 500, the electronic device 500 enables the user to request that the owner of the respective remote locator object share the location of the respective remote locator object with the user. For example, as discussed above with reference to FIGS. 8D-8E, the electronic device 500 displays a request sharing option (e.g., 814-1). As discussed below, in some embodiments, if the owner of the respective remote locator object is not a member of the predefined group of users that includes the user of the electronic device 500, the electronic device 500 forgoes enabling the user to request sharing from the owner of the respective remote locator object.

FIG. 8G illustrates the electronic device 500 presenting the lock screen user interface 804. In some embodiments, a second remote locator object 800*b* (e.g., similar to the first remote locator object 800*a* described above) is at or near a location of the electronic device 500. For example, as shown in the map view 820 in FIG. 8G, a location of the second remote locator object 800*b* is at or near (e.g., within the first threshold distance (discussed above) of) a location associated with the electronic device 500. In some embodiments, the user of the electronic device 500 is unaware of the presence of the second remote locator object 800*b* at the location of the electronic device 500. As shown in the map view 820, the second remote locator object 800*b* and the electronic device 500 are optionally located on A Street.

As shown in the map view 820 in FIG. 8H, the electronic device 500 and the second remote locator object 800*b* have optionally moved together farther along A Street and past First Avenue. In some embodiments, as discussed above, the electronic device 500 detects that the location of the second remote locator object 800*b* is the same as or is within the first threshold distance of the location of the user of the electronic device 500. Additionally or alternatively, for example, the electronic device 500 detects that the electronic device 500 and the second remote locator object 800*b* have moved together more than the threshold distance discussed above. In some embodiments, as represented by the advancement of the time bar in FIG. 8H, the electronic device 500 determines that the second remote locator object 800*b* has been moving with the electronic device 500 for less than the threshold amount of time. In FIG. 8I, as similarly discussed with reference to FIG. 8C, the first remote locator object 800*a* and the electronic device 500 are still both located at the same location (e.g., relative to when the electronic device 500 last polled the location of the second remote locator object 800*b*), as indicated by the advancement of the time bar in FIG. 8C, but the second remote locator object 800*b* and the electronic device 500 have not been together for more than the threshold amount of time. Accordingly, the electronic device 500 does not yet generate a notification of tracking.

In some embodiments, when the electronic device 500 determines that the location of the second remote locator object 800*b* has been at or within the first threshold distance of the user's location for more than the threshold amount of time, the electronic device 500 generates a notification 802, as shown in FIG. 8J and as similarly described above with reference to FIG. 8D. In some embodiments, the electronic device 500 displays the notification 802 in the lock screen user interface 804, as shown in FIG. 8J. In some embodiments, notification 802 indicates to the user that the owner of the second remote locator object is able to see the location of the second remote locator object. In some embodiments, the owner of the second remote locator object 800*b* and the user of the electronic device 500 are not members of a same predefined group of users. For example, as previously discussed above, the predefined group of users is a family account (e.g., a shared account) that does not include both the owner of the second remote locator object 800*b* and the user of the electronic device 500. As shown in FIG. 8J, the notification 802 optionally hides (e.g., does not include) the personal information of the owner of the second remote locator object, such as the label of the object and the owner's name. Rather, notification 802 indicates that an unnamed person's remote locator object is following the location of the user of device 500.

In FIG. 8J, the electronic device 500 receives user input 803 selecting the notification 802. In some embodiments, in response to receiving the user input, electronic device 500 displays information user interface 810, as shown in FIG. 8K and similarly discussed above with reference to FIG. 8E. As shown in FIG. 8K, in some embodiments, information user interface 810 includes a map 812 that indicates a current location of the second remote locator object 800*b* that is tracking the user. For example, the map 812 includes a representation of the second remote locator object 800*b* displayed at a location on the map that corresponds to the current location of the second findable item 800*b* (e.g., on A Street past First Avenue), as shown. In some embodiments, information user interface 810 includes selectable options 814-2 to 814-4 for performing functions with respect to the second remote locator object 800*b* that is tracking the user, as discussed previously and in more detail below.

As discussed above, the user of the electronic device 500 and the owner of the second findable item 800*b* are optionally not members of the same predefined group of users. As discussed above with reference to FIGS. 8E-8D, the electronic device 500 displays a request sharing option (e.g., 814-1 in FIG. 8E) for requesting sharing of the location of a respective remote locator object from the owner of the respective remote locator object when one or more criteria are satisfied. In some embodiments, because the owner of the second remote locator object 800*b* and the user of the electronic device 500 are not both members of the predefined group of users, the one or more criteria are not satisfied in FIG. 8K. Accordingly, as shown in FIG. 8K, the information user interface 810 does not includes a request sharing option (e.g., does not include request sharing option 814-1 shown previously in FIG. 8E). For example, the user of the electronic device 500 is unable to request that the owner of the second remote locator object 800*b* share the location of the second remote locator object 800*b* with the user.

In some embodiments, information user interface 810 includes selectable options 814-2, 814-3 and 814-4. In some embodiments, the selectable options 814-2, 814-3 and 814-4 in FIG. 8K correspond to the selectable options 814-2, 814-3 and 814-4 in FIG. 8E, respectively. As similarly described above with reference to FIG. 8E, in some embodiments, selectable option 814-2 is selectable to initiate a process to disable the second remote locator object 800*b*. In some embodiments, selectable option 814-3 is selectable to cause the remote locator object to emit an audible sound to enable the user to find the second remote locator object 800*b*. In some embodiments, selectable option 814-4 is selectable to allow the user to ignore the second remote locator object 800*b* (e.g., in a similar process as described above with respect to FIG. 8E).

In FIG. 8K, the electronic device 500 receives user input 803 selecting the disable option 814-2. In some embodiments, in response to receiving the user input, electronic device 500 displays user interface 840, as shown in FIG. 8L. In some embodiments, user interface 840 displays a representation 842 of the second remote locator object (e.g., as similarly described above with reference to FIG. 8E). In some embodiments, user interface 840 includes instructions for disabling the second remote locator object. For example, representation 842 is optionally an animation that illustrates steps for disassembling and/or disabling the second remote locator object (e.g., optionally removing the batteries of the remote locator object). In some embodiments, in response to receiving the user input 803 in FIG. 8K, the electronic device 500 deactivates the second remote locator object 800*b* (e.g., causes the second remote locator object 800*b* to enter a sleep state, to power off, and/or to enter a low power mode), as shown in FIG. 8L. Selection of selectable option 844 optionally causes electronic device 500 to cease displaying user interface 840 (e.g., and redisplay information user interface 810 of FIG. 8K).

Figure 8M:
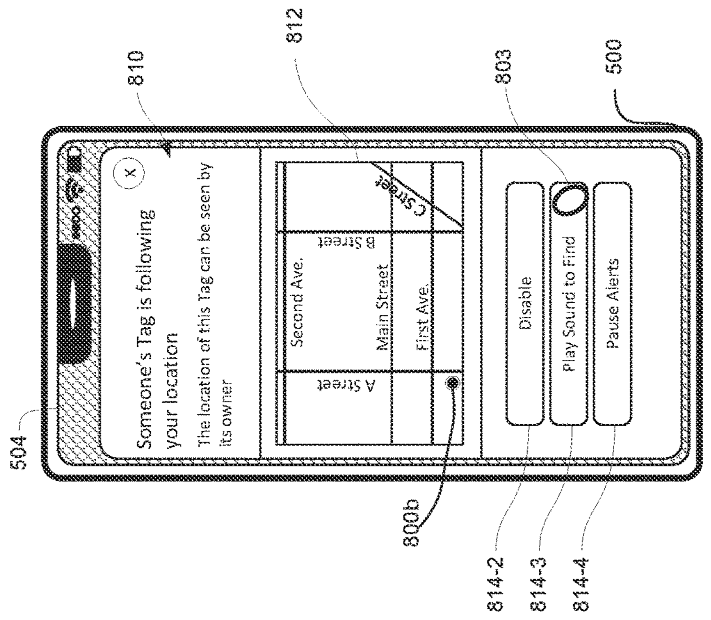
Figure 9A:
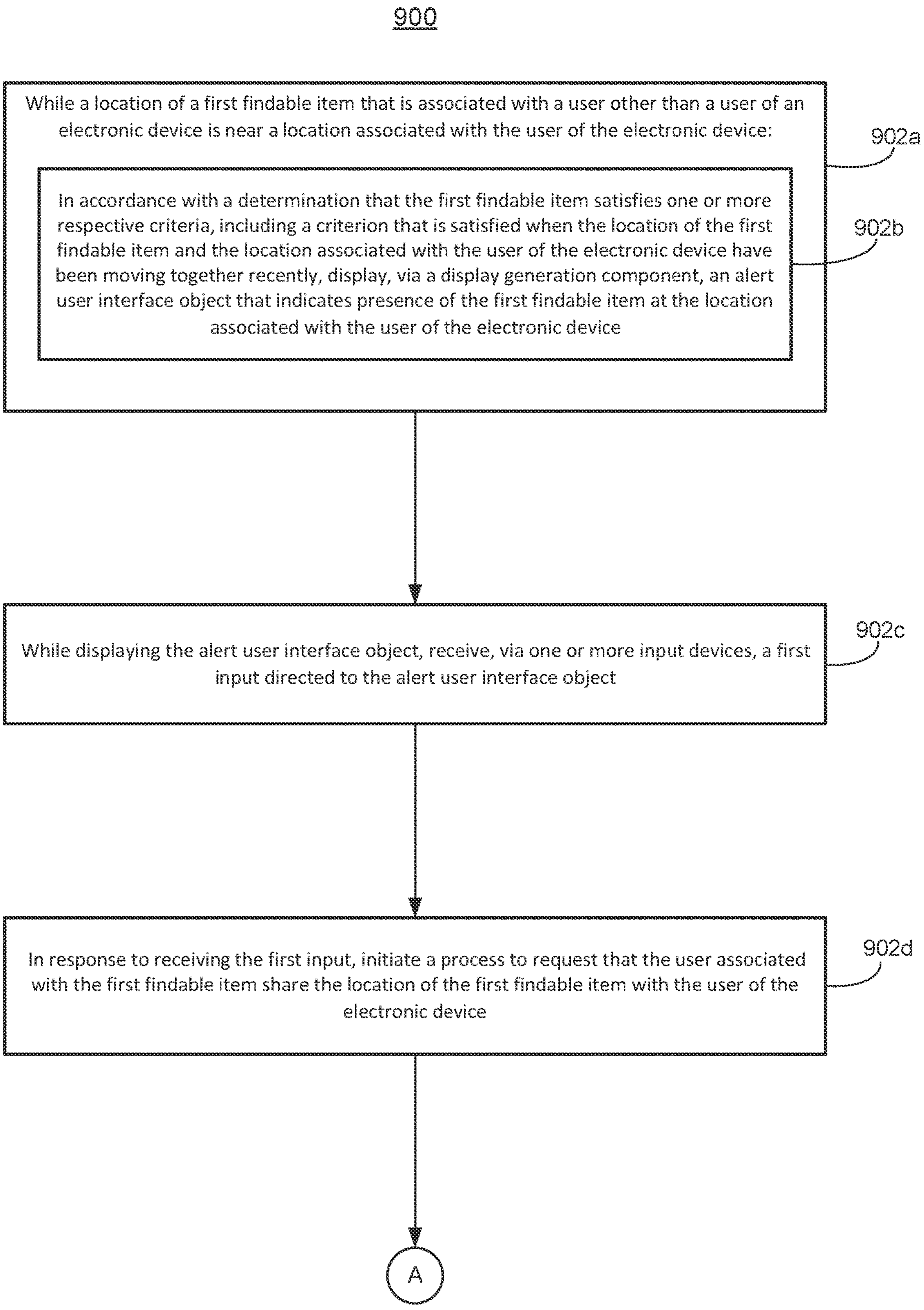
FIGS. 9A-9E are flow diagrams illustrating a method of displaying notifications of tracking by an unknown remote locator object in accordance with some embodiments of the disclosure.
Figure 9B:
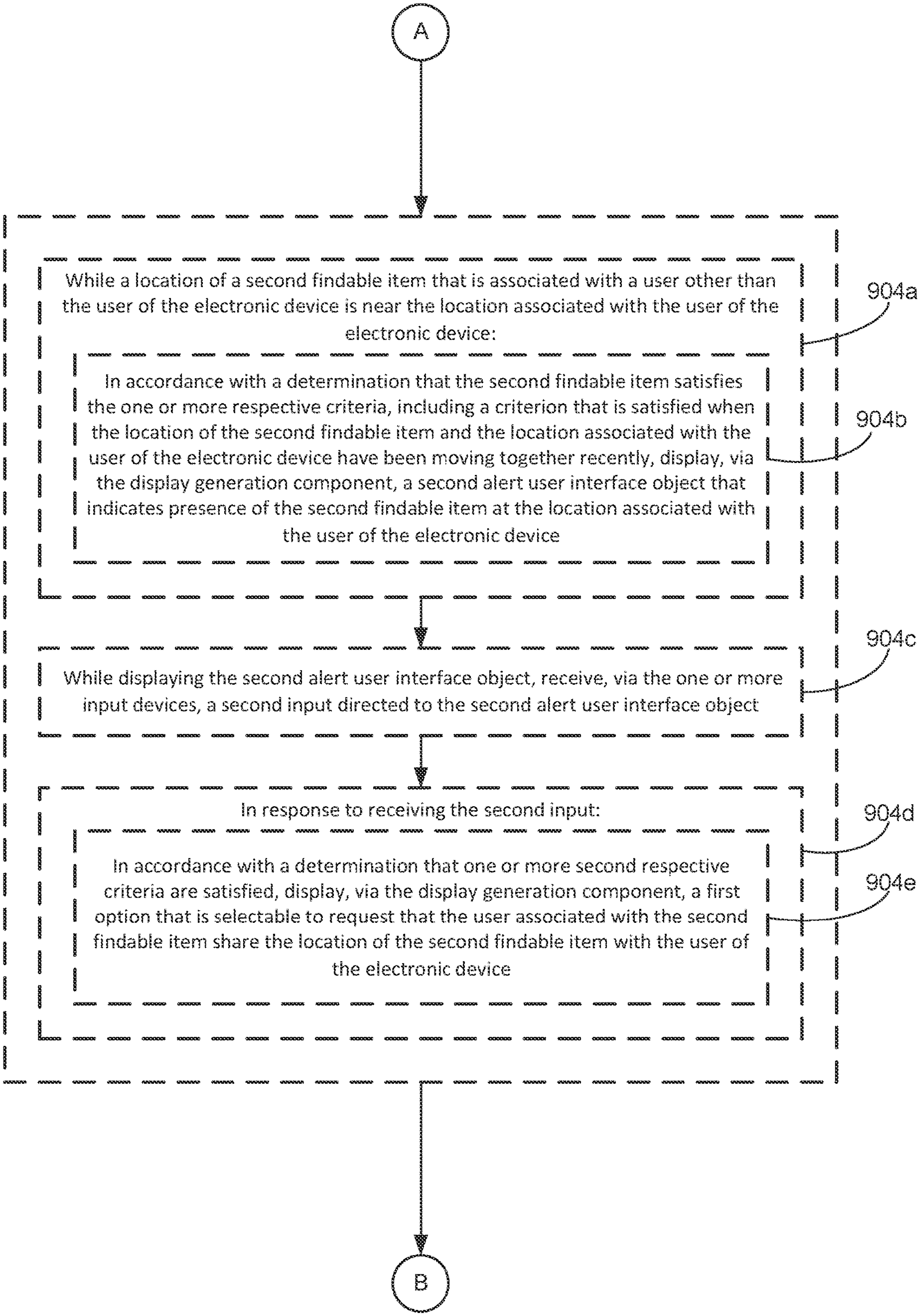
Figure 9C:
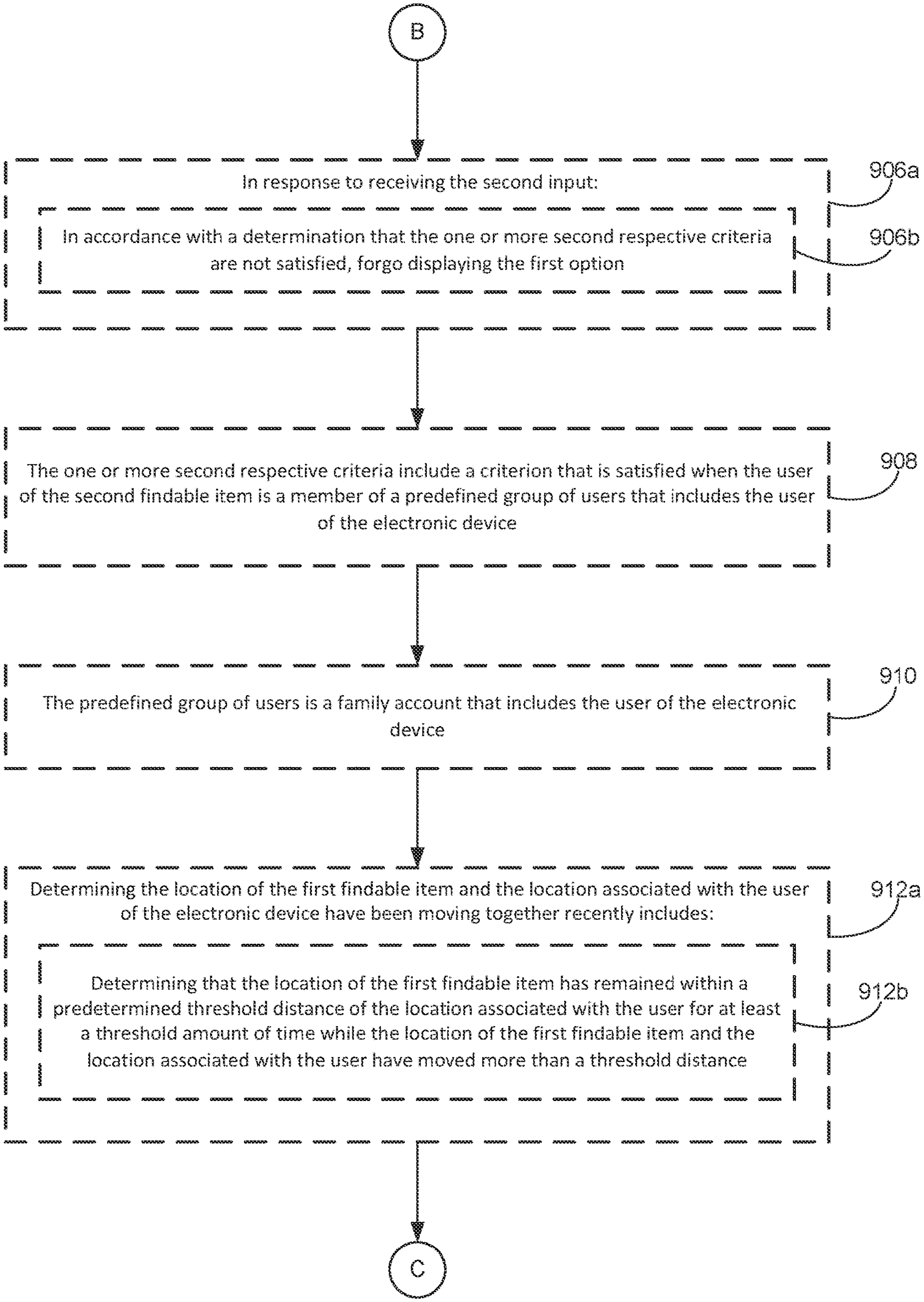
Figure 9D:
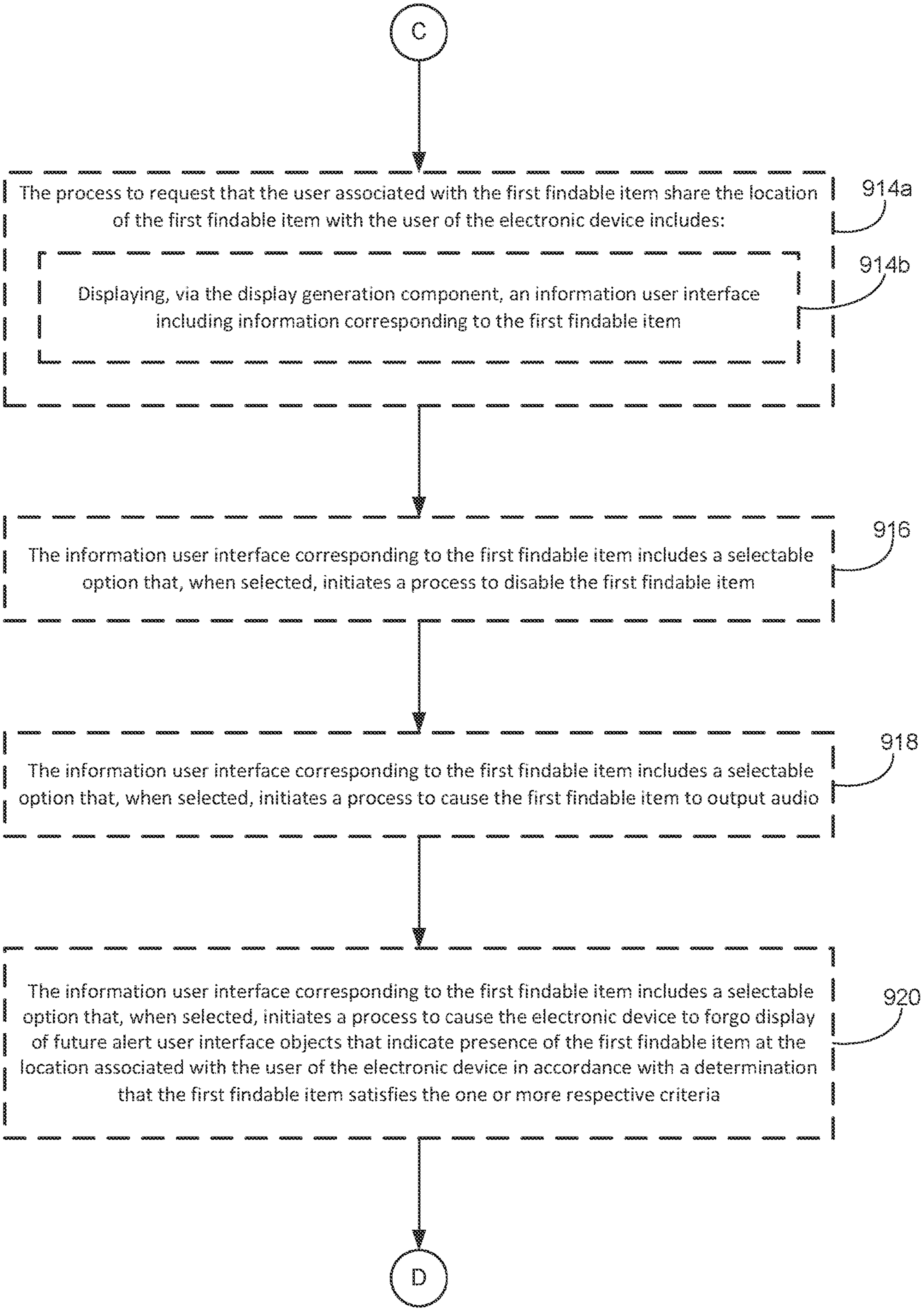
Figure 9E:
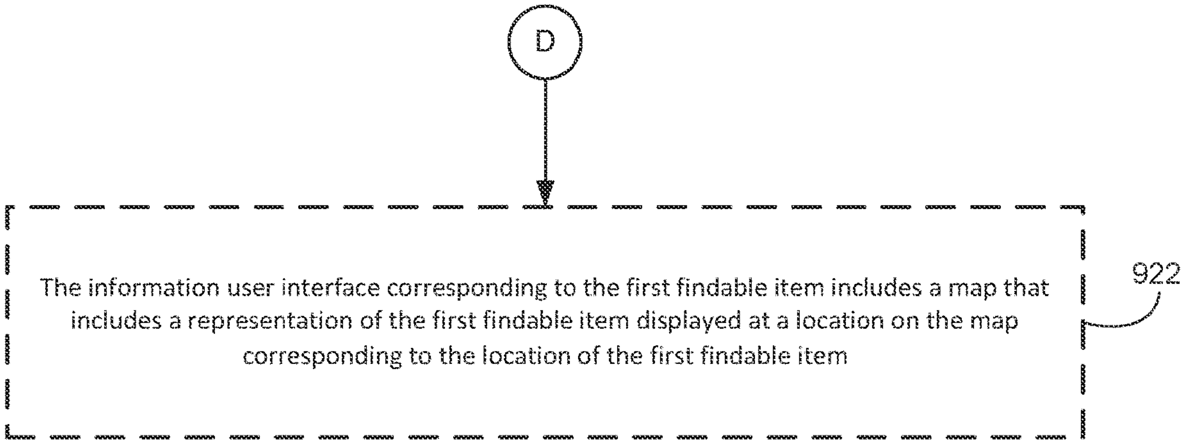

Alternatively, in FIG. 8M, the electronic device 500 receives user input 803 selecting the play sound option 814-3 in the information user interface 810. In some embodiments, in response to receiving the user input, electronic device 500 displays user interface 850, as shown in FIG. 8N. In some embodiments, user interface 850 displays a representation 852 of the second remote locator object (e.g., similar to representation 842 shown in FIG. 8L and/or representation 832 shown in FIG. 8F). In some embodiments, as similarly described above with reference to FIG. 8E, the electronic device 500 causes the second remote locator object 800*b* to emit an audible sound that allows the user of the electronic device to locate the second remote locator object 800*b*, as shown in FIG. 8N. As shown in FIG. 8N, the user interface 850 also includes selectable options 854-855. In some embodiments, selection of selectable option 855 causes the second remote locator object 800*b* to emit an audible sound a second time (e.g., and/or a third time, a fourth time, or a fifth time). Selection of selectable option 854 optionally causes electronic device 500 to cease displaying user interface 850 (e.g., and redisplay information user interface 810 of FIG. 8M).

FIGS. 9A-9E are flow diagrams illustrating a method 900 of displaying notifications of tracking by an unknown remote locator object in accordance with some embodiments of the disclosure, such as in FIGS. 8A-8N. The method 900 is optionally performed at an electronic device such as device 100, device 300, device 500 as described above with reference to FIGS. 1A-1B, 2-3, 4A-4B and 5A-5H. Some operations in method 900 are, optionally combined and/or order of some operations is, optionally, changed.

As described below, the method 900 provides ways to display notifications of tracking by an unknown remote locator object. The method reduces the cognitive burden on a user when interaction with a user interface of the device of the disclosure, thereby creating a more efficient human-machine interface. For battery-operated electronic devices, increasing the efficiency of the user's interaction with the user interface conserves power and increases the time between battery charges.

In some embodiments, method 900 is performed at an electronic device (e.g., electronic device 500) in communication with one or more wireless antenna, a display generation component (e.g., touch screen display 504), and one or more input devices. For example, the electronic device is a mobile device (e.g., a tablet, a smartphone, a media player, or a wearable device) including a touch screen and wireless communication circuitry, or a computer including one or more of a keyboard, mouse, trackpad, and touch screen and wireless communication circuitry. In some embodiments, the one or more wireless antenna have one or more characteristics of the one or more wireless antenna in method 700. In some embodiments, the display generation component has one or more characteristics of the display generation component in method 700. In some embodiments, the one or more input devices have one or more characteristics of the one or more input devices in method 700.

In some embodiments, while a location of a first findable item (e.g., a remote locator object), such as first remote locator object 800*a* in FIG. 8A, that is associated with a user other than a user of the electronic device is near a location associated with the user of the electronic device (902*a*), as shown in the map view 820 in FIG. 8A, in accordance with a determination that the first findable item satisfies one or more respective criteria, including a criterion that is satisfied when the location of the first findable item and the location associated with the user of the electronic device have been moving together recently (e.g., while the location of the first findable item is within a threshold distance (e.g., 0.1, 0.2, 0.5, 0.8, 1, 1.2, 1.5, 2, 5, 10, 20 or 40 m) of the current location of the electronic device), as shown in the map views 820 in FIGS. 8B-8C, the electronic device displays (902*b*), via the display generation component, an alert user interface object that indicates presence of the first findable item at the location associated with the user of the electronic device, such as display of notification of tracking 802 as shown in FIG. 8D. In some embodiments, the first findable item is a device with a battery, one or more wireless antenna and a processor that enables the device to function as a remote locator object when associated with another physical object associated with the user other than the user of the electronic device (e.g., wallet, purse, backpack, suitcase, car, or a set of keys). In some embodiments, the first findable item is configured to transmit location data of the first findable item to the electronic device (e.g., wirelessly, such as over Bluetooth, RF, IR, NFC, and/or Wi-Fi). In some embodiments, the first findable item is associated with a name or label that is identifiable on an electronic device (e.g., the electronic device and/or a second electronic device of the user associated with (e.g., owning) the first findable item). In some embodiments, the first findable item has one or more characteristics of the findable items in method 700. In some embodiments, the electronic device does not have access to the location of the first findable item, such that the electronic device is unable to display information associated with the location of the first findable item on the electronic device. For example, the user of the electronic device is unable to (e.g., via an item finding application running on the electronic device) actively access the information associated with the location of the first findable item, including viewing the location of the first findable item in a user interface (e.g., a map user interface) of the item finding application. In some embodiments, the item finding application has one or more characteristics of the item finding application in method 700. In some embodiments, the one or more respective criteria are satisfied when electronic device detects that the user of the electronic device (and/or the electronic device) and the first findable item have recently (e.g., within the past 1 minute, 3 minutes, 5 minutes, 10 minutes, 15 minutes, 25 minutes, 30 minutes, 1 hour, 3 hours, or 5 hours) been within the threshold distance of each other and have moved together (e.g., moved while not becoming farther than the threshold distance apart) a certain distance (e.g., 1, 2, 5, 10, 15, 20, 30, 35, or 40 m) and/or have not been stationary for at least a second threshold amount of time (e.g., 1 minute, 5 minutes, 15 minutes, 30 minutes, 1 hour, or 2 hours).

In some embodiments, the one or more respective criteria are satisfied when the electronic device detects that the first findable item has moved with the electronic device more than the certain distance. In some embodiments, the first findable item is in communication with the electronic device, such that the electronic device detects that the location of the first findable item has moved with the location associated with the electronic device recently. In some embodiments, in response to detecting that the first findable item and the user of the electronic device (and/or the electronic device) have been moving together recently, the electronic device displays and/or generates a notification or visual alert indicating that the first findable item has been moving with the user of the electronic device recently and/or that the first findable item is not associated with the user of the electronic device. In some embodiments, the alert user interface object is displayed on a home screen (e.g., such as described with reference to FIG. 4A) or a lock screen of the electronic device. In some embodiments, the display of the alert user interface object is accompanied by audible (e.g., ring or chime) and/or haptic (e.g., vibration) feedback.

In some embodiments, while displaying the alert user interface object, the electronic device receives (902*c*), via the one or more input devices, a first input directed to the alert user interface object (e.g., corresponding to selection of the alert user interface object), such as selection input 803 directed to the notification 802 as shown in FIG. 8D. For example, the electronic device receives a tap input, a click input (e.g., via a mouse or trackpad in communication with the electronic device), and/or a hover input (e.g., in which a hand of the user is maintained above the a portion of the electronic device, such as the display generation component, and/or provides a pinch gesture (e.g., in which the index finger and thumb of the hand of the user make contact)) on a location of the display generation component that is associated with the displayed alert user interface object (e.g., that is displaying the alert user interface object).

In some embodiments, in response to receiving the first input, the electronic device initiates (902*d*) a process to request that the user associated with the first findable item share the location of the first findable item with the user of the electronic device, such as display of information user interface 810 including request sharing option 814-1 as shown in FIG. 8E. For example, the electronic device displays, via the display generation component, a user interface associated with requesting that the user associated with the first findable item share the location of the first findable item with the user of the electronic device (e.g., make the location of the first findable item accessible to the electronic device such that the electronic device is able to display one or more user interfaces that display information about the location of the first findable item, as will be described in more detail below). In some embodiments, sharing the location of the first findable item with the user of the electronic device includes making the location of the first findable item accessible to a plurality of electronic devices associated with the user of the electronic device (e.g., a plurality of electronic devices associated with a user account of the user that the different devices are signed into). For example, the plurality of electronic devices are able to display the one or more user interfaces that display information about the location of the first findable item. In some embodiments, the user interface includes information associated with the first findable item, such as a name or label associated with the first findable item, and/or a current location or most recent known location of the first findable item (e.g., on a map user interface). In some embodiments, as described below, the user interface includes one or more options that are selectable to cause one or more corresponding operations involving the first findable item to be performed, including requesting the sharing of the location of the first findable item with the user of the electronic device. In some embodiments, in response to receiving an input directed to the option to request the sharing, the user associated with the first findable item receives, at a second electronic device, a notification corresponding to the request to share the location of the first findable item with the user of the electronic device. In some embodiments, in response to receiving the input directed to the option to request the sharing, the electronic device ceases display of the user interface. In some embodiments, if the user associated with the first findable item approves the request from the electronic device to share the location of the first findable item with the electronic device, the electronic device forgoes (optionally any) future generation of the alert user interface object so long as the location of the first findable item is shared with the user of the electronic device even when the electronic device detects that the first findable item has been moving with the electronic device recently. In some embodiments, if the location of the first findable item is shared with the user of the electronic device, the location of the first findable item is viewable in a user interface of an item locating application, such as the item locating application discussed above. Generating an alert at an electronic device when a location associated with a user of the electronic device and a location of a findable item associated with a different user have been moving together recently facilitates discovery that the user of the electronic device is in possession of the findable item and/or reduces the inputs needed to request that the location of the findable item be shared with the user of the electronic device, thereby improving user-device interaction.

In some embodiments, while a location of a second findable item (e.g., a second remote locator object), such as second remote locator object 800*b* in FIG. 8G, that is associated with a user other than the user of the electronic device is near the location associated with the user of the electronic device (904*a*), as shown in the map view 820 in FIG. 8G (e.g., while the location of the second findable item is within the threshold distance (e.g., 0.1, 0.2, 0.5, 0.8, 1, 1.2, 1.5, 2, 5, 10, 20 or 40 m) of the current location of the electronic device), in accordance with a determination that the second findable item satisfies the one or more respective criteria, including a criterion that is satisfied when the location of the second findable item and the location associated with the user of the electronic device have been moving together recently, as shown in the map views 820 in FIGS. 8H-8I, the electronic device displays (904*b*), via the display generation component, a second alert user interface object (e.g., notification of tracking 802 in FIG. 8J) that indicates presence of the second findable item at the location associated with the user of the electronic device. In some embodiments, the second findable item is a device with a battery, one or more wireless antenna and a processor that enables the device to function as a remote locator object when associated with another physical object associated with the user other than the user of the electronic device (e.g., wallet, purse, backpack, suitcase, car, and/or a set of keys). In some embodiments, the second findable item is configured to transmit location data of the second findable item to the electronic device (e.g., wirelessly, such as over Bluetooth, RF, IR, NFC, and/or Wi-Fi). In some embodiments, the second findable item is associated with a name or label that is identifiable on an electronic device (e.g., the electronic device and/or a second electronic device of the user associated with (e.g., owning) the second findable item). In some embodiments, the second findable item has one or more characteristics of the first findable item described herein. In some embodiments, the electronic device does not have access to the location of the second findable item, such that the electronic device is unable to display information associated with the location of the second findable item on the electronic device. For example, the user of the electronic device is unable to (e.g., via an item finding application running on the electronic device) actively access the information associated with the location of the second findable item, including viewing the location of the second findable item in a user interface (e.g., a map user interface) of the item finding application. In some embodiments, the one or more respective criteria are satisfied when the electronic device detects that the user of the electronic device (and/or the electronic device) and the second findable item have recently been within the threshold distance of each other and have moved together (e.g., moved while not becoming farther than the threshold distance apart) a certain distance and/or have not been stationary for at least a second threshold amount of time, as similarly described above with reference to the first findable item. In some embodiments, the second findable item is in communication with the electronic device, such that the electronic device detects that the location of the first findable item has moved with the location associated with the electronic device recently. In some embodiments, in response to detecting that the second findable item and the user of the electronic device (and/or the electronic device) have been moving together recently, the electronic device displays and/or generates a second notification or second visual alert indicating that the second findable item has been moving with the user of the electronic device recently and/or that the second findable item is not associated with the user of the electronic device, as similarly described above with reference to the first findable item.

In some embodiments, while displaying the second alert user interface object, the electronic device receives (904*c*), via the one or more input devices, a second input directed to the second alert user interface object, such as selection input 803 directed to the notification 802 as shown in FIG. 8J. In some embodiments, the second input corresponds to selection of the second alert user interface object. For example, the electronic device receives a tap input, a click input (e.g., via a mouse or trackpad in communication with the electronic device), and/or a hover input (e.g., in which a hand of the user is maintained above the a portion of the electronic device, such as the display generation component, and/or provides a pinch gesture (e.g., in which the index finger and thumb of the hand of the user make contact)) on a location of the display generation component that is associated with the displayed second alert user interface object (e.g., that is displaying the second alert user interface object).

In some embodiments, in response to receiving the second input (904*d*), in accordance with a determination that one or more second respective criteria are satisfied, the electronic device displays (904*e*), via the display generation component, a first option (e.g., request sharing option 814-1 in FIG. 8E) that is selectable to request that the user associated with the second findable item share the location of the second findable item with the user of the electronic device. For example, in accordance with the determination that the one or more second respective criteria are satisfied, the electronic device displays the first option in a user interface that includes one or more options that are selectable to cause one or more corresponding operations involving the second findable item to be performed. In some embodiments, sharing the location of the second findable item with the user of the electronic device includes making the location of the second findable item accessible to a plurality of electronic devices associated with the user of the electronic device (e.g., a plurality of electronic devices associated with a user account of the user that the different devices are signed into). In some embodiments, the user interface includes information associated with the second findable item, such as a name or label associated with the second findable item, and/or a current location or most recent known location of the second findable item (e.g., on a map user interface). In some embodiments, the first option is displayed within the second alert user interface object, as similarly described above. In some embodiments, in response to receiving an input directed to the first option to request the sharing, the user associated with the second findable item receives, at a second electronic device, a notification corresponding to the request to share the location of the second findable item with the user of the electronic device. In some embodiments, if the user associated with the second findable item approves the request from the electronic device to share the location of the second findable item with the electronic device, the electronic device forgoes (optionally any) future generation of the second alert user interface object so long as the location of the second findable item is shared with the user of the electronic device even when the electronic device detects that the second findable item has been moving with the electronic device recently, as similarly described above. Displaying a selectable option, at an electronic device, that is selectable to request that a location of a findable item be shared with a user of the electronic device when respective criteria are satisfied reduces the inputs needed to request that the location of the findable item be shared with the user of the electronic device, thereby improving user-device interaction.

In some embodiments, in response to receiving the second input (906*a*), in accordance with a determination that the one or more second respective criteria are not satisfied, the electronic device forgoes (906*b*) displaying the first option, such as forgoing display of request sharing option 814-1 in information user interface 810 as shown in FIG. 8K. For example, the electronic device does not display the first option that is selectable to request that the user associated with the second findable item share the location of the second findable item with the user of the electronic device. In some embodiments, as discussed below, the one or more second respective criteria are not satisfied when the user of the electronic device and the user associated with the second findable item are not members of a same predefined group of users. For example, as discussed below, the one or more second respective criteria are not satisfied because the user associated with the second findable item is not known to the user of the electronic device (e.g., the user associated with the second findable item is not a member of a family account that includes the user of the electronic device). In some embodiments, in accordance with the determination that the one or more second respective criteria are not satisfied, the electronic device displays one or more options, excluding the first option, that are selectable to cause one or more corresponding operations involving the second findable item to be performed. For example, as discussed in more detail below, in response to receiving the second input directed to the second alert user interface object, the electronic device displays an information user interface including information corresponding to the second findable item. For example, the information user interface includes a name and/or representation associated with the second findable item. In some embodiments, the information user interface includes an option that is selectable to initiate a process to disable the second findable item, an option that is selectable to initiate a process to generate a sound from the second findable item, and/or an option that is selectable to initiate a process to forgo future generation of alert user interface object when the second findable item satisfies the one or more respective criteria, as similarly described below. In some embodiments, the one or more selectable options are displayed in the information user interface with a map that indicates a location of the second findable item and/or a location of the electronic device, as similarly described below. Forgoing display of a selectable option, at an electronic device, that is selectable to request that a location of a findable item be shared with a user of the electronic device when respective criteria are not satisfied limits the ability to request sharing to users who satisfy the respective criteria, which avoids repetitive and/or unwanted transmission of share requests to the user associated with the findable item, and provides privacy and security benefits to the user associated with the findable item.

In some embodiments, the one or more second respective criteria include a criterion that is satisfied when the user of the second findable item is a member of a predefined group of users that includes the user of the electronic device (908), as described with reference to FIG. 8E. For example, the one or more second respective criteria are satisfied when the user (e.g., the owner) of the second findable item and the user of the electronic device are both members of the predefined group of users. In some embodiments, the one or more second respective criteria are not satisfied if the user of the second findable item and the user of the electronic device are not both members of the predefined group of members. In some embodiments, the user of the second findable item and the user of the electronic device are known to be members of the predefined group of members (e.g., relative to the electronic device) based on a shared affiliation, such as a shared account, as described below. Selectively displaying a selectable option, at an electronic device, that is selectable to request that a location of a findable item be shared with a user of the electronic device based on whether a user of the findable item and the user of the electronic device are members of a predefined group of members limits the ability to request sharing to users who belong to the predefined group, which avoids repetitive and/or unwanted transmission of share requests to the user of the findable item, and/or reduces the number of inputs needed to request that the location of the findable item be shared with other members of the predefined group, and provides privacy and security benefits to the user of the findable item.

In some embodiments, the predefined group of users is a family account that includes the user of the electronic device (910), as indicated in the top region of information user interface 810 in FIG. 8E. For example, the user of the second finable item and the user of the electronic device are both members of a family account. In some embodiments, members of a family account have access to one or more aspects of other members in the family account, such as content (e.g., movie, book, and/or television show) purchases, and optionally have access to the same purchase account (e.g., credit card account) for purchasing content via the family account. In some embodiments, the user of the second findable item and the user of the electronic device both have access to a shared account (e.g., which the second findable item and the electronic device are optionally signed into and/or registered with). In some embodiments, another user (e.g., different from the user of the electronic device) who is also a member of the family account would receive an alert user interface object indicating that the second findable item and an electronic device of the other user have been moving together recently if the other user were (e.g., unknowingly) in possession of the second findable item, as similarly discussed above. Selectively displaying a selectable option, at an electronic device, that is selectable to request that a location of a findable item be shared with a user of the electronic device based on whether a user of the findable item and the user of the electronic device are members of a family account limits the ability to request sharing to users who belong to the family account, which avoids repetitive and/or unwanted transmission of share requests to the user of the findable item, and/or reduces the number of inputs needed to request that the location of the findable item be shared with other members of the family account, and provides privacy and security benefits to the user of the findable item.

In some embodiments, determining the location of the first findable item and the location associated with the user of the electronic device have been moving together recently includes (912*a*) determining that the location of the first findable item has remained within a predetermined threshold distance (e.g., 0.1, 0.2, 0.5, 0.8, 1, 1.2, 1.5, 2, 5, 10, 20 or 40 m) of the location associated with the user for at least a threshold amount of time (e.g., within the past 1 minute, 3 minutes, 5 minutes, 10 minutes, 15 minutes, 25 minutes, 30 minutes, 1 hour, 3 hours, or 5 hours), as represented by timer 801 in FIG. 8D, while the location of the first findable item and the location associated with the user have moved more than a threshold distance (912*b*) (e.g., 1, 5, 10, 20, 40, 50, 100, 200, or 500 m, or 1, 2, 5, or 10 km), as shown in the map views 820 in FIGS. 8A-8D. Thus, in some embodiments, determining that the location of the first findable item and the location associated with the user of the electronic device have been moving together includes evaluating a two-part test for triggering the alert user interface object to notify the user that the first findable item is able to track the user's location. In some embodiments, the first part of the test determines whether the first findable item is actually physically following the user of the electronic device and the second part of the test determines, after determining that the first findable item is actually physically following the user, that the first findable item remains following the user for the threshold amount of time. In some embodiments, the first part of the test determines whether the first findable item remains with the user for the threshold amount of time and the second part of the test determines, after determining that the first findable item remains with the user for the threshold amount of time, whether the first findable item is actually physically following the user (e.g., whether the first findable item and the electronic device have moved more than the threshold distance). In some embodiments, the electronic device periodically polls the first findable item to determine whether the first findable item is still within the predetermined threshold distance of the electronic device. In some embodiments, the second part of the test is satisfied if the first findable item is still within the predetermined threshold distance of the electronic device for a threshold number of polls (e.g., 2 polls, 4 polls, or 10 polls). For example, the electronic device polls the first findable item (optionally polls for any object near the electronic device) every 2 hours and if the same findable item is found to be within the predetermined threshold distance of the electronic device after four polls (e.g., after 8 hours), then the second part of the test is satisfied. Generating an alert at an electronic device when a location associated with a user of the electronic device and a location of a findable item associated with a different user have been moving together recently facilitates discovery that the user of the electronic device is in possession of the findable item, thereby improving user-device interaction, and provides a quick and efficient way of alerting the user of a potential unauthorized tracking, which further provides privacy and security benefits to the user by alerting the user of potential unauthorized tracking.

In some embodiments, the process to request that the user associated with the first findable item share the location of the first findable item with the user of the electronic device includes (914*a*) displaying, via the display generation component, an information user interface (e.g., information user interface 810 in FIG. 8E) including information corresponding to the first findable item (914*b*). For example, in response to receiving a selection of the alert user interface object, the electronic device displays an information user interface (e.g., and optionally ceases display of the alert user interface object). In some embodiments, the information user interface includes identifying information corresponding to the first findable item, such as a name associated with the first findable item (e.g., a name assigned to the first findable item by the user associated with the first findable item), a representation (e.g., an image or rendering) of the first findable item, and/or information corresponding to the user associated with the first findable item (e.g., a name, phone number, and/or email associated with the user). In some embodiments, as described below, the information user interface includes one or more selectable options that are selectable to cause one or more corresponding processes involving the first findable item to be initiated. In some embodiments, as described below, the one or more selectable options are displayed in the information user interface with a map that indicates a current location of the first findable item (e.g., relative to the electronic device) and optionally a current location of the electronic device. For example, the map includes a representation of the first findable item and/or a representation of the electronic device that are displayed at locations corresponding to the locations of the first findable item and/or the electronic device, respectively. Displaying an information user interface including information corresponding to a findable item at an electronic device when a location associated with a user of the electronic device and a location of the findable item associated with a different user have been moving together recently facilitates user input for interacting with the findable item and/or facilitates learning additional information about the findable item, thereby improving user-device interaction.

In some embodiments, the information user interface corresponding to the first findable item includes a selectable option that, when selected, initiates a process to disable the first findable item (916), such as disable option 814-2 in FIG. 8E. For example, in response to receiving a selection of the selectable option (e.g., a "disable" option), the electronic device presents instructions for dismantling the first findable item and removing or disconnecting a power source such as a battery. In some embodiments, the instructions are presented via text (e.g., displayed via the display generation component), audio (e.g., via a speaker in communication with the electronic device), video or other image-based instructions. In some embodiments, in response to receiving a selection of the selectable option, the electronic device causes the first findable item to power-off, enter a sleep-mode, and/or otherwise prevent the first findable item from reporting its location (e.g., to the owner of the first findable item). Displaying a selectable option, at an electronic device, that is selectable to initiate a process to disable a findable item when a location associated with a user of the electronic device and a location of the findable item associated with a different user have been moving together recently prevents the user associated with the findable item from locating the user of the electronic device, thereby improving device security and increasing user privacy.

In some embodiments, the information user interface corresponding to the first findable item includes a selectable option that, when selected, initiates a process to cause the first findable item to output audio (918), such as play sound option 814-3 in FIG. 8E. For example, in response to receiving a selection of the selectable option (e.g., a "play sound" option), the electronic device communicates with the remote locator object and causes the remote locator object to generate a sound (e.g., output audio, such as a ring, a chime, or other audio, via a speaker in communication with the remote locator object). In some embodiments, causing the remote locator object to generate a sound enables the user of the electronic device to locate and/or obtain the remote locator object. In some embodiments, selection of the selectable option causes the remote locator object to generate the sound a predetermined number of times, for a predetermined duration of time, and/or at a predetermined volume. For example, selection of the selectable option causes the remote locator object to generate a ring or a chime once at a respective volume and for a duration of 0.5, 0.75, 1, 1.5, 2, 3, 4, or 5 seconds. Displaying a selectable option, at an electronic device, that is selectable to initiate a process to cause a findable item to generate a sound when a location associated with a user of the electronic device and a location of the findable item associated with a different user have been moving together recently enables the user of the electronic device to locate the findable item and/or facilitates user input for returning the findable item to the user associated with the findable item, thereby improving user-device interaction, and increases user privacy and device security.

In some embodiments, the information user interface corresponding to the first findable item includes a selectable option that, when selected, initiates a process to cause the electronic device to forgo display of future alert user interface objects that indicate presence of the first findable item at the location associated with the user of the electronic device in accordance with a determination that the first findable item satisfies the one or more respective criteria (920), such as pause alerts option 814-4 in FIG. 8E. For example, in response to receiving a selection of the selectable option (e.g., "a silence alert" option), the electronic device initiates a process to forgo display of future alert user interface objects in accordance with the determination that the first findable item satisfied the one or more respective criteria (e.g., ignoring the presence of the first findable item that is within the threshold distance (e.g., 0.1, 0.2, 0.5, 0.8, 1, 1.2, 1.5, 2, 5, 10, 20 or 40 m) of the current location of the electronic device). In some embodiments, the electronic device displays (e.g., after selection of the "silence alert" option) one or more selectable options for ignoring the presence of the first findable item for the remainder of the day, for ignoring the presence of the first findable item for a selected period of time (e.g., 5 minutes, 15 minutes, 30 minutes, 1 hour, 3 hours, 5 hours, 2 days, one week, or two weeks), and/or for ignoring the presence of the first findable item indefinitely. Accordingly, in some embodiments, when the electronic device is configured to ignore the presence of the first findable item, the electronic device forgoes displaying the alert user interface object for the duration optionally specified by the user. In some embodiments, even while the electronic device is forgoing display of future alerts that the first findable item meets the one or more respective criteria, the device continues to generate alerts that other findable items (e.g., remote locator objects) meet the one or more respective criteria if other findable items meet the one or more respective criteria (e.g., forgoing display of future alerts applies only to the particular remote locator object for which generation of alerts are paused, and not for other remote locator objects that might meet the one or more respective criteria and have not been ignored). Displaying a selectable option, at an electronic device, that is selectable to initiate a process to forgo display of future alerts that indicate a location associated with a user of the electronic device is proximate to a location of the findable item associated with a different user reduces the frequency of display of the alerts, which reduces battery usage, and enables the user to silence repetitive and/or unwanted display of the alerts, which could otherwise divert attention of the user from more important alerts, thereby improving user privacy.

In some embodiments, the information user interface corresponding to the first findable item includes a map (e.g., map 812 in FIG. 8E) that includes a representation of the first findable item displayed at a location on the map corresponding to the location of the first findable item (922), such as display of representation 800*a* in the map 812 as shown in FIG. 8E. For example, as mentioned above, the electronic device displays, in the information user interface, a map indicating the location of the first remote locator object and optionally indicating the location of the electronic device. In some embodiments, the location of the first findable item is indicated via the display of a representation of the first findable item, an indication (e.g., a dot, rectangle, square, or other shape) corresponding to the first findable item, and/or a label (e.g., a name associated with the first findable item) on the map in the information user interface at a location in the map that corresponds to the location of the first findable item. In some embodiments, if the location of the first findable item changes while the information user interface is displayed (e.g., due to movement of the first findable item), the electronic device updates display of the representation of the first findable item to be at a location on the map that corresponds to the new location of the first findable item. Displaying a representation of a findable item on a map at an electronic device when a location associated with a user of the electronic device and a location of the findable item associated with a different user have been moving together recently facilitates discovery that the user of the electronic device is in possession of the findable item and/or facilitates user input for returning the findable item to the user associated with the findable item, thereby improving user-device interaction, and increases user privacy and device security.

It should be understood that the particular order in which the operations in FIGS. 9A-9E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and/or 1100) are also applicable in an analogous manner to method 900 described above with respect to FIGS. 9A-9E. For example, remote locator objects and/or presenting tracking notifications described above with reference to method 900 optionally have one or more of the characteristics of findable items and/or receiving and/or transmitting invitations for accessing locations of findable items described herein with reference to other methods described herein (e.g., methods 700 and/or 1100). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 9A-9E are, optionally, implemented by components depicted in FIGS. 1A-1B. For example, displaying operations 902*b*, 904*b*, 904*e*, 914*b* and receiving operations 902*c*, 904*c* are optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Sharing Location Information of Findable Items

Users interact with electronic devices in many different manners. In some embodiments, an electronic device is able that a findable item is in close proximity and/or has made contact with the electronic device. In some embodiments, in response to detecting such close proximity and/or contact, the electronic device initiates one or more processes to request authorization for sharing of location information of the findable item. The embodiments described below provide ways in which an electronic device requests, grants, and/or rejects authorization for the sharing of location information associated with accessing locations of findable items, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 10A:
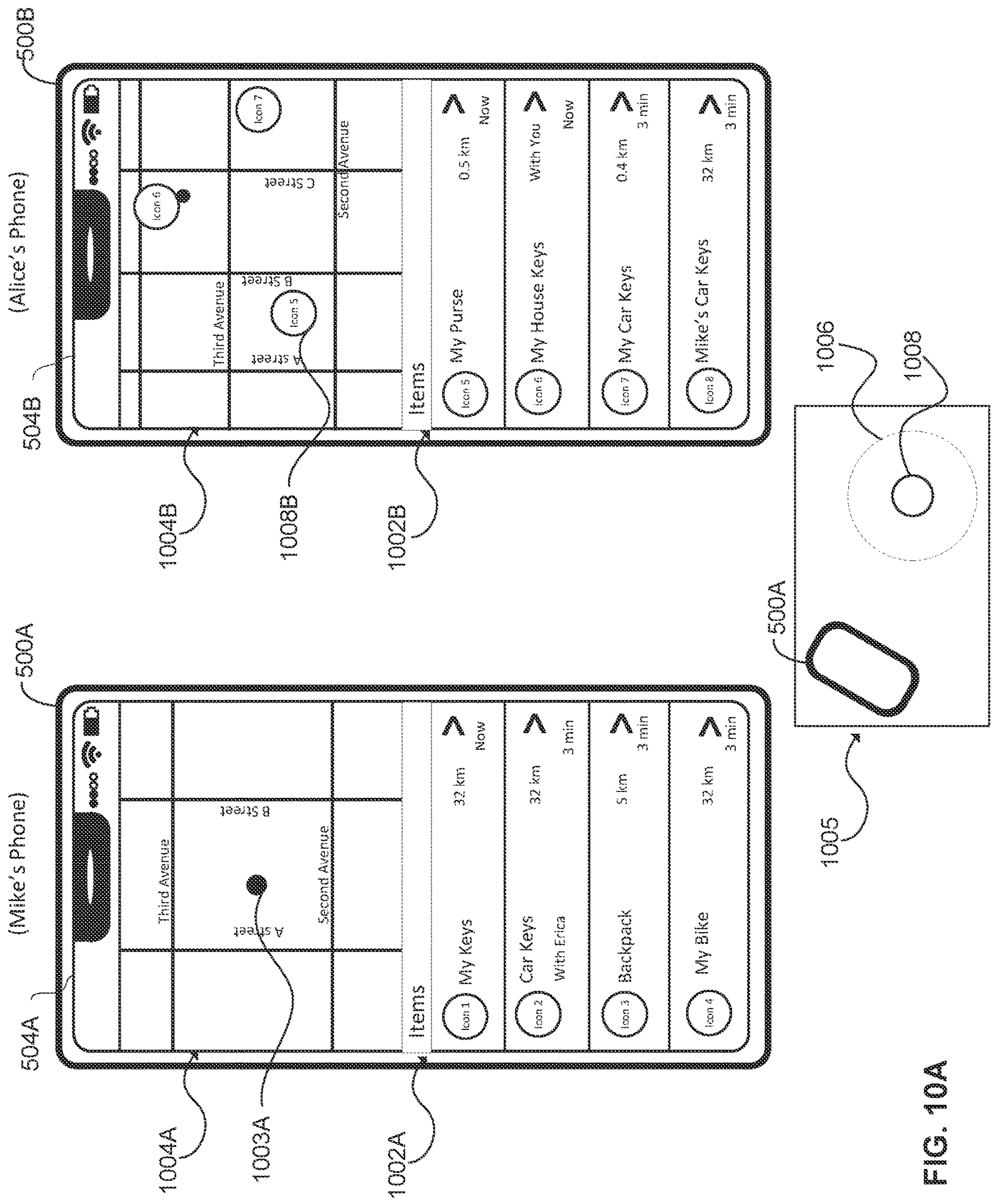
FIGS. 10A-10N illustrate exemplary ways in which an electronic device requests and grants or rejects authorization to obtain location information of findable items in accordance with some embodiments of the disclosure.
Figure 10B:
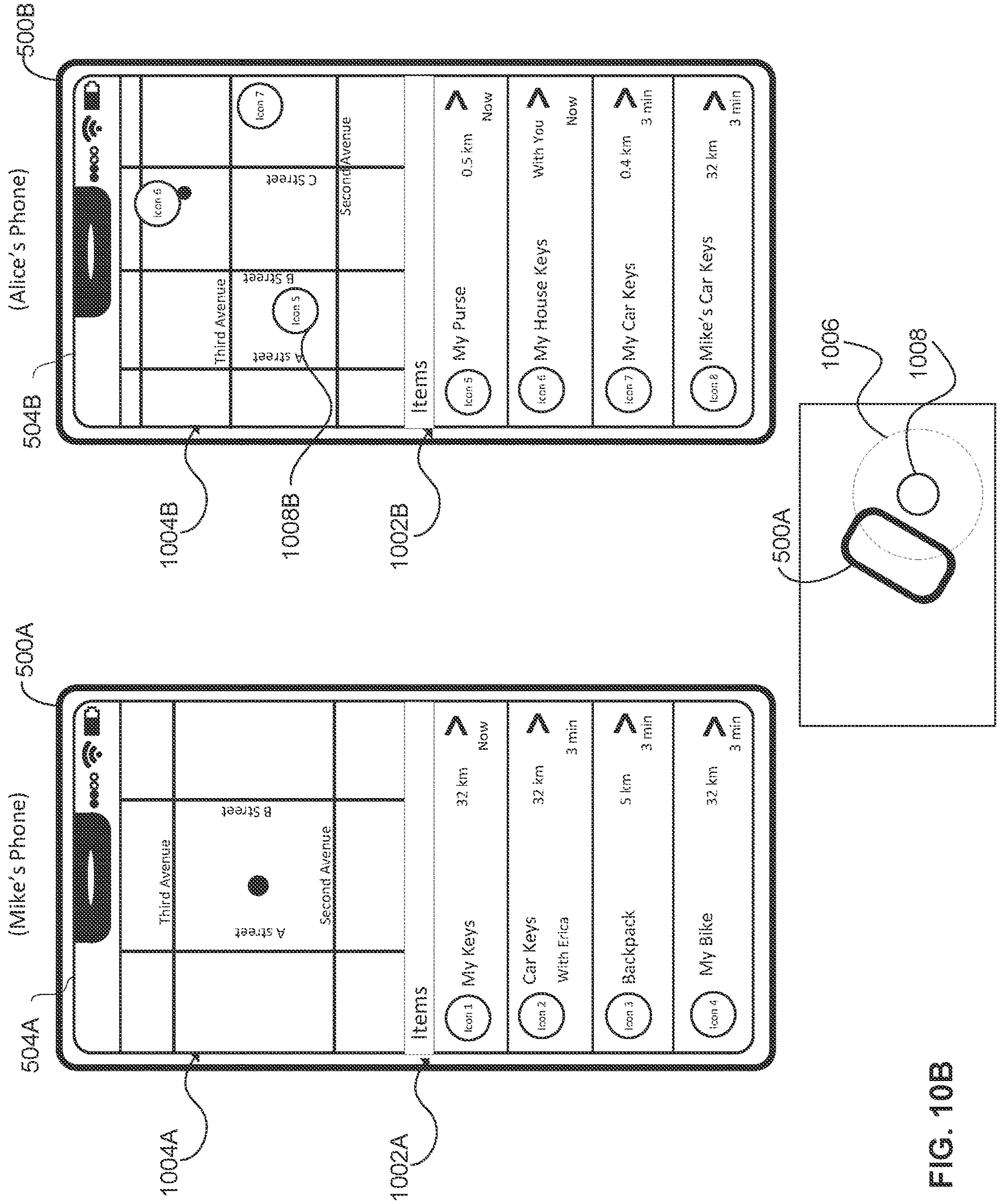
Figure 10C:
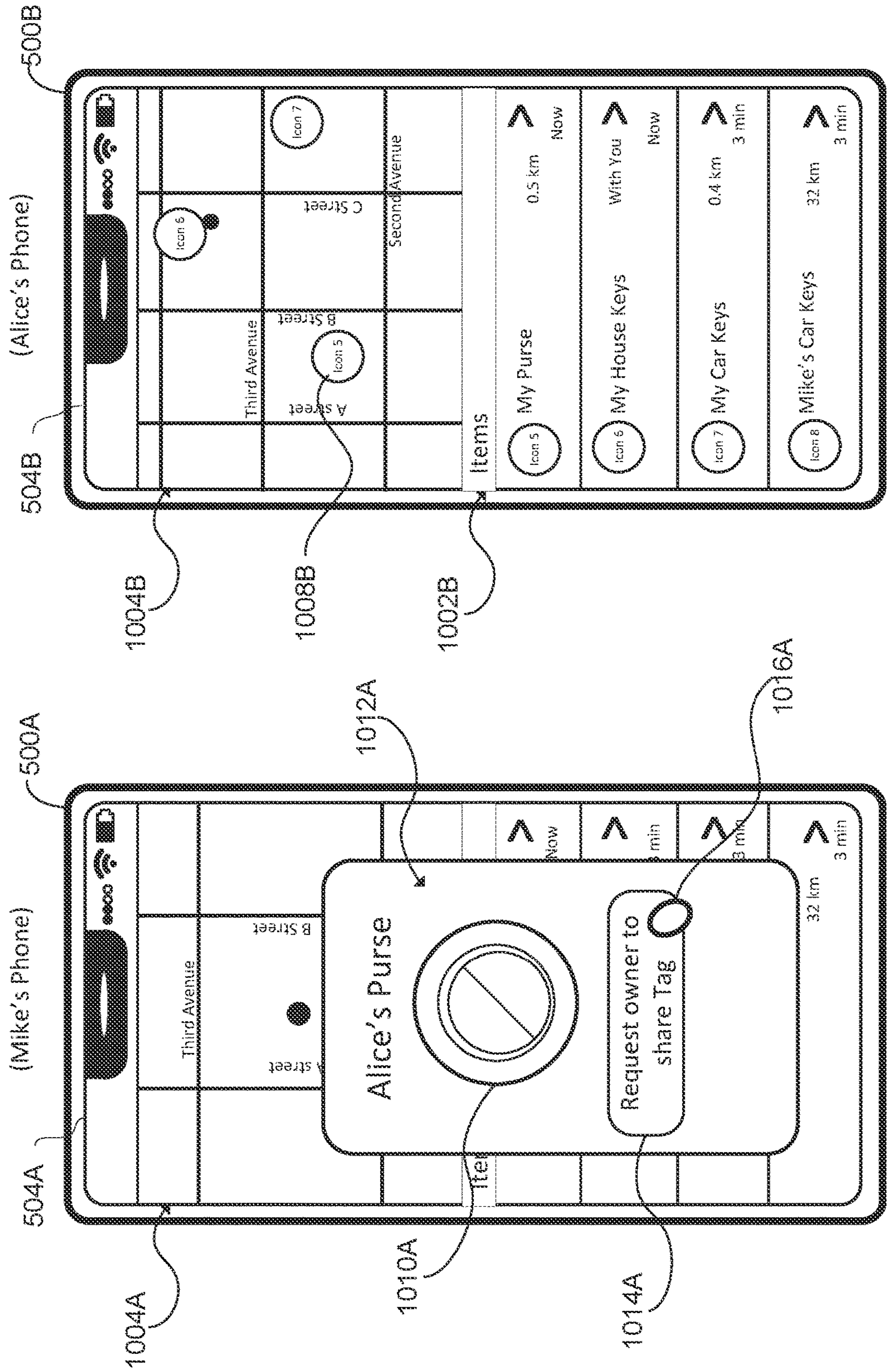
Figure 10D:
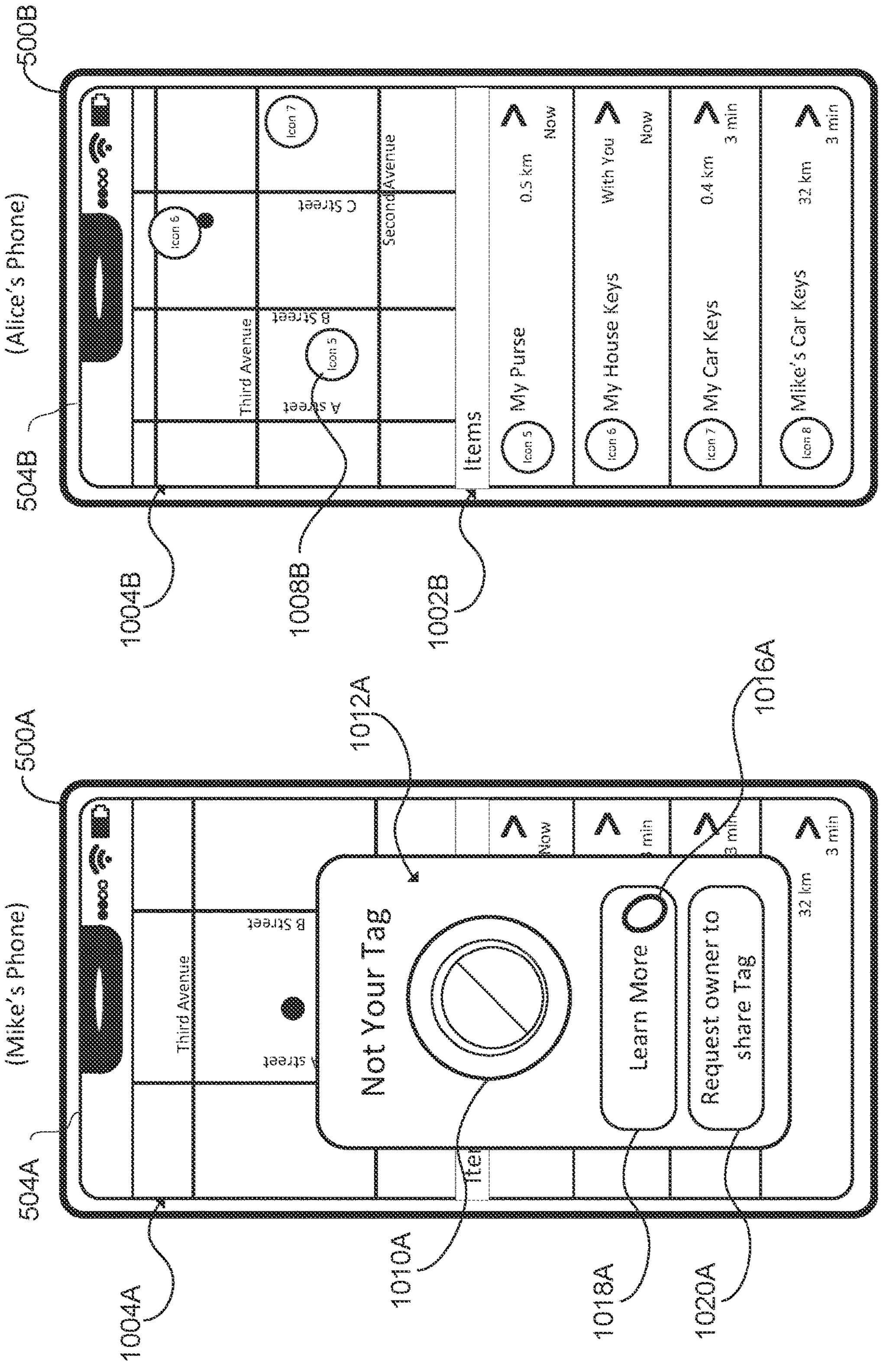
Figure 10E:
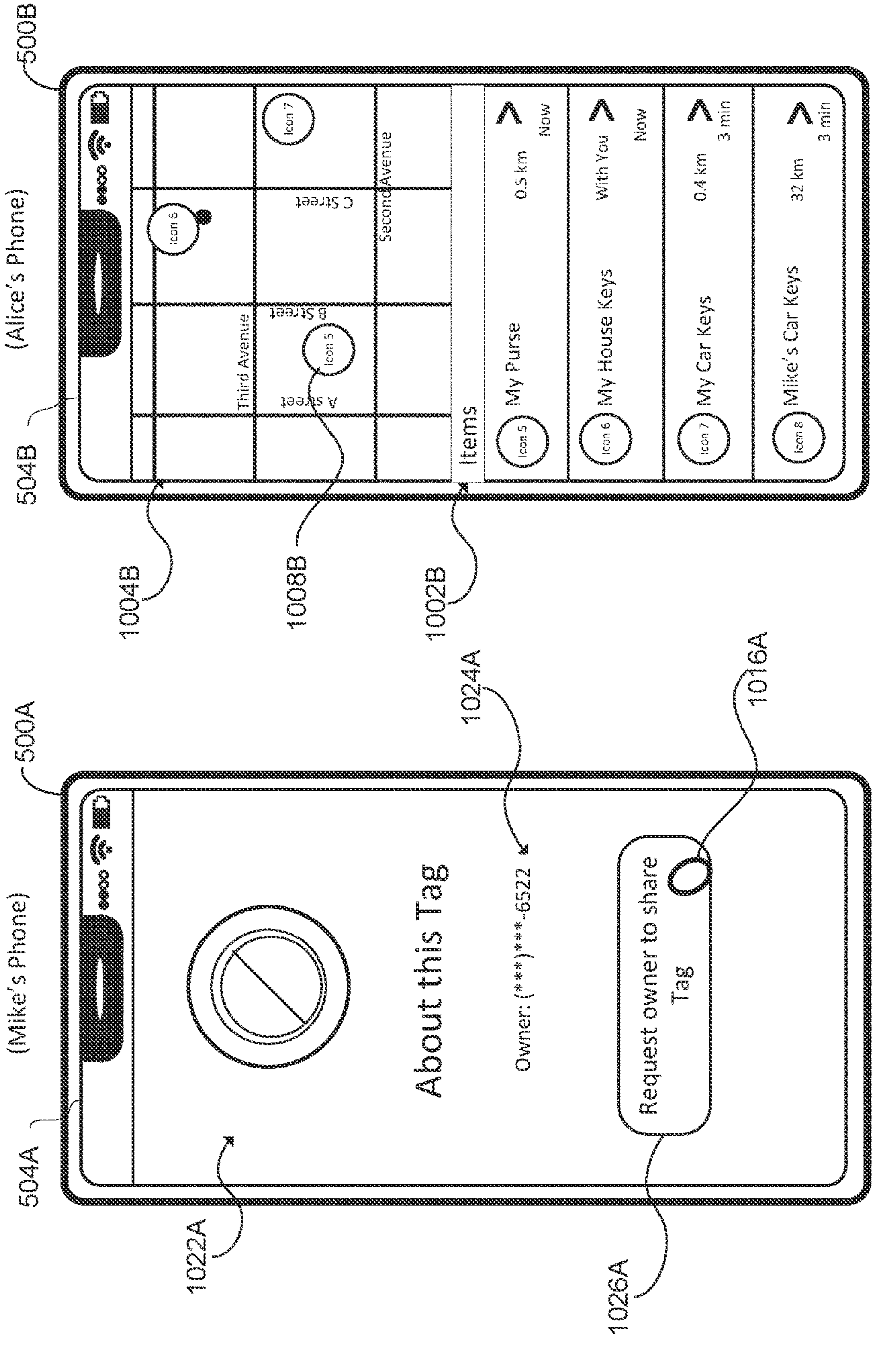
Figure 10F:
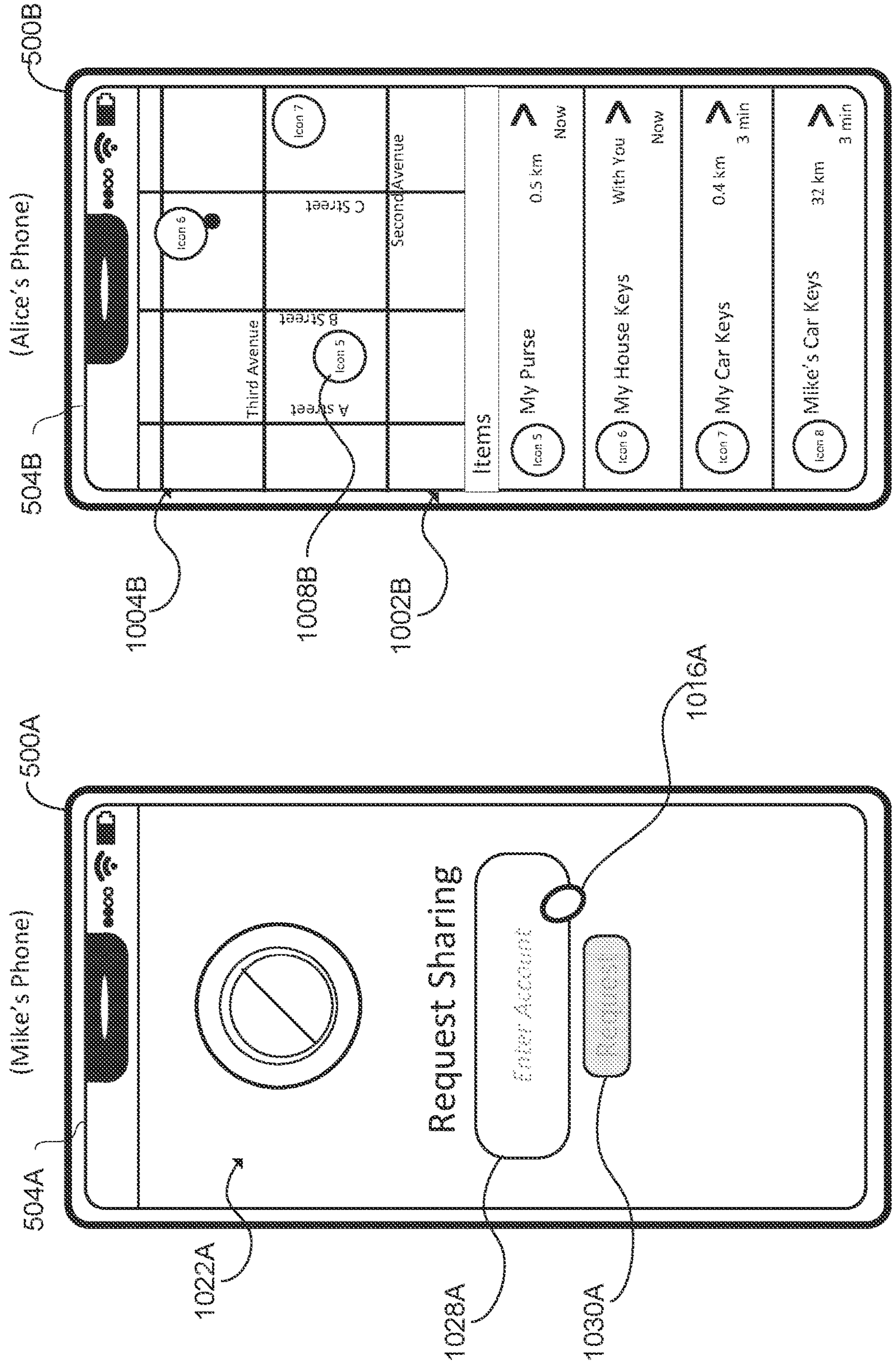
Figure 10G:
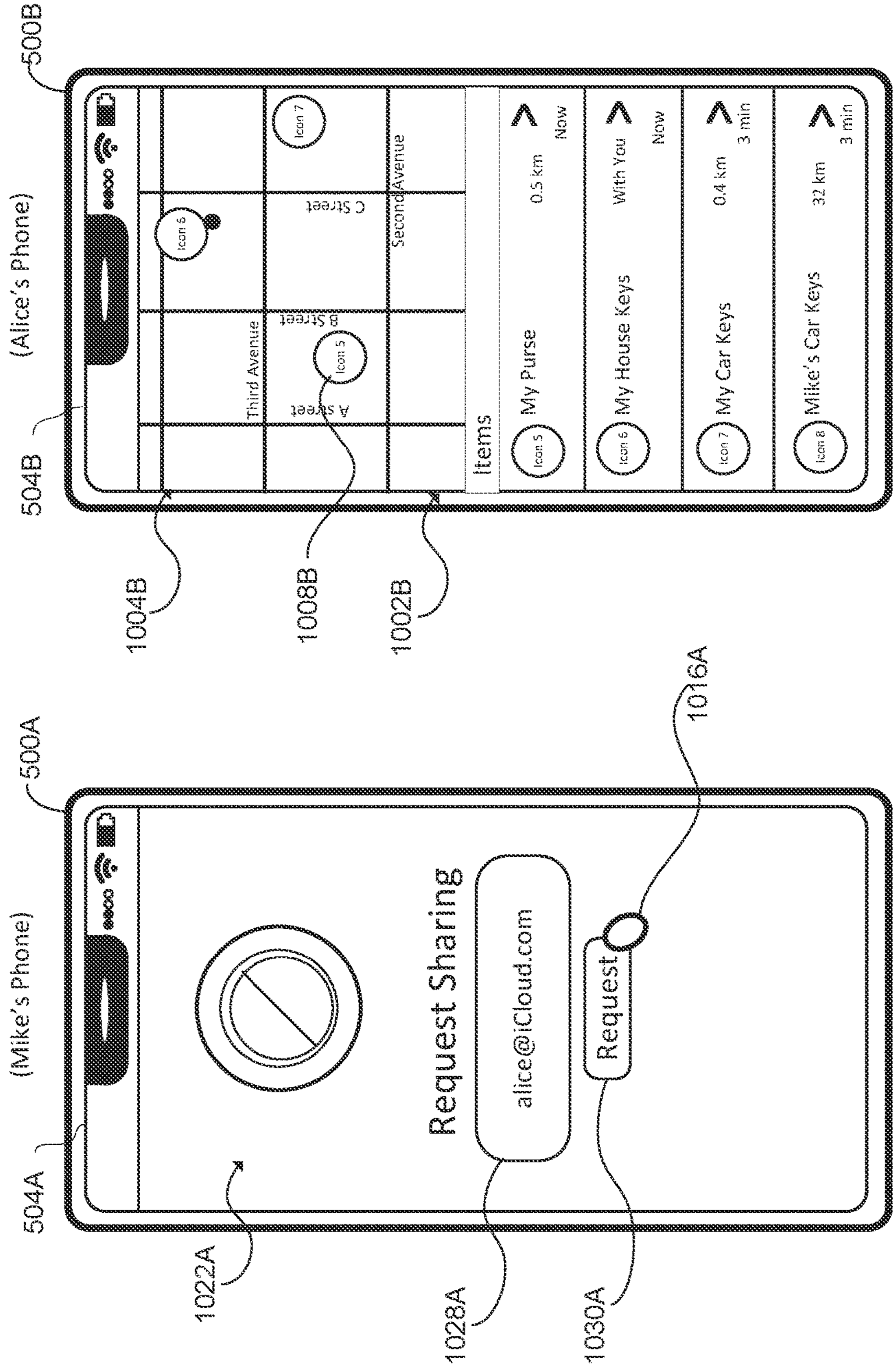
Figure 10H:
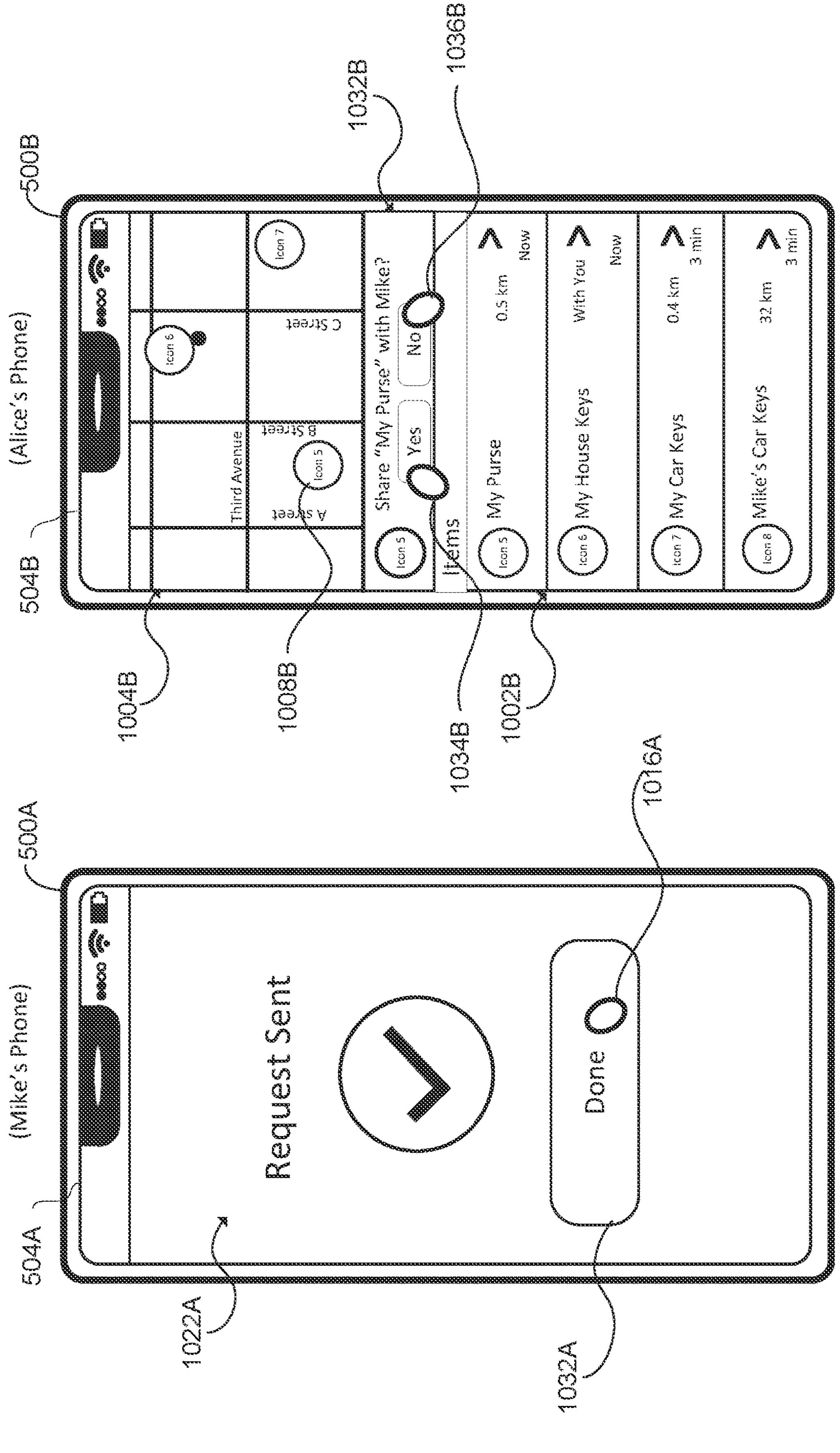
Figure 10I:
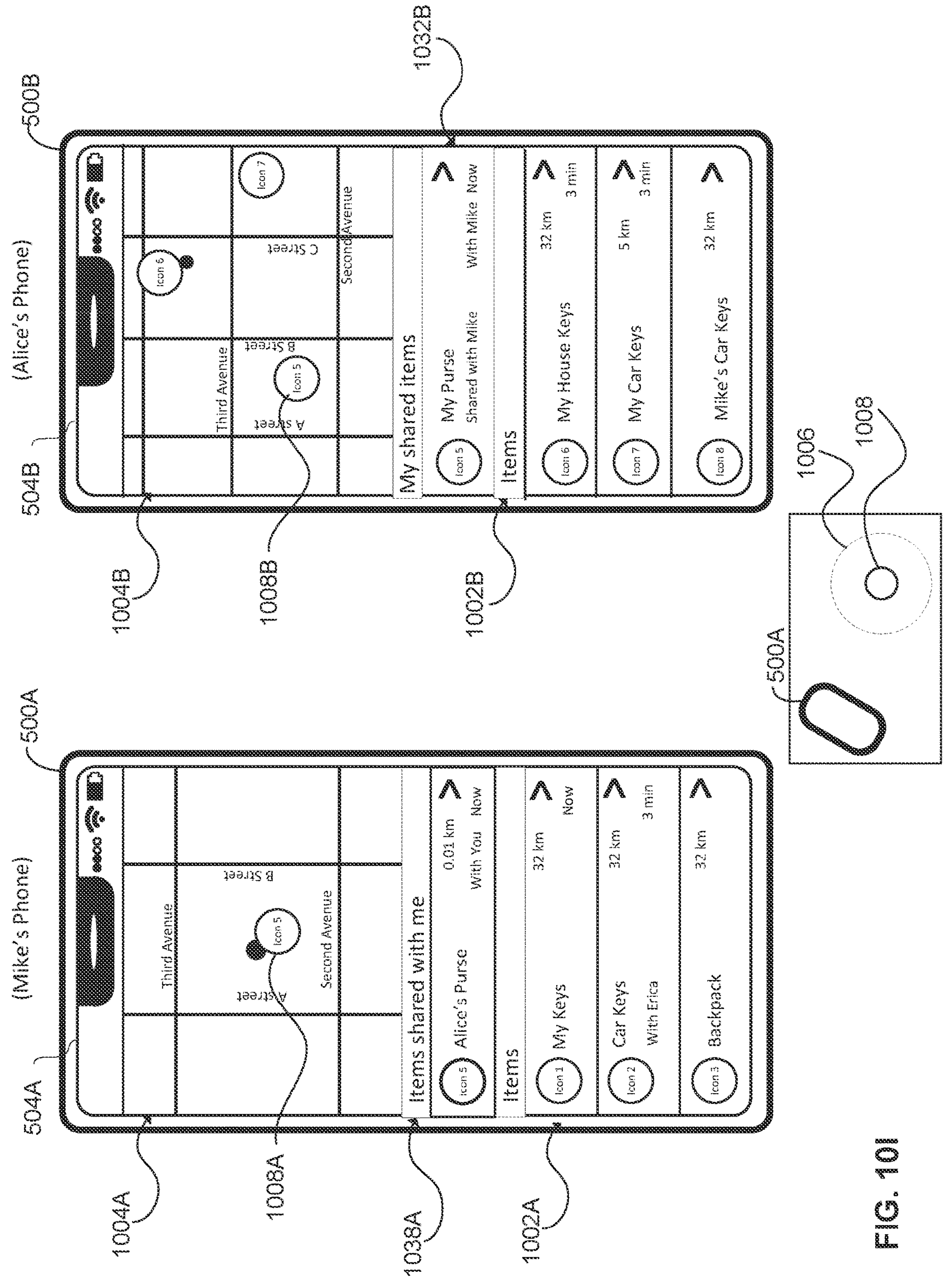
Figure 10J:
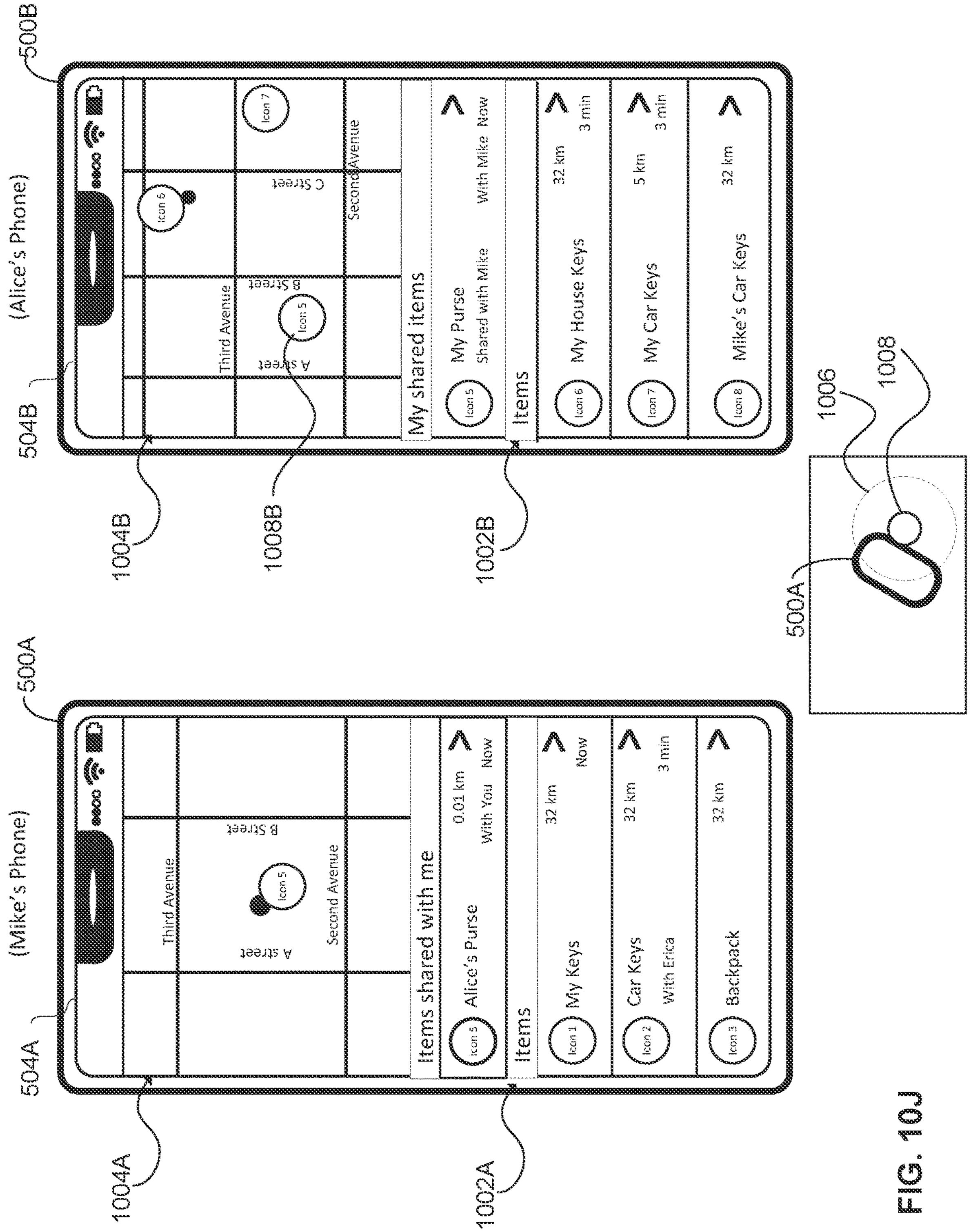
Figure 10K:
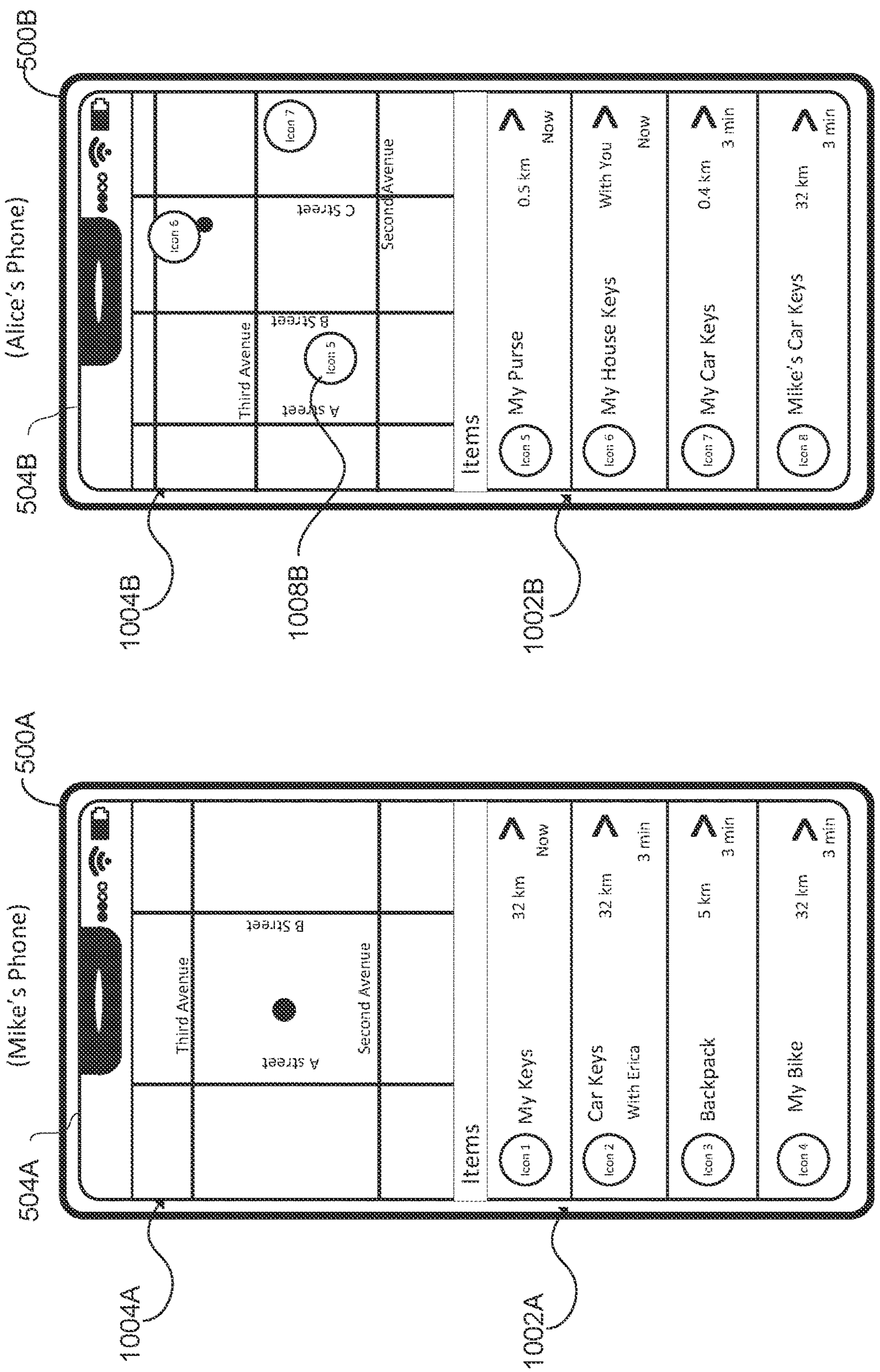
Figure 10L:
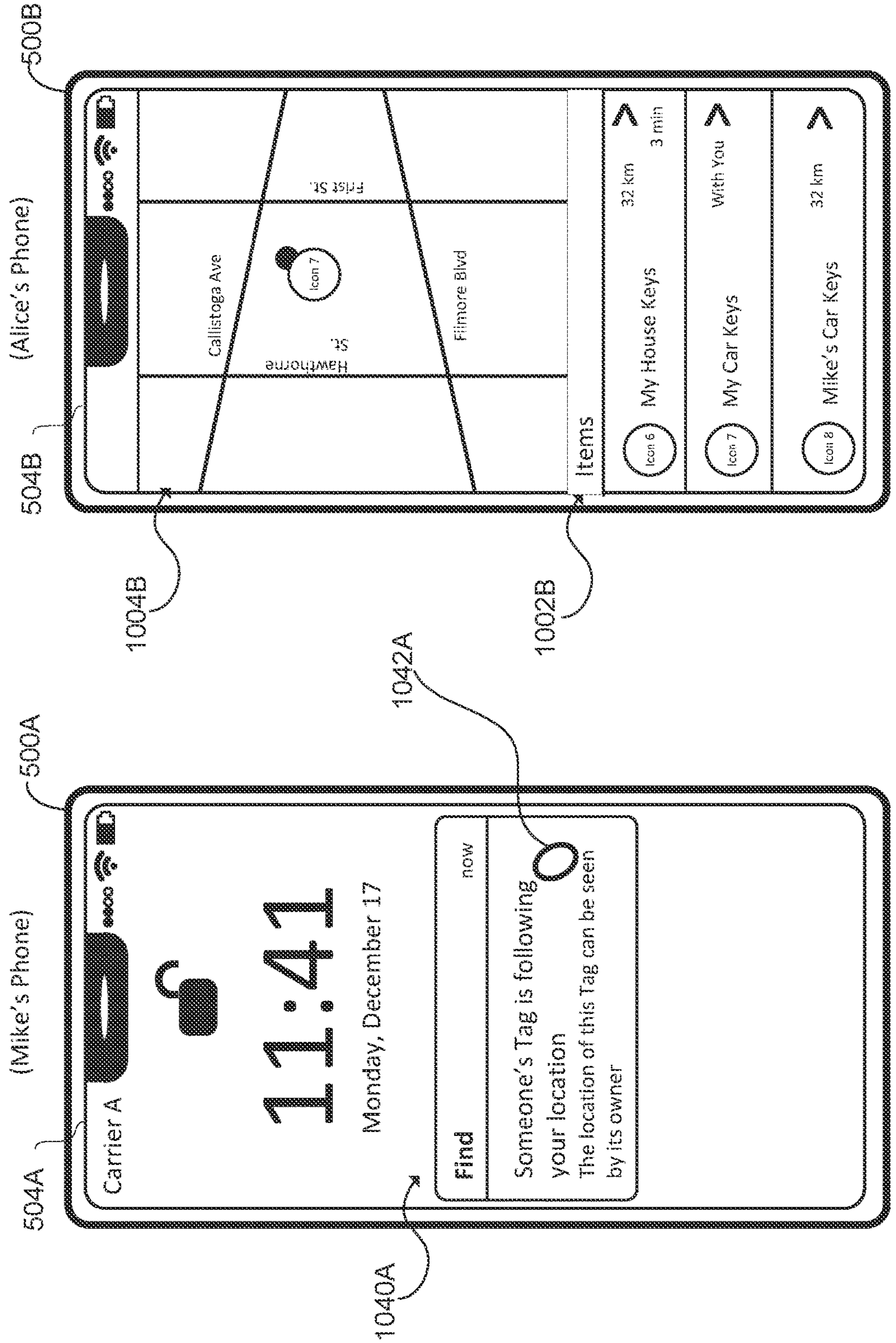
Figure 10M:
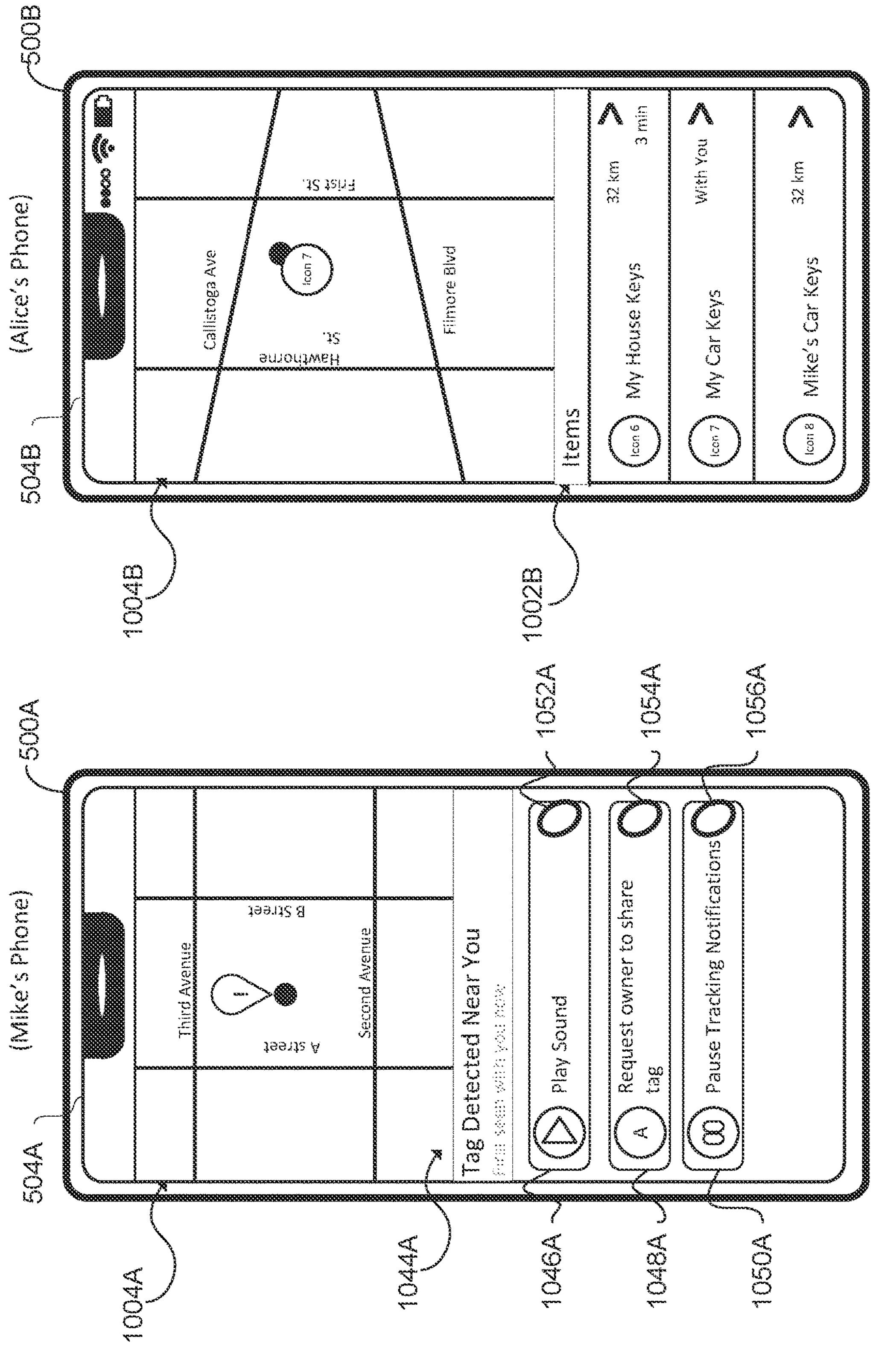
Figure 10N:
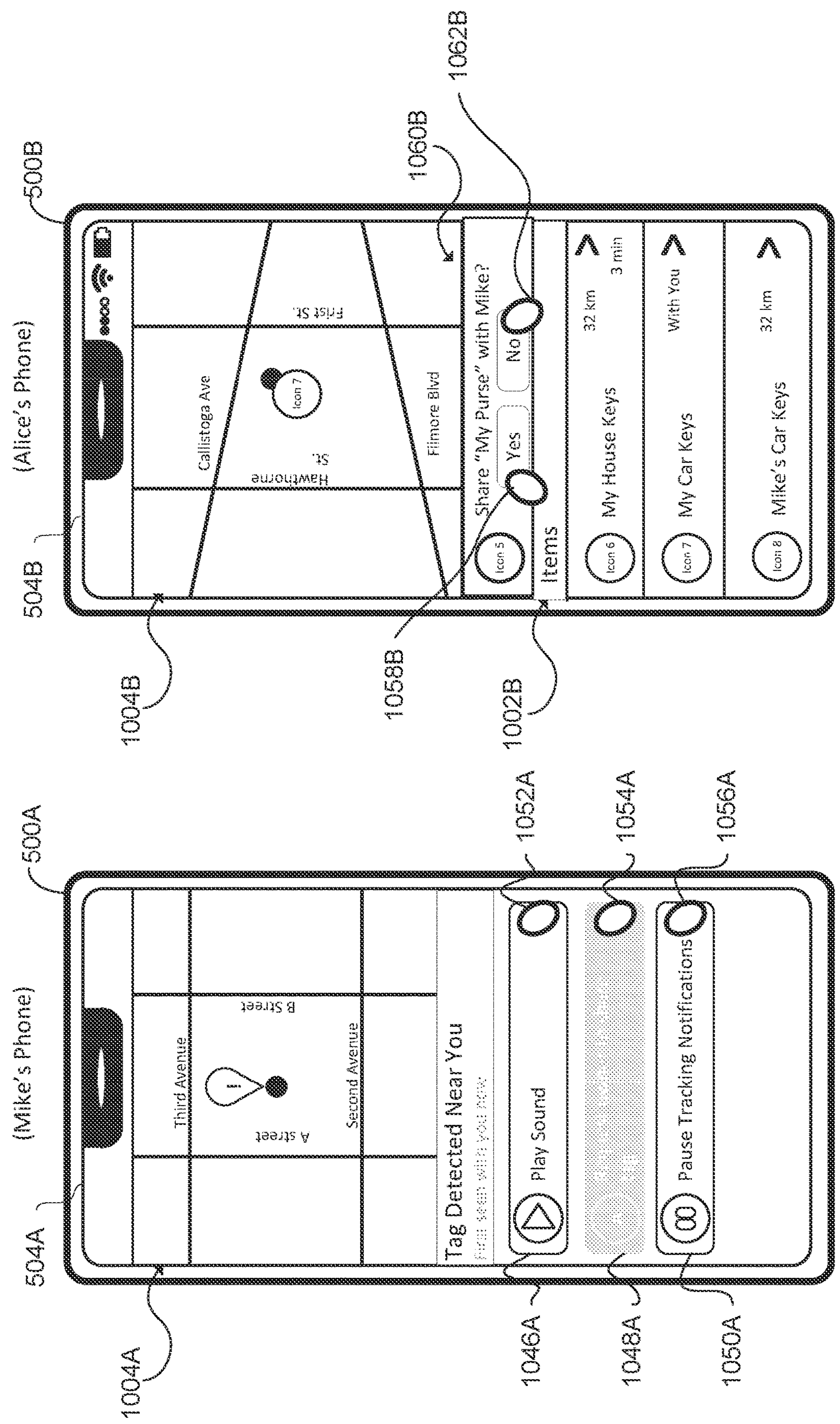
Figure 11A:
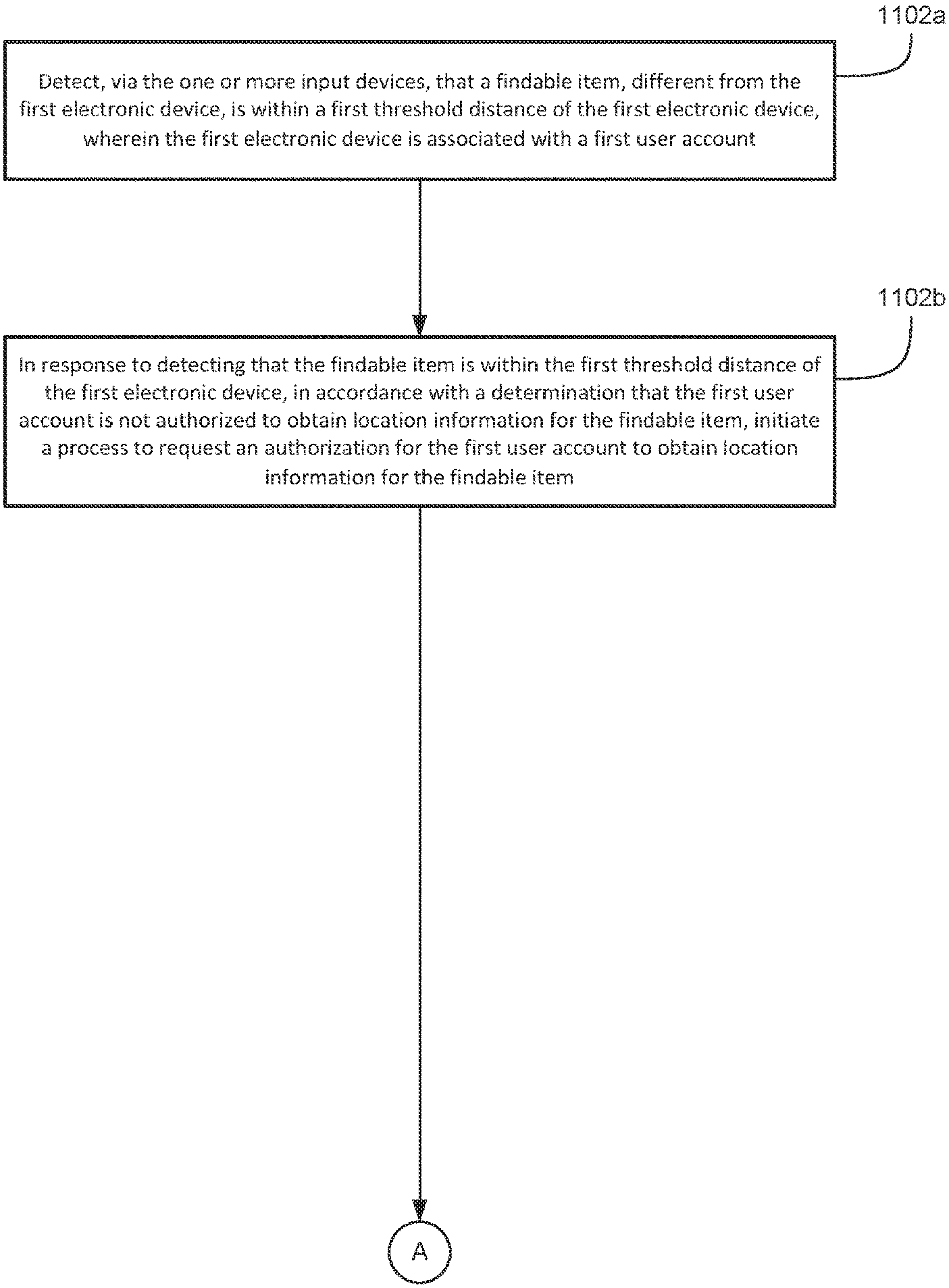
FIGS. 11A-11E are flow diagrams illustrated a method of requesting and granting or rejecting authorization to obtain location information of findable items in accordance with some embodiments of the disclosure.
Figure 11B:
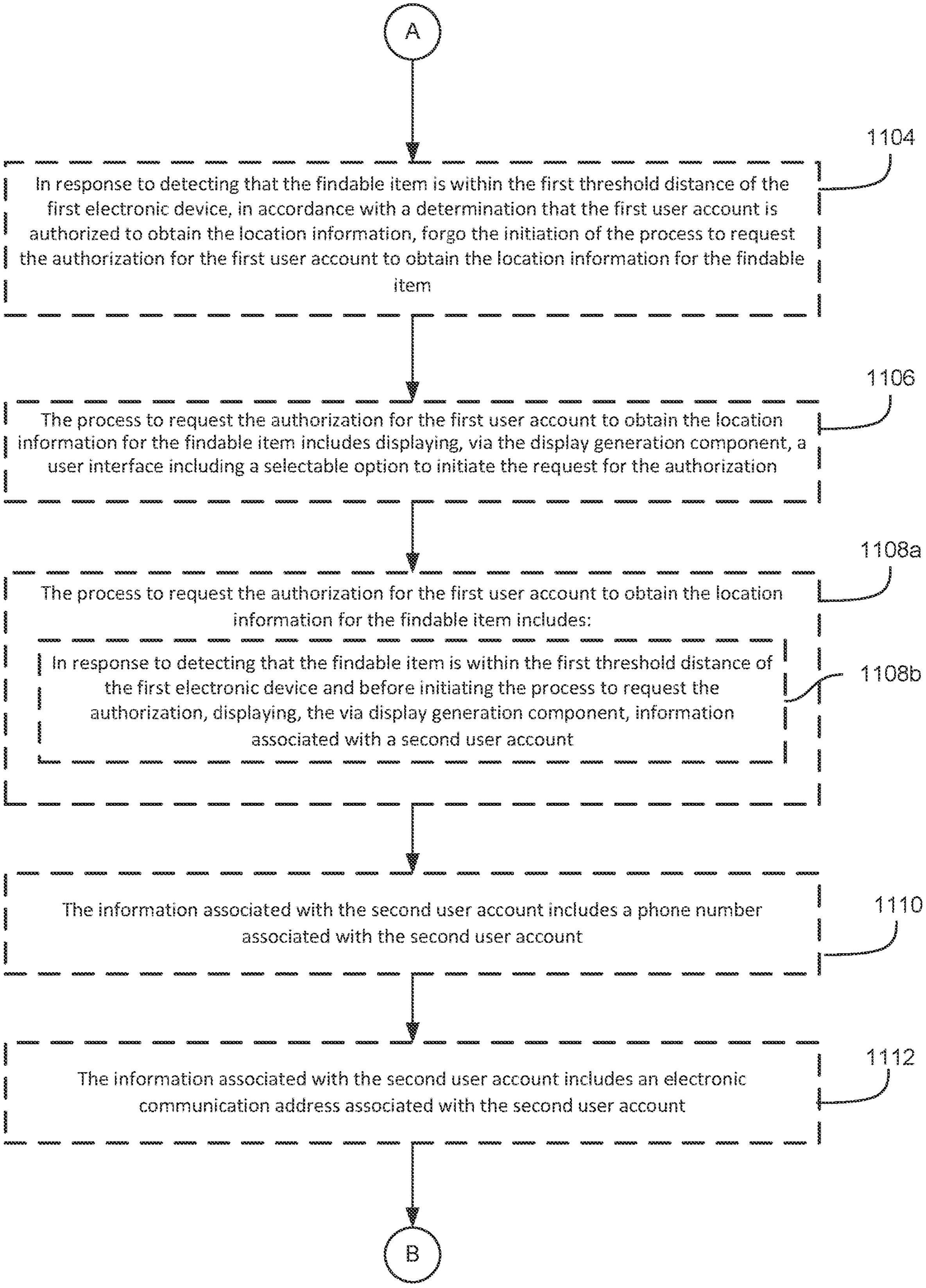
Figure 11C:
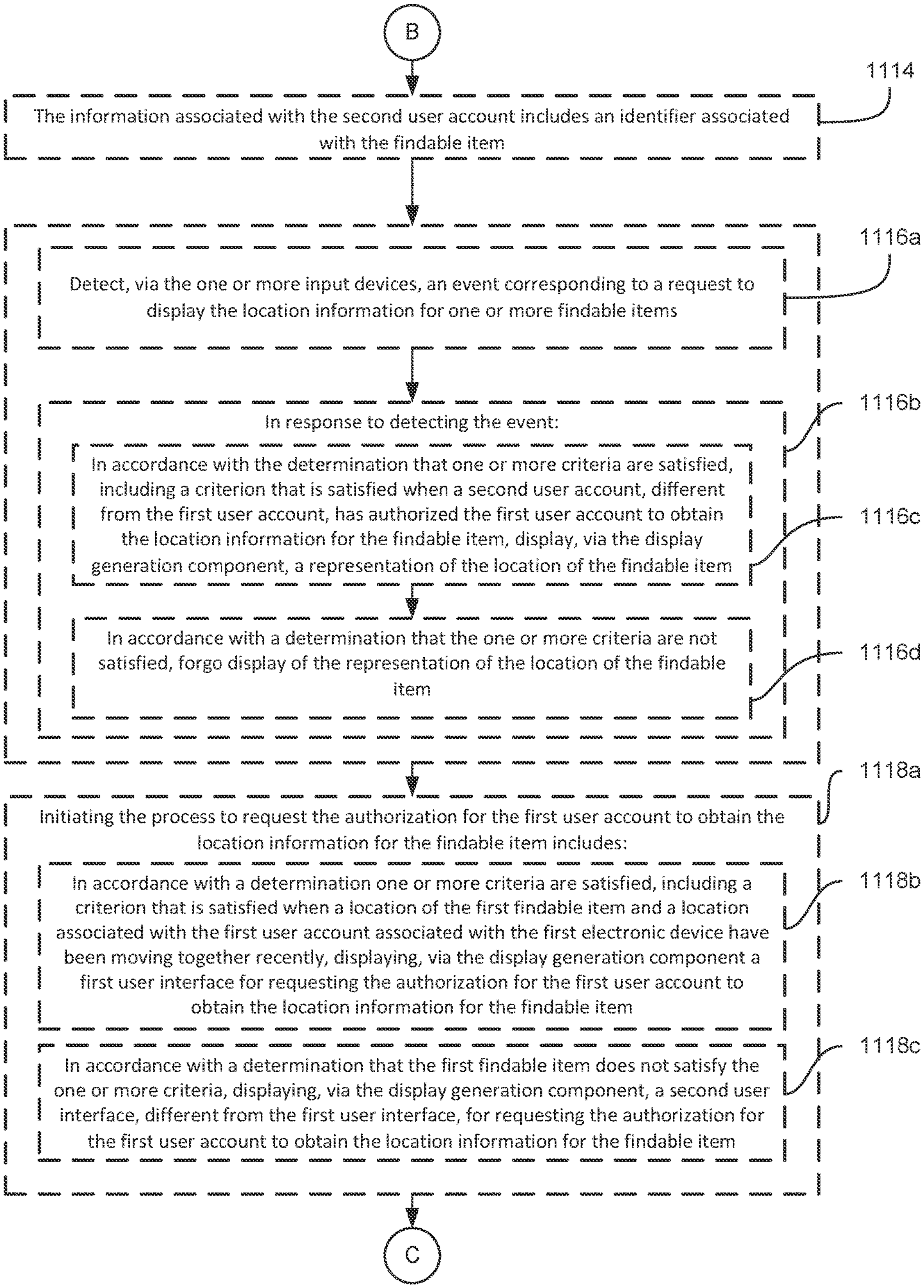
Figure 11D:
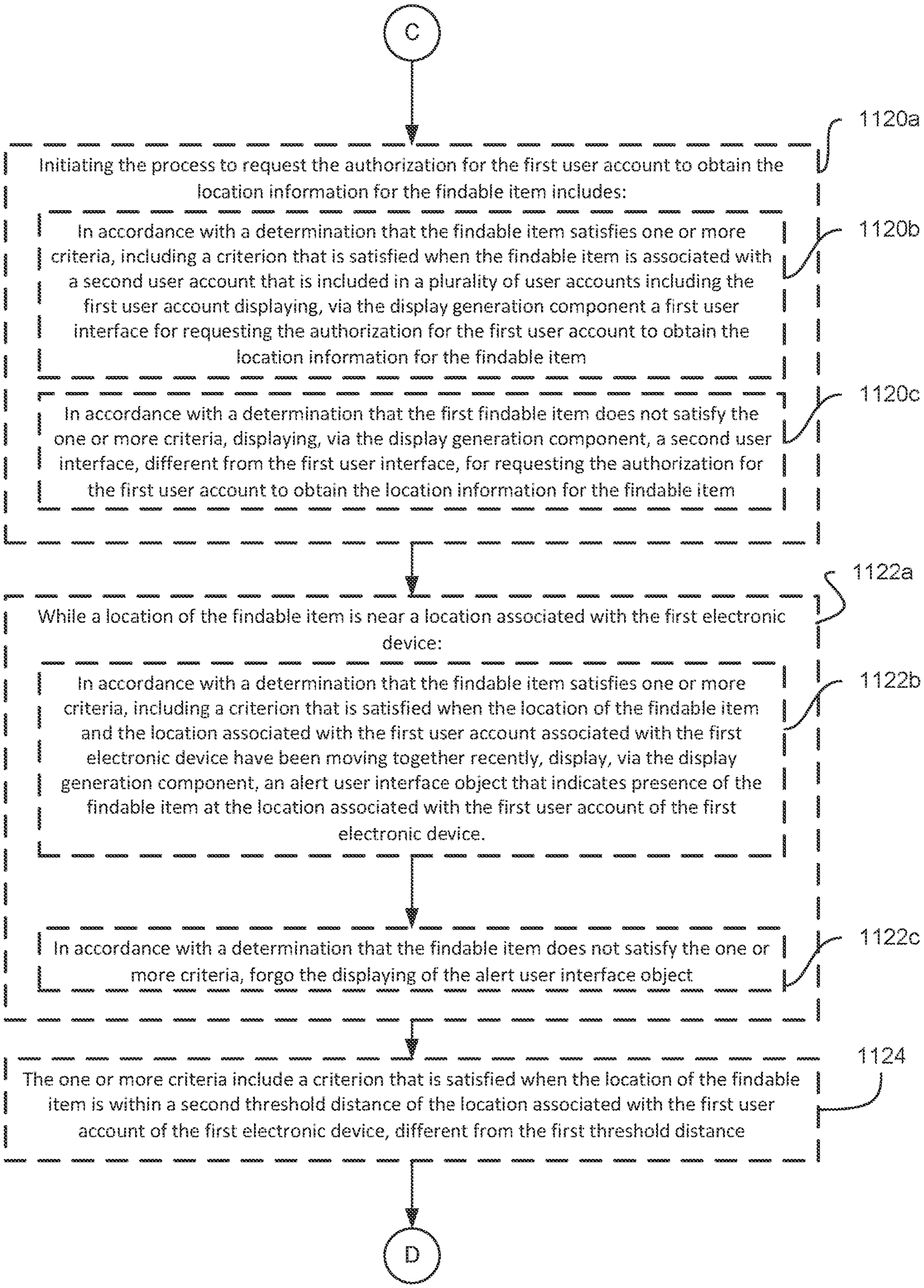
Figure 11E:
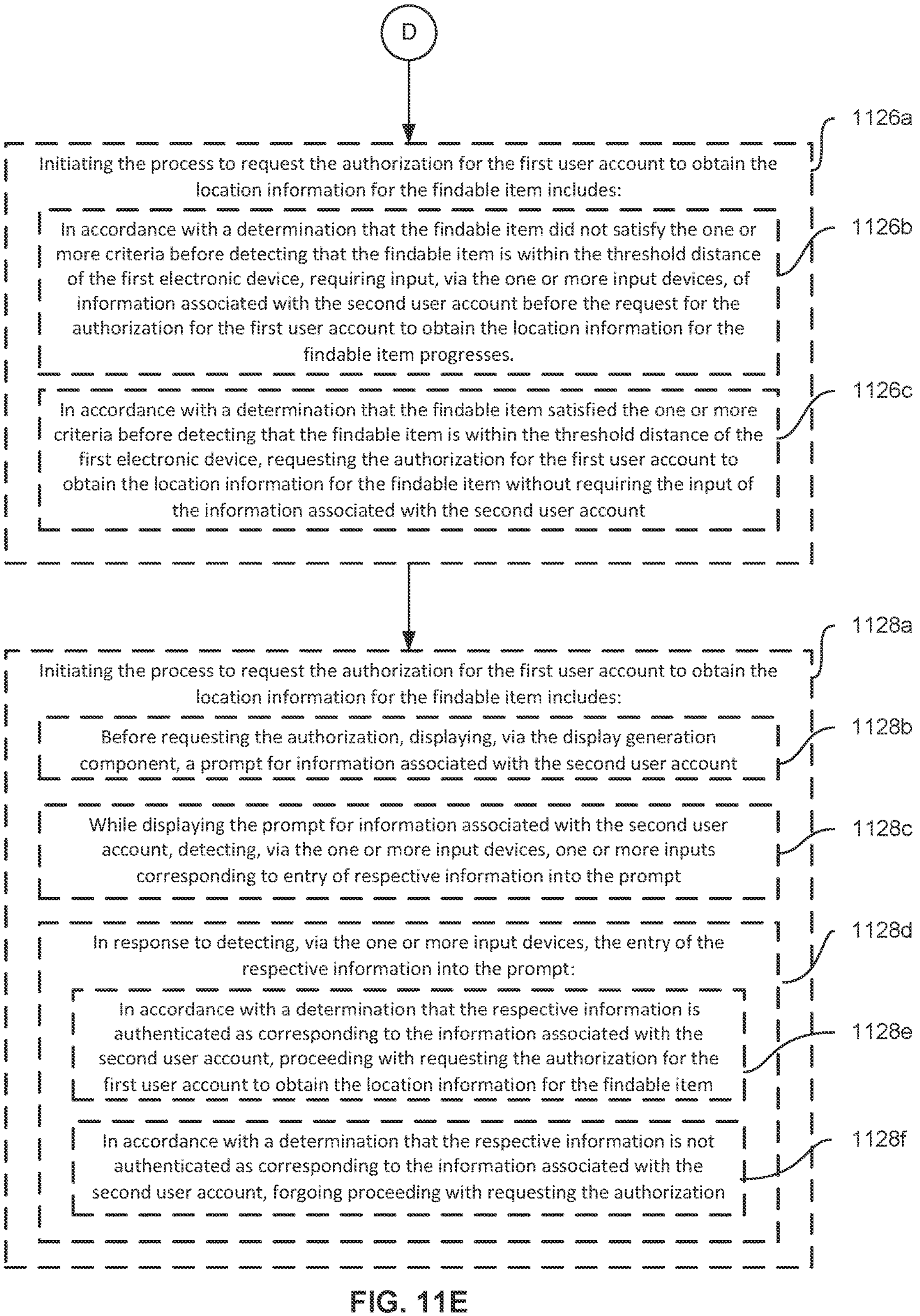

FIGS. 10A-10N illustrate exemplary ways in which an electronic device requests, grants, and/or rejects authorization to obtain location information of a findable item. The embodiments in these figures are used to illustrate the processes described below, including the processes described with reference to FIGS. 11A-11E.

FIGS. 10A-10N illustrate an electronic device 500A associated with a first user (e.g., "Mike") and a second electronic device 500B associated with a second user (e.g., "Alice"). Electronic device 500A includes touch screen 504A and electronic device 500B includes touch screen 504B, which are respectively configured to detect user input (e.g., taps on the touch screen, maintenance of the contact of the touch screen, force of contact on the touch screen, and/or movement of contacts on the touch screen). User interface 1004A displayed on electronic device 500A and user interface 1004B displayed on electronic device 500B respectively include user interfaces of item finding applications, including respective maps displaying a location of the respective devices relative to the map, and visual indications of one or more findable items associated with the respective electronic devices via respective user accounts. For example, electronic device 500A displays a list 1002A of findable items (e.g., "My Keys" which are 32 km away as of the current moment), and electronic device 500B displays a list 1002B of findable items, (e.g., "My Purse" which is 0.5 km away as of the current moment). It is understood that in some embodiments, the user interface 1004A and user interface 1004B throughout FIGS. 10A-10M correspond to what is displayed at a same moment in time at electronic device 500A and electronic device 500B, respectively. In some embodiments, the user interfaces illustrated throughout FIGS. 10A-10M illustrate what is displayed at different moments in time (e.g., within a threshold amount of time of one another (e.g., 0.01, 0.1, 1, 10, or 100 seconds, 15 minutes, or 2 hours)). In some embodiments, user interface 1004A and user interface 1004B include one or more characteristics of the user interfaces described with reference to methods 700 and/or 900.

In some embodiments, the respective user interfaces display visual indications of findable items associated with a user account that is associated with a respective electronic device. For example, electronic device 500A is logged into a first user account that is tied to its item finding application, the list 1002A illustrating a plurality of findable items that are owned by and/or registered to the first user account. Similarly, electronic device 500B is logged into a second, different user account tied to its item finding application, list 1002B illustrating a plurality of findable items owned and/or registered to the second user account. In some embodiments, the user interfaces include representations of a location of a findable item associated with a respective user account overlaid on a map. For example, My Purse 1008B (e.g., Alice's purse) is displayed on the map user interface 1004. In some embodiments, the second user account has designated a descriptor associated with the findable item (e.g., a findable item including circuitry to communicate and/or provide an indication of a location of the findable item, such as a locator tag providing location information assigned to track the location of a purse), hence the text in list 1002B describing the findable item is "My Purse."

In FIG. 10A, representation 1003A illustrates a current location of electronic device 500A. As shown in user interface 1004B, My Purse 1008B is located at a position that is close to the first electronic device 500A. In the inset legend 1005, electronic device 500A is physically close to findable item 1008—corresponding to My Purse 1008B—and outside a threshold 1006 of findable item 1008 (e.g., 0.0001, 0.001, 0.01, 0.1, or 1 m from a center and/or body of the findable item 1008). In some embodiments, the threshold distance is measured relative to a respective electronic device, rather than the findable item.

From FIG. 10A to FIG. 10B, electronic device 500A is moved within threshold 1006 of findable item 1008. For example, the electronic device 500A taps and/or hovers close to findable item 1008. In some embodiments, in response to detecting a respective electronic device is within a threshold distance of findable item, the respective electronic device initiates a process to authorize obtaining of location information of the findable item, described further with reference to method 1100.

From FIG. 10B to FIG. 10C, in response to detecting that electronic device 500A is within the threshold distance of findable item 1008, electronic device 500A initiates the process to authorize the obtaining of the location information associated with the findable item, including displaying user interface 1012*a*. In some embodiments, electronic device 500A displays a prompt (e.g., user interface 1012A) providing information associated with the findable item. User interface 1012A includes information identifying an owner of the findable item (e.g., "Alice") and a physical item associated with the findable item (e.g., Alice's purse). User interface 1012A additionally or alternatively includes visual information, such as a representation 1010A of the findable item (e.g., an icon representing a locator tag). In some embodiments, information is modified to indicate whether the first user account associated with electronic device 500A is authorized to obtain the location information associated with the findable item, such as the diagonal line overlaying the representation 1010A, and/or selectable option 1014A. Selectable option 1014A is optionally selectable, as illustrated by contact 1016A, to initiate additional operations to proceed with the request for authorization to obtain the location information of the findable item. In some embodiments, information included in user interface 1012A is modified in accordance with a determination that the first user account is associated with the second user account (e.g., the accounts are grouped together, such as in a family account, described further with reference to methods 700, 900, and/or 1100). For example, user interface 1012A identifies the owner of the findable item, identifies the physical item associated with the findable item, and/or includes a selectable option to directly request authorization to obtain the location information associated with the findable item, optionally without requesting entry of additional information verifying that the first user account is acquainted with the second user account (e.g., without requesting entry of a password and/or identification information associated with the second user account). In some embodiments, one or more operations, user interfaces, and/or selectable options described with reference to method 700 (e.g., embodiments related to a "predefined group" of users) are additionally or alternatively included in operation(s) initiating a request for authorization to obtain location information associated with the findable item, described with reference to method 1100.

FIG. 10D illustrates an alternative to FIG. 10C when the first user account is not associated with the second user account. From FIG. 10B to FIG. 10D, electronic device 500A determines that the first user account is not associated with the second user account, and displays user interface 1012A in response to detecting that electronic device 500A is within the threshold distance of the findable item. For example, user interface 1012A in FIG. 10D does not include an identifier of the owner of the second user account (e.g., "Not Your Tag") and does not include an identifier of the physical item with which the findable item is associated. User interface 1012A includes a representation 1010A of the findable item, optionally with modified information relative to user interface 1012A illustrated in FIG. 10C. Additionally, user interface 1012 in FIG. 10D includes additional and/or alternative selectable options relative to user interface 1012A in FIG. 10C. For example selectable option 1018A—selected as indicated by contact 1016A—is selectable to display and/or enter additional information associated with the findable item. In some embodiments, at least a portion of user interface 1012A includes the same information that is presented in FIG. 10C, irrespective of whether the first and the second user account are associated with one another. In some embodiments, in response to selection input directed to selectable option 1020A, electronic device 500A progresses with operations to request authorization for location information associated with the findable item including display of user interface(s) as described with reference to FIG. 10F.

From FIG. 10D to FIG. 10E, electronic device 500A displays information 1022A to verify that the first user account is acquainted with the second user account in response to selection of selectable option 1018A in FIG. 10D. For example, information 1022A in FIG. 10E includes information corresponding to the second user, such as a partially redacted phone number associated with the second user account (e.g., a phone number of electronic device 500B). In some embodiments, information 1022A includes additional or alternative information, described further with reference to method 1100. For example, information 1024A optionally includes electronic communication addresses and/or identifiers associated with the second user account. In some embodiments, information 1022A includes a selectable option 1026A that is selectable—as illustrated by contact 1016A—to proceed with additional operation(s) to request authorization for location information associated with the findable item. In some embodiments, the information associated with the second user account is at least partially redacted, and in some embodiments, the information is not partially redacted.

From FIG. 10E to FIG. 10F, electronic device 500A updates information 1022A to include a prompt for authorization information to ensure the first account is acquainted with the second user account in response to detecting a selection of selectable option 1026A in FIG. 10E. For example, information 1022A prompts the user to "Request Sharing," and includes a field 1028A for a first user of electronic device 500A to populate with information (e.g., "Enter Account"). In some embodiments, electronic device 500A concurrently displays a selectable option 1030A, that is selectable to submit the request for the authorization for the location information associated with the findable item. In some embodiments, selectable option 1030A is not yet selectable when field 1028A is not populated with information. In FIG. 10F, contact 1016A is detected directed to field 1028A, in order to populate field 1028A.

From FIG. 10F to FIG. 10G, electronic device 500A detects user input to populate the field 1028 illustrated in FIG. 10F. Such input optionally includes entry via a virtual keyboard (e.g., entering a password, communication address, and/or identifier associated with the second user account of electronic device 500B), via a voice input, and/or a biometric verification of the first user of electronic device 500A, thereafter populating the field based on previously stored credentials and/or information. In response to the population of field 1028 and/or selection of selectable option 1030A, electronic device updates information 1022A to indicate that the request for the authorization for the location information associated with the findable item has successfully been communicated, as shown in FIG. 10G. In FIG. 10G, information 1022A includes a selectable option 1032A to dismiss information 1022A (e.g., to return to the item finding user interface, and/or when information 1022A is overlaid over the item finding user interface, to cease display of information 1022A).

At electronic device 500B in FIG. 10G, after receiving the request for authorization for the location information associated with the findable item initiated in response to selection of option 1030A in FIG. 10G, electronic device 500B displays prompt 1032B (e.g., within the item finding location displayed by electronic device 500B), requesting a second user of electronic device 500B grant or reject the authorization request. For example, prompt 1032B identifies the findable item (e.g., the locator tag associated with "My Purse") and/or the first user associated with the first user account (e.g., "Mike"). In some embodiments, prompt 1032B includes selectable options that are selectable to grant or reject the authorization request. For example, a first contact 1034B is directed to a selectable option granting the request, and a second contact 1036B is directed to a selectable option rejecting the request. It is understood that such contacts are merely representative of possible input, and that the presence of multiple contacts is not necessarily indicative of a simultaneous selecting of different selectable options. In some embodiments, prompt 1032B is overlaid over a currently displayed user interface 1004B, and/or prompt 1032B is not displayed while information (e.g., selectable options) included in prompt 1032B are included in a respective visual element, such as an individual line item of list 1002B (e.g., "My Purse" included in list 1002B includes selectable options "Yes" and "No" to authorize or not authorize the sharing of location information of the corresponding findable item). In some embodiments, prompt 1032B is displayed in a lock screen user interface (e.g., described with reference to method 900), and in response to a selection input and after an identity of a user providing the selection input is verified at the second electronic device, electronic device 500B communicates an indication of granting or rejecting of the request. In some embodiments, after prompt 1032B is initially presented at electronic device 500B, if a time greater than a threshold amount of time (e.g., 5, 10, 30, 60, 120, 180, minutes, 0.25, 0.5, 1, 3, 7, 14, or 30 days) elapses without input directed to prompt 1032B (or other acceptance of the request to authorize the sharing of location information of the corresponding findable item), electronic device 500B rejects the authorization request (e.g., without detecting explicit input rejecting the request).

FIGS. 10I-10J illustrate embodiments of electronic devices displaying representations of findable items when authorization requests to share location information associated with the findable items are granted.

From FIG. 10H to FIG. 10I, electronic device 500B detects an approval of the authorization request, and in response, communicates an indication of the approval to electronic device 500A (e.g., via a findable item network and/or directly, described further with reference to method 1100). In response to detecting an indication of the approval, electronic device 500A initiates display of a representation of the findable item using the location information. For example, banner 1038A includes an indication of "Items shared with me" (e.g., Mike), including a representation of the findable item (e.g., "Alice's Purse"), as described further with reference to method 900. User interface 1004A additionally includes a representation 1008 of the findable item, indicating that electronic device 500A and the findable item are co-located. In some embodiments, in response to detecting movement of electronic device 500A away from the findable item and/or movement of the findable item away from electronic device 500A, electronic device 500A maintains display of representation 1008A while user interface 1004A displays a portion of a map including the location of the findable item. In some embodiments, as described further with reference to method 900, electronic device 500B updates a position of representation 1008A included in user interface 1004A to an updated location by obtaining real-time, or nearly real-time, location information associated with the findable item 1008.

At electronic devices 500A and 500B in FIG. 10I, user interfaces 1004A and 1004B are respectively updated to display indications that the findable item 1008 is shared between multiple user accounts. For example, banner 1038A indicates there are "Items shared with me" and banner 1032B indicates there are "My shared items," including an indication of the shared item (e.g., "My Purse" and "Icon 5") and that the shared, findable item 1008 is shared with another user account (e.g., with "Mike").

From FIG. 10I to FIG. 10J, electronic device 500A is brought within threshold 1006 of findable item 1008, but because the first user account associated with electronic device 500A is already authorized to obtain the location information associated with findable item 1008, electronic device 500A forgoes initiation of one or more operations to request the authorization, because such one or more operations would be redundant. In some embodiments, the findable item 1008 is temporarily shared with the first user account, and authorization for obtaining of location information is eventually revoked unless a second authorization is received. For example, after detecting a first authorization to obtain the location information of findable item 1008 for a period of time, the first user account is no longer authorized location information of findable item 1008 due to an express input from electronic device 500B revoking said authorization and/or an expiration of a time period (e.g., 5, 10, 30, 60, 120, 180, minutes, 0.25, 0.5, 1, 3, 7, 14, or 30 days) during which such authorization is granted. In such embodiments, when electronic device 500A is brought within the threshold 1006 of the findable item 1008 a second time (e.g., similarly to as shown from FIG. 10I to FIG. 10J), the electronic device 500A re-initiates one or more operations to again request authorization to obtain the location information associated with findable item 1008.

FIG. 10K illustrates embodiments of electronic devices displaying representations of findable items when authorization requests to share location information associated with the findable items are rejected. From FIG. 10H to FIG. 10K, in response to electronic device 500B detecting a selection input rejecting the sharing of "My Purse" (e.g., detecting selection of "No" in FIG. 10H) electronic device 500A forgoes requesting of location information (e.g., because the first user account tied to electronic device 500A is not authorized to request such location information) and/or display of a representation of the findable item. Similarly, electronic device 500B forgoes display of visual indications of such sharing, because the sharing is not approved. In some embodiments, until the findable item is moved outside the threshold distance 1006 (e.g., as shown in FIG. 10A) from electronic device 500A, electronic device 500A forgoes performance of additional operations to request authorization to obtain the location information associated with the findable item. In some embodiments, after moving outside the threshold distance, in response to detecting that the electronic device 500A again moves within the threshold distance 1006, electronic device 500A again requests the authorization. In some embodiments, in accordance with a determination that the authorization has been rejected a number of times greater than a threshold number of times (e.g., 1, 2, 3, 4, 5, 7, 10, or 15 times), the electronic device 500A forgoes initiation of additional requests for the authorization.

FIGS. 10L-10N illustrate embodiments in which electronic devices moving with findable items display alerts and request sharing of the location of the findable item.

In some embodiments, when a location of a findable item is determined to be moving with an electronic device recently, the electronic device presents an alert user interface object to the user, indicating the presence of the findable item, as described with reference to method 900. In some embodiments, the alert user interface object is selectable to initiate one or more operations to request authorization of sharing of the location information associated with the findable item, similar to as described with reference to FIGS. 10A-10K.

In FIG. 10L, electronic device 500A is displaying a user interface corresponding to a lock screen (e.g., described further with reference to method 900) including an alert user interface object 1040A. Electronic device 500A also detects an input 1042A, corresponding to a selection input directed toward alert user interface object 1040A. In FIG. 10L, electronic device 500B is displaying a user interface 1004B, corresponding to an item finding application and including a list 1002B of findable items associated with a user account of the electronic device 500B.

From FIG. 10L to FIG. 10M, electronic device 500A displays a user interface of an item finding application in response to the selection input received in FIG. 10L. In some embodiments, user interface 1004A includes a user interface for an item finding application, and in some embodiments, user interface 1004A has one or more characteristics of the user interface(s) described with reference to FIG. 8E. Electronic device 500A optionally displays a user interface and/or modifies a currently displayed user interface (e.g., an item finding application user interface) to indicate that the findable item is moving with the electronic device 500A, optionally including indications of a range of one or more times, locations, and/or distances that the findable item has been moving with the electronic device 500A, and/or one or more selectable options to interact with the findable item. For example, as indicated by banner 1044A, a findable item has been determined to be moving with electronic device 500A recently (e.g., for a period of time greater than a threshold period of time (e.g., 10, 20, 30, 60, 120, 360 seconds, 5, 10, 15, or 30 minutes) and/or a distance traveled greater than a threshold distance (e.g., 5, 10, 15, 30, 50, 75, 100, 1000, or 5000 m)). Accordingly, electronic device 500 updates user interface 1004A to include one or more selectable options associated with the findable item; selectable option 1046A is selectable to cause the findable item to emit a noise, and can be selected as indicated by a first contact 1052A, selectable option 1048A is selectable to communicate a request for authorization to obtain location information for the findable item, and can be selected as indicated by a second contact 1054A, and selectable option 1050A is selectable to temporarily or permanently cease display of future alert user interface objects for the findable item, and can be selected as indicated by third contact 1056A. It is understood that the first, second, and third contacts 1052A-1056A are optionally representative of alternative contacts, and that some combination of one or more of such contacts are optionally detected or not detected.

From FIG. 10M to FIG. 10N, in response to contact 1054A in FIG. 10M, electronic device 500A communicates a request for authorization to obtain location information of the findable item, and in response to detecting an indication of such a request, electronic device 500B displays one or more visual indications indicative of the request. For example, user interface 1004B is updated to include banner 1060B, prompting a user of electronic device 500B to approve the authorization (e.g., corresponding to a first contact 1058B directed to a "Yes" selectable option) or reject the authorization (e.g., corresponding to a second contact 1062B directed to a "No" selectable option). Banner 1060B also includes an indication of the findable item that is traveling with electronic device 500A (e.g., "Icon 5" and "My Purse") and an identifier corresponding to a user account associated with electronic device 500A (e.g., "Mike"). In response to respective selections of the selectable options, electronic device 500A and/or electronic device 500B perform one or more operations as described with reference to FIGS. 10H-10J. In some embodiments, the request is communicated without requiring entry of respective information that corresponds to the second user account associated with electronic device 500B, described further with reference to FIGS. 10F-10G.

In some embodiments, user interface 1004A illustrated in FIG. 10M is presented in response to detecting the electronic device 500A is within the threshold distance 1006 of the findable item that is moving with the electronic device (e.g., the threshold distance 1006 described with reference to the embodiments of FIG. 10A-10J). In some embodiments, respective user interfaces are displayed in accordance with a determination that a findable item has or has not been moving with an electronic device recently, described further with reference to method 900 and/or 1100. For example, in response to contact 1042A in FIG. 10L, and/or in response to contact 1054A displayed in FIG. 10M, in accordance with a determination that the findable item has been moving with the electronic device, a user interface (e.g., a user interface displayed at electronic device 500A in FIGS. 10L-10N) displayed by the electronic device optionally includes one or more selectable options and/or one or more fields prompting for entry of respective information corresponding to a user account associated with another electronic device that is associated with (e.g., has registered) the findable item (e.g., similar to as illustrated with reference to FIGS. 10C-10E, and described further with reference to method 1100). In some embodiments, in accordance with a determination that the findable item has not been moving with the electronic device recently, the user interface displayed by the electronic device that is requesting location information associated with the findable item does not include and/or require prompts and/or the respective information.

FIGS. 11A-11E are flow diagrams illustrating a method 1100 of requesting and granting or rejecting authorization to obtain location information of findable items in accordance with some embodiments of the disclosure, such as in FIGS. 10A-10N. The method 1100 is optionally performed at an electronic device such as device 100, device 300, device 500 as described above with reference to FIGS. 1A-1B, 2-3, 4A-4B and 5A-5H. Some operations in method 1100 are, optionally combined and/or the order of some operations is, optionally, changed.

In some embodiments, method 1100 is performed at a first electronic device, such as electronic device 500A, associated with a first user, the first electronic device in communication with a display generation component and one or more input devices. For example, the first electronic device has one or more characteristics of the electronic devices described with reference to method 700 and/or method 900. In some embodiments, the display generation component and one or more input devices have one or more characteristics of the display generation components and one or more input devices described with reference to method 700 and/or method 900. In some embodiments, the first electronic device is associated with a first user account (e.g., that is established with a secure and/or trusted entity such as one or more servers configured to verify cryptographic information associated with the first user account) that has designated the first user as the owner of the first electronic device, thereby defining an association between the first user and the first user account.

In some embodiments, the first electronic device detects (1102*a*), via the one or more input devices, that a findable item, such as findable item 1008 in FIG. 10A, different from the first electronic device, is within a first threshold distance of the first electronic device, such as threshold 1006 in FIG. 10A, wherein the first electronic device is associated with a first user account (e.g., such as also described with reference to method 700). For example, the computer system optionally determines one or more first criteria are satisfied optionally including a criterion that is satisfied when the findable item is within a threshold distance (e.g., 0.0001, 0.001, 0.01, 0.1, or 1) of the first electronic device. In some embodiments, the findable item is a locator object that (e.g., an electronic device) associated with a second user and/or a second user account of a second electronic device, different from the first electronic device, as described further with reference to method 700. In some embodiments, the second user account has one or more characteristics of the first user account, and defines an association between the second user and an at least partially different set of devices and/or credentials (e.g., including the findable item and the second electronic device). In some embodiments, the computer system detects satisfaction of one or more first criteria including a criterion that is satisfied when the findable item is not associated with the first user account, and in response to detecting the satisfaction of the one or more first criteria, initiates a process to request authorization of location sharing information associated with the findable item. For example, the one or more first criteria include a criterion that is satisfied when the first electronic device is not directly associated with the findable item (e.g., the first electronic device has not paired with the findable item, has not been granted location tracking privileges associated with the findable item described further herein (e.g., the ability to request and obtain a tracked location of the findable item relative to a physical environment of the findable item), is not associated with the first user account, and/or is not owned by the first user), and/or include a criterion that is satisfied when the findable item is associated with the second user (e.g., the second electronic device has paired with the findable item, successfully completed a setup process to gain location tracking privileges of the findable item, is associated with a second user account, different from the first user account, and/or is owned by the second user).

In some embodiments, the first electronic device and/or the findable item include circuitry to wirelessly indicate their presence and/or proximity to one another (e.g., radio-frequency (RF) transmitters, RF receivers, electromagnetic coils, and/or one or more antennas) to facilitate short-range wireless communication (e.g., near-field communication (NFC)), indicating a proximity of the first electronic device to the findable item and/or vice-versa. In response to determining the one or more first criteria are satisfied, including the criterion satisfied when the first electronic device is within the threshold distance of the device, the first electronic device initiates a process to request location information sharing privileges associated with the findable item. In some embodiments, in accordance with a determination that the one or more first criteria are not satisfied, the computer system forgoes initiating the process to request location information sharing of the findable item.

In some embodiments, in response to detecting that the findable item is within the first threshold distance of the first electronic device, in accordance with a determination that the first user account is not authorized to obtain location information (e.g. directly from the findable item or through a findable item network that periodically updates location information for one or more findable items including the findable item) for the findable item, such as the location information used to display representation 1008B in FIG. 10A (e.g., the first user account is not authorized to obtain the information about the location of the findable item, because it is not associated with or registered to the first user account and/or because the findable item location has not already been shared with the first user account from a second user account that is associated with or to which the findable item is registered), the first electronic device initiates (1102*b*) a process to request an authorization for the first user account to obtain location information for the findable item (e.g., from the second electronic device). For example, the first electronic device and/or the findable item optionally communicate a request to grant location information sharing privileges (e.g., the ability to request and/or obtain location information describing a location of the findable item) to the second electronic device and/or another trusted entity (e.g., a server included in the findable item network) responsible for handling such requests. In some embodiments, the process to request authorization for the first user account to obtain location information including and/or corresponding to the location of the findable item (e.g., described further with reference to method 700) includes displaying one or more user interfaces at the first electronic device and/or second electronic device to present one or more selectable options and information describing the findable item to facilitate granting, rejecting, and/or verifying of location information sharing privileges of the findable item to the first electronic device and/or the first user account. In some embodiments, in response to receiving a request for authorization for the first user account to obtain location information (e.g., requesting location information sharing privileges of the findable item) at the second electronic device, the second electronic device optionally displays one or more selectable options, presenting the second user with a first option to authorize location information sharing of the findable item to the first electronic device and/or the first user account. In response to detecting a selection authorizing such location information sharing, the second electronic device optionally communicates an indication of approval to the trusted entity, the first electronic device, and/or the findable item. In response to detecting an indication of such granting of location information sharing of the findable item to the first user account (e.g., from the second electronic device, via the findable item, and/or via the trusted entity), the first electronic device optionally displays an indication that such privileges have been authorized, such as a notification, a graphical representation of the location of the findable item overlaying a map user interface, and/or one or more descriptors describing the findable item (e.g., in a list) and/or one or more characteristics of the findable item (e.g., the second user and/or second user account associated with the findable item, a proximity of the findable item, and/or a time of a last communication with the findable item). In some embodiments, after the location information sharing of the findable item is granted to the first user account, the first electronic device has access to the location information of the findable item, described further with reference to method 700, and is able to display the location of the findable item via an item locating application using the location information of the findable item. In some embodiments, in accordance with a determination that the first user account is already authorized to obtain the location information (e.g., due to a previous granting of the location sharing to the first user account from the second user account, and/or because the findable item is registered with the first user account), the computer system forgoes initiation of the process to authorize the location information sharing.

It is understood that the embodiments described below optionally differ from as expressly described. For example, embodiments describing information communicated between the first electronic device and the second electronic device (e.g., requesting location privileges of a findable item, granting access to such location privileges, requesting information describing the findable item) optionally is communicated directly between the first electronic device and the second electronic device, and/or optionally is communicated via one or more intermediate devices (e.g., the findable item, one or more trusted entities configured to facilitate such information communication such as the findable item network). Additionally or alternatively, it is understood that as described further with reference to method 700, such location information sharing privileges optionally are granted directly by the second user of the second electronic device. In some embodiments, the location information sharing privileges associated with the findable item are granted to the first electronic device and/or the first user account by another one or more users that the second user has previously indicated are trusted to grant such privileges associated with the findable item (e.g., a partner of the second user, a family member, and/or a trusted friend). Initiating a process to request authorization of sharing of location information associated with the findable item when the first electronic device is brought within a threshold distance of the findable item reduces user input required to manually perform similar requests, reduces the likelihood that unapproved user accounts surreptitiously gain access to location information associated with the findable item, and additionally reduces the likelihood of receiving user input erroneously requesting sharing of another findable item, thereby reducing processing required to handle such manual and/or erroneous requests.

In some embodiments, in response to detecting that the findable item is within the first threshold distance of the first electronic device, such as threshold 1006 in FIG. 10A, in accordance with a determination that the first user account is authorized to obtain the location information, the first electronic device forgoes (1104) the initiation of the process to request the authorization for the first user account to obtain the location information for the findable item, such as forgoing one or more operations in response to detecting electronic device 500A moving within threshold 1006 in FIG. 10J. For example, when the first user account has been authorized (e.g., by the second user account) to obtain the location information associated with the findable item, the first electronic device forgoes requesting the authorization an additional one or more times (e.g., forgoes initiating the operations and/or processes described with reference to method 700). Forgoing the initiation of the process to request the authorization for the first user account to obtain the location information when the first user account is already authorized reduces the processing required to initiate and/or perform the request for authorization, thereby saving power consumption of the first electronic device.

In some embodiments, the process to request the authorization for the first user account to obtain the location information for the findable item includes displaying, via the display generation component, a user interface, such as user interface 1012A in FIG. 10C, including a selectable option to initiate the request for the authorization (1106), such as selectable option 1014*a* in FIG. 10C. For example, when the first electronic device detects the findable item is within the threshold distance described with reference to step(s) 1102, the first electronic device optionally displays one or more visual representations describing the findable item—described further with reference to step(s) 1108—and optionally displays one or more selectable options (e.g., buttons, text, and/or graphics) corresponding to a request to initiate the request for authorization. For example, the selectable option includes text (e.g., “tap to request location sharing”) and/or an icon (e.g., depicting the findable item and/or a physical object associated with the findable item, such as a backpack, a set of keys, and/or a wallet). In some embodiments, the user interface is overlaid over another user interface that was displayed immediately before the findable item was detected within the threshold distance and/or when the findable item was detected within the threshold distance. In some embodiments, when the first electronic device is in a “locked” state wherein a limited amount of information (e.g., date, day of the week, time, and/or notifications, but not including one or more home user interface elements such as representations of software applications) are available to the first user, the user interface is overlaid over the limited amount of information (e.g., overlaid over a “lock screen” interface). In some embodiments, a notification is presented to the user (e.g., as a banner dropping down and overlaid over a previously displayed user interface such as a map, as a notification in a list of items associated with an application configured to present findable items associated with the user, as a notification on a lock screen, and/or as a notification overlaying a lock screen), and in response to detecting a selection of the notification, the first electronic device displays the user interface including the selectable option. In some embodiments, the request for authorization is initiated in response to detecting a selection input directed toward the selection option (e.g., a tapping of the selectable option (e.g., “tap to request location sharing”) and/or tapping of one or more selectable options presented in response to tapping the selection option (e.g., “Learn More” and/or “tap to request location sharing”)). Displaying a user interface including a selectable option to initiate the request for authorization guides the user away from entry of erroneous inputs that do not initiate the request for authorization, improves privacy of the user account by reducing the likelihood the user account is granted access to location information it is not approved to obtain, and/or reduces the likelihood of erroneously initiating the request for authorization, thereby reducing processing and power consumption required to process such erroneous inputs.

In some embodiments, the process to request the authorization for the first user account to obtain the location information for the findable item includes (1108*a*) in response to detecting that the findable item is within the first threshold distance of the first electronic device, such as threshold 1006 in FIG. 10A, and before initiating the process to request the authorization, displaying, the via display generation component, information associated with a second user account (optionally associated with the findable item) that is different from the location information for the findable item (1108*b*), such as the information included in user interface 1012 in FIG. 10C. For example, before one or more inputs requesting authorization of the location information are received, the first electronic device displays information identifying the findable item, a physical item associated with the findable item, and/or information corresponding to and/or included in the second user account. Such information optionally includes contact information associated with the second user account and/or descriptive information describing the findable item and/or the physical item associated with the findable item (e.g., described further with reference to step(s) 1110-1114). In some embodiments, the information associated with the second user account is displayed concurrently with and/or is included within the user interface including the selectable option to initiate the request for authorization described with reference to step(s) 1106. Presenting information associated with the second user account reduces the likelihood that the user erroneously requests authorization of location information sharing with a findable item that they do not wish to obtain, thereby reducing the processing required to perform initiate such erroneous requests.

In some embodiments, the information associated with the second user account includes a phone number associated with the second user account (1110), such as the phone number included in information 1024 in FIG. 10E. For example, the phone number is optionally the number of a second user that owns the second user account, is included in credentials corresponding to the second user account (e.g., included in credentials for a mobile carrier that provides the second user account), and/or is a phone number of a user account that is associated with the second user account (e.g., the phone number of a father whose child's user account owns the findable item). In some embodiments, at least a portion of the phone number is redacted and/or obscured (e.g., one or more digits are not displayed, are blurred, and/or are replaced with placeholder character(s) such as one or more asterisks). Presenting a phone number associated with the second user account reduces the likelihood that the user erroneously requests authorization of location information sharing with a findable item that they do not wish to obtain, thereby reducing the processing required to perform initiate such erroneous requests.

In some embodiments, the information associated with the second user account includes an electronic communication address associated with the second user account (1112), such as the communication address entered into field 1028A in FIG. 10G that is associated with a user account of electronic device 500B. For example, the electronic communication address is optionally an e-mail address that is included in credentials corresponding to the second user account (e.g., a login e-mail address required to access information of the second user account), and/or is an e-mail address of a second user account that is associated with the second user account (e.g., the e-mail address of a father whose child's user account owns the findable item). In some embodiments, the electronic communication address is a text messaging address, a social media address, a screen name, and/or a unique numeric identifier. In some embodiments, at least a portion of the electronic communication address is redacted and/or obscured (e.g., one or more digits are not displayed, are blurred, and/or are replaced with placeholder character(s) such as one or more asterisks). Presenting an electronic communication address associated with the second user account reduces the likelihood that the user erroneously requests authorization of location information sharing with a findable item that they do not wish to obtain, thereby reducing the processing required to perform initiate such erroneous requests.

In some embodiments, the information associated with the second user account includes an identifier associated with the findable item, such as an identifier included in information 1022A in FIG. 10E, and/or such as an identifier included in user interface 1012A in FIG. 10C (1114). For example, the identifier is a name of a second user associated (e.g., owning) the second user account, a graphical icon depicting a physical item that the findable item is associated with, and/or text describing the physical item and/or the findable item (e.g., Mike's keys and/or Mike's Tag). In some embodiments, the text describing the physical and/or findable item is assigned via the second account (e.g., Mike's backpack, Mike's keys, and/or Mike's car). Presenting an identifier associated with the second user account reduces the likelihood that the user erroneously requests authorization of location information sharing with a findable item that they do not wish to obtain, thereby reducing the processing required to perform initiate such erroneous requests.

In some embodiments, the first electronic device detects (1116*a*), via the one or more input devices, an event corresponding to a request to display the location information for one or more findable items (e.g., before initiating, after initiating and/or while the process to request the authorization for the first user account to obtain the location information for the findable item is ongoing), such as an event that is detected including a request to display the user interface 1004*a* in FIG. 10I. In some embodiments, the event includes one or more inputs launching an item locating application, and/or an initiating and/or refreshing of display of the item locating application including representations of findable item(s) that the first user account is authorized to locate overlaid on a map. In some embodiments, the event includes a selection of a representation of the findable item (e.g., from a list of findable items that are near and/or associated with the first electronic device, from a notification displayed on a lock screen user interface, from a pop-up notification overlaid over other user interfaces, and/or from a banner notification displayed along one or more edges of a user interface of the first electronic device). In some embodiments, the event includes detection of an indication that location tracking of the findable item has been authorized and/or rejected. In some embodiments, the event includes a voice command. In some embodiments, the event includes detection of an interaction between a third electronic device associated with the first user account (e.g., a wearable device, a laptop computer, and/or a tablet) with the findable item.

In some embodiments, in response to detecting the event (e.g., and/or while the request for the authorization is ongoing) (1116*b*), in accordance with the determination that one or more criteria are satisfied, including a criterion that is satisfied when a second user account, different from the first user account, has authorized the first user account to obtain the location information for the findable item (e.g., described with reference to step(s) 1104), the first electronic device displays (1116*c*), via the display generation component, a representation of the location of the findable item, such as representation 1008A in FIG. 10I. For example, as described with reference to method 700, the first electronic device optionally displays a representation of the location of the findable item in an item sharing location application included in the first electronic device, such as a graphical icon overlaid on a map user interface (e.g., the "indication of the location of the first findable item"). As described with reference to step(s) 1102, the second account is associated with the findable item, and optionally communicates an indication that authorization is granted to the first user account (e.g., directly and/or via the findable item network).

In some embodiments, in response to detecting the event (1116*b*), in accordance with a determination that the one or more criteria are not satisfied, the first electronic device forgoes (1116*d*) display of the representation of the location of the findable item, such as forgoing display of representation 1008A in FIG. 10I. For example, when the second user account has not yet authorized the sharing and/or when the second user account has rejected the sharing (e.g., in response to detecting a selection of a selectable option rejecting location sharing privileges, described with reference to step(s) 1102), the first electronic device forgoes display of the representation of the location of the findable item. Displaying or not displaying the representation of the location of the findable item based on whether or not the second user account has authorized the first user account to obtain location information for the findable item prevents the first electronic device from erroneously displaying a location of the findable item based on insufficient location information and prevents the first user account from gaining access to location information without approval of the second user account, thereby reducing processing required to display the erroneous location and improving privacy associated with the second user account.

In some embodiments, initiating the process to request the authorization for the first user account to obtain the location information for the findable item includes (1118*a*), in accordance with a determination one or more criteria are satisfied, including a criterion that is satisfied when a location of the findable item and a location associated with the first user account associated with the first electronic device have been moving together recently (e.g., similar to or the same as described with reference to method 900. It is understood that description of a first electronic device and/or second electronic device in communication with a findable item described with reference to method 900 applies not only to the respective electronic devices, but additionally or alternatively applies to the first user account and/or the second user account described with reference to the present method), such as indicated by electronic device 500A in FIG. 10L, displaying, via the display generation component a first user interface for requesting the authorization for the first user account to obtain the location information for the findable item (1118*b*), such as alert user interface object 1040A in FIG. 10L and/or such as indicated in user interface 1004A in FIG. 10M. In some embodiments, the first electronic device displays the first user interface when the findable item has been moving with the first electronic device (e.g., when the one or more criteria are satisfied) that is different from a second user interface—described further below—that the first electronic device displays when the findable item has not been moving with the first electronic device. In some embodiments, the first user interface has one or more characteristics of the user interfaces and/or alert user interface objects described with reference to method 900. In some embodiments, the first and the second user interfaces include different content. For example, both interfaces include a first set of content (e.g., a graphical icon depicting the findable item, a selectable option that is selectable to cause the findable item to play a sound, and/or a selection option to modify notification settings associated with the findable item), and the first user interface optionally includes content (e.g., text and/or graphics indicating that the tag is not known and/or associated with the first user account, a selectable option to partially disable the findable item, and/or an indication of one or more places and/or times the findable item has been co-located with the first electronic device) that is not included in the second user interface. Thus, in some embodiments, the first electronic device displays context relevant information (e.g., based on a findable item that has been moving with the first electronic device) when the one or more criteria are satisfied.

In some embodiments, initiating the process to request the authorization for the first user account to obtain the location information for the findable item includes (1118*a*) in accordance with a determination that the findable item does not satisfy the one or more criteria, displaying, via the display generation component, a second user interface, different from the first user interface (e.g., and forgoing display of the first user interface), for requesting the authorization for the first user account to obtain the location information for the findable item, such as a user interface including information 1022A in FIG. 10E. For example, the second user interface is as described with reference to step(s) 1102. Displaying a first or a second user interface in accordance with a determination that the one or more criteria are satisfied reduces processing required to display content that is less relevant to a context of that particular user interface and prevents unnecessary display of information about the second user account and/or the findable item, thereby reducing processing required to display the less relevant content and improving privacy of the second user account's information.

In some embodiments, initiating the process to request the authorization for the first user account to obtain the location information for the findable item includes (1120*a*) in accordance with a determination that the findable item satisfies one or more criteria, including a criterion that is satisfied when the findable item is associated with a second user account that is included in a plurality of user accounts including the first user account (e.g., as described with reference to method 900 with respect to devices associated with a user of an electronic device, and similarly applicable to user accounts associated with similar electronic device(s)), displaying, via the display generation component a first user interface for requesting the authorization for the first user account to obtain the location information for the findable item (1120*b*), such as user interface 1012A displayed by electronic device 500A in FIG. 10C, when a respective first user account associated with electronic device 500A is associated with a plurality of user accounts including a respective second user account associated with electronic device 500B and/or a findable item corresponding to representation 1008B in FIG. 10C. For example, when the first electronic device is associated with a group of user accounts such as a family account including the group of user accounts, a list of contacts of the first user account and/or the second user account, and/or the first user account is included in a group of user accounts that are temporarily authorized to obtain the location information (e.g., by the second user account), the first electronic device optionally displays a first user interface. The first user interface optionally includes a first set of content (e.g., media, information, and/or selectable options) corresponding to performing the requesting of the authorization, such as a selectable option to initiate the request for the authorization of location sharing. In some embodiments, the first user interface does not include content that is displayed when the findable item does not satisfy the one or more criteria, as described further below. In some embodiments, the first electronic device forgoes display of selectable options and/or prompts requiring information verifying an identity of the second user account (e.g., described with reference to step(s) 1108-1114 of the present method), because such information is implicitly known given the findable item is associated with the plurality of user accounts including the first user account.

In some embodiments, initiating the process to request the authorization for the first user account to obtain the location information for the findable item includes (1120*a*) in accordance with a determination that the findable item does not satisfy the one or more criteria, displaying, via the display generation component, a second user interface, different from the first user interface (e.g., and forgoing display of the first user interface), for requesting the authorization for the first user account to obtain the location information for the findable item (1120*c*), such as user interface 1012A displayed by electronic device 500A in FIG. 10D, when a respective first user account associated with electronic device 500A is not associated with a plurality of user accounts including a respective second user account associated with electronic device 500B and/or a findable item corresponding to representation 1008B in FIG. 10D. For example, the second user interface optionally includes a first portion of the first set of content included in the first user interface (e.g., a graphical icon depicting the findable item, a selectable option to learn more about the findable item, and/or text identifying a characteristic of the findable item (e.g., that the findable item is a "tag")), and includes a second set of content, different from the first set of content. For example, the second user interface optionally includes a selectable option and/or prompts requiring information verifying the identity of the second user account. Additionally or alternatively, the second user interface optionally does not include a second portion of the first set of content included in the first user interface (e.g., information identifying a name of the second user that is associated with the second account, information describing a physical item associated with the findable item, and/or a selectable option to directly request the authorization of sharing of the location information without providing the identity verification of the second user account). Displaying a first or a second user interface in accordance with a determination that the findable item is associated with a plurality of user accounts associated with the first user account tailors a presented user interface in light of a determined relationship between the findable item and the first user account, thereby reducing the need for input to indicate a relationship (e.g., a degree of trust) between the first electronic device and the findable item and/or the second user account, thus reducing power consumption and processing required to process such input and improving privacy of information associated with the findable item and its associated user account(s).

In some embodiments, while a location of the findable item is near a location associated with the first electronic device (1122*a*) (e.g., before initiating, after initiating, and/or while the process to request the authorization for the first user account to obtain the location information for the findable item is ongoing, and as described further with reference to method 900), such as the location of findable item 1008 relative to a location of electronic device 500A as shown in FIG. 10I, in accordance with a determination that the findable item satisfies one or more criteria, including a criterion that is satisfied when the location of the findable item and the location associated with the first user account associated with the first electronic device have been moving together recently (e.g., further described with reference to method 900), the first electronic device displays (1122*b*), via the display generation component, an alert user interface object that indicates presence of the findable item at the location associated with the first user account of the first electronic device, such as the alert user interface object 1040A in FIG. 10L. In some embodiments, the alert user interface object has one or more characteristics of similar user interface objects described with reference to method 900. In some embodiments, the location associated with the first user account corresponds to a location provided by the first electronic device, and when the findable item location and the location provided by the first electronic device have been moving together (e.g., described further with reference to method 900), the first electronic device displays an alert to indicate close movement of the findable item and the first electronic device.

In some embodiments, in accordance with a determination that the findable item does not satisfy the one or more criteria, the first electronic device forgoes (1122*c*) the displaying of the alert user interface object, such as not displaying alert user interface object 1042A shown in FIG. 10L. For example, as described with reference to method 900. In some embodiments, after the first user account is authorized to obtain the location information associated with the findable item, the first electronic device forgoes performance and/or initiation of one or more operations to alert the user of the presence of the findable item, such as the displaying of the alert user interface object described previously, and/or in a similar or the same manner to as described with reference to method 900. In some embodiments, after and/or in response to receiving the authorization to obtain the location information associated with the findable item and/or the location information itself, the first electronic displays, via the display generation component, a visual indication of a location of the findable item (e.g., an icon and/or text representative of the findable item, overlaid on a map in an item locating application). Displaying or not displaying an alert user interface object based on whether the location of the findable item and the location associated with the first user account have been moving together recently reduces the processing required to display an erroneous alert user interface object when the findable item and the location associated with the first user account have not been moving together, thereby saving on power consumption of the first electronic device and improving user awareness about other accounts potentially receiving location information associated with the user.

In some embodiments, the one or more criteria include a criterion that is satisfied when the location of the findable item is within (e.g., has remained within, and/or nearly has remained within) a second threshold distance (e.g., in contact, 0.001 m, 0.005 m, 0.01 m, 0.05 m, 0.1 m, 1 m, 5 m, 10 m, or 50 m) of the location associated with the first user account of the first electronic device, different from (e.g., greater than or less than) the first threshold distance, such as a threshold distance of a findable item associated with the findable item 1008 shown in FIG. 10A, different from threshold 1006 in FIG. 10A. For example, as described with reference to method 900, the first electronic device optionally presents an alert user interface object if the findable item is within the second threshold distance. In some embodiments, the second threshold distance is greater than the first threshold distance (e.g., in contact, 0.0001, 0.0005, 0.001, 0.005, 0.01, 0.05, 0.1, 0.2, 0.3, 0.4 and/or 0.5 m). Defining different threshold distances for displaying the alert user interface object and for initiating the processes to authorize sharing of the location information associated with the findable item reduces the likelihood such authorization is erroneously initiated and/or that alerts are not sufficiently presented via the first electronic device, thereby reducing processing required to handle erroneous initiation of authorization and improving user awareness that the findable item might be co-located with the first electronic device.

In some embodiments, the process to request the authorization for the first user account to obtain the location information for the findable item includes (1126*a*), in accordance with a determination that the findable item did not satisfy the one or more criteria before detecting that the findable item is within the first threshold distance of the first electronic device (e.g., at a time prior and/or leading up to the detection of the findable item within the first threshold distance), requiring input, via the one or more input devices, of information associated with the second user account before the request for the authorization for the first user account to obtain the location information for the findable item progresses (1126*b*), such as information entered into field 1028A in FIG. 10F. For example, before the first electronic devices determines and/or receives an indication that the findable item is potentially traveling with the first electronic device, the first electronic device optionally displays a prompt and/or one or more selectable options requesting verification information associated with the second user account, described further with reference to step(s) 1120. As an example, the first electronic device optionally displays a fillable field, requesting entry of an electronic communication address associated with the second user account, a phone number associated with the second user account, and/or an answer to question posed by the owner of the second user account, before further operations related to the authorization to obtain the location information are performed. In some embodiments, in accordance with a determination that the first user account successfully provided information verifying their association with the second user account (e.g., verifying the first user's knowledge of the second user account phone number, electronic communication address, answer to a security question, and/or a password), the first electronic device proceeds with the request for the authorization for location information.

In some embodiments, the process to request the authorization for the first user account to obtain the location information for the findable item includes (1126*a*), in accordance with a determination that the findable item satisfied the one or more criteria before detecting that the findable item is within the first threshold distance of the first electronic device, requesting the authorization for the first user account to obtain the location information for the findable item without requiring the input of the information associated with the second user account (1126*c*), such as the requesting performed in response to contact 1054*a* directed to selectable option 1048A in FIG. 10M. For example, after the alert user interface object was displayed (e.g., described further with reference to step(s) 1122), the first electronic device optionally forgoes display of the prompt and/or one or more selectable options that are selectable to request the verification information. In some embodiments, the process to request the authorization continues without additional user input (e.g., tapping on a touch screen included in the first electronic device). Requiring—or not requiring—information associated with the second user account before proceeding with the request for the authorization of location information reduces user input when the user of the first electronic device is already aware of the presence of the findable item and reduces the likelihood the user erroneously requests such information sharing for findable items that are unintentional targets of such requests, thereby improving the efficiency and/or speed with which the first electronic device facilitates the request and/or reduces the inputs required to handle an erroneous request and improving privacy of information associated with the second user account.

In some embodiments, the process to request the authorization for the first user account to obtain the location information for the findable item includes (1128*a*) before requesting the authorization, displaying, via the display generation component, a prompt for information associated with the second user account (1128*b*), such as a prompt included in user interface 1012A in FIG. 10C. For example, the prompt for the information includes the information associated with the second user account described with reference to step(s) 1108-1114 (e.g., a partially redacted phone number, communication address, and/or identifier associated with the second user account), and/or text and/or graphics requesting entry of a password and/or information similar or the same to information described with reference to step(s) 1108-1114 (e.g., a full phone number, communication address, identifier, and/or password associated with the second user account.

In some embodiments, the process to request the authorization for the first user account to obtain the location information for the findable item includes (1128*a*) while displaying the prompt for information associated with the second user account, detecting, via the one or more input devices, one or more inputs corresponding to entry of respective information into the prompt (1128*c*), such as information entered into field 1028A in FIG. 10G. For example, the information includes one or more of the requested pieces of information described above (e.g., text, graphical, and/or numeric character(s)).

In some embodiments, the process to request the authorization for the first user account to obtain the location information for the findable item includes (1128*a*) in response to detecting, via the one or more input devices, the entry of the respective information into the prompt (1128*d*), in accordance with a determination that the respective information is authenticated as corresponding to the information associated with the second user account, proceeding with requesting the authorization for the first user account to obtain the location information for the findable item (1128*e*), such as indicated by information 1022A in FIG. 10H. For example, if the one or more pieces of respective information matches information associated with the second user account (e.g., the phone number, communication address, identifier, and/or password match what a trusted entity has recorded as corresponding to the second user account), the first electronic device proceeds with the requesting of the authorization. In some embodiments, the first electronic device communicates with another device (e.g., the second device, a trusted entity, and/or one or more devices included in a findable item network) to verify the matching of the entered information and recorded information associated with the second user account. In response to receiving an indication that the information matches, the first electronic device optionally transmits a request for the location information. In some embodiments, the displayed information is at least partially redacted, and in some embodiments, the respective information entirely matches the information associated with the second user account (e.g., the respective information matches if a full password, phone number, communication address, and/or identifier is entered that matches what is registered with the second user account).

In some embodiments, in response to detecting, via the one or more input devices, the entry of the respective information into the prompt (1128*a*), in accordance with a determination that the respective information is not authenticated as corresponding to the information associated with the second user account, forgoing proceeding with requesting the authorization (11280, such as when the information entered into field 1028A in FIG. 10G does not correspond to information registered with the second account associated with electronic device 500B in FIG. 10G. For example, the first electronic device does not transmit the request, and/or displays another prompt indicating that the entered information is inconsistent with the information associated with the second user account in accordance with a determination that the respective information does not correspond to (e.g., match) the information associated with the second user account. Proceeding with the authorization request when the respective information is authenticated as corresponding to the second user account ensures that the first user account is granted access to the location information only if the first user account is proven to be trusted, thereby protecting privacy of information associated with the findable item and/or the second user account.

It should be understood that the particular order in which the operations in FIGS. 11A-11E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700 and/or method 900) are also applicable in an analogous manner to method 1100 described above with respect to FIGS. 11A-11E. For example, the findable items, electronic devices, alert user interface objects, user interfaces, and associated logic have one or more characteristics of remote locator objects and/or tracking notifications and associated logic described above with reference to method 900, and/or optionally have one or more of the characteristics of findable items and/or receiving and/or transmitting invitations for accessing locations of findable items and associated logic described above with reference to method 700. For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 11A-11E are, optionally, implemented by components depicted in FIGS. 1A-1B. For example, displaying operations 1106, 1118*b/c*, 1120*b/c* and detecting operations 1102*a*, 1116*a*, 1128*c*, 1128*d*, are optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to improve the ability for users to track and locate items that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to identify the location of remote locator objects and/or identify the location of the user. Accordingly, use of such personal information data enables users to identify, find, and otherwise interact with remote locator objects. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an application that their personal information data will be accessed and then reminded again just before personal information data is accessed by the application.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, location data and notifications can be delivered to users based on aggregated non-personal information data or a bare minimum amount of personal information.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method, comprising:

at a first electronic device in communication with a second electronic device, a display generation component, and one or more input devices:

receiving an invitation associated with accessing a location of a first findable item, wherein the first findable item is not associated with a first user of the first electronic device and is associated with a second user, different from the first user, of the second electronic device, wherein:

the invitation is an invitation sent by the second user of the second electronic device; and a location of the first findable item is independent from a location of the second electronic device;

after receiving the invitation, displaying, via the display generation component, a first selectable option that is selectable to initiate a process to accept the invitation associated with accessing the location of the first findable item;

while displaying the first selectable option, receiving, via the one or more input devices, a first input; and after receiving the first input, displaying, via the display generation component, a user interface of an item locating application, wherein:

in accordance with a determination that the first input corresponded to selection of the first selectable option, the user interface includes:

a representation of the first findable item that indicates the location of the first findable item, and one or more representations of one or more other findable items.

2. The method of claim 1, the method further comprising:

after receiving the first input, displaying, via the display generation component, the user interface of the item locating application, wherein:

in accordance with a determination that the first input corresponded to selection of a second selectable option, the user interface does not include the representation of the first findable item that indicates the location of the first findable item, wherein the second selectable option is selectable to decline the invitation associated with accessing the location of the first findable item.

3. The method of claim 1, wherein the user interface of the item locating application concurrently includes:

the representation of the first findable item that indicates the location of the first findable item; and a representation of a second findable item that is associated with the first user and indicates a location of the second findable item, wherein a third user, different from the first user, has access to the location of the second findable item based on an invitation associated with accessing the location of the first findable item transmitted by the first user to the third user.

4. The method of claim 1, wherein the user interface of the item locating application concurrently includes:

the representation of the first findable item that indicates the location of the first findable item; and a representation of a second findable item that is associated with the first user and indicates a location of the second findable item, wherein another user does not have access to the location of the second findable item.

5. The method of claim 4, wherein the representation of the first findable item that indicates the location of the first findable item is displayed within a first region of the user interface, and the representation of the second findable item that indicates the location of the second findable item is displayed within a second region of the user interface, different from the first region.

6. The method of claim 5, wherein the user interface of the item locating application further concurrently includes:

a representation of a third findable item that indicates a location of the third findable item, wherein the representation of the third findable item is displayed within a third region of the user interface, different from the first region and the second region, and wherein a third user, different from the first user and the second user, has access to the location of the third findable item.

7. The method of claim 4, wherein the representation of the first findable item that indicates the location of the first findable item further indicates one or more users, different from the first user and the second user, who have access to the location of the first findable item.

8. The method of claim 7, further comprising:

receiving an invitation associated with accessing a location of a third findable item, different from the first findable item and the second findable item, wherein the third findable item is not associated with the first user of the first electronic device and is associated with a third user, different from the first user, of a third electronic device; and after receiving the invitation, displaying, via the display generation component, an indication of the invitation associated with accessing the location of the third findable item in the user interface of the item locating application, wherein the indication of the invitation is concurrently displayed with the representation of the first findable item and the representation of the second findable item.

9. The method of claim 8, wherein the indication of the invitation associated with accessing the location of the third findable item includes:

a first option that is selectable to initiate a process to accept the invitation associated with accessing the location of the third findable item; and a second option that is selectable to decline the invitation associated with accessing the location of the third findable item.

10. The method of claim 4, further comprising:

receiving a request to share a location of a third findable item that is associated with the first user, different from the first findable item and the second findable item, with a third user, different from the first user, of a third electronic device, wherein the third user does not have access to the location of the third findable item; and after receiving the request, displaying, via the display generation component, an indication of the request to share, with the third user, the location of the third findable item that is associated with the first user in the user interface of the item locating application, wherein the indication of the request is concurrently displayed with the representation of the first findable item and the representation of the second findable item.

11. The method of claim 10, wherein the indication of the request to share, with the third user, the location of the third findable item that is associated with the first user includes:

a first option that is selectable to initiate a process to share the location of the third findable item with the third user; and a second option that is selectable to decline the request to share the location of the third findable item with the third user.

12. The method of claim 1, the method further comprising:

receiving a second invitation associated with accessing a location of a second findable item, wherein the second findable item is not associated with the first user of the first electronic device and is associated with a third user, different from the first user, of a third electronic device;

after receiving the invitation and the second invitation, concurrently displaying, via the display generation component:

the first selectable option that is selectable to initiate the process to accept the invitation associated with accessing the location of the first findable item; and a second selectable option that is selectable to initiate a process to accept the second invitation associated with accessing the location of the second findable item.

13. The method of claim 1, wherein displaying, via the display generation component, the user interface of the item locating application includes:

in accordance with a determination that a first set of one or more users has access to a location of a second findable item that is associated with the first user of the first electronic device, displaying a representation of the second findable item that indicates the location of the second findable item in association with first one or more indications of users in the first set of one or more users; and in accordance with a determination that a second set of one or more users, different from the first set of one or more users, has access to the location of the second findable item that is associated with the first user of the first electronic device, displaying the representation of the second findable item that indicates the location of the second findable item in association with second one or more indications of users in the second set of one or more users.

14. The method of claim 1, the method further comprising:

after receiving the first input, wherein the first input corresponded to selection of the first selectable option, in accordance with a determination that a second invitation associated with accessing the location of the first findable item was transmitted to or accepted by a third user, different from the first user and the second user, displaying, via the display generation component, a notification indicating that the third user was invited to access the location of the first findable item.

15. The method of claim 14, wherein the notification is displayed on a lock screen user interface of the first electronic device.

16. The method of claim 14, wherein the notification is displayed in the user interface of the item locating application.

17. The method of claim 1, wherein the first input corresponded to selection of the first selectable option, and displaying the user interface of the item locating application includes:

displaying, in the user interface, a map of a physical region that includes the location of the first findable item and a location of a third user; and concurrently displaying on the map:

the representation of the first findable item at a location on the map corresponding to the location of the first findable item; and a representation of the third user at a location on the map corresponding to the location of the third user.

18. The method of claim 1, wherein the first input corresponded to selection of the first selectable option, and displaying the user interface of the item locating application includes:

displaying, in the user interface, a map of a physical region that includes the location of the first findable item and a location of a third user; and in accordance with a determination that the third user is sharing their location with the first user and in accordance with a determination that the first findable item is in proximity to the location of the third user, concurrently displaying on the map:

the representation of the first findable item at a location on the map corresponding to the location of the first findable item; and a representation of the third user at a location on the map corresponding to the location of the third user; and in accordance with a determination that the third user is not sharing their location with the first user, displaying on the map the representation of the first findable item at the location on the map corresponding to the location of the first findable item without displaying the representation of the third user.

19. The method of claim 18, further comprising:

while a first set of one or more users or a second set of one or more users has access to the location of a second findable item that is associated with the first user of the first electronic device, receiving, via the display generation component, a second input corresponding to a request to share access to the location of the second findable item with a respective user; and in response to receiving the second input:

in accordance with a determination that the first set of one or more users has access to the location of the second findable item that is associated with the first user of the first electronic device, displaying, via the display generation component, an indication that the one or more users in the first set of one or more users will be alerted that the location of the second findable item will be accessible by the respective user; and in accordance with a determination that the second set of one or more users has access to the location of the second findable item that is associated with the first user of the first electronic device, displaying, via the display generation component, an indication that the one or more users in the second set of one or more users will be alerted that the location of the second findable item will be accessible by the respective user.

20. The method of claim 1, further comprising:

displaying, in a second user interface of the item locating application, wherein the second user interface is associated with a second findable item that is associated with the first user, a second selectable option that is selectable to transmit a second invitation associated with accessing a location of the second findable item to a third user; and displaying a third user interface of the item locating application, wherein the third user interface is associated with the first findable item, wherein the third user interface does not include a selectable option that is selectable to initiate a process to transmit a third invitation associated with accessing a location of the first findable item.

21. The method of claim 20, wherein a first set of one or more users, different from the first user, has access to the location of the second findable item in response to having accepted invitations associated with accessing the location of the second findable item, and the second selectable option is displayed in association with one or more visual indications of the first set of one or more users.

22. The method of claim 1, displaying, in a second user interface of the item locating application, wherein the second user interface is associated with the first findable item, a second selectable option that is selectable to initiate a lost mode for the first findable item.

23. The method of claim 22, wherein displaying the second user interface includes:

in accordance with a determination that the lost mode was enabled for the first findable item, and that a third user enabled the lost mode for the first findable item, displaying, in the second user interface, a visual indication indicating that the third user initiated the lost mode.

24. The method of claim 22, wherein displaying the second user interface includes:

in accordance with a determination that the lost mode was enabled for the first findable item, displaying, in the second user interface, a visual indication of when the lost mode was enabled for the first findable item.

25. The method of claim 22, wherein displaying the second user interface includes:

in accordance with a determination that the lost mode was enabled for the first findable item, displaying, in the second user interface, a third selectable option that is selectable to change a phone number associated with the lost mode for the first findable item;

receiving a second input, wherein the second input corresponded to selection of the third selectable option;

after receiving the second input, receiving a third input to change the phone number associated with the lost mode for the first findable item; and after receiving the third input, displaying the changed phone number associated with the lost mode for the first findable item.

26. The method of claim 25, wherein displaying the user interface of the item locating application includes in accordance with a determination that a third user is sharing their location with the first user and in accordance with a determination that the first findable item is in proximity to a location of the third user, a representation of the third user is displayed at a location on a map corresponding to the location of the third user based on a determination of the location of the third user that is independent of a determination of the location of the first findable item.

27. The method of claim 1, further comprising:

displaying, in a second user interface of the item locating application, wherein the second user interface is associated with a second findable item that is associated with the first user, a second selectable option that is selectable to initiate a process to transmit a second invitation associated with accessing a location of the second findable item to a third user; and displaying a third user interface of the item locating application, wherein the third user interface is associated with the first findable item, wherein the third user interface does not include a selectable option that is selectable to initiate a process to transmit a third invitation associated with accessing a location of the first findable item.

28. The method of claim 27, wherein the third user interface associated with the first findable item does not include a selectable option that is selectable to initiate a process to revoke access to the location of the first findable item, and the second user interface associated with the second findable item does include a third selectable option that is selectable to initiate a process to revoke access to the location of the second findable item.

29. The method of claim 27, further comprising:

after receiving the first input, wherein the first input corresponded to selection of the first selectable option:

in accordance with a determination that the location of the second findable item satisfies one or more separation criteria, including a criterion that is satisfied when the location of the second findable item has become separated from the first electronic device, presenting one or more indications that the second findable item has become separated from the first electronic device; and in accordance with a determination that the location of the first findable item satisfies the one or more separation criteria, forgoing presenting one or more indications that the first findable item has become separated from the first electronic device.

30. The method of claim 1, further comprising:

displaying, in a second user interface of the item locating application, wherein the second user interface is associated with a second findable item that is associated with the first user, a second selectable option that is selectable to initiate a lost mode for the second findable item; and displaying a third user interface of the item locating application, wherein the third user interface is associated with the first findable item, and wherein the third user interface does not include a selectable option that is selectable to initiate a lost mode for the first findable item.

31. The method of claim 30, wherein a third user, different from the first user, of a third electronic device has access to a location of the second findable item, the method further comprising:

while displaying the second selectable option in the second user interface associated with the second findable item, receiving, via the one or more input devices, a second input corresponding to selection of the second selectable option;

in response to receiving the second input, initiating the lost mode for the second findable item;

while the lost mode for the second findable item is active, receiving an indication that the second findable item has been located, wherein the indication is not transmitted to the third user of the third electronic device; and in response to receiving the indication, displaying, via the display generation component, a visual indication that the second findable item has been located.

32. The method of claim 1, further comprising:

after receiving the first input, wherein the first input corresponded to selection of the first selectable option, wherein the first user and one or more other users including the second user have access to the location of the first findable item, receiving, via the one or more input devices, a second input corresponding to a request to remove access to the location of the first findable item; and after receiving the second input, displaying, via the display generation component, a user interface object that indicates that the location of the first findable item remains accessible to the one or more other users, including the second user of the second electronic device.

33. The method of claim 1, the method further comprising:

displaying, in a second user interface of the item locating application, wherein the second user interface is associated with the first findable item, a second selectable option that is selectable to rename the first findable item.

34. The method of claim 1, wherein the second user has access to the location of the first findable item, the method further comprising:

after receiving the first input, wherein the first input corresponded to selection of the first selectable option, receiving, via the one or more input devices, a second input corresponding to a request to cease access to the location of the first findable item;

after receiving the second input, displaying, via the display generation component, the user interface of the item locating application, wherein the user interface of the item locating application does not include the representation of the first findable item that indicates the location of the first findable item; and in response to receiving the second input:

ceasing access to the location of the first findable item, wherein the second user continues to have access to the location of the first findable item; and displaying, via the display generation component, a user interface object that indicates that the second user continues to have access to the location of the first findable item.

35. The method of claim 1, the method further comprising:

after receiving the first input, wherein the first input corresponded to selection of the first selectable option, wherein the first user and one or more other users including the second user have access to the location of the first findable item, receiving an indication that access to the location of the first findable item has been revoked; and after receiving the indication that access to the location of the first findable item has been revoked, displaying, via the display generation component, a user interface object that indicates that access to the location of the first findable item has been revoked and that the location of the first findable item remains accessible to the one or more other users.

36. A first electronic device, comprising:

one or more processors;

memory; and one or more programs, wherein the one or more programs are stored in the memory and configured to be executed by the one or more processors, the one or more programs including instructions for:

receiving an invitation associated with accessing a location of a first findable item, wherein the first findable item is not associated with a first user of the first electronic device and is associated with a second user, different from the first user, of a second electronic device, wherein:

the invitation is an invitation sent by the second user of the second electronic device; and a location of the first findable item is independent from a location of the second electronic device;

after receiving the invitation, displaying, via a display generation component, a first selectable option that is selectable to initiate a process to accept the invitation associated with accessing the location of the first findable item;

while displaying the first selectable option, receiving, via one or more input devices, a first input; and after receiving the first input, displaying, via the display generation component, a user interface of an item locating application, wherein:

in accordance with a determination that the first input corresponded to selection of the first selectable option, the user interface includes:

a representation of the first findable item that indicates the location of the first findable item, and one or more representations of one or more other findable items.

37. The first electronic device of claim 36, the one or more programs further including instructions for:

after receiving the first input, displaying, via the display generation component, the user interface of the item locating application, wherein:

in accordance with a determination that the first input corresponded to selection of a second selectable option, the user interface does not include the representation of the first findable item that indicates the location of the first findable item, wherein the second selectable option is selectable to decline the invitation associated with accessing the location of the first findable item.

38. The first electronic device of claim 36, wherein the user interface of the item locating application concurrently includes:

the representation of the first findable item that indicates the location of the first findable item; and a representation of a second findable item that is associated with the first user and indicates a location of the second findable item, wherein a third user, different from the first user, has access to the location of the second findable item based on an invitation associated with accessing the location of the first findable item transmitted by the first user to the third user.

39. The first electronic device of claim 36, wherein the user interface of the item locating application concurrently includes:

the representation of the first findable item that indicates the location of the first findable item; and a representation of a second findable item that is associated with the first user and indicates a location of the second findable item, wherein another user does not have access to the location of the second findable item.

40. The first electronic device of claim 36, wherein displaying, via the display generation component, the user interface of the item locating application includes:

in accordance with a determination that a first set of one or more users has access to a location of a second findable item that is associated with the first user of the first electronic device, displaying a representation of the second findable item that indicates the location of the second findable item in association with first one or more indications of users in the first set of one or more users; and in accordance with a determination that a second set of one or more users, different from the first set of one or more users, has access to the location of the second findable item that is associated with the first user of the first electronic device, displaying the representation of the second findable item that indicates the location of the second findable item in association with second one or more indications of users in the second set of one or more users.

41. The first electronic device of claim 36, the one or more programs further including instructions for:

after receiving the first input, wherein the first input corresponded to selection of the first selectable option, in accordance with a determination that a second invitation associated with accessing the location of the first findable item was transmitted to or accepted by a third user, different from the first user and the second user, displaying, via the display generation component, a notification indicating that the third user was invited to access the location of the first findable item.

42. The first electronic device of claim 41, wherein the notification is displayed on a lock screen user interface of the first electronic device.

43. A non-transitory computer readable storage medium storing one or more programs, the one or more programs comprising instructions, which when executed by one or more processors of a first electronic device, cause the first electronic device to perform a method comprising:

receiving an invitation associated with accessing a location of a first findable item, wherein the first findable item is not associated with a first user of the first electronic device and is associated with a second user, different from the first user, of a second electronic device, wherein:

the invitation is an invitation sent by the second user of the second electronic device; and a location of the first findable item is independent from a location of the second electronic device;

after receiving the invitation, displaying, via a display generation component, a first selectable option that is selectable to initiate a process to accept the invitation associated with accessing the location of the first findable item;

while displaying the first selectable option, receiving, via one or more input devices, a first input; and after receiving the first input, displaying, via the display generation component, a user interface of an item locating application, wherein:

in accordance with a determination that the first input corresponded to selection of the first selectable option, the user interface includes:

a representation of the first findable item that indicates the location of the first findable item, and one or more representations of one or more other findable items.

44. The non-transitory computer readable storage medium of claim 43, the method further comprising:

after receiving the first input, displaying, via the display generation component, the user interface of the item locating application, wherein:

in accordance with a determination that the first input corresponded to selection of a second selectable option, the user interface does not include the representation of the first findable item that indicates the location of the first findable item, wherein the second selectable option is selectable to decline the invitation associated with accessing the location of the first findable item.

45. The non-transitory computer readable storage medium of claim 43, wherein the user interface of the item locating application concurrently includes:

the representation of the first findable item that indicates the location of the first findable item; and a representation of a second findable item that is associated with the first user and indicates a location of the second findable item, wherein a third user, different from the first user, has access to the location of the second findable item based on an invitation associated with accessing the location of the first findable item transmitted by the first user to the third user.

46. The non-transitory computer readable storage medium of claim 43, wherein the user interface of the item locating application concurrently includes:

the representation of the first findable item that indicates the location of the first findable item; and a representation of a second findable item that is associated with the first user and indicates a location of the second findable item, wherein another user does not have access to the location of the second findable item.

47. The non-transitory computer readable storage medium of claim 43, wherein displaying, via the display generation component, the user interface of the item locating application includes:

in accordance with a determination that a first set of one or more users has access to a location of a second findable item that is associated with the first user of the first electronic device, displaying a representation of the second findable item that indicates the location of the second findable item in association with first one or more indications of users in the first set of one or more users; and in accordance with a determination that a second set of one or more users, different from the first set of one or more users, has access to the location of the second findable item that is associated with the first user of the first electronic device, displaying the representation of the second findable item that indicates the location of the second findable item in association with second one or more indications of users in the second set of one or more users.

48. The non-transitory computer readable storage medium of claim 43, the method further comprising:

after receiving the first input, wherein the first input corresponded to selection of the first selectable option, in accordance with a determination that a second invitation associated with accessing the location of the first findable item was transmitted to or accepted by a third user, different from the first user and the second user, displaying, via the display generation component, a notification indicating that the third user was invited to access the location of the first findable item.

49. The non-transitory computer readable storage medium of claim 48, wherein the notification is displayed on a lock screen user interface of the first electronic device.

* * * * *